US007612735B2

(12) United States Patent
Essig, Jr. et al.

(10) Patent No.: US 7,612,735 B2
(45) Date of Patent: *Nov. 3, 2009

(54) MULTI-FUNCTION FIELD-DEPLOYABLE RESOURCE HARNESSING APPARATUS AND METHODS OF MANUFACTURE

(76) Inventors: John R. Essig, Jr., P.O. Box 3333, Fairfax, VA (US) 22038-3333; James Essig, P.O. Box 3333, Fairfax, VA (US) 22038-3333

(*) Notice: Subject to any disclaimer, the term of this patent is extended or adjusted under 35 U.S.C. 154(b) by 0 days.

This patent is subject to a terminal disclaimer.

(21) Appl. No.: 11/254,023

(22) Filed: Oct. 20, 2005

(65) Prior Publication Data

US 2006/0033674 A1 Feb. 16, 2006

Related U.S. Application Data

(63) Continuation-in-part of application No. 10/729,145, filed on Dec. 4, 2003, now Pat. No. 7,382,332, which is a continuation-in-part of application No. 10/156,814, filed on May 30, 2002, now Pat. No. 6,897,832.

(60) Provisional application No. 60/620,510, filed on Oct. 20, 2004.

(51) Int. Cl.
*H01Q 15/20* (2006.01)
*H01Q 1/34* (2006.01)
*H01Q 1/12* (2006.01)

(52) U.S. Cl. ............... 343/915; 343/709; 343/878

(58) Field of Classification Search ............ 343/709, 343/832, 878, 912, 915
See application file for complete search history.

(56) References Cited

U.S. PATENT DOCUMENTS

| 2,814,038 | A | * | 11/1957 | Miller | ............... 343/757 |
| 3,005,987 | A | | 10/1961 | Mack et al. | ............... 343/872 |
| 3,326,624 | A | | 6/1967 | Maydell et al. | ............... 350/293 |

(Continued)

FOREIGN PATENT DOCUMENTS

CH 671 832 9/1989

(Continued)

OTHER PUBLICATIONS

El-Kassaby M M: "New Solar Cooker of Parabolic Square Dish: Design and Simulation" Renewable Energy, Pergamon Press, Oxford, GB, vol. 1, No. 1, Jan. 1991, pp. 59-65, XP000204646.

*Primary Examiner*—Shih-Chao Chen

(57) ABSTRACT

A multi-function, field-deployable resource harnessing apparatus having, in its embodiments, an inflatable reflector apparatus comprising at least one manufactured parabolic mirror made from a pressure-deformable reflective covering of an inflatable ring for focusing electromagnetic energy from radio frequency radiation (RF) through the ultraviolet (UV) radiation including solar energy. A first main embodiment of the inflatable reflector apparatus generally utilizes two pressure-deformable membranes, at least one of which is reflective. A second main embodiment utilizes a reflective membrane and a transparent membrane. In addition to the reflector apparatus, the modular apparatus typically further includes modular assemblies to increase versatility facilitate use, and/or enhance safety such as, for example, a modular support and orienting assembly, a separate support ring, a safety shield or cage, a focal point support assembly, a safety cover, a safety net or mesh, and a stabilizing assembly. Portability is enhanced by complete collapsing of the inflatable device.

76 Claims, 68 Drawing Sheets

U.S. PATENT DOCUMENTS

| | | | |
|---|---|---|---|
| 3,373,069 A | 3/1968 | Gillespie, Jr. | 156/285 |
| 3,599,218 A | 8/1971 | Williamson et al. | 343/840 |
| 3,730,120 A | 5/1973 | Dobell | 114/0.5 R |
| 4,281,644 A | 8/1981 | Chiles | 126/451 |
| 4,446,854 A | 5/1984 | Clevett et al. | 126/451 |
| 4,552,126 A | 11/1985 | Boyd | 126/451 |
| 4,585,317 A | 4/1986 | Hodges et al. | 350/628 |
| 4,672,389 A | 6/1987 | Ulry et al. | 343/915 |
| 4,673,934 A * | 6/1987 | Gentry et al. | 342/8 |
| 4,744,112 A | 5/1988 | Keesling, Jr. | 4/585 |
| 4,868,578 A | 9/1989 | Bruinsma et al. | 343/882 |
| 4,979,494 A | 12/1990 | Andersen et al. | 126/451 |
| 5,101,823 A | 4/1992 | Smith | 128/369 |
| 5,404,868 A * | 4/1995 | Sankrithi | 126/604 |
| 5,515,067 A | 5/1996 | Rits | 343/912 |
| 5,617,843 A | 4/1997 | Erwin | 126/681 |
| 5,760,739 A | 6/1998 | Pauli | 343/359 |

FOREIGN PATENT DOCUMENTS

| | | |
|---|---|---|
| DE | 11 19 707 | 12/1961 |
| DE | 29 35 341 | 6/1980 |
| DE | 34 39 150 | 5/1986 |
| DE | 40 09 754 | 1/1991 |
| DE | 44 41 201 | 4/1995 |
| DE | 4441201 A1 * | 6/1995 |
| DE | 199 23 141 | 11/2000 |
| EP | 0 025 834 | 4/1981 |
| FR | 1 048 681 | 12/1953 |
| FR | 2 446 451 | 8/1980 |
| FR | 2 567 995 | 1/1986 |
| FR | 2 787 867 | 6/2000 |
| GB | 2 054 188 | 2/1981 |
| JP | 60 049128 | 3/1985 |
| SU | 1 343 208 | 10/1987 |
| SU | 1 766 845 | 10/1992 |

* cited by examiner

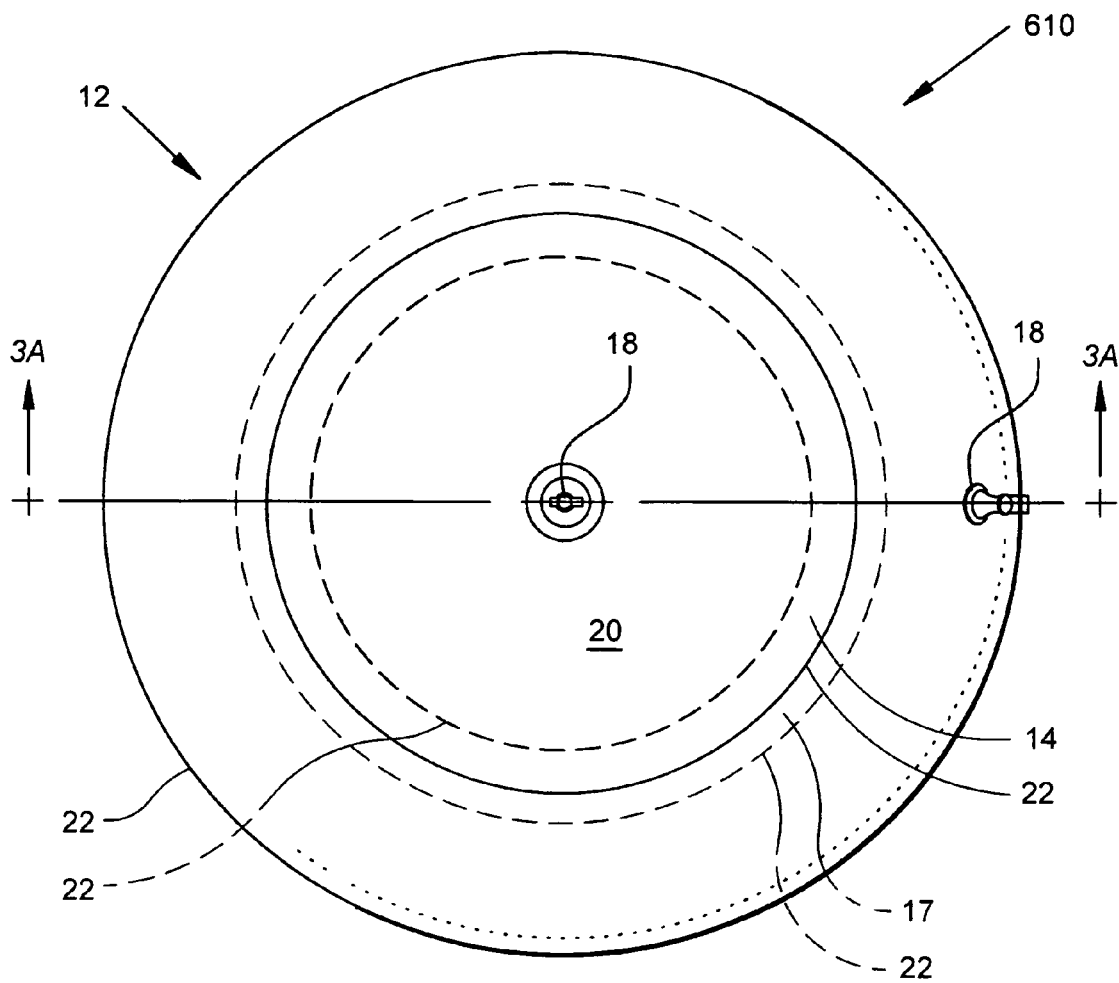
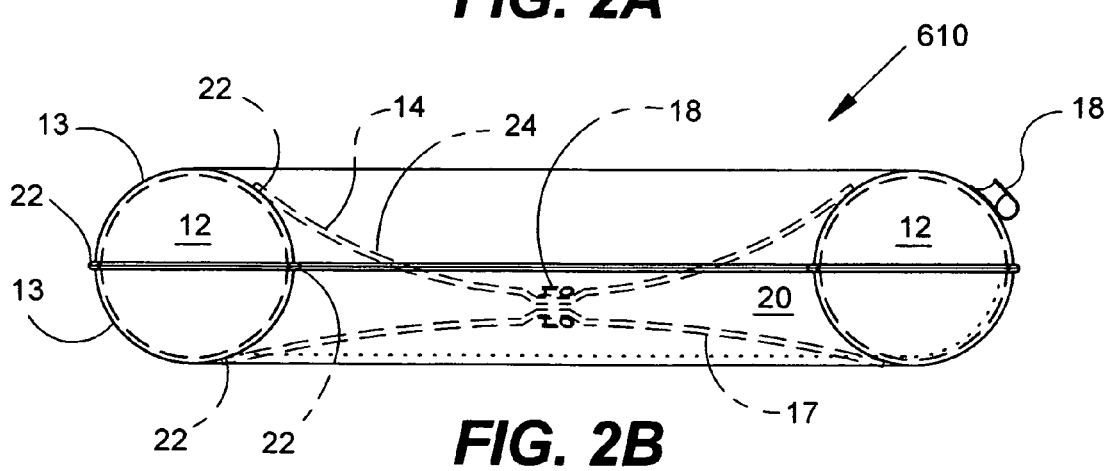

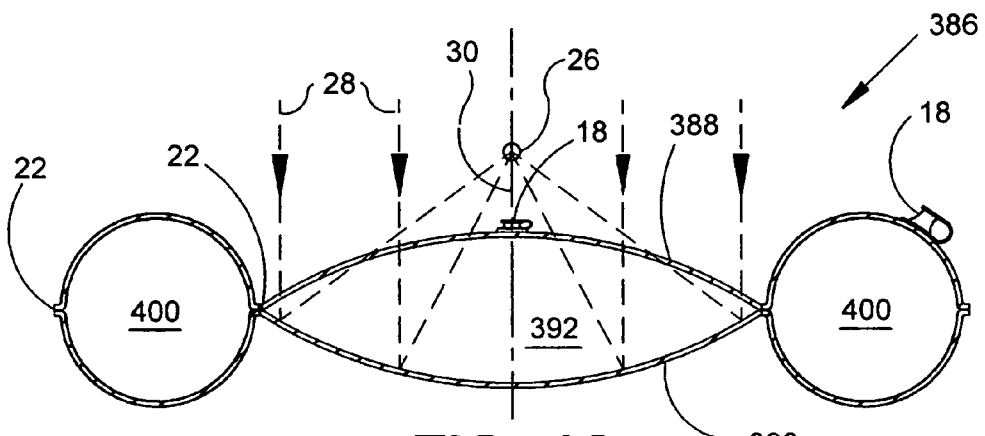
FIG. 4C
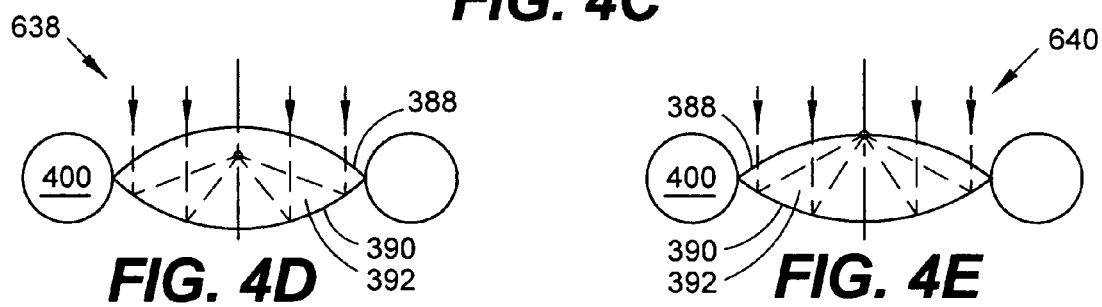
FIG. 4D   FIG. 4E
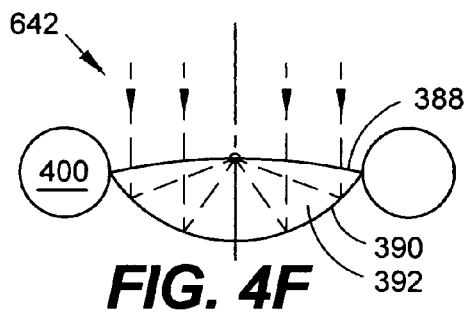 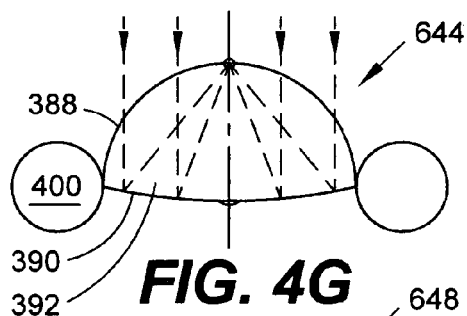
FIG. 4F   FIG. 4G
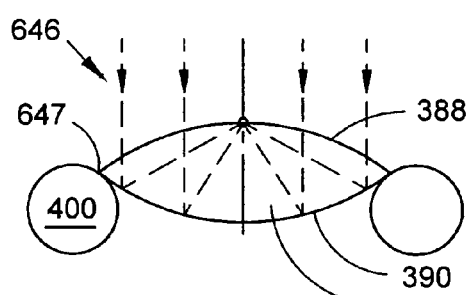 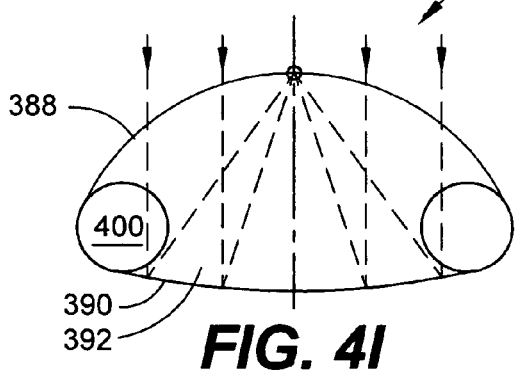
FIG. 4H   FIG. 4I

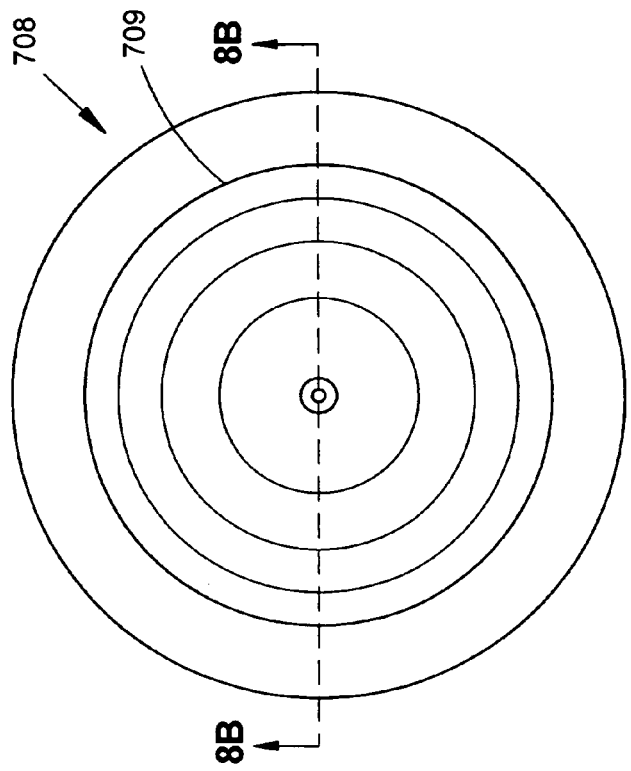
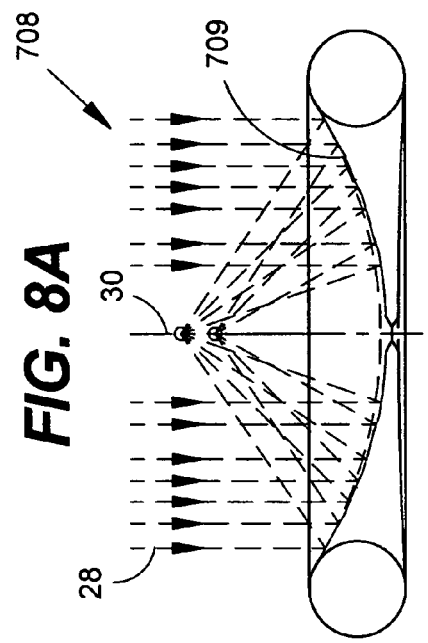
FIG. 8A
FIG. 8B
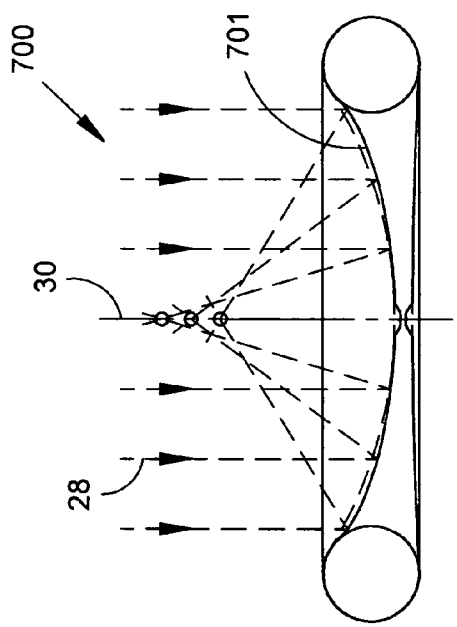
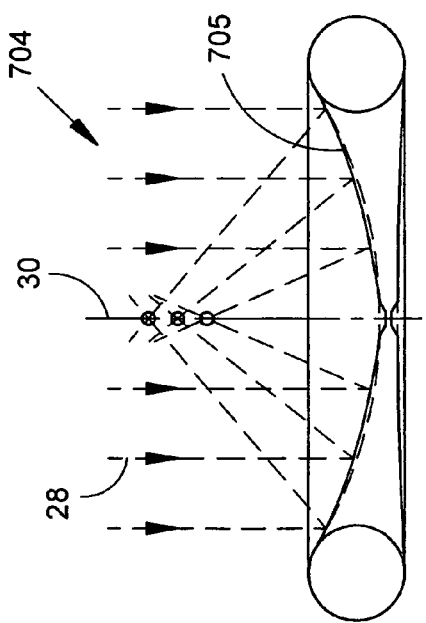
FIG. 7A
FIG. 7B

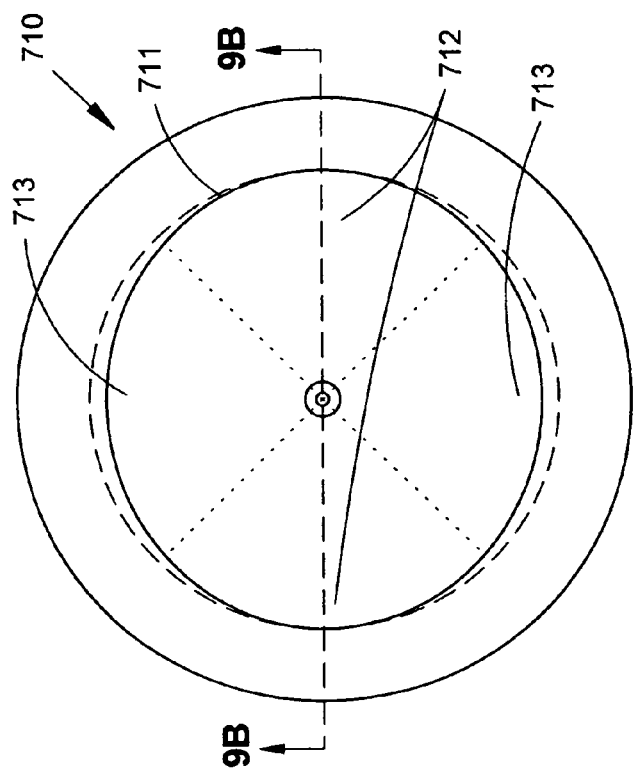
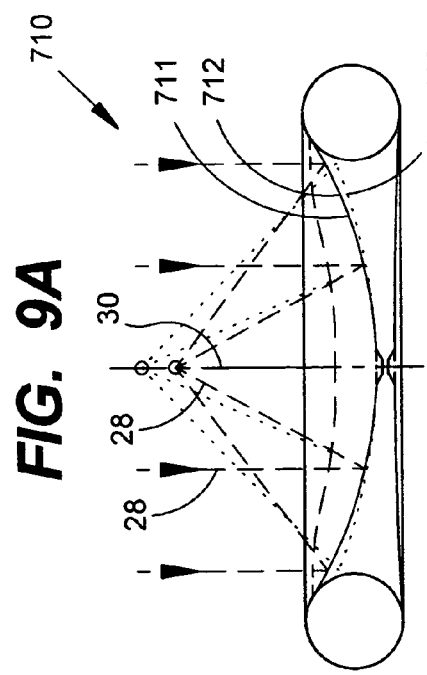
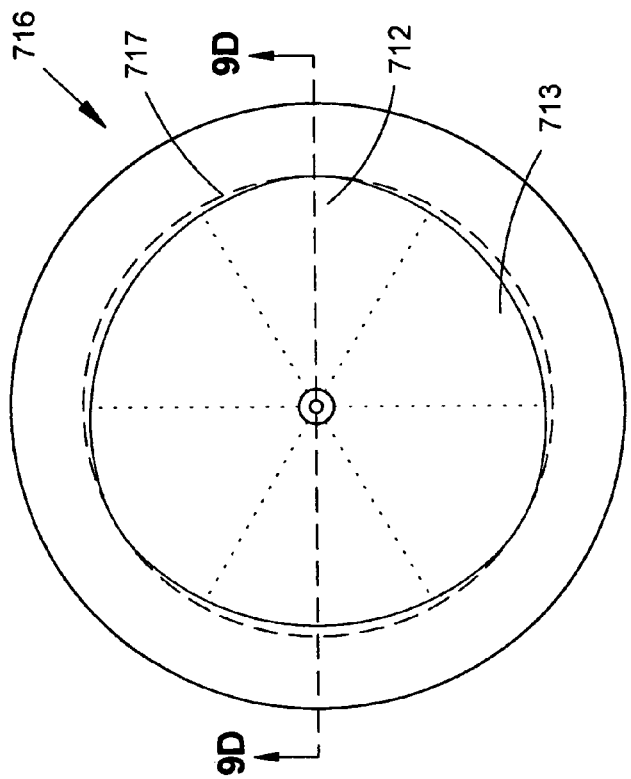
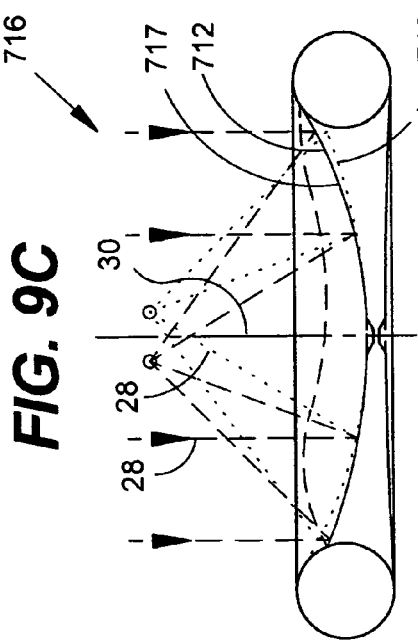
FIG. 9A
FIG. 9B
FIG. 9C
FIG. 9D

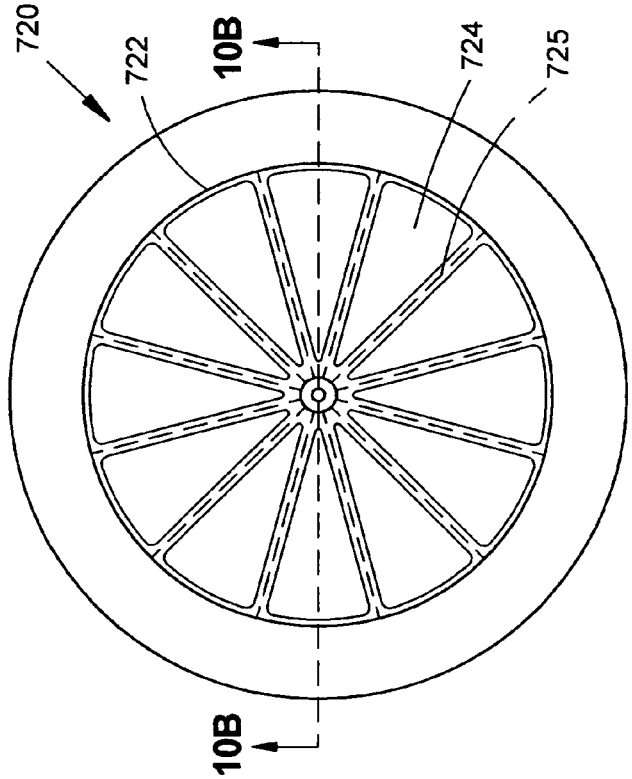
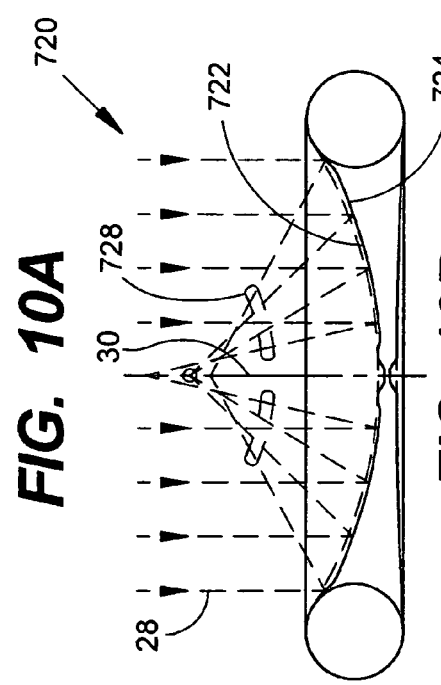
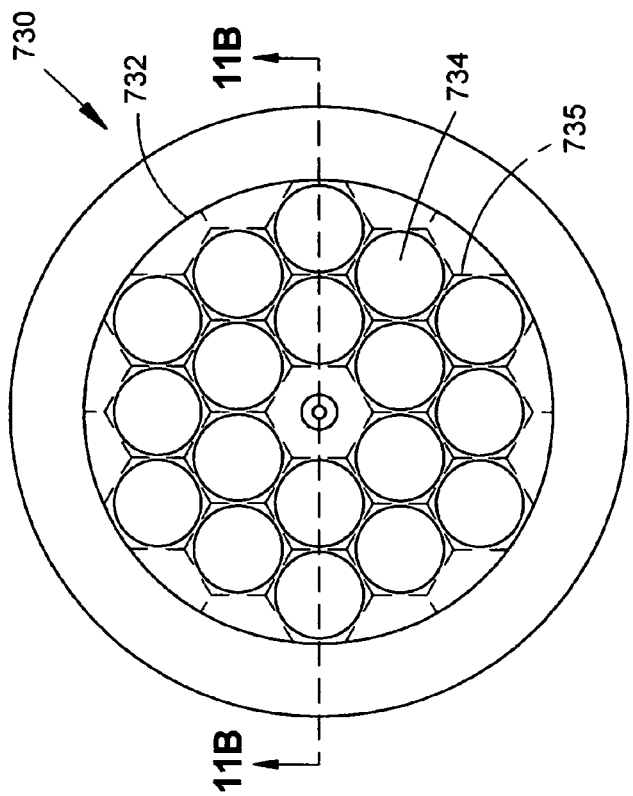
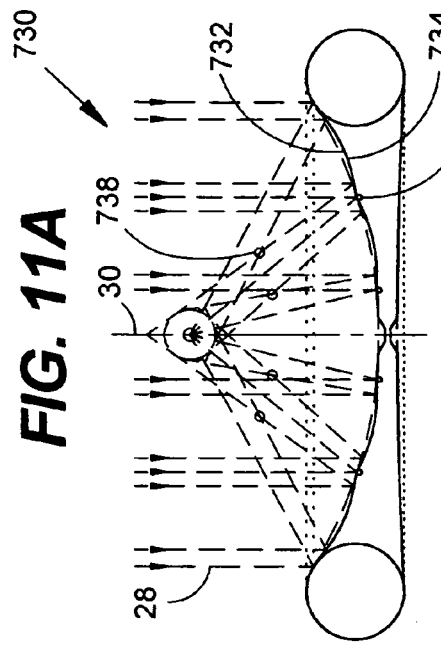

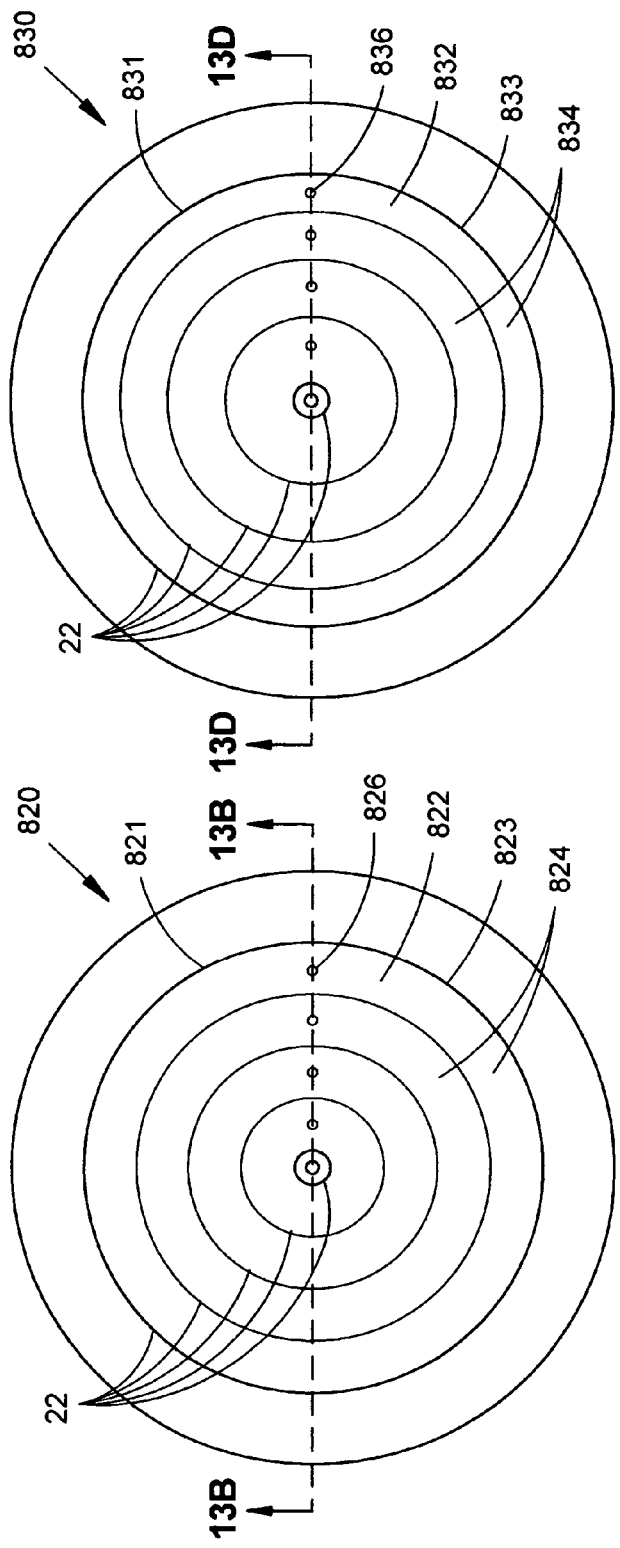

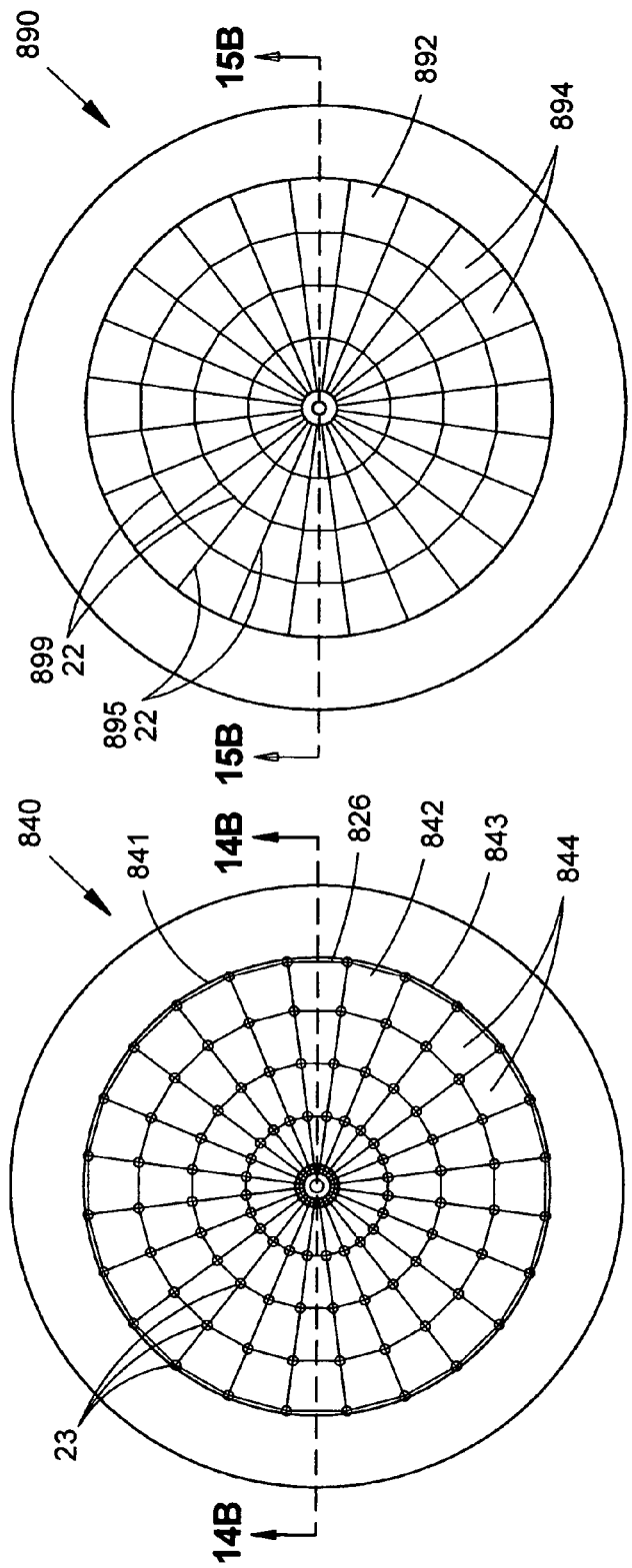
FIG. 14A
FIG. 15A
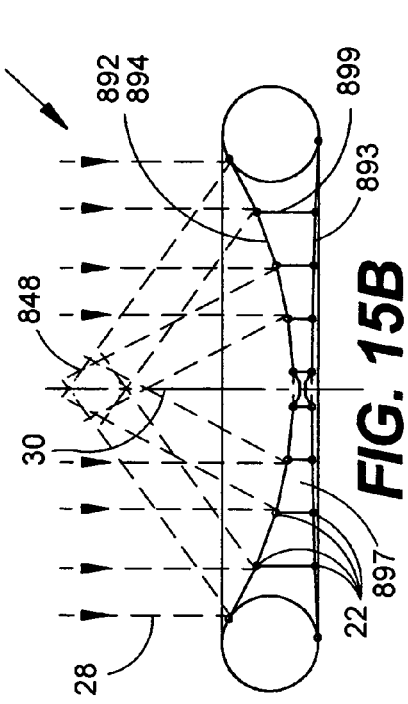
FIG. 15B
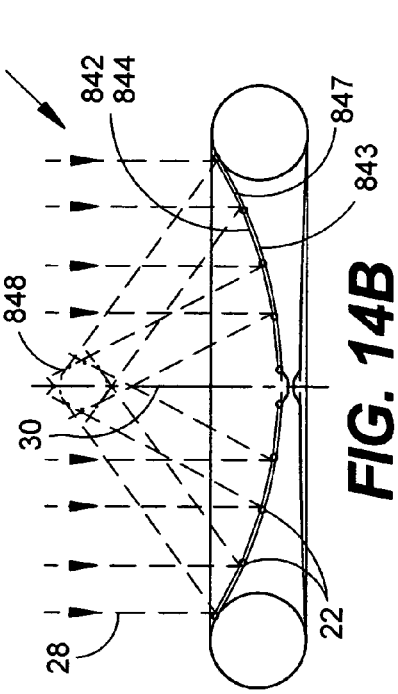
FIG. 14B

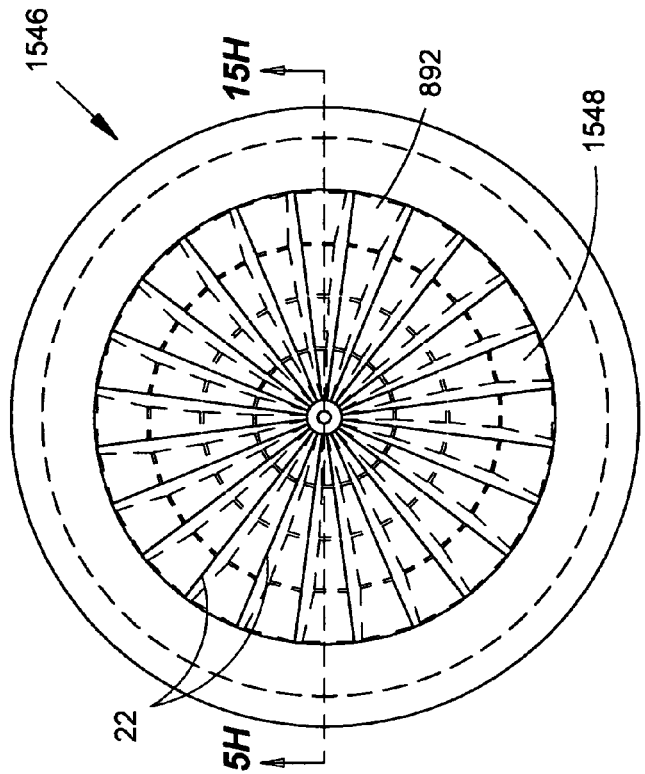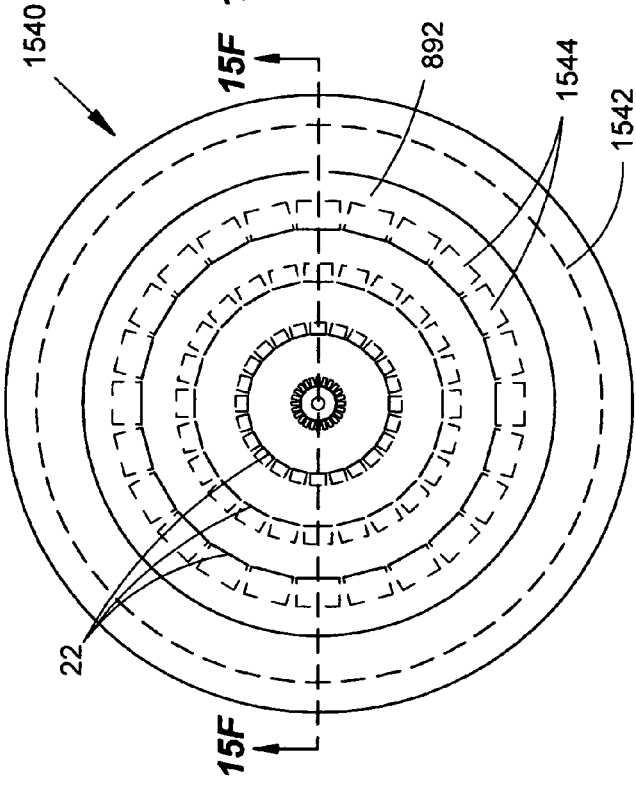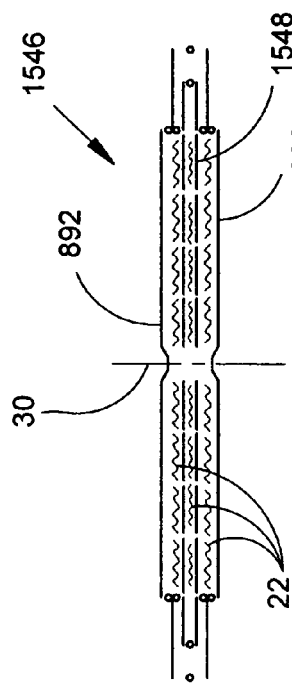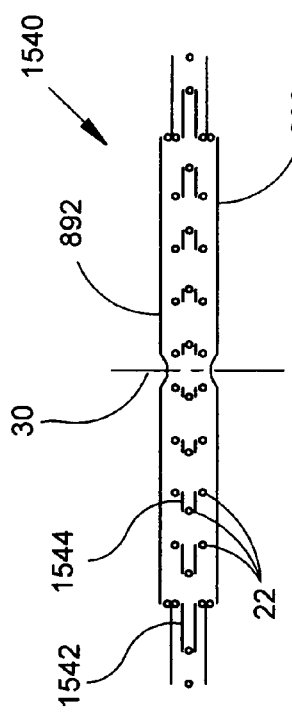
FIG. 15E
FIG. 15F
FIG. 15G
FIG. 15H

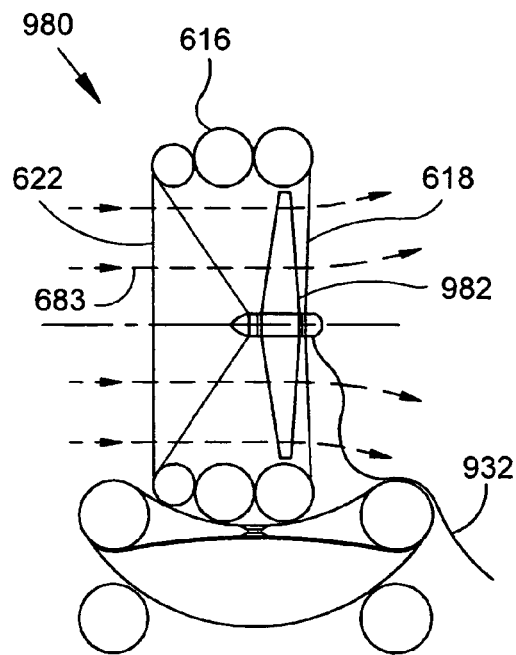
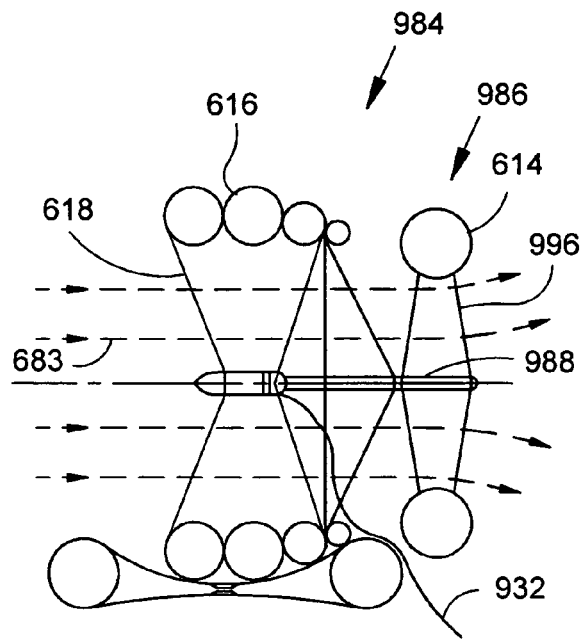
FIG. 23A
FIG. 23B
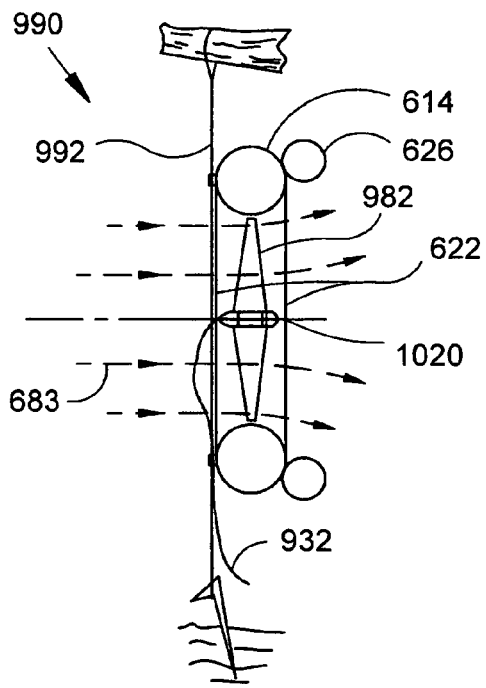
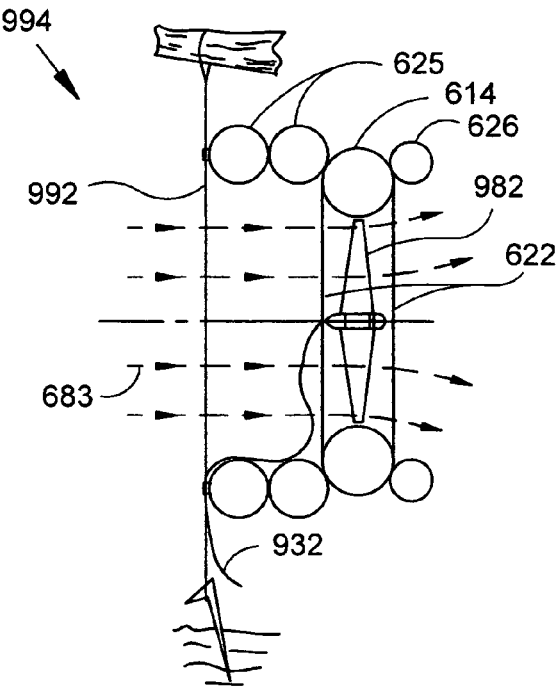
FIG. 23C
FIG. 23D

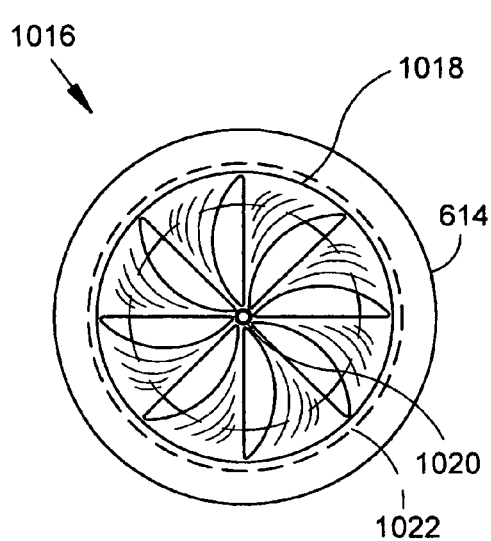
FIG. 23 I
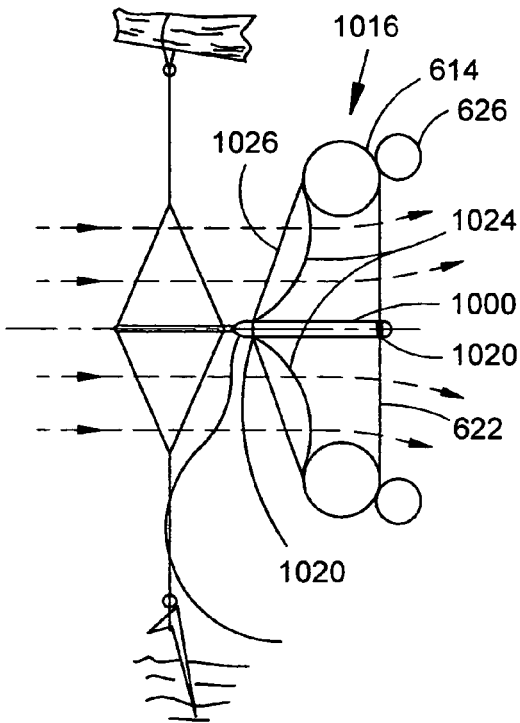
FIG. 23J
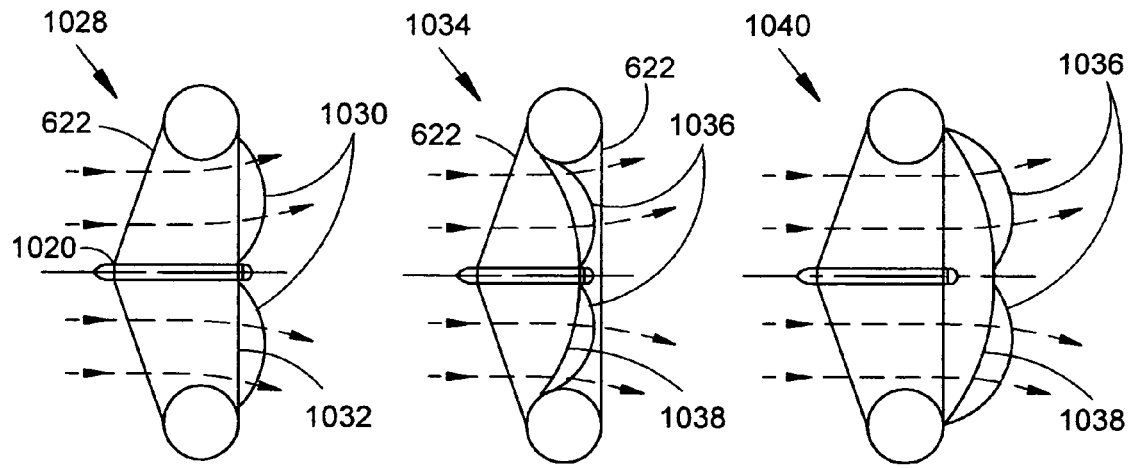
FIG. 23K   FIG. 23L   FIG. 23M

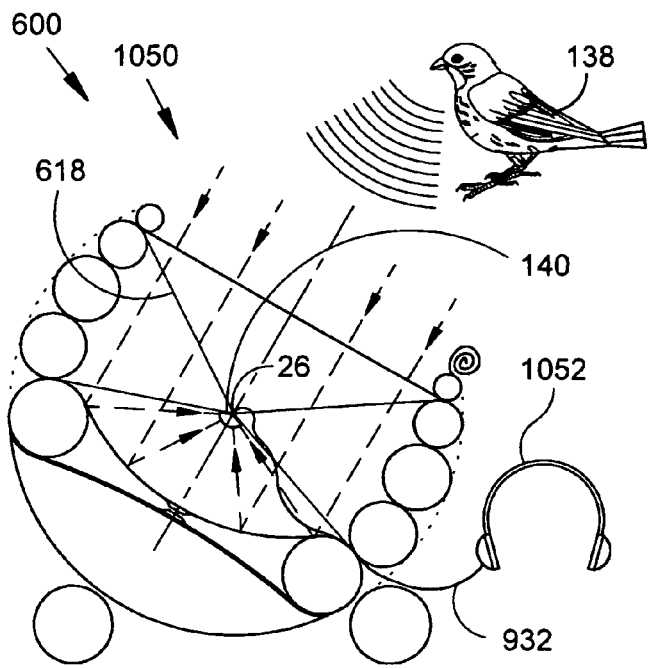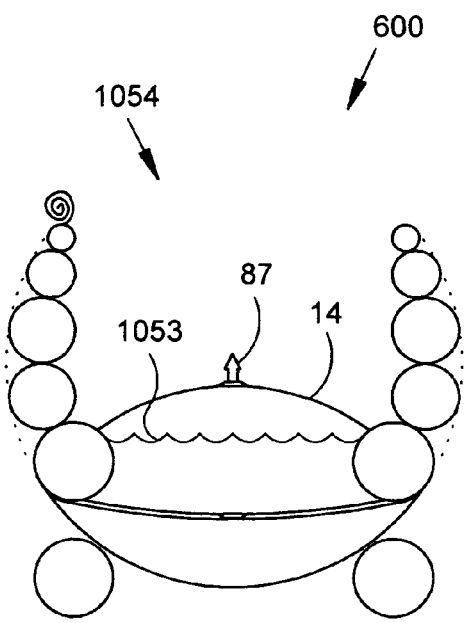
FIG. 24A  FIG. 24B
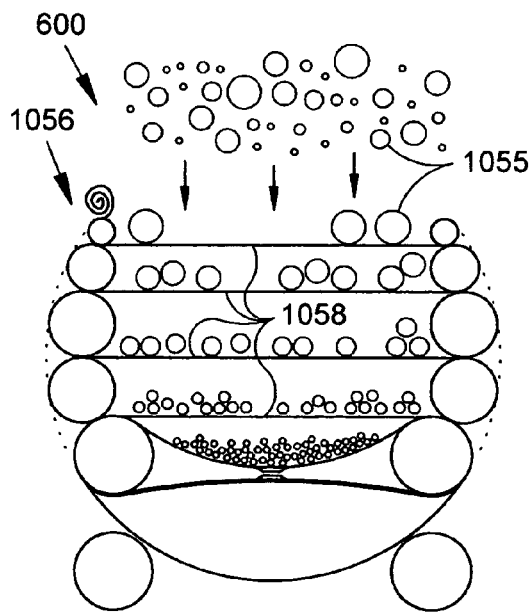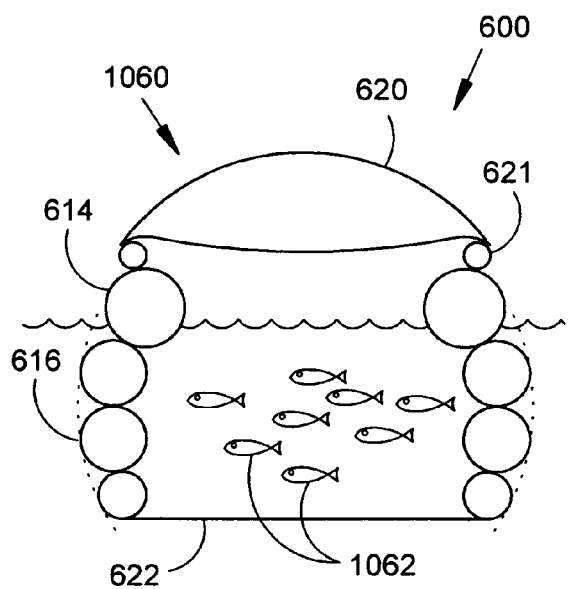
FIG. 24C  FIG. 24D

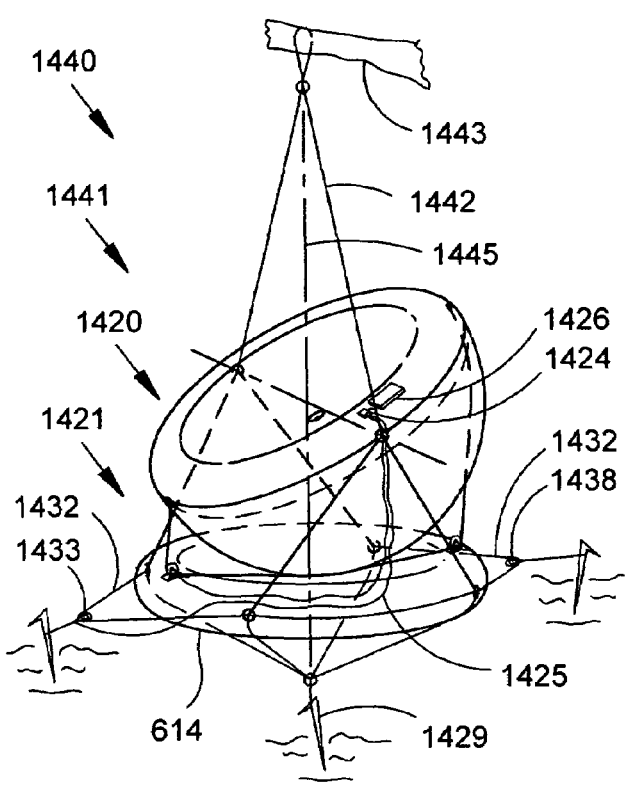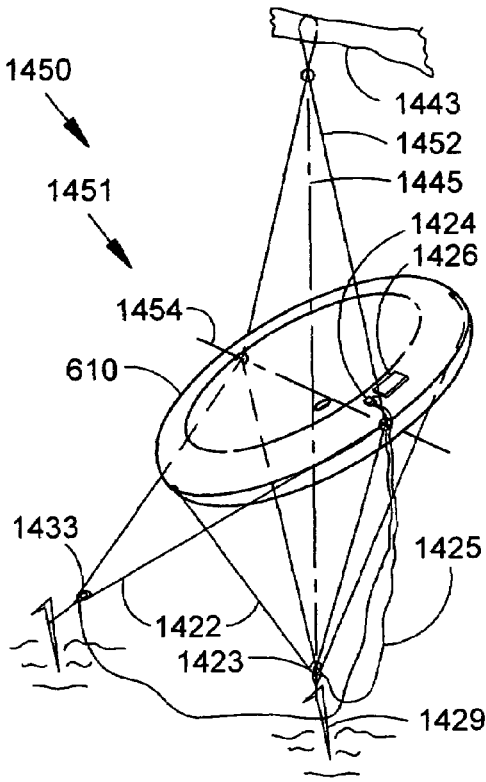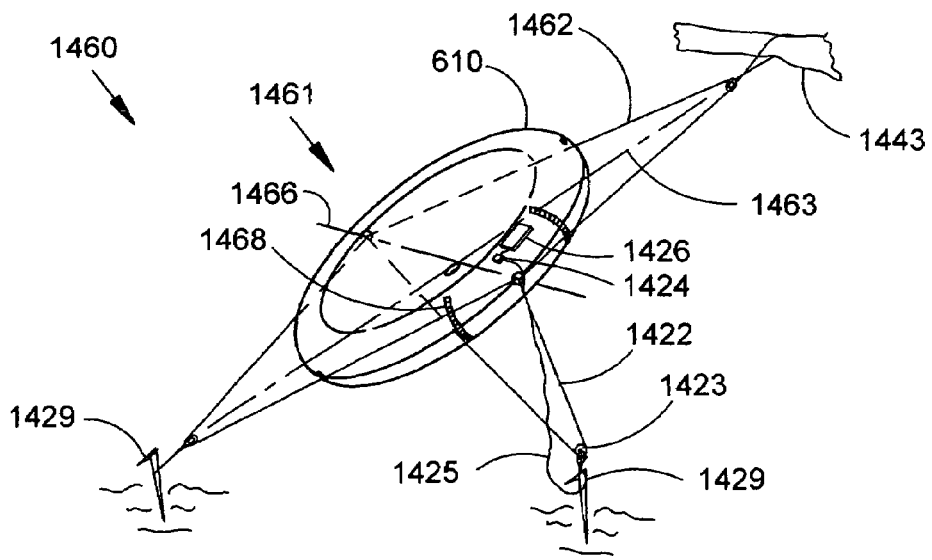

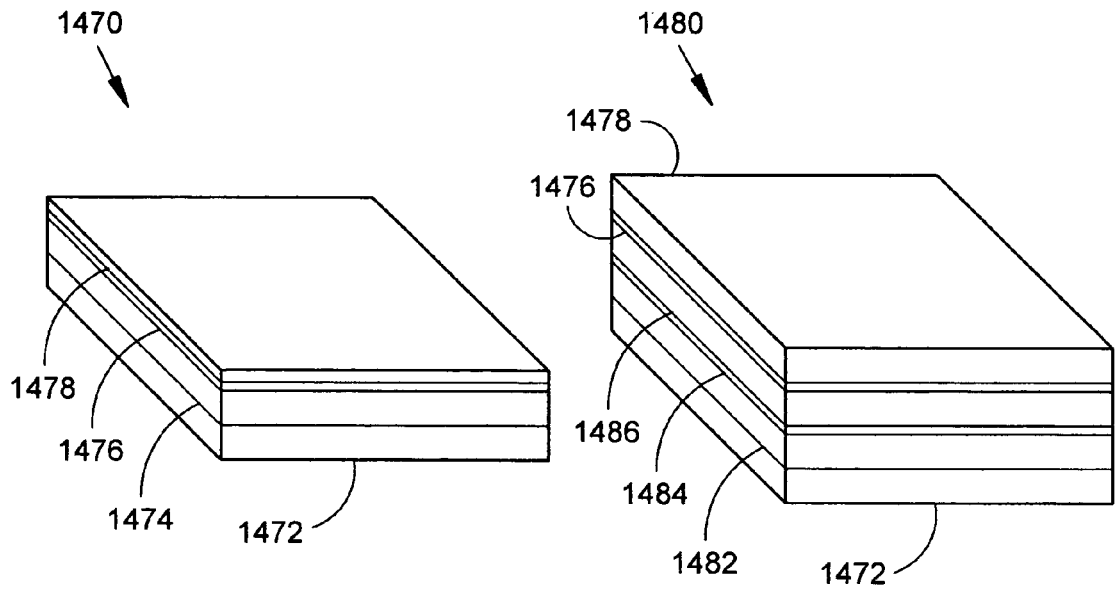
FIG. 40A
FIG. 40B
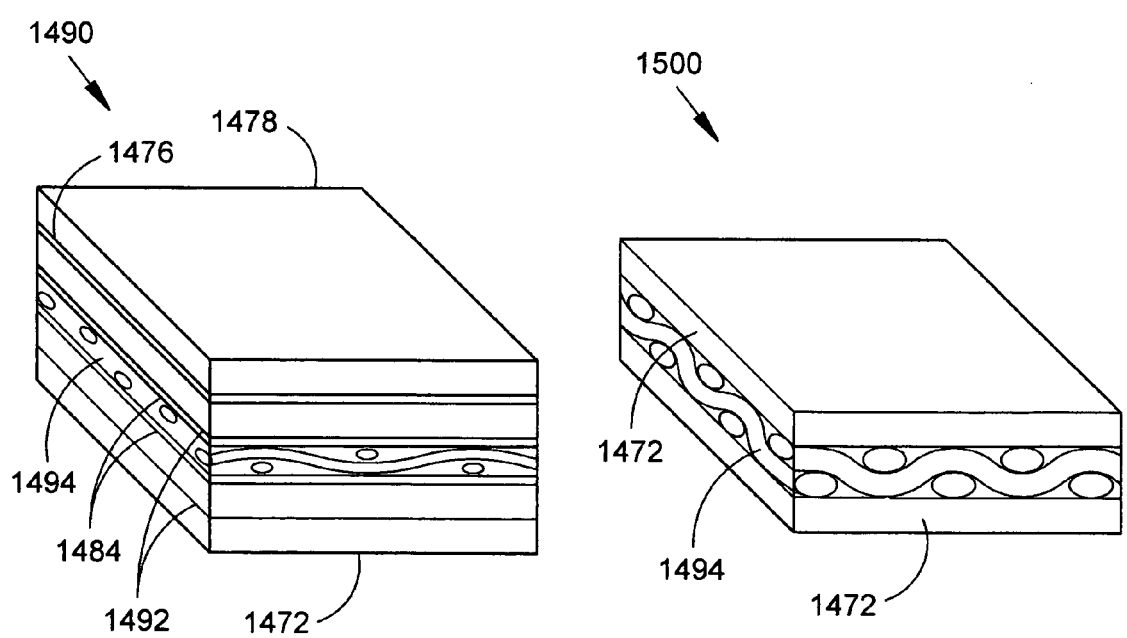
FIG. 40C
FIG. 40D

MULTI-FUNCTION FIELD-DEPLOYABLE RESOURCE HARNESSING APPARATUS AND METHODS OF MANUFACTURE

CROSS-REFERENCE TO RELATED APPLICATIONS

This application claims the benefit of U.S. Provisional Patent Application Ser. No. 60/620,510 filed 20 Oct. 2004. This application also claims the benefit of PCT Patent Application Ser. No. PCT/US2004/040479 filed 6 Dec. 2004. This application further claims the benefit of U.S. Provisional Patent Application of John R. Essig Jr and James M Essig for "Concentrating Reflector Apparatus with Safety Device and Methods of Use" filed 11 Oct. 2005, for which a serial number has not yet been assigned. This application is a continuation-in-part (CIP) of U.S. patent application Ser. No. 10/729,145 filed 4 Dec. 2003, which is a continuation-in-part of U.S. patent application Ser. No. 10/156,814 filed 30 May 2002, now U.S. Pat. No. 6,897,832 issued 24 May 2005.

This application also is related in subject matter to U.S. Design Patent Applications filed 29 Nov. 2002 having Ser. Nos. 29/171,799, 29/171,800, 29/171,801, 29/171,800, 29/171,801, now, respectively, U.S. Pat. No. D507717 issued 26 Jul. 2005, U.S. Pat. No. D507925 issued 2 Aug. 2005, U.S. Pat. No. D510498 issued 11 Oct. 2005, U.S. Pat. No. D508814 issued 30 Aug. 2005, and U.S. Pat. No. D508815 issued 30 Aug. 2005.

The entire specification (including Description, Drawing, and claims) contained within each of these related applications, both as filed and as amended (where applicable), is hereby incorporated herein by reference.

1. Field of the Invention

The present invention relates most broadly to modular multifunction field-deployable tools or apparatus, which are typically configured for use as highly portable solar cooking, heating, and/or energizing apparatus, but which typically may also be reconfigured and/or redeployed by the user in the field to harness other resources from the surrounding environment and/or to serve (i.e., provide a means for performing) numerous other life-enhancing or life-sustaining functions. More specifically, the present invention relates to improved inflatable (or otherwise collapsible or rigid) multifunction solar energy concentrating devices, which are typically selectably configurable and/or re-configurable to also effectively and reliably perform one or more other functions selected from a broad range of focused electromagnetic, non-focused electromagnetic, and/or non-electromagnetic functions, thereby rendering the invention highly amenable to a broad scope of practical applications within a wide range of terrestrial (e.g., land, sub-terrainian, marine, sub-marine, airborne) and/or non-terrestrial (e.g., space-based or extra-planetary) environments.

2. Related Art a. Description

The related art of interest describes various electromagnetic energy harnessing devices including several apparatus for concentrating solar energy, but none discloses the present invention. Accordingly, there remains a need for an economical field-deployable apparatus, which, in addition to being able to concentrate solar energy for heating, cooking, and/or energizing, also provides a means for performing various other life-enhancing or life-sustaining functions, and which is fully collapsible (e.g., deflatable) to greatly facilitate portage and storage. A review of the related art reveals its many limitations and disadvantages and, thus, clearly shows that this need for a highly portable, multifunction, field-deployable apparatus remains unfulfilled, thereby underscoring the value of the present invention, which fully and uniquely meets this need.

In particular, U.S. Pat. No. 3,326,624 issued on Jun. 20, 1967, to Wladimir von Maydell et al. describes an inflatable paraboloid mirror capable of being formed into a permanently rigid structure in outer space to collect solar energy for space stations and flying bodies. The mirror has a valved annular ring, radial segmental covers or strip springs, radial heating wires, and a valved double walled mirror formed with polyester foam coated with a reflector material. The ring and mirror have internal rigid spacers. However, this apparatus is not well suited for use as a field-deployable tool because it cannot be collapsed and re-deployed after its initial deployment, it is not multifunctional, it does not provide a means for supporting and orienting the apparatus to facilitate use in a terrestrial environment, it does not provide a means for protecting the user against accidental exposure to concentrated electromagnetic radiation, and both its mechanical structure and its means of deployment are generally too complex to allow the device to be economically produced for wide use by the general public.

Other related art exhibiting many of these limitations and disadvantages include:

U.S. Pat. No. 5,920,294 issued on Jul. 6, 1999, to Bibb B. Allen describes space antennas, which comprise a reflective mesh supported by an inflatable support structure (e.g., an elliptical, spherical, or toroidal balloon), and which further comprise a plurality of tensioned cords or ties attached to the mesh and to the inflatable support structure to deploy the reflective mesh for electromagnetic and solar energy applications. Note that the mechanical attachments (tensioned cords or ties) used to deploy the reflector are generally too complex and also too great in number to permit economical construction of a device intended for general use by the public. Also, no means is provided for supporting and orienting the apparatus in a terrestrial environment.

U.S. Pat. No. 4,352,112 issued on Sep. 28, 1982, to Fritz Leonhardt et al. describes a large reflector having an inner face of either a polished aluminum sheet or a plastic sheet backed by individual membrane segments of a rigid foam backing having a curved concave surface and an opening in its center. Two membranes formed as concave or convex reflectors are used to reflect and concentrate solar rays to a heat absorber, heat exchanger and the like. Note that this patent is primarily a means for producing parabolic reflectors from flat planar sheets of material, and shows various rigid means for supporting and operating such reflective membranes. Further, it does not represent a portable device.

U.S. Pat. No. 2,977,596 issued on Mar. 28, 1961, to Harold D. Justice describes an inflatable circular antenna saucer on a transmitter or receiver base. Note that the rigid support frame of the apparatus is not significantly collapsible for portage and storage, and the reflector structure contains unnecessary internal webbing, which is not economical to produce.

U.S. Pat. No. 3,005,987 issued on Oct. 24, 1961, to Kent M. Mack et al. describes an inflatable antenna assembly comprising a radome covering an inflatable elliptical tubular membrane support having structural lacing and two concave flexible non-conducting sheets, wherein one sheet is coated with vaporized aluminum. Note that the apparatus is not significantly collapsible for portage and storage, the reflector structure contains tensioning cords, which are unnecessary for use as a solar concentrator, and the radome generally inhibits or prohibits use as a broad-spectrum solar energy concentrator.

U.S. Pat. No. 3,056,131 issued on Sep. 25, 1962, to Ralph L. McCreary describes an inflatable reflector for electromagnetic radiation comprising two concave thin sheets of flexible plastic material, wherein at least one sheet has a parabolic shape. Note that the rigid support frame of the apparatus is not significantly collapsible for portage and storage. Also, no means is provided for adjustably supporting and orienting the apparatus in a terrestrial environment.

U.S. Pat. No. 3,221,333 issued on Nov. 30, 1965, to Desmond M. Brown describes an inflatable radio antenna comprising an oblate bag aerial including a pair of spaced parallel insulating planar surfaces connected to a medial portion and having two antenna elements mounted parallel to form a capacitive plate antenna. Note that this apparatus is primarily a means for producing a capacitive aerial antenna. It does not have a means for concentrating solar energy, such as a parabolic reflector, nor any means for performing any other functions except its primary (sole) use as a capacitive aerial antenna.

U.S. Pat. No. 3,413,645 issued on Nov. 26, 1968, to Richard J. Koehler describes an elongated inflatable parabolic radar antenna toroid assembly providing a small wave energy aperture in one plane and a larger wave energy aperture in a perpendicular plane. Note that this apparatus is not significantly collapsible for portage and storage, and that the reflector's support structure generally inhibits or prohibits use as a broad-spectrum solar energy concentrator.

U.S. Pat. No. 3,471,860 issued on Oct. 7, 1969, to Floyd D. Amburgey describes a reflector antenna having a variable or flexible surface, the geometrical shape of which may be changed by air pressure or a partial vacuum behind the flexible membrane for the purpose of obtaining the best reception from this antenna type. Note that this patent is primarily a means for producing an adjustable-focal-length parabolic reflector from flat planar sheets of material. It does not represent a significantly collapsible portable device.

U.S. Pat. No. 4,672,389 issued on Jun. 9, 1987, to David N. Ulry describes an inflatable reflector apparatus and a method of manufacture. A super-ambient pressure is maintained within the envelope, which is maintained by a compression frame member. Note that the rigid support frame of the apparatus is not significantly collapsible for portage and storage, and the transparent membrane of the super-ambient reflector structure limits efficiency when used as a solar energy concentrator.

U.S. Pat. No. 4,741,609 issued on May 3, 1988, to Daniel V. Sallis describes a stretched membrane heliostat having a membrane mounted on a circular frame, there being a double-walled portion of the membrane that extends in a circle near the periphery of the membrane to form a bladder that is inflatable to tension the membrane. Note that the rigid support frame of the apparatus is not significantly collapsible for portage and storage.

U.S. Pat. No. 4,755,819 issued on Jul. 5, 1988, to Marco C. Bernasconi et al. describes a parabolically-shaped reflector antenna intended for space vehicle applications. The device is inflated by a gas in space to form an antenna reflector and an antenna radome stabilized by a rigidizing torus. The covering material is a resin-impregnated fabric which when heated by the sun polymerizes to render the reflector antenna stable and requires no gas pressure to keep its shape. Note that this apparatus is not significantly collapsible for portage and storage, it is too complex to yield a sufficiently economical field-deployable tool for use by the general public, and the radome generally inhibits or prohibits use as a broad-spectrum solar energy concentrator.

U.S. Pat. No. 5,276,600 issued on Jan. 4, 1994, to Takase Mitsuo et al. describes a planar reflector composed of a base and a flexible polymeric plastic substrate having a highly reflective silver layer formed thereon and overlaid on the base with an adhesive layer interposed between the two layers. Note that this patent is primarily a means for producing reflectors having a small radius of curvature from multi-layer planar sheets of material. It does not represent a functional collapsible reflector apparatus.

U.S. Pat. No. 5,893,360 issued on Apr. 13, 1999, to O'Malley O. Stoumen et al. describes an inflatable solar oven comprising two sheets of flexible material sealed at their edges. The top sheet is clear and the bottom sheet has a reflective layer. Note that this apparatus exhibits an extremely clumsy or cumbersome method of cooking, and the functionality of the device is easily impaired by vapors, which, after being emitted from the items being heated or cooked within the device, may condense on the transparent membrane of the device, thereby diffusing the impinging solar radiation, thus preventing effective concentration. Further, the device is not multifunctional.

U.S. Pat. No. 6,150,995 issued on Nov. 21, 2000, to L. Dwight Gilger describes a combined photovoltaic array and a deployable perimeter truss RF reflector. Note that this structure is highly complex in light of its two simple functions, and it is generally not suitable for use as a terrestrial field-deployable tool.

U.S. Pat. No. 6,219,009 issued on Apr. 17, 2001, to John Shipley et al. describes a tensioned cord and tie attachment of a collapsible antenna reflector to an inflatable radial truss support structure. Note, again, that the mechanical attachments (tensioned cord-ties) used to deploy the reflector are generally too complex to permit economical construction of a device intended for general use by the public. Also, no means is provided for supporting and orienting the apparatus in a terrestrial environment.

U.K. Patent Application No. 758,090 published on Sep. 26, 1956, for Charles T. Suchy et al. describes an inflatable balloon having arranged within a radio aerial. Note that this apparatus does not have a concentrating reflector.

France Patent Application No. 1.048.681 published on Dec. 23, 1953, for Adnan Tarcici describes a reflector for concentrating solar energy for cooking when camping. Note that this apparatus is not significantly collapsible for portage and storage.

Japan Patent Application No. 59-97205 published on Jun. 5, 1984, for Yasuo Nagazumi describes a parabolic antenna having an airtight chamber filled with nitrogen and demarcated with a radiating aluminum casing and a heat-insulating mirror. Note that this apparatus is not significantly collapsible for portage and storage and is not suitable for concentrating solar energy.

b. Summary of Disadvantages of Related Art

In short, the disadvantages of related art generally include, among others, one or more of the following limitations:

(a) the device or apparatus generally is not multifunctional in nature, i.e., it is generally limited to either a single function or perhaps two or more closely related functions;

(b) the apparatus is not suitably or sufficiently collapsible to permit easy transport to and from the field, or allow convenient storage when not in use;

(c) the apparatus is not easily reusable or re-deployable, i.e., the apparatus cannot be collapsed after its initial deployment to facilitate portage to an alternate location or to compactly store for future use;

(d) the apparatus has no lightweight collapsible means for supporting and orienting the apparatus to facilitate use in a terrestrial environment, and/or it does not employ other features to facilitate use by persons having limited experience or knowledge, such as simple well-known inflation valves;

(e) the apparatus has no means for protecting the user from accidental exposure to highly concentrated electromagnetic radiation, thereby posing a safety hazard;

(f) the apparatus exhibits limited efficiency when concentrating broad-spectrum solar radiation as a result of having one or more intervening layers in its optical path, such as a transparent membrane or radome;

(g) the apparatus exhibits unnecessary structural complexity, thereby rendering the apparatus uneconomical to produce for wide use by the general public;

(h) the apparatus is generally not suitably robust or sufficiently durable for rapid deployment into the field, such as by air drop, nor does the apparatus provide a means for easily repairing the device in the field using integral rapid-repair materials in the event of damage; and/or (i) the apparatus generally is not modular and selectably configurable by the user to perform other functions.

In contrast, each of these disadvantages or limitations of the related art are overcome by the present invention.

SUMMARY OF THE INVENTION a. General Description

The present invention, in its embodiments, is a selectably configurable or re-configurable modular, inflatable, multi-function, field-deployable apparatus, which primarily provides an economical means for harnessing resources from its surrounding ambient environment (e.g., concentrating solar energy for heating, cooking, and/or energizing in a terrestrial environment; or harnessing a material resource from the ambient environment, such as precipitation to provide potable water), but which also typically provides various means for performing other life-enhancing or life-sustaining functions, and which is preferably (but not necessarily) fully collapsible (e.g., deflatable) to greatly facilitate portage and storage. Briefly, the modular, inflatable, multifunction, field-deployable apparatus of the present invention, in its embodiments, typically has as its primary functional module a basic inflatable, multifunction, parabolic reflector apparatus, such as disclosed in our previous applications. The present invention typically further includes one or more optional, preferably (but not necessarily) removably attached, accessory modules and/or elements, such as an inflatable (or otherwise collapsible or rigid) module or element operable to support and orient (i.e., means for supporting and orienting) the basic inflatable reflector apparatus, an inflatable (or otherwise collapsible or rigid) module or element operable to protect (i.e., means for protecting) the user from accidental exposure to highly concentrated electromagnetic (e.g., solar) radiation at or near a focal point defined by the basic reflector apparatus, an inflatable (or otherwise collapsible or rigid) module or element operable to support (i.e., means for supporting) materials or accessory elements in proximity to the focal point, and an inflatable (or otherwise collapsible or rigid) protective cover.

Regarding functionality, briefly note that the embodiments of both the basic inflatable reflector apparatus of the basic invention (i.e., the related invention by the inventors of the present invention) and, thus, the preferably (but not necessarily) modular field-deployable apparatus of the present invention are primarily configured for use as highly portable solar cooking, heating, and/or energizing apparatus, as examples of an energy-harnessing first mode of operation. However, both the basic reflector apparatus and the modular field-deployable apparatus are typically (but not necessarily) specially configured to also effectively and reliably perform, either alone or in concert with various optional accessory elements, one or more other functions selected from a broad range of focused electromagnetic, non-focused electromagnetic, and non-electromagnetic functions, thus, typically (but not necessarily) providing one or more second modes of operation. Hence, both the basic reflector apparatus and the modular field-deployable apparatus can serve as highly portable multifunction tools, each of which is highly amenable to a broad scope of practical applications; however, the selectably re-configurable nature of the modular apparatus of the present invention offers greater versatility, safety, and/or ease of use relative to the basic reflector apparatus.

In greater detail, the present invention is generally (but not necessarily) functionally optimized (as is the basic invention) for concentrating, focusing, and/or beaming radiant electromagnetic energy and is effective over a wide range of the electromagnetic spectrum from radio frequency (RF) radiation through ultraviolet (UV) radiation including broad-spectrum solar energy. However, as indicated above, the present invention (and the basic invention) can also generally (but not necessarily) effectively and reliably perform numerous other functions not related to concentrating, focusing, and beaming radiant electromagnetic energy. Focused electromagnetic applications of the present invention typically but optionally include one or more of the following non-limiting examples: (1) concentrating broad-spectrum (e.g., solar) radiation for heating, cooking, sterilizing, distilling, processing materials, generating electrical power, and/or the like, (2) manipulating radio and/or microwave frequency radiation for enhancing the transmission and reception of radio signals and/or other electromagnetic communications, and/or (3) manipulating visible-spectrum radiation for enhancing vision in low-light environments, projecting optical signals or images, and/or other optical purposes, such as using the apparatus as a convex mirror to extend the user's field of vision for surveillance and/or safely. Non-focused electromagnetic applications typically but optionally include one or more of the following non-limiting examples: (1) use as an emergency thermal blanket, shelter, incubator, greenhouse, and/or the like, (2) use as an electromagnetic energy shield, and/or (3) use as an electrostatic insulator. Non-electromagnetic applications typically but optionally include one or more of the following non-limiting examples: (1) the collection, storage, and/or processing of water or other substantially fluidic materials, (2) use as a shelter to protect persons, equipment, materials, and/or other items from inclement weather and/or other environmental elements, (3) use as a soft or compliant support such as a bed, cradle, inflatable cast (for immobilizing a broken limb), and the like, (4) use as a water flotation device or water boat, (5) use as a portable fermentor apparatus for producing fuels, medicines, beverages, and/or other materials, (6) use as an inflatable wind turbine or water wheel for producing electrical and/or mechanical power, (7) use as an inflatable wave energy harnessing apparatus for producing electrical and/or mechanical power, pumping fluids, and/or desalinating sea or ocean water, and/or (8) use as a directional sound amplification device. The invention contemplates numerous other uses as discussed hereinbelow and as readily apparent to a user of the apparatus. However, it is emphasized that any particular embodiment or manifestation of the present invention need not perform all such functions, i.e., a particular embodiment can be configured to perform a limited number or subset of these functions without departing from the nature of the invention. Further, as will be shown below, it should be noted that although the basic reflector apparatus is generally the primary functional module of the modular field-deployable apparatus, the present invention (i.e., the modular field-deployable apparatus) can optionally be reconfigured without a basic reflector apparatus by the user in the field (or by the factory) to perform various non-focused electromagnetic and/or non-electromagnetic functions, for example, use as a water flotation device or use as part of a wind turbine apparatus, without departing from the nature of the invention.

Regarding physical construction, first note that each of the modular structures of the present invention are generally optimized to minimize weight, non-deployed volume, and production cost, while simultaneously maximizing operational performance, versatility, and safety. To achieve such optimization, the primary modules of the present invention are typically (but not necessarily) made from one or more lightweight inflatable structures (such as an inflatable ring), thin flexible (e.g., pressure-deployable) membranes, and/or other easily collapsible, lightweight structures. An excellent example of such structural optimization is the basic inflatable reflector apparatus in a preferred first main embodiment configuration, wherein two pressure-deformable (i.e., pressure-deployable) membranes, at least one of which is reflective, are utilized in conjunction with the inner portion of an inflatable support ring to form a highly efficient central reflector chamber, which generally can be inflated to either sub-ambient pressure (as required for most applications) or super-ambient pressure to deploy the reflective membrane(s). Note that by using the inner portion of the support ring to form an integral part of the highly efficient sub-ambient-pressurizable reflector chamber, the first embodiment of the basic reflector apparatus can be produced very economically from a minimum number or parts while maximizing weight-specific power output.

As another example, a second main embodiment of the basic reflector apparatus utilizes at least one reflective membrane and at least one transparent membrane to form a central reflector chamber, which generally can be inflated only to super-ambient pressure to deploy the reflective membrane. Although generally less efficient than the first embodiment when used for concentrating broad-spectrum electromagnetic energy, the primary structure of the second embodiment of the basic reflector apparatus can be made extremely economically from as few as two sheets of material. Additionally, both main embodiments of the basic reflector apparatus generally employ one or more reflective membranes which are pre-formed substantially into the shape of a paraboloid to enhance safety, facilitate operation, and reduce structural loading of the membranes on the support ring. (It is noted that a "pre-formed" pressure-deformable membrane is a membrane which is fabricated to substantially embody or possess its pressure-deformed shape, i.e., its deployed surface contour, prior to the application of significant differential pressure across the membrane.) As noted above, the other modules of the present invention are also typically (but optionally) constructed from similar lightweight inflatable structures and/or pressure-deployable (or pressure-deformable) membranes to achieve such structural optimization; however, it should be further noted that particular modules (or components thereof) are also sized to substantially match, where possible, other modules and/or components of the present invention, both to further reduce fabrication cost by minimizing the number of different elements required to construct the modular apparatus, and to allow similarly sized modules to be easily interchanged to increase versatility of the modular apparatus and/or to facilitate rapid substitution of one or more modules in the event of damage.

To enable the various modules of the present invention to operate as a unit, each module typically includes one or more attachment means for connecting to other modules of the apparatus, for attaching accessory elements, and/or for securing and stabilizing the apparatus to promote safe operation. Additionally, each inflatable and/or pressure-deployable module of the apparatus requires at least one inflation means or pressure-adjusting means such as, for example, a simple well-known plug valve, a manual or automatic pump, a gas canister, and/or the like.

To increase performance, to further enhance safety, to facilitate use, to reduce production cost, and/or to enable the modular field-deployable apparatus to perform additional functions, the present invention optionally provides that numerous alternate configurations, optional features, and/or accessory elements typically can be substituted for, incorporated into, and/or used in concert with the various embodiments and/or modules of the present invention.

Regarding alternate configurations, note, for example, that the use of non-pre-formed (i.e., planar) elastic reflective membranes is contemplated to enable the basic reflector apparatus to have a variable focal length, or to simply serve as a planar reflector or mirror. (Note that the latter case requires only a single reflective membrane to be supported and tensioned by the inflatable support.) Further, the use of pre-formed, non-parabolic reflective membranes (e.g., reflective membranes having surfaces which are spherical, undulating, a series of conic sections, faceted, and/or the like) is contemplated to limit the maximum degree of concentration to further enhance safety. In addition, the invention also contemplates various novel methods of manufacture for the various modules. More specifically, various fabrication processes, such as those disclosed in our previous (cross-referenced) applications, may be employed to economically produce the present invention primarily from multiple, thin, flexible (e.g., pressure-deformable) membranes (e.g., produced from a flat pattern of membranous sheets).

Regarding optional features and/or accessory elements, note that such elements can be either integrally incorporated within, or removably (e.g., separably) attached to, the various modules of the present invention. Also note that the various modules of an optionally inflatable embodiment of the apparatus may be integrated, such as to permit simultaneous inflation of the integrated, interconnected modules.

Although there are many benefits provided by having an apparatus substantiality comprising one or more inflatable modules or elements, each of the modules or elements of the field-deployable apparatus comprising the present invention may optionally alternatively comprise a non-inflatable collapsible module or element, or a rigid module or element, without departing from the nature of the present invention.

Specific portable apparatus are shown herein below which greatly facilitate or enable a wide range of useful applications. However, the invention contemplates that many other portable apparatus may be provided for various purposes by judiciously combining one or more of the modules of the modular field-deployable apparatus (or alternate configurations thereof) with any of the numerous optional features and/or accessory elements of the present and/or basic invention, i.e., the invention is not limited to the specific examples shown and/or described herein.

Ultimately, the present invention serves as a highly portable, field-deployable, multi-function, multi-purpose apparatus or tool, which can quickly and economically provide in the field (or other partially or significantly infrastructuredeprived environment) at least one life-enhancing or life-sustaining function or utility. More specifically, the invention can perform many of the life-sustaining functions and/or utilities routinely provided by much more massive, semi-portable apparatus and/or substantially fixed elements of infrastructure that are typically found within highly infrastructure-rich environments. Consequently, the highly portable multifunction apparatus of the present invention can rapidly, effectively, and economically replace and/or supplement, either temporarily or permanently, many of these life-sustaining apparatus and/or elements of infrastructure, examples of which include various domestic (i.e., household) appliances and/or other housewares; research, commercial, industrial, recreational, and/or military equipment; municipal power, water, and/or communication utilities; basic shelter from inclement weather or other environmental elements; and/or the like. Accordingly, the present invention is ideally and uniquely suited to facilitate a broad range of activities including, for example, remote field work, emergency response, disaster relief, outdoor recreation (such as camping, backpacking, picnicking, boating, and/or the like), education (as a teaching or learning aid, or as a resourcefulness tool or creativity-stimulating tool), and/or other activities in terrestrial (e.g., land, sub-terrainian, marine, sub-marine, air-borne) and/or non-terrestrial (e.g., space-based or extra-planetary) environments.

b. Typical Advantages Over Related Art

Hence, the modular inflatable multifunction apparatus comprising the present invention is generally superior to the related art in at least seven very significant respects.

First, the present invention is superior to the related art as a result of its highly versatile multifunctional, multipurpose nature, which is greatly enhanced by the selectably configurable or re-configurable modular nature of the present invention. It is noted that the preferred and several alternate embodiments of the present invention have numerous electromagnetic and non-electromagnetic applications, many of which are made possible only by the selectably re-configurable nature of the present invention. In contrast, all related art is of a substantially fixed configuration (i.e., non-re-reconfigurable) and, thus, is significantly more limited with respect to utilities and applications thereof. In greater detail, it is emphasized that the related art typically makes no references to, or accommodations for, performing non-electromagnetic functions, such as harnessing energy from a fluid stream or water collection and storage, which are but two of the many important aspects of the present invention when the apparatus is deployed in the field as a multifunction terrestrial survival tool. In addition, the modular nature of the present invention allows the various modules of the apparatus to be used simultaneously for similar and/or radically different functions; however, related art contains no such provision.

Second, the present invention is typically superior to the related art as a result of its extremely lightweight and compactly foldable construction, which greatly facilitates portage and storage. As an example, note that a pocket-sized version of the basic inflatable reflector apparatus (as exemplary of the light-weight and compactly storable nature of other elements or modules of the present invention) having a mass of approximately 100 grams and measuring only 8.5 cm by 12.0 cm by 1.0 cm when fully collapsed can be inflated to yield a fully deployed device having a 120 cm diameter primary reflector providing 1000 watts of highly concentrated broad-spectrum radiant energy when utilized terrestrially as a solar energy concentrating device. It is noted that such a device can thus provide an unprecedented mass-specific power output approximating 10000 watts per kilogram, depending on the specific thickness and material of construction (e.g., a 13-micron-thick nylon/polyethylene co-extruded membrane), and a non-deployed, compactly folded, volume-specific power output (i.e., non-deployed power density) approximating 10 megawatts per cubic meter. As a result, a single cargo airlifter can, for example, airdrop in a single load a sufficient quantity of the apparatuses to capture and concentrate well over 100 megawatts of solar energy. Although a modular apparatus incorporating several inflatable accessory modules generally has a lower weight-specific and volume-specific power output than the basic inflatable reflector apparatus, it should be noted that such inflatable accessory modules of the modular apparatus optionally can be constructed from one or more modified basic reflector apparatuses such that the modified modular apparatus can be reconfigured as a plurality of basic inflatable reflector apparatuses, which substantially achieve the same high weight-specific and volume-specific power output of the primary basic inflatable reflector apparatus.

Third, the present invention, in one or more of its embodiments, is typically superior to the related art as a result of its precisely pre-formed reflective membranes and other optional features, which greatly increase the operational safety of the device. More specifically, the use of improved pre-formed substantially parabolic reflective membranes (instead of planar membranes as generally used in related art) allows the device to have (and can limit the device to) relatively short and substantially fixed focal lengths, thereby enabling the user to maintain greater control over the location of any potentially dangerous, high concentrations of radiant energy. In addition, pre-formed, non-parabolic reflective membranes may be used to limit the maximum degree of energy concentration to lower and, thus, safer levels. Further, the use of optionally integral safety cages, safety covers, and/or other safety features significantly reduces the risk of accidental exposure to high concentrations of electromagnetic radiation. Again, such features and their associated benefits typically are not contemplated by related art.

Fourth, the present invention, in one or more of its embodiments, is typically superior to the related art in that it is easier to deploy (e.g., inflate) and operate. Note that by using preformed reflective membranes (or other pre-formed elements of the apparatus), such reflective membranes can be fully deployed using significantly less differential pressure across the membranes, thereby facilitating proper inflation. In addition, various optional (typically modular) elements may be incorporated into the device, which further enhance ease-of-use during deployment and/or operation. For example, such elements include (1) various novel means for supporting and/or orienting the device, (2) various novel apparatus for holding materials or accessory elements in proximity to the focal point, and (3) the use of simple, well-known inflation valves, which greatly facilitate deployment, even by persons having limited education or prior experience with solar concentrating apparatus. In contrast, except for the occasional use of well-known focal point supports, related art typically neither contemplates nor anticipates such elements or the benefits thereof.

Fifth, the modular apparatus of the present invention, when employing a first embodiment configuration of the basic reflector apparatus, is typically more efficient in that it eliminates all loss-inducing intervening layers as contained within the optical paths of all closely related art, i.e., art employing pressure-deformable reflective membranes supported by an inflatable ring. Note that by employing a sub-ambient-pressure reflector chamber, as is used in the first embodiment of the basic reflector apparatus, sunlight or other electromagnetic radiation can travel, unobstructed, from the energy source to the reflector and then to the target. Accordingly, the first embodiment of the basic reflector apparatus causes no (i.e., zero) losses of radiant electromagnetic energy as such energy travels to and from the reflector. In contrast, most related art requires sunlight or other electromagnetic radiation to pass through the transparent membrane of a super-ambient reflector chamber on its way to and from the reflector, thereby resulting in a plurality of losses. The remaining related art, although utilizing a sub-ambient pressure reflector chamber, also requires the electromagnetic energy to pass through at least one intervening layer, such as a radome, again resulting in a plurality of losses. In general, these losses include the reflection, absorption, and diffusion of electromagnetic radiation by the intervening layer as the radiation travels to and from the reflector. Ultimately, the intervening layers of related art are typically responsible for reducing the efficiency of such devices by as much as twenty percent, or more, depending upon the wavelength of the impinging radiation and the transmission characteristics of the material or materials comprising the intervening layer.

Sixth, the present invention is typically superior to the related art in that the various modular elements of the present invention each typically possess an extremely simple and optionally highly integrated structure, which has been specially configured to facilitate high-speed mass-production, thereby making the device very economical to produce. Note that the designs specified in the related art typically do not demonstrate the high degree of integration and resulting simplicity of construction to the extent specified herein for the modules of the present invention. Also note that the relative simplicity of the present invention is due, in part, to the fact that the reflective membrane of its basic reflector apparatus can be deformed into a substantially parabolic surface utilizing only the surrounding ambient (e.g., atmospheric) pressure and simple, manually-operated (optionally orally operated) valves. In contrast, the related art typically relies on complex mechanical arrangements, complex electrostatic systems, or complex pressure adjusting systems to deform the reflective membrane into a substantially parabolic surface.

Seventh, the present invention is typically superior to related art as a result of possessing a superior degree of robustness, especially when deployed into the field via airdrop or other potentially high-acceleration-inducing delivery methods. Note that such robustness of design is a result of the nearly exclusive use of thin flexible membranes (instead of rigid structures) to produce the various modules of the apparatus. Further, in the event of damage, the apparatus is also superior to related art in that it exhibits superior maintainability, which is achieved by incorporating an integral repair assembly or means for rapidly repairing the apparatus in the field. In contrast, the related art provides no such means for conveniently maintaining the apparatus in the field.

It should be noted that each of the above aspects of the present invention, taken separately, represents a significant improvement over related art. However, in combination, these superior aspects of the present invention represent an enormous improvement over related art, the significance of which should not be underestimated. More specifically, as a result of optionally possessing all of the noted improvements over related art, the present invention can effectively serve as a highly multifunctional, highly portable, generally safe-to-operate, easy-to-use, high-performance, and highly economical tool—a tool which has the ability to significantly enhance one's ability to enjoy and/or survive a variety of difficult or demanding physical environments, which, for a variety of reasons, have few if any of the typical life-sustaining facilities or elements of infrastructure upon which much of humanity is presently highly dependent. In particular, the apparatus offers greatest benefits to persons who are suddenly and unexpectedly forced to dwell in regions of the world in which basic food preparation facilities, potable water systems, or other critical elements of the local infrastructure have been either destroyed or otherwise rendered inoperable, whether as a result of war, natural disaster, or other crisis. Under such circumstances, it should be noted that the efficacy with which emergency supplies and temporary infrastructure can be reestablished within the disaster area directly affects the quality of life and, more importantly, the survival rate of the persons located in the affected region. Ultimately, to alleviate as much general hardship as possible, but also to minimize the mortality rate, substitute temporary-use facilities need to be reestablished throughout the affected region in sufficient quantities, and with a minimum of time, effort, and expense. Due to its low cost, ease-of-use, and high degree of portability, the multifunction device disclosed herein is ideally and uniquely suited to facilitate such emergency or disaster relief efforts. As a result, the instant invention provides a highly effective method for meeting this unending global need—an aspect of the invention that is neither contemplated nor anticipated by related art.

The present invention can also be of great benefit to individuals living, working, or traveling in underdeveloped or neglected parts of the world. For the outdoorsman or explorer, the modular field-deployable apparatus can serve as an invaluable multifunctional survival tool. In addition, as noted above, the apparatus can offer many benefits to persons who choose to participate in a variety of outdoor recreational activities for which portable food preparation facilities and/or other functions of the present invention are either needed or desired. Further, it should be noted that the highly economical apparatus is ideally suited for use as an instructional aide for teaching students or other interested parties about solar energy. Considering the world's dwindling supply of fossil fuels and other conventional fuels—especially in conjunction with the present ever-increasing global demand for energy—worldwide education about solar energy is becoming increasingly necessary to protect the environment, sustain the global economy, and ensure a reasonable quality of life for all creatures inhabiting the Earth. Further, the multifunctional nature of the present invention enables the invention to effectively serve as a teaching aid or learning tool, such as for stimulating creativity and/or developing resourcefulness. Once again, these additional purposes and benefits are neither contemplated nor anticipated by related art.

As one reads subsequent sections of this document, it will become quite clear that the modular field-deployable apparatus is also superior to the related art in a variety of other ways including, among other items, various novel methods of manufacturing, deploying, and using the modular apparatus.

c. Specific Objects and Advantages of the Invention

Accordingly, it is typically a principal object of the present invention to provide a highly portable (e.g., inflatable or otherwise collapsible), modular, selectably configurable, multi-function, multipurpose, field-deployable apparatus and fabrication methods thereof, which is generally optimized for use as a substantially parabolic reflector to focus electromagnetic energy from radio frequency radiation (RF) through ultraviolet radiation (UV) including solar radiation (or a predetermined subset thereof), but which typically can also be used for numerous other electromagnetic and/or non-electromagnetic utilities. Regarding the multi-functional nature of this invention, specific (but optional) objects of the present invention are:

(a) to provide a highly portable modular multifunction apparatus for concentrating broad-spectrum (e.g., solar) radiation for cooking, heating, sterilizing, distilling, material processing, and/or for other purposes requiring or benefiting from the application of radiant heat, which may optionally utilize various accoutrements specially configured for absorbing concentrated solar radiation including, for example, a solar oven or autoclave having a high-emissivity (generally blackened) energy-absorbing external surface;

(b) to provide a portable modular multifunction apparatus for generating electrical power utilizing turboelectric, thermoelectric, and/or photoelectric devices;

(c) to provide a portable modular multifunction apparatus, which can be utilized to concentrate light radiating from a relatively dim source, such as a street lamp, to operate (and/or recharge) an otherwise inoperable, low-power, photovoltaic device, such as a handheld calculator;

(d) to provide a portable modular multifunction apparatus, which can be used for enhancing or enabling radio, microwave, and/or satellite communications (including use of one or more apparatus as a relay station), and/or for enabling radio-telescopy;

(e) to provide a portable modular multifunction apparatus for enhancing vision in darkened environments by concentrating visible light radiating from a dim source, such as a crescent moon, onto an object to be viewed;

(f) to provide a portable modular multifunction apparatus for enhancing vision in darkened environments by projecting light from non-collimated sources, such as a candle, into dark environments;

(g) to provide a highly portable modular multifunction apparatus for enabling or enhancing optical signal communications, such as when used with a non-collimated light source held at the focal point to form a signal beacon, and optionally further including colored, textured, polarized, and/or image-containing transparent and/or reflective membrane(s) to enhance signaling and/or to provide artistic lighting or imaging;

(h) to provide a portable modular multifunction apparatus employing a waveguide system to capture and deliver panchromatic visible light (or other useful spectral range of radiation) to interior, subterranean, and/or underwater environments to enhance vision and/or to operate equipment such as an optical image projector;

(i) to provide a portable modular multifunction apparatus, which can serve as a multi-layer emergency thermal blanket, electrostatic insulator, and/or electromagnetic energy shield to protect a person or object, but which also allows a person or object to hide from an infrared (IR) camera or otherwise be shielded from an electromagnetic imaging or detection device;

(j) to provide a portable modular multifunction apparatus, which can serve as a soft, compliant support for persons or objects, including use as a bed, cradle, seat, inflatable cast (for immobilizing a broken limb), or the like;

(k) to provide a portable modular multifunction apparatus, which can be used as a water flotation device, boat, or snow sled;

(l) to provide a portable modular multifunction apparatus, which can be used to capture, store, process, and/or distribute water, other liquids, and/or certain solid materials, for which various optional accoutrements (such as catchment rings, gutters, funnels, filters, tubes, valves, pumps, and the like) can be either integrally or removably incorporated into the apparatus;

(m) to provide a portable modular multifunction apparatus incorporating a high-emissivity surface, such as a matte black surface, which can be used to collect water at night by radiative condensation processes;

(n) to provide a portable modular multifunction apparatus, which can be used as a fermentor, which, in conjunction with the distillation function noted above, allows the apparatus to produce high grade spirits for fuel, medicinal, and other purposes;

(O) to provide a portable modular multifunction apparatus for the directional amplification of sound;

(p) to provide a portable modular multifunction apparatus optionally incorporating one or more pressure-deformable, planar, reflective membranes to allow the device to have a variable focal length;

(q) to provide a portable modular multifunction apparatus, which can be used as a thermal shelter, incubator, hydroponic growing chamber, greenhouse, frost shield, and/or general shelter from inclement weather or other environmental elements (e.g., mosquitoes, other biting insects, dust, debris, sunlight, etc.);

(r) to provide a portable modular multifunction apparatus, which can be used as a dehydrator, dryer, curing chamber, and/or sealed or vented work chamber;

(s) to provide a portable modular multifunction apparatus, which can be used as an optionally camouflaged wildlife viewing/hunting blind, animal cage, terrarium, aquarium, and/or aquatic growth chamber;

(t) to provide a portable modular multifunction apparatus, which can be used as a wind and/or water turbine to produce electrical and/or mechanical power;

(u) to provide a portable modular multifunction apparatus, which can be used as a liquid surface wave energy harnessing device for generating mechanical and/or electrical power; and/or (v) to provide a portable modular multifunction apparatus optionally incorporating one or more one-way valves to facilitate or enable use of the apparatus as a fluid pump.

A second main typical (but optional) object of the invention is to provide a modular multifunction apparatus which optionally is extremely lightweight, fully collapsible, and compactly foldable so as to greatly facilitate portage and storage, thereby providing a high performance apparatus which is ideally suited to camping, backpacking, picnicking, boating, emergency use, disaster relief, and/or other situations (terrestrial or space-based) for which high mass-specific and/or high volume-specific performance is critical. Regarding portage and storage, specific (but optional) objects of this invention are:

(a) to provide a modular multifunctional apparatus having a primary structure comprised entirely of thin and/or very thin, high-strength membranes to minimize weight;

(b) to provide a modular multifunctional apparatus, which is inflatable (i.e., rigidizable and/or otherwise deployable) by using pressurized gas which generally need not (but may) be carried with the device;

(c) to provide a modular multifunctional apparatus, which is fully collapsible and compactly foldable when not in use to minimize volume;

(d) to provide a modular multifunctional apparatus, which, due to its extremely low weight and stored (non-deployed) volume, yields very high mass-specific and volume-specific performance approximating 10000 watts per kilogram and 10 megawatts per cubic meter, respectively, when used terrestrially as a broad-spectrum solar concentrator; and/or (e) to provide a modular multifunctional device having extremely lightweight and compact inflation valves, for example, valves made from membranous material and including an interlocking tongue-and-groove (e.g., "Ziploc®"-type), clamped or tied, or self-sealing type closure mechanism.

A third main typical (but optional) object of the invention is to provide a modular multifunctional apparatus, which optionally is safer to operate, transport, and/or store. Regarding safety, specific (but optional) objects of this invention are:

(a) to provide a portable modular multifunctional apparatus having an integral safety cage (preferably inflatable or otherwise fully collapsible), which forms a physical barrier around the focal point, thereby preventing accidental exposure to potentially dangerous concentrations of electromagnetic radiation;

(b) to provide a portable modular multifunctional apparatus having an integral safety cover to block radiation from striking the reflective membrane(s) when the device is not in use, thereby preventing the formation of and, thus, the risk of accidental exposure to potentially dangerous concentrations of electromagnetic radiation at or near the focal point;

(c) to provide a portable modular multifunctional apparatus having an integral reflector wrinkling mechanism for distorting the reflective membranes when not fully deployed (pressurized), thereby once again substantially preventing the formation of any unintentional, potentially dangerous concentrations of electromagnetic energy;

(d) to provide a portable modular multifunctional apparatus having one or more pre-formed parabolic reflective membranes, which limit the device to substantially fixed, short focal lengths, thereby enhancing safety by giving the operator greater control of the location of the highly concentrated energy at the focal point;

(e) to provide a portable modular multifunctional apparatus having one or more pre-formed, non-parabolic reflective membranes to limit the maximum degree of energy concentration to lower and, thus, safer levels;

(f) to provide a portable modular multifunctional apparatus having one or more means for off-axis light attenuation such as, for example, an off-axis light attenuation grating for attenuating power when the device is positioned off-axis, and/or a darkened transparent film for attenuating reflected light when viewing from a position substantially off-axis;

(g) to provide a portable modular multifunctional apparatus having one or more means for blocking and/or redirecting energy in proximity to the focal point so as to provide a quick power shutoff means and/or to capture and redirect stray electromagnetic rays (which also can improve performance);

(h) to provide a portable modular multifunctional apparatus having redundant inflatable (or otherwise collapsible) support structures (e.g., independent pressure envelopes) to mitigate the risk of catastrophic collapse or other failure; and/or (i) to provide a portable modular multifunctional reflector apparatus having a status indicator device and/or warning alarms to warn the user or operator of said apparatus to the occurrence of any dangerous conditions such as overheating, fire, and the like.

A fourth main typical (but optional) object of the invention is to provide a portable modular multifunctional apparatus that optionally is easier to deploy and/or operate. Regarding ease of use, specific (but optional) objects of this invention are:

(a) to provide a modular apparatus having various integral securing and storage features such as handles, apertured tabs, ties, weighting and storage pouches (especially those which are lightweight, compact, and can be made from extensions of the membranes from which the apparatus is constructed);

(b) to provide a modular apparatus having various integral accessory hardware attachment devices such as devises, clips, brackets, sockets, hook-and-loop patches, and other common fastening mechanisms (especially those which are collapsible to facilitate portage and storage);

(c) to provide a modular apparatus having various lightweight, portable mechanisms for supporting and orienting the device including, for example, an inflatable adjustable dipody support, a stack of inflatable tapered support/leveling rings, and/or an inflatable (or otherwise collapsible) spherical mounting element with a separate, optionally inflatable (floating), support ring;

(d) to provide a modular apparatus having lightweight, portable mechanisms for holding various items and/or accoutrements at or near the focal point including, for example, a collapsible, multipurpose rotisserie/kettle support, a collapsible multi-leg focal point support, an inflatable focal point support, and/or a cable stayed focal point support;

(e) to provide a modular apparatus having one or more pre-formed, pressure-deformable reflective membranes, which can be fully deployed using significantly lower differential pressures across the membranes than devices employing planar reflective membranes, thus facilitating proper inflation;

(f) to provide a modular apparatus having integral or removably attached orientating and alignment features, such as a visual alignment guide, inclinometer, level, and/or magnetic compass, to facilitate alignment with an electromagnetic source and/or target, and/or for orienting the device for other purposes;

(g) to provide a modular apparatus having a light/heat intensity controller such as a louver or iris mechanism which is manually or automatically controlled;

(h) to provide a modular apparatus having various integrally or separately attached electronic and/or mechanical elements (to facilitate various applications) including but not limited to photovoltaic cells, electrical batteries, electric pumps, fans, drivers, timers, thermostats, controllers, and/or other useful devices; and/or (i) to provide a modular apparatus having a lightweight means for automated sun tracking.

A fifth main typical (but optional) object of the invention is to provide a portable modular multifunctional apparatus, which optionally is more efficient, wherein two pressure deformable membranes are utilized to form a sub-ambient concave-concave reflector chamber configuration, thereby eliminating the plurality of losses inherent in devices having one or more intervening layers in the optical path, such as a transparent membrane of a super-ambient reflector chamber, through which light must pass at least once on its way to or from the focal point.

A sixth main typical (but optional) object of the invention is to provide a portable modular multifunctional apparatus, which optionally is highly economical by virtue of its extremely simple, highly integrated construction, and which can thus be made universally available for both routine use as well as educational purposes. Regarding economy, specific (but optional) objects of this invention are:

(a) to provide a modular apparatus having a basic reflector apparatus (first and/or second main embodiment) made from a plurality of (generally four or more) sheets of thin, high-strength, high-elastic-modulus (preferably), commercially available material(s), plus the necessary valves, using a substantially flat pattern fabrication method that greatly simplifies manufacturing, tooling, and processing, thereby reducing fabrication cost;

(b) to provide a modular apparatus having a basic reflector apparatus (second embodiment), which can be fabricated from as few as two thin sheets of high-strength, commercially available material(s), plus the necessary valves, using simple, well-established manufacturing processes; and/or (c) to provide a modular field-deployable apparatus, wherein one or more of its modules (or components thereof) are sized to substantially match (i.e., have the same size as) other modules (or components thereof), so as to reduce fabrication cost by minimizing the number of different elements that need to be produced (but also to enhance versatility and facilitate repair).

A seventh main typical (but optional) object of the invention is to provide a portable modular multifunctional apparatus that is optionally highly drop tolerant, otherwise damage tolerant, and easy to repair in the event of damage. Regarding damage tolerance and reparability, specific (but optional) objects of this invention are:

(a) to provide a modular apparatus having one or more redundant reflector chambers such that if one reflector chamber is damaged, the device is still operable;

(b) to provide a modular apparatus constructed primarily of highly flexible materials (optionally including multi-layered and/or fiber-reinforced composite materials which are puncture-resistant, tear-resistant, and/or abrasion resistant) such that the apparatus can be dropped intentionally (e.g., air dropped), dropped unintentionally (i.e., accidentally), and/or otherwise be subjected to harsh operating conditions yet sustain no appreciable damage; and/or (c) to provide a modular apparatus having integral quick-repair materials (e.g., self-adhesive patches and the like).

An eighth main typical (but optional) object of the invention is to provide a modular portable multifunctional apparatus that is highly environmentally friendly by virtue of the fact that the apparatus generally requires no fuel to operate. Instead, the instant invention typically relies solely on radiating solar energy when used for heating, cooking, and the like, thereby minimizing air, water, and ground pollution. This is in stark contrast to other common portable cooking and heating equipment, which generally rely on the combustion of hydrocarbon fuels and, thus, inherently cause pollution through both combustion processes and unintentional fuel releases (e.g., spills, leaks, vapor releases, and the like).

It is a further object of the invention to provide improved elements and arrangements thereof, which are inexpensive, dependable, and fully effective in accomplishing their intended purposes.

These and other objects of the present invention will become readily apparent upon further review of the following specification and drawing. However, it is once again emphasized that any particular embodiment or manifestation of the present invention need not perform all such functions or otherwise meet all such objects of the present invention as noted herein, thus prompting the use of the term "optional" and/or "optionally" when referring to the various objects of the invention in several of the preceding paragraphs. Specifically, any particular embodiment of the present invention can be configured to perform and/or meet only a limited number (or subset) of these functions and/or objects without departing from the basic nature of the invention.

BRIEF DESCRIPTION OF FIGURES

FIGS. 2A-B are, respectively, a schematic top plan view and a schematic side-elevational view of the basic inflatable reflector apparatus in a currently preferred first embodiment configuration.

FIGS. 4C-J are schematic diametrical cross-sectional views of the basic inflatable reflector apparatus in a second embodiment configuration illustrating the operation of various preferred and alternate reflector chamber configurations.

FIGS. 7A-B are schematic diametrical cross-sectional views of alternate basic first embodiment reflector apparatuses having detuned (i.e., non-parabolic) reflective membranes which are pre-formed, respectively, into spherical and non-spherical surfaces-of-revolution.

FIGS. 8A-B are, respectively, a schematic top plan view and a schematic diametrical cross-sectional view of an alternate basic first embodiment reflector apparatus having a detuned reflective membrane pre-formed into the shape of a radially undulating (or radially stepped) surface of revolution.

FIGS. 9A-D are schematic top plan views (FIGS. 9A and 9C) and schematic diametrical cross-sectional views (FIGS. 9B and 9D) of alternate basic first embodiment reflector apparatuses having a detuned reflective membrane pre-formed into the shape of a circumferentially undulating (or scalloped) surface.

FIGS. 10A-B are, respectively, a schematic top plan view and schematic diametrical cross-sectional view of an alternate basic first embodiment reflector apparatus having a detuned reflective membrane comprising a plurality (e.g., twelve) of pre-formed, wedge-shaped dimples optionally supported by an underlying radial support grid (e.g., a plurality of radial cords, wires, cables, or the like).

FIGS. 11A-H are several schematic top plan views and a schematic diametrical cross-sectional view (FIG. 11B) of alternate basic first embodiment reflector apparatuses having a detuned reflective membrane comprising a plurality of pre-formed dimples in substantially hexagonal, circular, annular, or rectangular arrays, optionally supported by an underlying support grid.

FIGS. 13A-D are schematic top plan views (FIGS. 13A and 13C) and schematic diametrical cross-sectional views (FIGS. 13B and 13D) of alternate basic first embodiment reflector apparatuses having a detuned composite reflective membrane comprising a plurality of conical facets.

FIGS. 14A-F are several schematic top plan views and a schematic diametrical cross-sectional view (FIG. 14B) of alternate basic first embodiment reflector apparatuses having a detuned composite reflective membrane comprising a plurality of substantially planar facets in substantially circular, annular, or triangular arrays.

FIGS. 15A-B are, respectively, a schematic top plan view and a schematic diametrical cross-sectional view of an alternate basic first embodiment reflector apparatus having a detuned faceted reflective membrane which is alternately deployed via a plurality of internal ribs, sheets, and/or cords bonded to an opposing membrane (or optionally to a support ring or other support element).

FIGS. 15E-F are, respectively, a schematic top plan view and a schematic diametrical cross-sectional view of an alternate basic first embodiment reflector apparatus illustrating a flat pattern manufacturing method for an apparatus having a detuned faceted reflective membrane which is alternately deployed via a plurality of internal ribs or sheets bonded to an opposing membrane via generally circumferentially oriented bonds.

FIGS. 15G-H are, respectively, a schematic top plan view and a schematic diametrical cross-sectional view of an alternate basic first embodiment reflector apparatus illustrating a flat pattern manufacturing method for an apparatus having a detuned faceted reflective membrane which is alternately deployed via a plurality of internal ribs or sheets bonded to an opposing membrane via generally radially oriented bonds.

FIGS. 18A-F are schematic cross-sectional views of the modular multi-function apparatus being used as a broad-spectrum electromagnetic (e.g., solar) energy concentrator for cooking, distilling, heating, energizing, material processing, sterilizing, and the like.

FIGS. 20A-C are schematic cross-sectional views of the modular multi-function apparatus being used to manipulate visible-spectrum radiation (i.e., light) to enhance vision, communicate by light signals, and the like.

FIGS. 21A-D are schematic cross-sectional views of the modular multi-function apparatus being used as a compliant support, shelter, and the like.

FIGS. 23A-M are various schematic cross-sectional views, schematic front elevational views, and schematic side elevational views of the modular multi-function apparatus (or modules thereof) being used as part of a wind turbine apparatus for generating mechanical and/or electrical power.

FIGS. 24A-D are schematic cross-sectional views of the modular multi-function apparatus (or modules thereof) configured and being used for miscellaneous functions, including, respectively, use as a high-gain directional sound-amplification device, use as a fermentation apparatus, use as a sieve or filter, and use as a floating aquatic chamber.

FIGS. 24L-M are schematic side-elevational cross-sectional views of the modular multi-function apparatus (or modules thereof) configured and being used as an evaporative cooler and/or collector.

FIGS. 39A-C are schematic perspective views of a modified first embodiment reflector apparatus further including suspended single-axis and dual-axis means for tracking the sun.

FIGS. 40A-D are schematic perspective views of typical, substantially polymeric, multi-layer, composite materials from which the apparatus can be constructed.

DETAILED DESCRIPTION

FIGS. 1A-D: Modular Inflatable Multifunction Apparatus

Figure 1A:
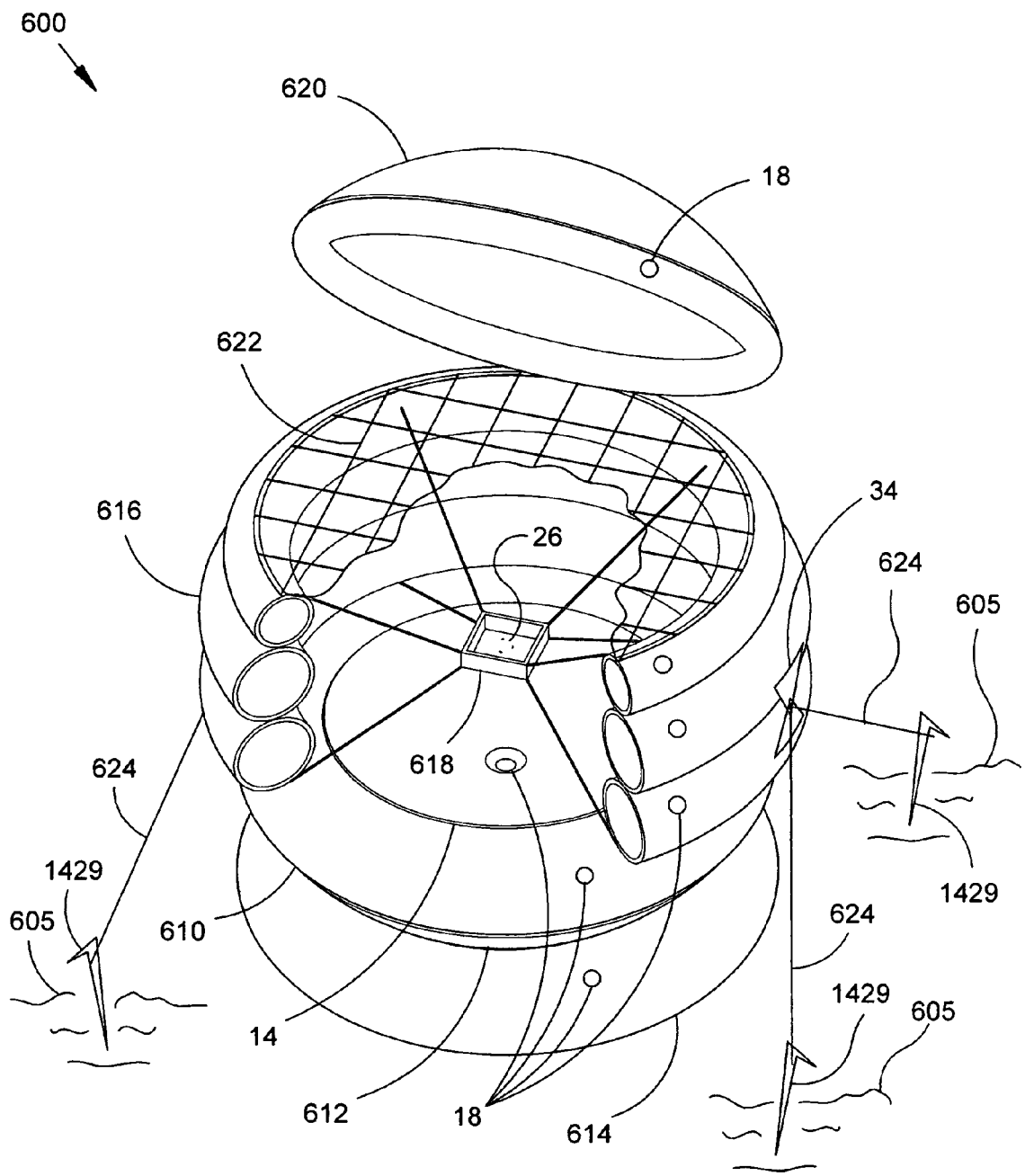
FIGS. 1A-D are, respectively, a schematic perspective view showing a partial cutaway, a schematic side elevational cross-sectional view, an exploded schematic cross-sectional view, and an alternate schematic perspective view of a typical modular, inflatable, multi-function, field-deployable apparatus.

FIG. 1A depicts a typical selectably deployable, modular, inflatable, multifunction, field-deployable apparatus 600 comprising as its primary functional element a basic inflatable multifunction reflector apparatus 610 in a preferred first embodiment configuration. The apparatus 610 is shown optionally supported on its lower side by a removably (i.e., separably) attached inflatable spherical support 612, which is movably couched within an optional separate inflatable toroidal ring 614. The apparatus 610 is shown supporting on its upper side an optional removably attached inflatable safety shield 616 (shown partially cut away) or safety cage (or other safety member) that further supports an optional removably attached cable-stayed support 618 for holding various items, materials, and/or accessory elements (not shown) in proximity to the focal point 26 of the basic reflector apparatus 610.

In addition to the safety shield 616, two other safety devices or means are shown for protecting the user from accidental exposure to potentially dangerous, high concentrations of electromagnetic energy at or near the focal point 26. First, a removably attached, optionally inflatable, protective safety cover 620 is shown attached to the upper potion of the safety cage 616 in a deployed (inflated) condition. The protective safety cover can be quickly deployed to either attenuate the amount of electromagnetic energy (not shown) striking the reflector 14 when the apparatus 600 is being used, or to fully block such electromagnetic radiation when the apparatus is not in use. Second, an optional protective safety net or mesh 622 (shown partially cut away) is shown attached to the upper portion of the safety shield 616 to restrict nondeliberate physical access to the focal point 26. Note that the safety net 622 also can be used to provide a convenient support for a partially or fully deployed safety cover 620, and to structurally stabilize or reinforce the upper end of the safety shield 616.

Additionally, safety is further enhanced by a plurality of stabilizing cables 624 or lines, which are shown connecting the movable upper portion of the modular apparatus to the surface 605 (e.g., ground) upon which the lower support ring 614 of the apparatus 600 is resting. As a non-limiting example, note the use of optional ground stakes 1429 to secure the cables 624 to the surface 605.

Regarding physical construction, briefly note that each module 610-624 of the apparatus 600 typically is principally constructed from one or more thin flexible (e.g., pressure-deformable) membranes, one or more lightweight inflatable structures, and/or other flexible structural elements, such as cables, lines, nets, and the like. In addition, each of the inflatable and/or otherwise pressure-deployable modules 610, 612, 614, 616, 620 includes one or more inflation or pressure adjusting means or devices, such as the simple plug-type valves 18 as shown; however, a variety of other well-known inflation or pressure adjusting elements, devices, or means may be employed including, as non-limiting examples: manual or automatic pumps, pressurized gas canisters, gas generators employing reactive chemicals or phase-changing (e.g., liquid to gas, or solid to gas) materials, and the like. Note that the inflatable structures of the apparatus can be inflated by air exchanged from the surrounding environment including, as a non-limiting example, use of one or more oral inflation valves and/or related means. Further, to enable the various modules of the modular apparatus to operate as a unit, each module typically includes one or more attachment means or devices (e.g., attachment means 34) for attaching the module to other modules, for attaching accessory elements, and/or for securing and stabilizing the apparatus as noted above. Note that such attachment means or devices may optionally be manually operable (e.g., attachable and/or separable without the use of tools), whereby no tools other than, for example, one or more of the user's hands are required to secure, attach, and/or separate one or more modules or elements of the apparatus.

Figure 1B:
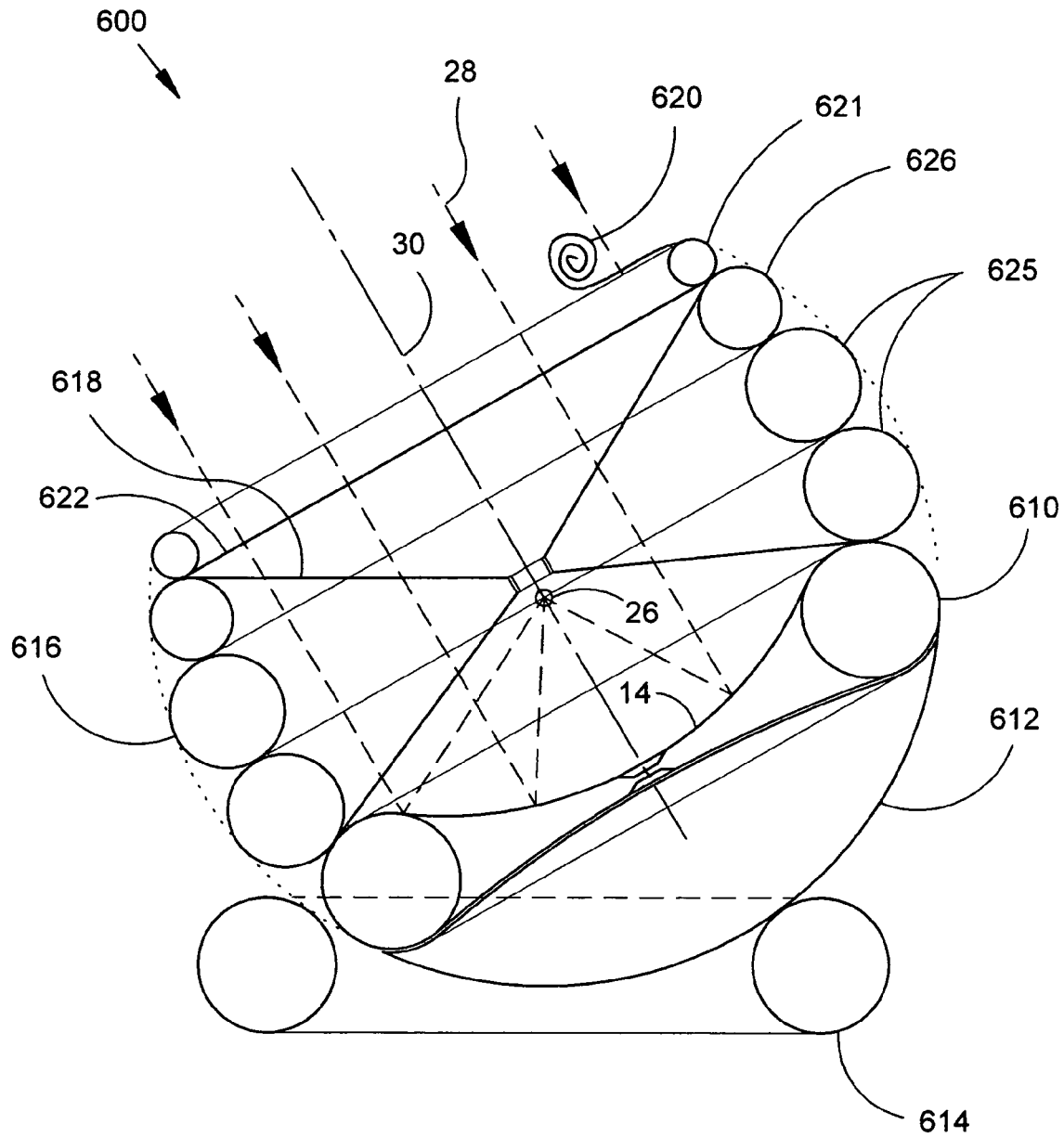

FIG. 1B depicts a first mode of operation (e.g., harnessing energy), wherein the modular field-deployable apparatus 600 is shown in cross-section concentrating radiant electromagnetic rays 28 (e.g., solar radiation) to heat or energize an energy-absorbing accessory element (not shown), such as a pot, kettle, oven, and the like, suspended in proximity to the focal point 26 via a cable-stayed support 618. Note that the movable upper portion of the modular apparatus (610, 612, 616, 618, 620, and 622) is positioned or couched within the lower support ring 614 to substantially align the focal axis 30 of the basic reflector module 610 with the incoming solar radiation 28. The safety cover 620 is shown partially deployed and secured with ties or other attachment means (not shown), thereby providing an adjustable means for attenuating (i.e., reducing) the amount of concentrated radiant energy impinging upon the element held in proximity to the focal point 26.

Figure 1C:
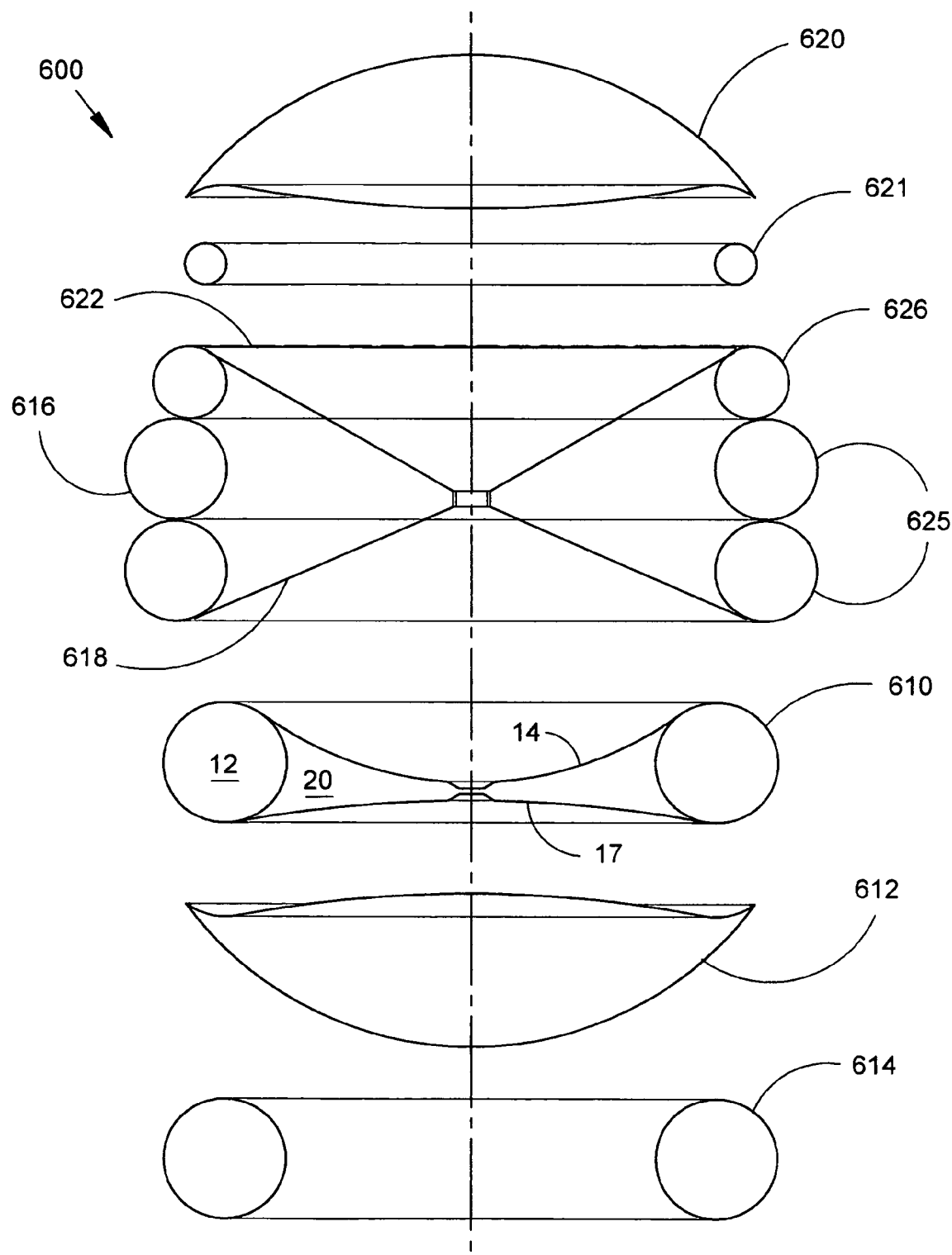

FIG. 1C depicts an exploded cross-sectional view of the modular field-deployable apparatus 600 illustrating in greater clarity its primary modules and their basic physical constructions. Such modular construction allows the apparatus 600 to be selectably configurable and, thus, to be readily reconfigured by the user in the field to perform other user-selected functions, as will be shown hereinbelow. Further, such modular construction enhances safety by providing redundant structures, thereby effectively mitigating the risk of catastrophic collapse of the apparatus.

It should be noted that each of the primary modules of apparatus 600 may optionally comprise a plurality of user-selected, user-detachable (i.e., separable) sub-modules. For example, as shown hereinbelow, the basic reflector apparatus 610 may alternatively have one or more removable central membranes and/or a removable reflector chamber to increase versatility of the basic reflector apparatus 610 and/or modular apparatus 600. As another example, the inflatable safety cage module 616 is shown as having a plurality (e.g., three) of removably attached, individually inflated, toroidal rings 625, 625, 626. This multi-ring configuration also promotes versatility in that the rings can be separated and/or alternately combined with other elements of the apparatus to serve other functions, for example, use as water flotation devices. Note that the use of multiple, separately inflated rings for the safety shield also provides an effective means for mitigating the risk of rapid catastrophic collapse. To further reduce the risk of collapse, to facilitate operation, and/or to provide a more durable stricture, note that one or more (or all) of the elements comprising the apparatus 600 optionally may be otherwise collapsible (e.g., non-inflatable) or rigid, several non-limiting examples of which are shown herein below.

It should be further noted that the various modules and/or components thereof (i.e., sub-modules) are shown preferably sized, where possible, to substantially match the size of one or more other modules and/or components of the present apparatus, both to reduce fabrication cost, and to permit similarly sized modules or components to be easily interchanged to increase versatility and/or facilitate maintenance.

The invention also provides that one or more of the primary modules of the overall modular apparatus may be integrally attached and, if inflatable, optionally simultaneously inflated by providing interconnecting gas ports between the integrally attached modules. Although such integration and interconnection may reduce structural redundancy, safety may nonetheless be enhanced, for example, by causing the safety shield to be deployed simultaneously with the reflector apparatus.

The invention further contemplates various alternate configurations for each of its primary modules, several non-limiting examples of which will be shown hereinbelow.

Figure 1D:
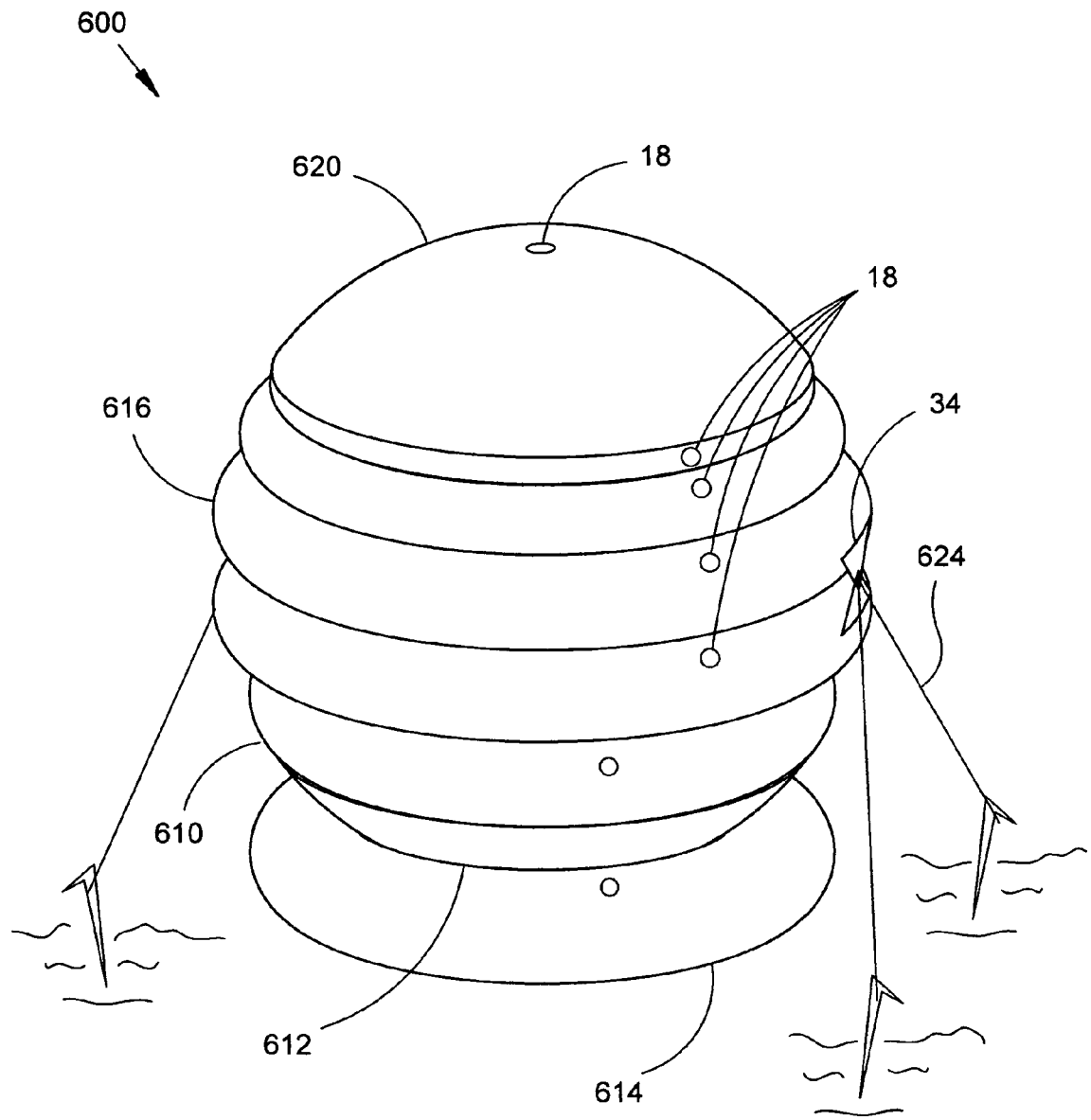

FIG. 1D depicts the apparatus 600 shown with its cover 620 in a closed position.

FIGS. 2A-D: Description of the Basic Inflatable Reflector Apparatus

First Embodiment

FIGS. 2A and 2B depict a currently preferred first embodiment configuration of the basic inflatable reflector apparatus 610, which is illustrated as an inflated toroid or ring support element 12 having a circular cross-section and supporting an upper frontal reflective membrane 14 and a lower transparent reflective membrane 17. The two central membranes 14, 17 in conjunction with the inner portion of the toroidal ring support element 12 provide a central reflector chamber (i.e., pressure envelope) 20 with a double parabolic, concave-concave configuration when inflated to a sub-ambient pressure, i.e., deployed in sub-ambient mode. The membranes 14, 17 each have an optionally centered inflation valve 18 as an example of a pressure-adjusting or inflation device or means for inflating the reflector chamber 20. The inflatable toroidal ring support element 12 also has a valve 18 as an example of an inflation device or means for inflating the ring support element to form a rigid ring. It should be noted that by optionally utilizing the inner portion of the ring support element 12 as an integral part of the reflector chamber 20, the first embodiment device 610, can be manufactured very economically from a minimum number of pieces.

The toroidal ring support element 12 is optionally fabricated from two sheets 13, which are substantially flat and annular prior to inflation, and which are attached (e.g., adhesively or thermally bonded) to each other along continuous seams 22 at their inner and outer periphery to form a toroid upon inflation, as one non-limiting example of forming the support element 12 comprising the toroid 12 are made of a high-strain-capable material, i.e., a material having high strength and low elastic modulus, such as vinyl, which is necessary for allowing the inner portion of a toroid fabricated from flat annular sheets to strain (i.e., stretch) sufficiently so as not to impede full inflation of the toroidal ring support element 12.

The central pressure-deformable membranes 14, 17 are made from thin circular sheets of high-strength, flexible material such as nylon or Mylar®, a polyethylene terephthalate plastic composition. Reflective surface 24 is provided by preferably coating the outer side of the membrane 14 (or otherwise disposing in or on the membrane 14) a reflective material, non-limiting examples of which include: vapor deposited aluminum, gold, and the like reflective material. The reflective membrane 14 is thermally or otherwise pre-formed during fabrication into the shape of a paraboloid to provide a short, fixed focal length for safety purposes and to reduce the differential pressure required to fully deform and smooth the reflective membrane 14, thus facilitating deployment and reducing the loads imposed on the support ring 12 by the reflective membrane 14 (mechanical loads) and the reflector chamber 20 (pressure loads). The transparent membrane 17 optionally may also be pre-formed to reduce the load it imposes on the support ring. Seams 22 are shown for attaching (e.g., sewing, adhesively or thermally bonding, and/or the like) the periphery of the central membranes 14, 17 to the support element 12 at or near what will become circular lines of tangency between the central membranes 14, 17 and the toroidal ring support element 12 upon inflation.

Numerous alternate configurations of the support element 12 can be incorporated (i.e., substituted) into the basic first embodiment device 610 as described above. FIG. 2A shows that the toroidal ring support element 12 has a circular planform; however, it is noted that the invention can be practiced using other types of supports including, as non-limiting examples: supports having hexagonal, pentagonal, octagonal, square, rectangular, elliptical, or other planforms. (Note that planforms having at least one substantially linear peripheral edge may prove useful for orienting and/or stabilizing the apparatus. Also note that the support ring may optionally have at least one effectively linear edge comprising one or more curvilinear or arcuate segments. The support rings may optionally have dissimilar inner and outer peripheral shapes. Furthermore, the simple two-sheet construction of the toroid as described above may be replaced with various alternate toroidal ring support elements offering greater performance and stability, but generally at the expense of somewhat greater complexity. For example, the toroid 12 optionally may be fabricated from a plurality (e.g., generally four or more) flat annular sheets of high-modulus material, such as described in our previous (referenced) applications, which also describe several other alternate configurations. Additionally, it should be noted that the invention is not intended to be limited to the specific materials and/or configurations as specified above for the toroid. Depending on the configuration, the toroid can be made from any suitably flexible material, including various other substantially polymeric materials, including monolithic, layered, and/or fiber-reinforced composite material.

Similarly, numerous alternate central pressure-deformable membrane configurations can be incorporated (i.e., substituted) into the basic first embodiment device 610 as described above. For example, the invention can be practiced using a planar (i.e., non-pre-formed) pressure-deformable reflective membrane to yield a device capable of providing a variable focal length as a function of the differential pressure imposed across the reflective membrane 14. Furthermore, the use of pre-formed, non-parabolic reflective membranes (e.g., reflective membranes having surfaces which are spherical, oblate or prolate spheroidal, cone shaped, undulating, dimpled, faceted, or which comprise a series of conic sections, and the like) is contemplated to limit the maximum degree of concentration to further enhance safety and/or to provide more uniform heating. The invention can also employ a redundant reflective membrane such as described in our previous cross-referenced applications (e.g., the transparent membrane 17 can be replaced with a reflective membrane to provide a second reflector having optionally similar or significantly different optical properties, such as focal length). It should be noted that the invention is not intended to be limited to the specific materials and/or configurations as specified above for the central pressure-deformable membranes. Similar to the toroid, depending on the configuration, the central membranes can also be made from any suitably flexible material, for example, other substantially polymeric materials, including monolithic, layered, and/or fiber-reinforced composite materials. Additionally, the reflective surface can be provided by a plastic reflective membrane, which alternatively has reflective particles homogeneously incorporated, or which contains an integral conductive wire or mesh, all of which tend to selectively reflect or filter the impinging radiation. Also, the device may optionally incorporate membranes having other arbitrary but useful optical properties such as selective transparency, translucency, opacity, color, texture, patterns, and/or polarization for practical and/or artistic applications.

The planform or peripheral contour of the central membranes 14, 17 optionally may have a non-circular shape, such as a shape that matches the planform of an alternate support ring 12 having a non-circular planform. Non-limiting examples of such non-circular shapes include: regular polygons (e.g., square, pentagon, hexagon, and octagon), irregular polygons (e.g., trapezoid, rectangle, and diamond shaped), or curvilinear shapes (e.g., ellipse or oval).

Regarding valves, note that the pre-formed pressure-deployable central membranes 14, 17 are shown as having a funnel-shaped region surrounding the centered inflation valves 18 to facilitate fluid collection. Membranous valves may also be employed, including those having self-sealing means such as used in toy balloons, or Ziploc® type tongue-and-groove sealing means.

To fully deploy the basic first embodiment device 610 in sub-ambient mode as shown in FIGS. 2A and 2B, the device, which is typically compactly folded for portage and storage, is first unfolded to gain access to the inflation valves 18. Subsequently, the toroidal ring support element 12 is inflated to a super-ambient pressure to rigidize the ring support element 12 as is necessary to properly support and tension the central membranes 14, 17. The reflector chamber 20 is then inflated to a sub-ambient pressure (as is required for most applications) to deform and smooth the reflective membrane 14 into a concave, substantially parabolic reflector. Finally, the focal axis (not shown) of the parabolic reflective membrane 14 is appropriately oriented toward the energy source (not shown) and/or target (not shown), as required for a particular application or mode of operation. As previously noted, the first main embodiment device 610 can also be deployed in super-ambient mode as shown later in this document.

Figure 2C:
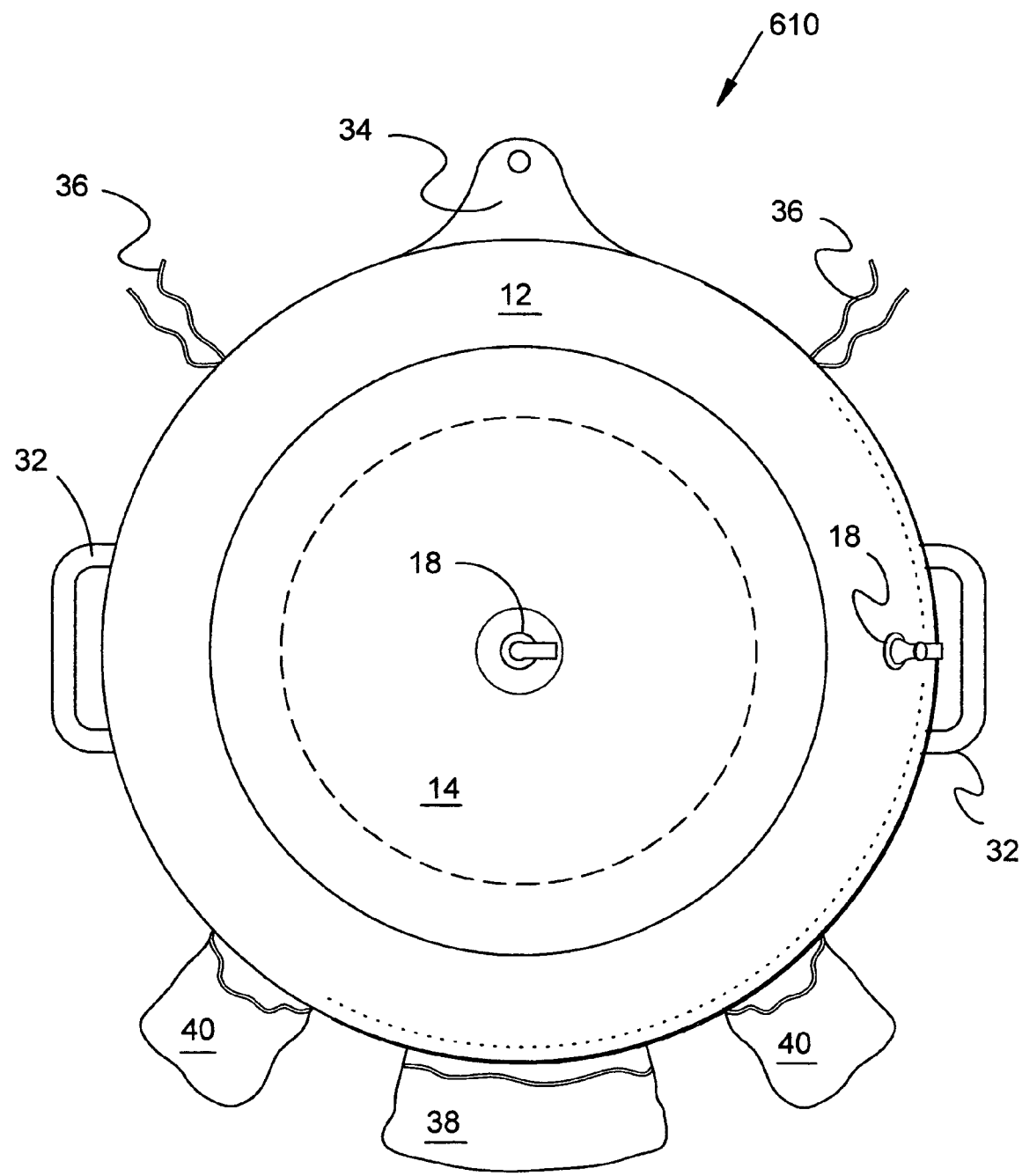
FIGS. 2C-D are, respectively, a schematic top plan view and a schematic side elevational view of the basic inflatable reflector apparatus showing various optional attachment means for attaching other modules, for connecting other accessory elements, and/or for securing the apparatus as exemplary of the various attachment means which also may be included in the other modules and/or accessory elements.

FIG. 2C depicts a currently preferred first embodiment configuration of the basic inflatable multi-function reflector apparatus 610 further including various optional accessory attachment means for attaching other modules, for connecting other accessory elements, and/or for securing and stabilizing the apparatus 610. A pair of handles 32 is positioned diametrically on the sides of the toroid 12. An apertured tab 34 is provided on a side equidistantly between the handles 32 for hanging up when in storage or the like. A pair of tying or hanging straps 36 is attached on either side of the apertured tab 34. A storage pouch 38 is provided for storing the deflated and folded apparatus 610. A pair of bottom pouches 40 is provided for filling with dense material to stabilize an upright apparatus 610. It should be noted that these appendages can be incorporated into the device (apparatus) in any useful quantity, location, and combination thereof. It should also be noted that each of these appendages is highly amenable to fabrication from thin membrane materials to minimize size and weight to facilitate portage and storage, and that each can be fabricated fully or in part from extensions of the central membranes 14, 17 and/or the membranes comprising the toroidal support element 12 to facilitate manufacturing.

Figure 2D:
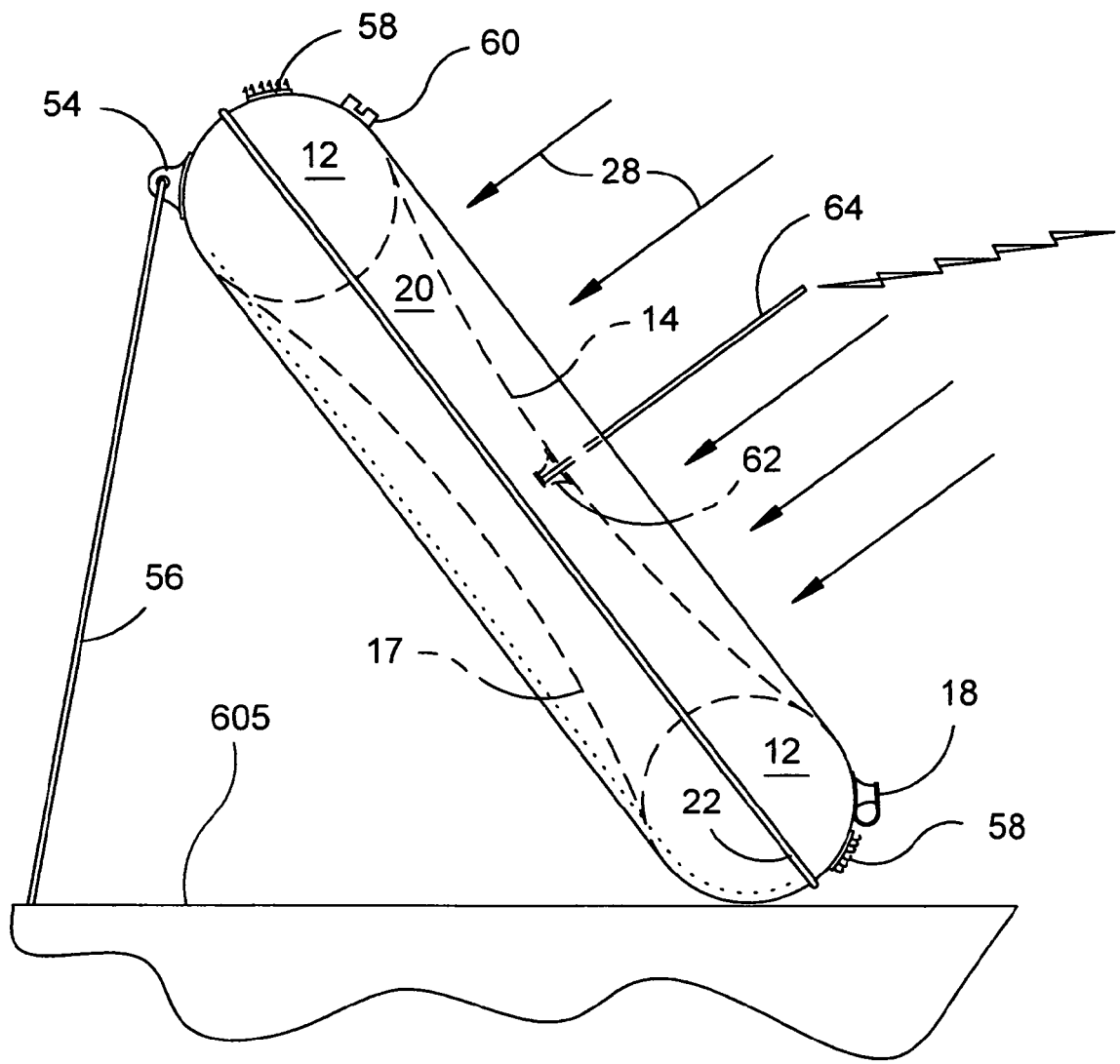

FIG. 2D also depicts other various optional attachment devices which are generally rigid or semi-rigid, but which are preferably collapsible to facilitate portage and storage. Examples include a clevis, shackle, clip, or bracket 54 for attaching various accessory elements including, for example, a support rod 56 (shown supporting and orienting the apparatus in relation to the surface 605 upon which the apparatus is resting) or a line. Hook-and-loop fastening patches 58 and a mounting stud 60 are also provided for attaching various accessory elements. A centered socket 62 is shown in the upper frontal reflective membrane 14 for supporting other accessory elements including, for example, an antenna 64.

It should be noted that any of these attachment devices can be incorporated into the basic reflector apparatus 610 (or any other module, sub-module, and/or accessory elements of the present invention, including any alternate embodiments or configurations thereof) in any useful quantity, location, and combination thereof. Further, one or more of these attachment means may be combined or otherwise integrated with other various features of the present invention to facilitate manufacture or for other purposes. For example, an inflation valve 18 may be combined with a mounting bracket 54, hook-and-loop fastening patches 58, a socket 62, and/or the like.

FIGS. 3A-F: Operation of the Basic Inflatable Reflector Apparatus

First Embodiment

Figure 3A:
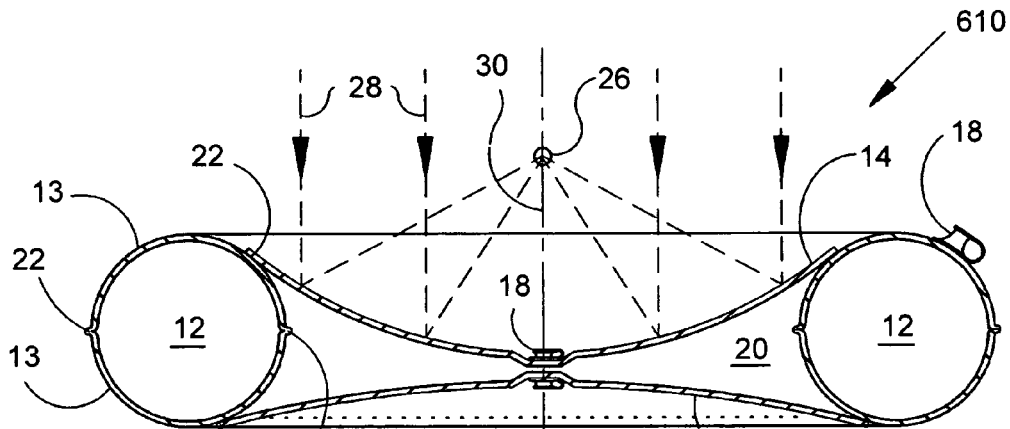
FIGS. 3A-B are schematic cross-sectional views of the basic first embodiment reflector apparatus being used to concentrate and project, respectively, radiant electromagnetic energy with its reflector chamber deployed in sub-ambient mode.

FIG. 3A depicts the first main embodiment device 610 deployed in sub-ambient mode as an electromagnetic radiant ray concentrator having the focal axis 30 of the pre-formed parabolic reflective membrane 14 oriented toward the sun (not shown). The radiant solar rays 28 are reflected by the pre-formed parabolic reflective membrane 14 to focus on an energy-absorbing object (not shown) placed at the focal point 26.

Regarding the instant device's ability to capture and concentrate electromagnetic radiation, it should first be noted that a device deployed in sub-ambient mode allows the electromagnetic rays to travel unobstructed to and from the reflector, thus providing superior capture efficiency relative to much of the related art as well as the second main embodiment of the instant invention (capture efficiency is defined herein as the portion of the incoming radiant energy that is delivered to the focal point and local surrounding area). As an example, when operated in sub-ambient mode as a terrestrially-based solar concentrator as shown in FIG. 3A, the first main embodiment device has an effective capture efficiency exceeding 90%, which is limited only by the reflective efficiency of the membrane and the transmission and dispersion characteristics of the surrounding atmosphere. Second, although a reflective parabolic surface is the ideal geometry for reflecting all incoming parallel radiant rays to the focal point and, thus, producing extremely high theoretical concentrations of energy, the ability of the instant device to concentrate energy is limited by several factors including, but not limited to, the geometric precision of the reflective membrane 14 and, hence, its supporting toroidal ring support element 12, the capture efficiency of the device as noted above, the apparent finite angular diameter of the source (e.g., the sun), and the wavelength of the radiation relative to the diameter of the reflector. Despite these and other limiting factors, a precisely constructed first embodiment device used as a terrestrially-based solar concentrator has the ability to concentrate sunlight by factors in excess of 10,000.

Regarding safety, as one consequence of having a pre-formed reflective membrane 14, the device has a fixed focal length, i.e., the focal point is located at a substantially fixed distance from the reflective membrane along the focal axis 30 of reflector 14. This fixed focal length greatly enhances safety by allowing the user to maintain greater control of the location of any potentially dangerous high concentrations of electromagnetic radiation at the focal point. A second consequence of employing thermally or otherwise pre-formed reflective membranes is that pre-forming allows the reflectors to achieve significantly shorter focal lengths than is practical using non-pre-formed, planar membranes due to the limited ability of planar membranes to elastically deform. The very short focal lengths achieved by such deeply pre-formed reflective membranes further enhance safety by providing the user with even greater control over the location of the concentrated electromagnetic radiation.

Figure 3B:
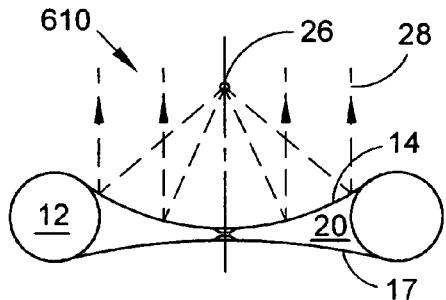

FIG. 3B depicts a first main embodiment device 610 deployed in sub-ambient mode as a radiant ray projector with the same reflector structure 20 as shown in FIG. 3A, but projecting a collimated beam of the electromagnetic rays 28 from a non-collimated light source (not shown) such as a light bulb, lamp, or candle placed at the focal point 26 to a distant object (not shown). It should be noted that the selection of the concentrating or projecting mode depends on the position of the light or other electromagnetic source relative to the focal point of the device.

It should be further noted that the focal axis of the pre-formed parabolic reflective membrane 14, as depicted in FIGS. 3A and 3B, is coincident with the axis-of-revolution of the toroidal support element 12, thereby causing the focal point of the device to be aligned with the axis-of-revolution of the toroid and, thus, to be located directly above the center of the reflective membrane. However, the reflective membrane 14 may be pre-formed and/or attached to the toroidal support element 12 in such a manner that the focal point 26 of the device 610 is located off the axis-of-revolution of the support ring 12. Note that such "off-axis" reflectors can facilitate orientating the device relative to the energy source and/or target for certain applications.

Figure 3C:
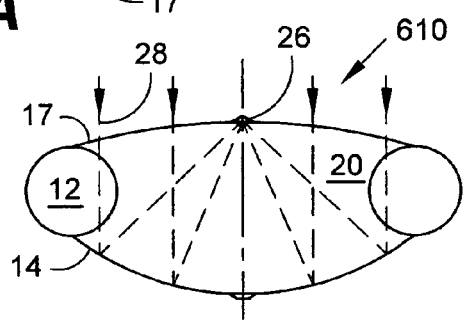
FIGS. 3C-F are schematic cross-sectional views of the basic first embodiment reflector apparatus being used to manipulate radiant electromagnetic energy with its reflector chamber deployed in super-ambient mode.

FIG. 3C depicts the basic first embodiment reflector apparatus 610 being used to concentrate radiant electromagnetic energy 28 with its reflector chamber 20 alternatively deployed in super-ambient mode (i.e., the reflector chamber 20 is inflated to a super-ambient pressure to outwardly deploy the reflective membrane 14). Note that central membranes 14, 17 are pre-formed such that the focal point 26 is located substantially at the surface of the transparent membrane 17 of the super-ambient pressurized reflector chamber 20, thereby allowing the transparent membrane 17 to directly support a suitable electromagnetic accessory device (not shown) in proximity to the focal point 26.

Figure 3D:
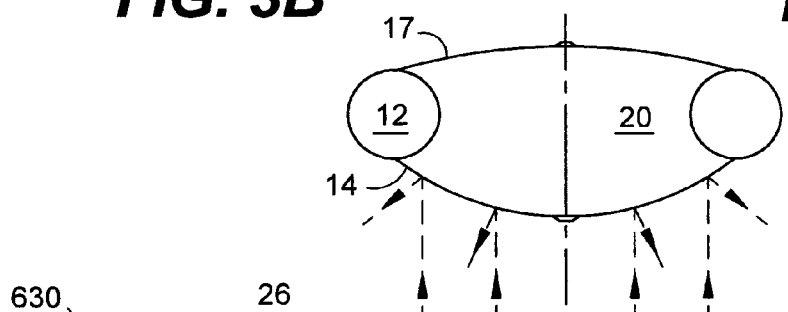

FIG. 3D depicts a first main embodiment device 610 deployed in super-ambient mode as a radiant ray diffuser with the same reflector structure 20 as shown in FIG. 3C, but used alternatively as a convex mirror, such as for expanding the user's field of view for surveillance or safety. More specifically, the apparatus can serve as an economical field-deployable convex mirror, which can be used, for example, to allow a vehicle operator to see around a blind corner.

Figure 3E:
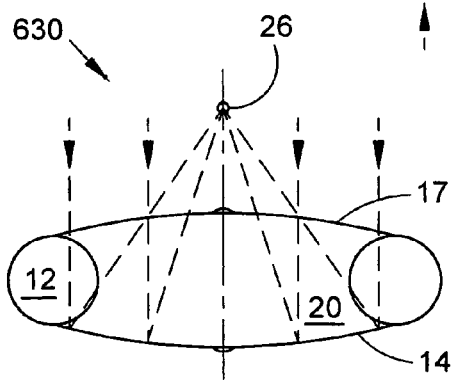

FIG. 3E depicts a modified basic first embodiment reflector apparatus 630 being used to concentrate radiant electromagnetic energy with its reflector chamber 20 deployed in super-ambient mode, wherein the central membranes 14, 17 are pre-formed such that the focal point 26 is located outside the super-ambient pressurized reflector chamber 20.

Figure 3F:
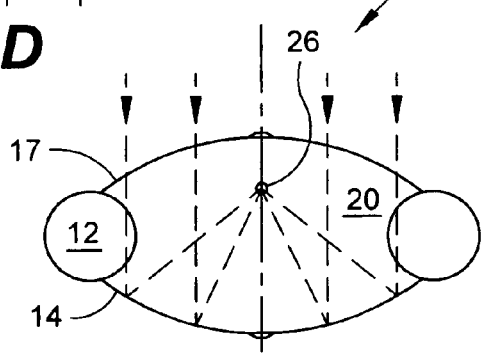

FIG. 3F depicts a modified basic first embodiment reflector apparatus 632 being used to concentrate radiant electromagnetic energy with its reflector chamber 20 deployed in super-ambient mode, wherein the central membranes 14, 17 are pre-formed such that the focal point 26 is located within the super-ambient pressurized reflector chamber 20.

FIGS. 4A-I: Description and Operation of the Basic Inflatable Reflector Apparatus Second Embodiment In FIGS. 4A and 4B, the second main embodiment device 386 is illustrated as an inflated toroid or ring support element 400 supporting an upper transparent membrane 388 and a lower reflective membrane 390. The transparent membrane 388 and reflective membrane 390 provide a central reflector chamber (i.e., pressure envelope) 392 with a double parabolic convex-convex lens configuration when inflated to a super-ambient pressure. The transparent membrane 388 has a centered inflation valve 18 for inflating the reflector chamber 392; however, it is noted that the inflation valve 18 may alternatively be located at any other useful location such as in the reflective membrane 390. The inflatable toroidal support element 400 also has a valve 18 for inflation to form a rigid ring. Two valves are shown for separate inflation of the ring support 400 and the reflector chamber 392; however, it is noted that the two pressure envelopes (the toroid 400 and the reflector chamber 392) can be interconnected, thereby allowing both super-ambient pressure envelopes 392, 400 to be inflated with a single valve 18.

The toroidal support element 400 is fabricated from two thin sheets 401 of material, each of which is fully pre-formed into the shape of a half toroid and attached (e.g., adhesively or thermally bonded) to each other along continuous seams 22 at their inner and outer periphery, as one example of forming the toroid. The two sheets 401 comprising the toroid 400 are made of a flexible, high-strength material capable of being thermally or otherwise pre-formed, such as vinyl, nylon, and the like.

The transparent membrane 388 is made from a thin circular sheet of transparent, high-strength, flexible material such as Mylar® or nylon. The reflective membrane 390 is also made from a thin circular sheet of high-strength, flexible material such as Mylar® or Nylon; however, a reflective surface 24 is provided by coating the inner side (preferred, but not necessary if the uncoated membrane material is otherwise transparent) of the membrane 390 with vapor deposited aluminum and the like reflective material. The reflective membrane 390 is pre-formed during fabrication substantially into the shape of a paraboloid to provide a substantially fixed, short focal length for safety purposes, and to reduce the differential pressure required to fully deform and smooth the reflective membranes 390 to facilitate deployment. The transparent membrane 388 is optionally also pre-formed, primarily to reduce loads imparted on the support ring; however, the transparent membrane 388 also can be pre-formed for other purposes, such as to facilitate supporting an accessory element in close proximity to the focal point as will be shown below. However, the transparent membrane need not be pre-formed (or it can be pre-formed to a different extent than the reflective membrane), thus yielding an asymmetrical reflector chamber. Seams 22 are shown for attaching (e.g., adhesively or thermally bonding) the outer periphery of the reflective and transparent membranes 388, 390 to the inner edge of the toroid 400. This basic, four-sheet, fully pre-formed construction represents a first species 398 of the second main embodiment device 386.

Similar to the first embodiment, it should be noted that several alternate toroid, central membrane, and valve configurations can be incorporated (i.e., substituted) into the basic second embodiment device as described above. In addition to having alternate planforms, the simple two-sheet toroidal support element 400 as described above may be replaced with alternate support rings offering greater performance and/or stability, but generally at the expense of somewhat greater complexity. However, such alternate support ring configurations for the second embodiment are limited to those particular configurations wherein the portion of the support ring to which the reflector chamber is attached (e.g., bonded) does not move appreciably in the radial direction upon inflation. Otherwise, either the reflector chamber will generally restrict proper inflation of the toroid resulting in a buckled ring structure, or the inflated ring will not properly tension the perimeter of the reflective membrane. Numerous alternate membrane configurations can be incorporated (i.e., substituted) into the basic second embodiment device as described above including membranes having any of the alternate shapes, functional characteristics, optical properties, constructions, and materials as noted for the first embodiment. The many optional valves or other inflation means available for the first embodiment are also available for the second embodiment. Note that our previous (referenced) applications describe several useful alternate configurations for the toroid, membranes, valves, and other elements, all of which are generally applicable to the present invention.

FIG. 4C depicts the second main embodiment 386 in an electromagnetic radiant ray concentrating mode having the transparent membrane 388 facing the sun (not shown). The radiant solar rays 28 are illustrated as passing through the transparent membrane 388 to the reflective membrane 390, which then reflects the rays back through the transparent membrane 388 to focus on an energy-absorbing object (not shown) placed at the focal point 26 of the device 386. Although the figure shows the focal point 26 to be outside of the reflector chamber 392, it should be noted that the reflective and transparent membranes 390, 388 can each be pre-formed or otherwise deformed to any predetermined shape or extent (e.g., deeply pre-formed, moderately pre-formed, non-pre-formed, etc.) such that the focal point 26 alternatively is located inside the reflective chamber 392 of an apparatus 638, such as shown in FIG. 4D, or at the surface of the transparent membrane 388 of an apparatus 640, such as shown in FIG. 4E. However, the reader is cautioned that the latter case should be restricted to low-power (e.g., radio frequency) applications to prevent the possibility of thermally or otherwise damaging the transparent membrane 388 and/or any integral or removable elements attached to the surface of the transparent membrane 388 at or near the focal point 26. Additionally, by pre-forming the reflective membrane 390 and transparent membrane 388 to different extents, an asymmetrical reflector chamber is provided. For example, FIG. 4F shows a modified apparatus 642 having a deeply pre-formed reflective membrane 390 and a slightly pre-formed transparent membrane 388 to yield an asymmetrical reflector chamber 392 having a very short focal length. In contrast, FIG. 4G shows a modified apparatus 644 having a slightly pre-formed reflective membrane 390 and a deeply pre-formed transparent membrane 388 to yield an asymmetrical reflector chamber 392 having a relatively long focal length.

FIG. 4H depicts the basic second embodiment reflector apparatus 646, wherein the attachment means 647 for attaching the central reflector chamber 392 is offset or displaced from the inner periphery of the toroidal support ring 400 to accommodate a larger reflective membrane 390.

FIG. 4I depicts a modified basic second embodiment reflector apparatus 648, wherein the attachment means 22 for the central membranes 388, 390 of the reflector chamber 392 are offset or displaced in opposite directions from the inner periphery of the toroidal support ring 400 to accommodate a still larger reflective membrane 390. Note that this configuration is similar to that of the first embodiment apparatus 610, except that the transparent membrane is highly pre-formed to an extent that the apparatus of FIG. 4I cannot operate in sub-ambient mode (i.e., the central membranes would experience significant interference).

Figure 4A:
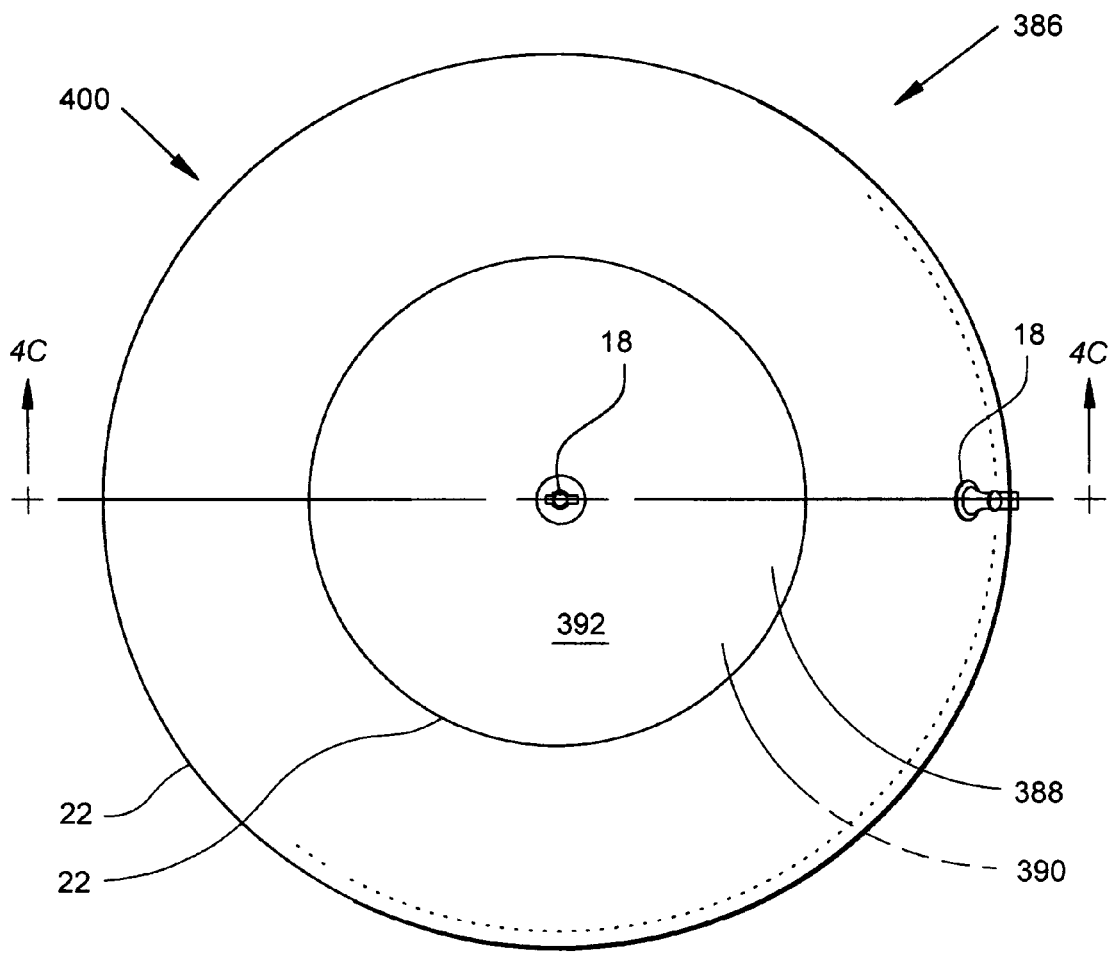
FIGS. 4A-B are, respectively, a schematic top plan view and a schematic side-elevational view of the basic inflatable reflector apparatus in a second embodiment configuration.
Figure 4B:
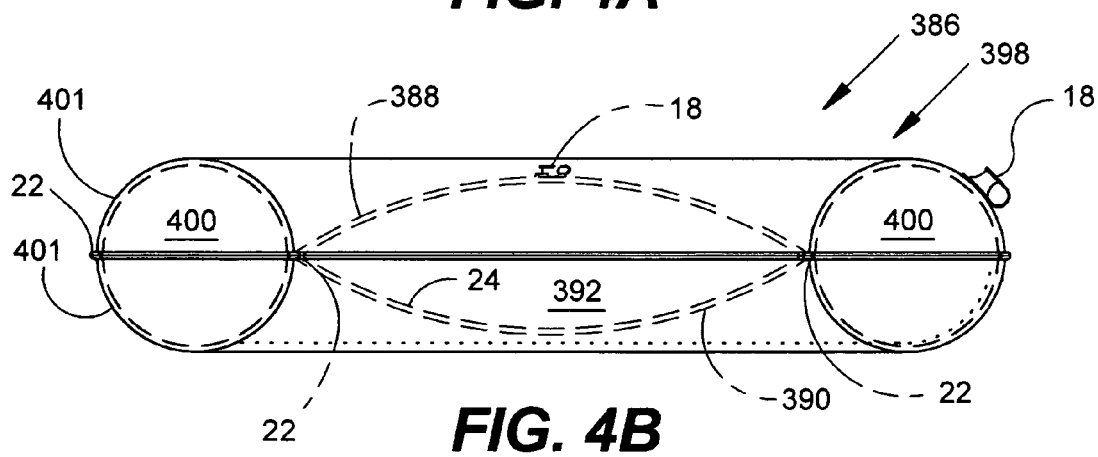
Figure 4J:
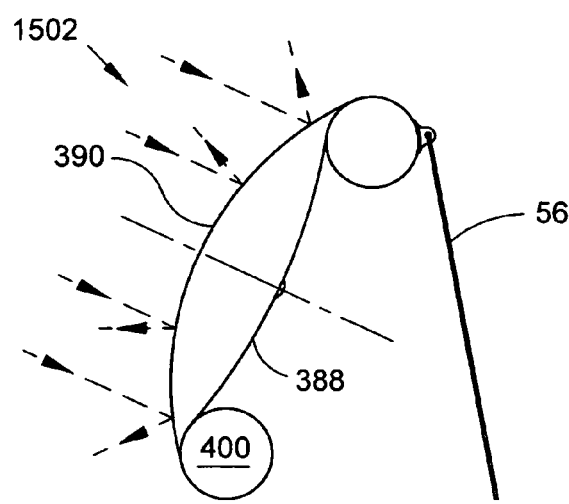

Note that any of the second embodiment devices depicted in FIGS. 4A-I can also serve as a convex reflector, such as for providing an expanded field of view as previously depicted in FIG. 3D, and as shown in FIG. 4J as apparatus 1502, by disposing a reflective material in or on a convex membrane to render the membrane externally reflective to light.

FIGS. 4K-O: Description and Operation of a Simplified Inflatable Reflector Apparatus Third Embodiment FIGS. 4K-O illustrate the construction and use of simplified alternate inflatable reflector apparatuses (third main embodiment) having only one membrane shown attached to an inflatable (or, optionally, otherwise collapsible or rigid) support element.

Figure 4K:
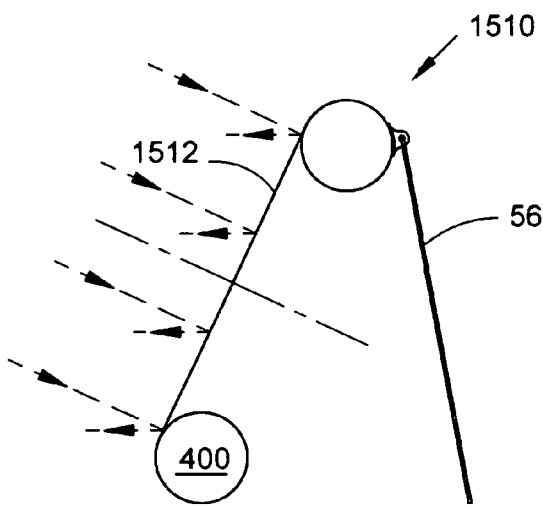
FIGS. 4K-O are schematic diametrical cross-sectional views illustrating the construction and use of various simplified alternate inflatable reflector apparatuses and/or resource harnessing apparatuses having only one membrane shown attached to an inflatable (or, optionally, otherwise collapsible or rigid) support element.

FIG. 4K depicts an alternate simple planar reflector or mirror apparatus 1510 provided by attaching as few as one planar (i.e., non-preformed) reflective membrane 1512 to the support ring 400. Although such an apparatus having only a single membrane is generally not operable as a single apparatus to concentrate electromagnetic energy, the apparatus 1510 can effectively serve as a highly portable self-imaging mirror, a photographic light reflector and/or diffuser, and/or a radiant electromagnetic energy heat shield (such as to shield a person, object, or other item from radiant energy emitted from a fireplace, campfire, of other radiant heat source). However, an array or plurality of such apparatuses may be used to concentrate radiant electromagnetic energy by positioning the apparatuses such as to superpose the energy reflected by each mirror apparatus. It should be noted that this simplified apparatus is also multifunctional, being that it optionally also may be deployed to serve as a light-attenuating cover similar in function to the aforementioned cover 620, or to perform many of the other electromagnetic and/or non-electromagnetic functions described herein. Note that an apparatus similar in appearance to that shown in FIG. 4K alternatively may be configured to have a flexible photovoltaic membrane (or other energy-absorbing or energy-harnessing membrane) supported by the support ring, whereby the apparatus may be compactly rolled for portage and storage. Alternatively, such an apparatus can have, a flexible central membrane which supports an array of flexible or rigid photovoltaic elements or cells, whereby the apparatus can be compactly folded for portage and storage.

Figure 4L:
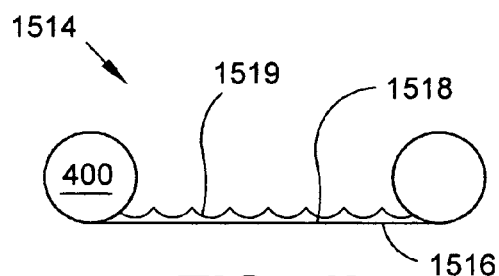

FIG. 4L depicts an apparatus 1514 with membrane 1516 having a blackened surface 1518 for evaporating salt water 1519 for producing sea salt. Note that by further providing a preferably transparent membrane above the evaporating sea water, the device can also be used to provide potable water by collecting the water that condenses on the transparent membrane, similar to that shown herein below in FIG. 22B.

Figure 4M:
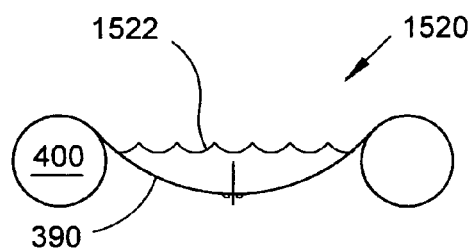
Figure 4N:
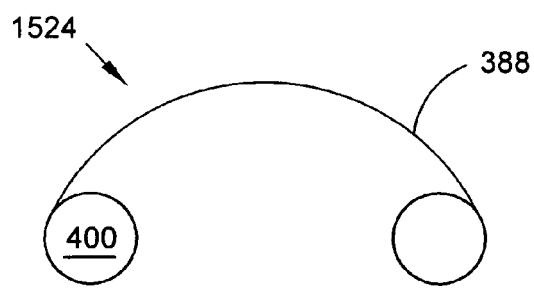
Figure 4O:
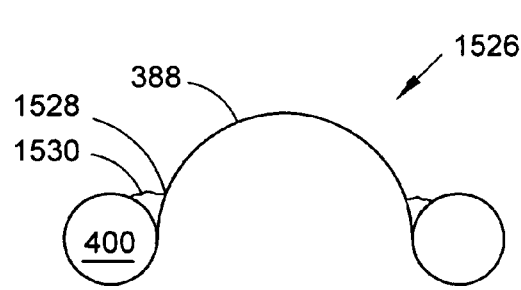

FIG. 4M depicts another useful alternate single-membrane configuration 1520 provided by attaching a single pre-formed, optionally reflective membrane 390 to a support ring 400, wherein the pre-formed concave contour of the membrane 390 can facilitate the collecting, storage, processing and/or dispensing of water or other materials 1522. This general configuration optionally may be used to provide a more voluminous shelter 1524 as illustrated in FIG. 4N, or to provide, as shown in FIG. 4O, a cover apparatus 1526 effectively having a weight-fillable region or trough 1528 at the periphery of the pre-formed membrane 388, wherein the weight-fillable region or though 1528 may optionally be filled with dense material 1530 to secure the cover apparatus 1526 to the surface on which it is positioned.

Note that each of the basic apparatuses depicted above in FIGS. 2A-40 (or any alternate configurations thereof) optionally may have one or more alternate or supplemental membranes (or a support element) having one or more optical characteristics (or predetermined degrees thereof), non-limiting examples of which include reflectivity, selective reflectivity, transparency, selective transparency, emissivity, selective emissivity, absorptivity, selective absorptivity, diffusivity, selective diffusivity, color, polarity, fluorescence, images, textures, patterns, indicia, and/or the like.

Further, each of the basic apparatuses depicted above in FIGS. 2A-40 (or any alternate configurations thereof) may have one or more membranes (or other resource harnessing devices described herein), which are integrally or permanently attached. Alternatively, these apparatuses (or any alternate configurations thereof) may have one or more membranes (or other resource harnessing devices described herein), which are removably or separably attached, such as to enhance functional versatility, maintainability, and/or other performance metrics. Several non-limiting examples of removably or separably attached membranes (and/or other resource harnessing devices) are shown herein below.

Figure 5A:
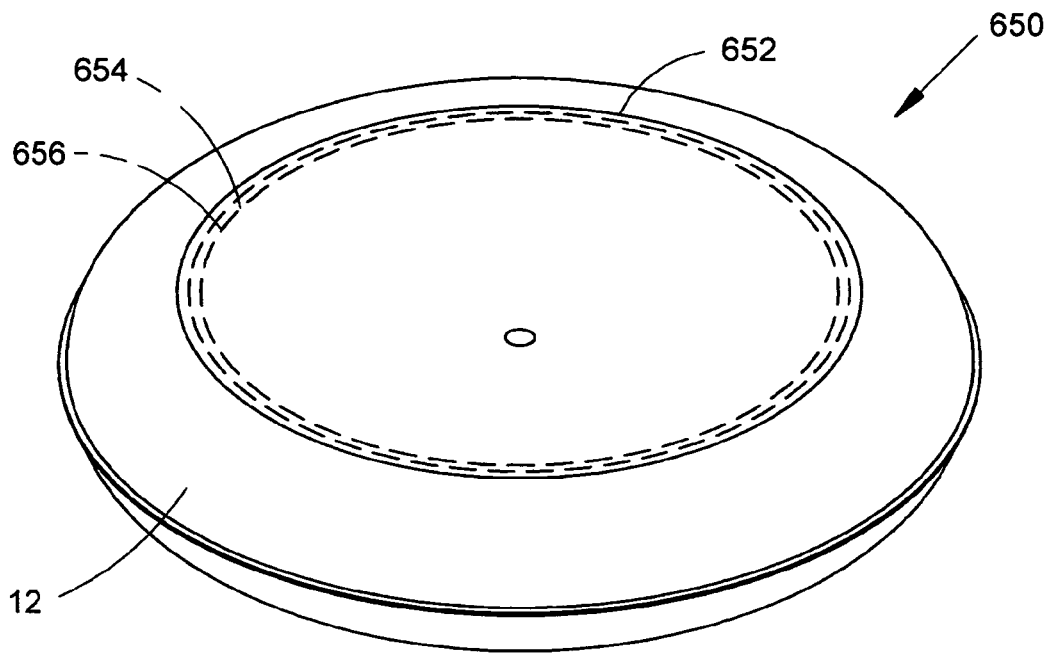
FIGS. 5A-C are, respectively, a schematic perspective view, a schematic diametrical cross-sectional view, and a partial schematic cross-sectional view of a modified basic first embodiment reflector apparatus having a removably attached central pressure-deformable membrane.
Figure 5B:
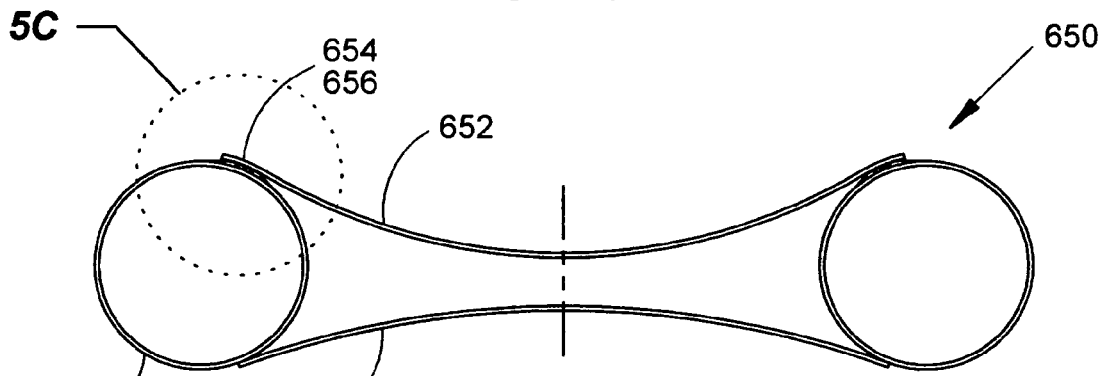
Figure 5C:
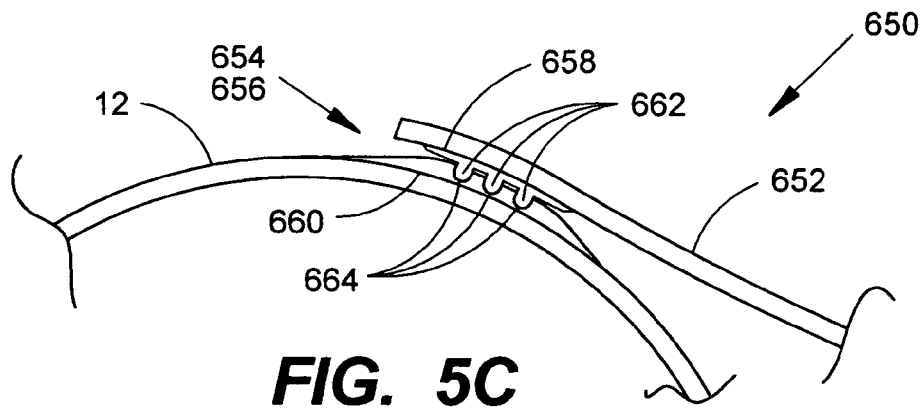

FIGS. 5A-C: Removable Central Membranes

FIGS. 5A-C depict a modified first embodiment basic reflector apparatus 650 having a removable upper central membrane 652, which is removably attached via a quick attachment and sealing means 654, such as a tongue-and-groove fastening mechanism 656, to the support element 12. FIG. 5C shows the removable membrane 652 having an affixed integrated multi-tongue element 658 inserted into a multi-groove element 660 affixed to the support element 12. The use of multiple tongues 662 and grooves 664 provides structural and sealing redundancy; however, a single tongue-and-grove can be used to promote economy. The lower central membrane optionally may also be removably attached by such means. Note that such devices or means for removably attaching the central membranes allows the user to remove or replace the membranes to enable the apparatus to perform other functions, or to replace a membrane in the event of damage. To facilitate replacement, the removable central membranes and the support element can optionally further include complementary visual and/or mechanical alignment features (not shown) such as indicia, positioning tabs, studs, alignment holes, snaps, and the like. Other non-limiting examples of optional attachment devices for removably attaching a central membrane to its support ring include: clamps, hooks, apertures, snaps, straps, ties, zippers, hook-and-loop patches, and non-permanent mechanical fasteners (e.g., bolts and nuts, screws, and the like).

Note that a removable central membrane optionally may be reversible, e.g., a membrane may have one or more attachments whereby the membrane may be attached to the apparatus having either side facing outward. Further, the two sides of such a reversible membrane optionally may have differing optical (or other) characteristics, non-limiting examples of which include: reflectivity, emissivity, absorptivity, transparency, color, fluorescence, images, textures, patterns, symbols, and/or the like.

FIGS. 6A-D: Removable Reflector Chamber

Figure 6A:
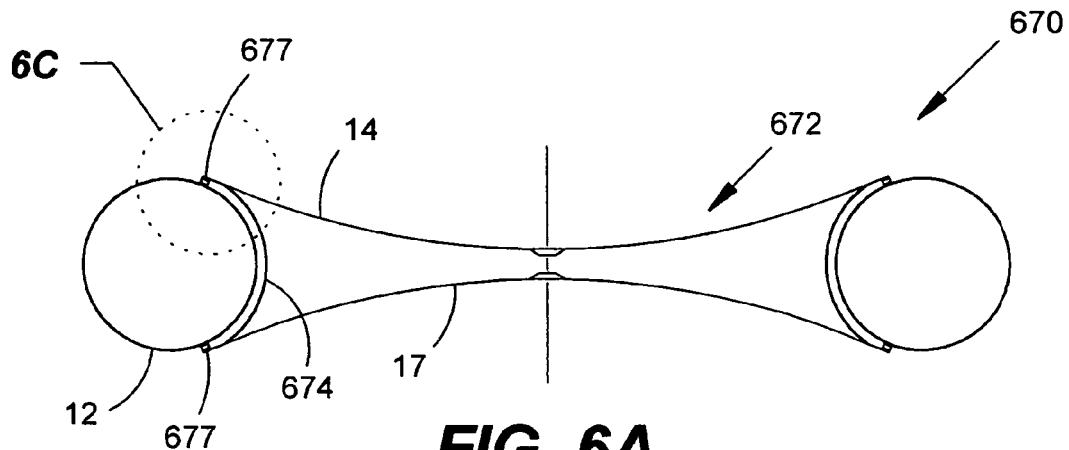
FIGS. 6A-B are, respectively, schematic diametrical cross-sectional views of alternate first and second embodiment reflector apparatuses having a removably attached reflector chamber.

FIG. 6A depicts an alternate basic first embodiment reflector apparatus 670 having a removably attached sub-ambient/super-ambient pressurizable reflector chamber 672, which is attached to the support ring 12 using a clip type attachment means 677. An additional membrane 674 is incorporated into the removable reflector chamber 672 to provide a sealable chamber. Other non-limiting examples of optional attachment devices for removably attaching a central chamber to its support ring include clamps, hooks, apertures, snaps, straps, ties, zippers, hook-and-loop patches, and non-permanent mechanical fasteners such as bolts and nuts, screws, and the like. Alternatively, a removably indirectly attached or integrally indirectly attached, reflector chamber may optionally be attached to its support ring by at least one peripheral membranous ring or collar having an annular, conical, cylindrical or other ring shape.

Figure 6B:
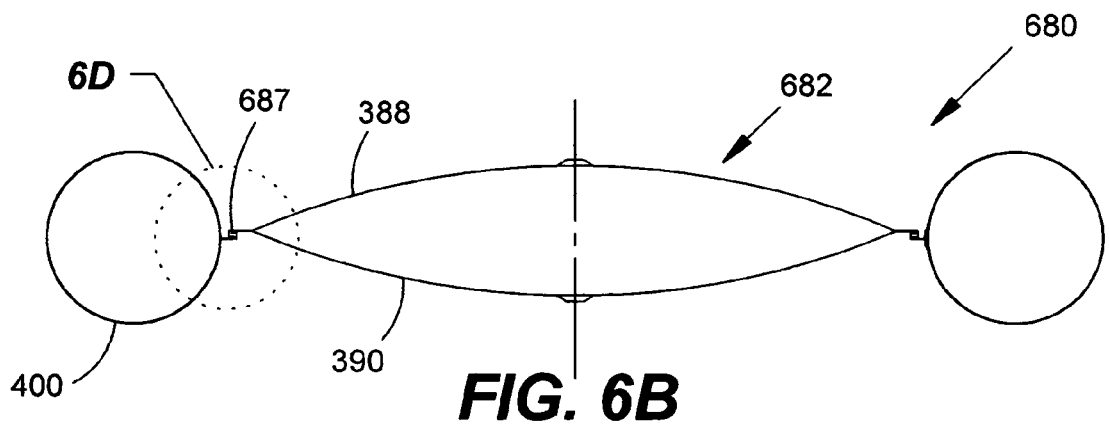

FIG. 6B depicts an alternate basic second embodiment reflector apparatus 680 having a removably attached super-ambient-pressurizable reflector chamber 682, which is attached to the support ring 400 using a clip type attachment means 687.

Figure 6C:
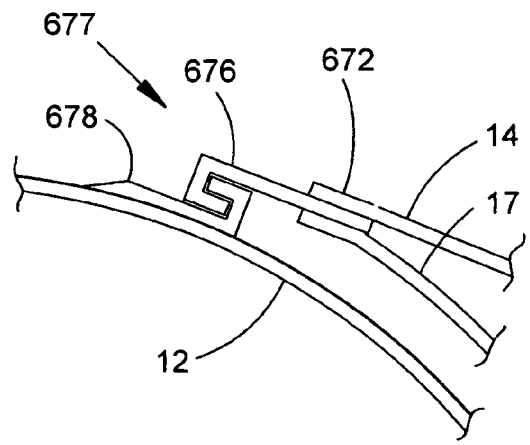
FIGS. 6C-D are partial schematic diametrical cross-sectional views of a typical attachment means for securing a removably attachable reflector chamber to the support ring.
Figure 6D:
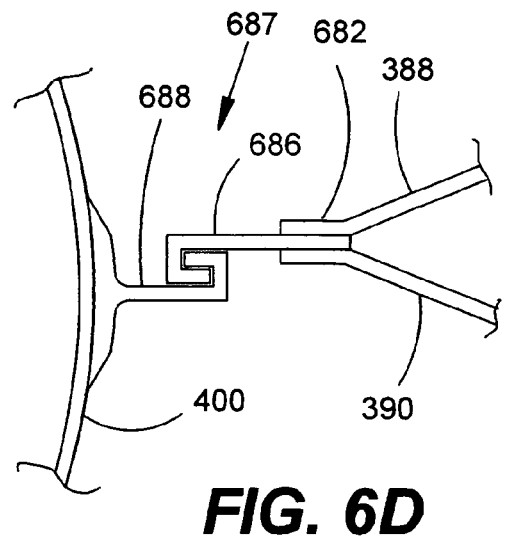

FIG. 6C depicts a typical hook or clip-type attachment means 677 (comprising clips 676 and 678) for quickly securing a removably attachable reflector chamber of the first embodiment type 672 to the toroidal support ring 12. FIG. 6D depicts a similar hook or clip-type attachment means 687 (comprising clips 686 and 688) for securing a removably attachable reflector chamber of the second embodiment type 682 to the toroidal support ring 400. It is noted that other common means can be employed to attach such removable reflector chambers including, for example, one or more attachment means similar to those previously shown in FIG. 2C (e.g., hook-and-loop patches, a plurality of discrete mounting studs with corresponding apertures, and the like), or any of the separable attachments as noted above for attaching a removable central membrane.

Note that one or more central membranes (or reflector chambers) may be directly attached to the support element, such as previously depicted in FIG. 2B. However, one or more central membranes (or reflector chambers) alternatively may be indirectly attached to the support element by one or more intervening elements (e.g., another central membrane, a peripheral annular or conical membrane, one or more peripheral attachment devices, or other structures) such as shown above in FIGS. 5A-6D. In the case of indirect attachment, note that the central membranes extend across the generally vacant center or central region of the support element, but typically only to an extent necessary to attach to one or more intervening elements. Further note that such direct and indirect attachments optionally may be either permanent or separable.

FIGS. 7A-17B: Alternate Detuned Reflective Membranes

FIG. 7A depicts an alternate basic first embodiment reflector apparatus 700 having a detuned (i.e., non-parabolic) reflective membrane 701, (first species, first sub-species) wherein the reflective membrane 701 is pre-formed to have a spherical surface contour. Note that the rays 28 do not converge at a single point, thereby limiting the degree of concentration to enhance safety. To better illustrate the differences between the contour of the detuned non-parabolic membrane and a typical parabolic membrane, a parabolic contour is shown dashed in the cross-sectional view of FIG. 7A (and in several of the subsequent cross-sectional views depicting detuned membranes) for reference.

FIG. 7B depicts an alternate basic first embodiment reflector apparatus 704 having a detuned (i.e., non-parabolic) reflective membrane 705 (first species, second sub-species), wherein the reflective membrane 705 is pre-formed to have a surface contour comprising a surface-of-revolution of non-constant radius. FIG. 7B shows that the rays 28 do not converge at a single point.

FIGS. 8A and 8B depict an alternate basic first embodiment reflector apparatus 708 having a detuned reflective membrane 709 (first species, third sub-species), wherein the reflective membrane 709 is pre-formed into the shape of a radially undulating (or radially stepped) surface of revolution. Again, FIG. 8B shows that the rays 28 do not converge at a single point.

FIGS. 9A and 9B depict an alternate basic first embodiment reflector apparatus 710 having a detuned reflective membrane 711 (second species, first sub-species), wherein the reflective membrane 711 is pre-formed into a circumferentially undulating or scalloped shape having an even number (e.g., two) of circumferential peaks 712 and troughs 713. Similarly, FIGS. 9C and 9D depict an alternate basic first embodiment reflector apparatus 716 having a detuned reflective membrane 717 (second species, second sub-species), wherein the reflective membrane 717 is pre-formed into a circumferentially undulating or scalloped shape having an odd number (e.g., three) of circumferential peaks 712 and troughs 713. In FIGS. 9B and 9D, the electromagnetic rays shown dashed 28 represent rays in the plane of the cross-section, and the dotted lines represent rays 28 out of the plane of the cross-section. Note that the reflector of FIG. 9B tends to produce a vertically dispersed ray concentration pattern, whereas the reflector of FIG. 9D tends to produce a horizontally dispersed or annular ray concentration pattern. Note that any number of peaks 712 and troughs 713 may be incorporated into such circumferentially undulating or scalloped membranes. For reference, the dotted lines shown in FIGS. 9A and 9C represent inflection points or demarcation lines between the generally circumferentially convex peaks 712 and the generally circumferentially concave troughs 713.

FIGS. 10A-B depict an alternate basic first embodiment reflector apparatus 720 having a detuned reflective membrane 722 (third species, first sub-species), wherein the reflective membrane comprises a plurality (e.g., twelve) of pre-formed, wedge-shaped dimples 724 optionally supported by an underlying radial support grid 725 (e.g., a plurality of radial cords, wires, cables, or the like). FIG. 10B shows that the electromagnetic rays 28 reflected by each dimple 724 form a diffuse, substantially linear focal locus 728 prior to diffusely converging in proximity to the primary focal axis 30 of the reflector 722.

FIGS. 11A and 11B depict an alternate basic first embodiment reflector apparatus 730 having a detuned reflective membrane 732 (third species, second sub-species), wherein the reflective membrane 732 incorporates a plurality (e.g., eighteen) of large pre-formed substantially circular and/or elliptical dimples 734, which are generally arranged in a staggered pattern or array, such as a substantially hexagonal lattice, to maximize packing density, and further optionally includes a plurality (e.g., twelve) of smaller dimples (not shown) disposed around the larger dimples 734 to further minimize the non-dimpled area of the detuned reflective membrane. An optional underlying mesh 735 may be used to support and/or reinforce the dimpled reflective membrane; however, as will be shown below, a support grid or mesh is required for membranes having dimples which substantially comprise the entire surface of the membrane. Similar to FIG. 10B, FIG. 11B shows that the electromagnetic rays 28 reflected by each dimple 734 form a diffuse focal locus 738 prior to diffusely converging in proximity to the primary focal axis 30 of the reflector 732.

Figure 11C:
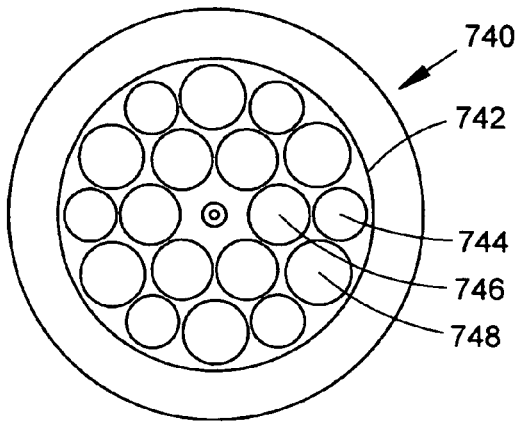
Figure 11D:
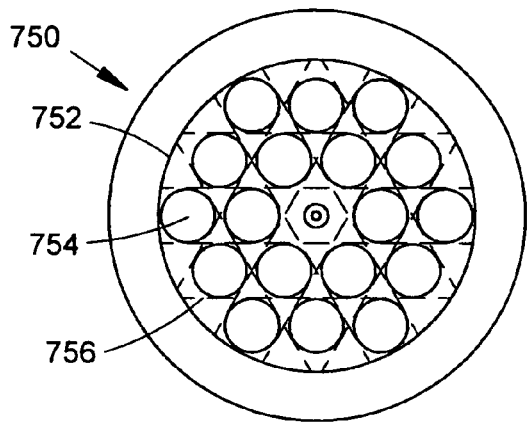
Figure 11E:
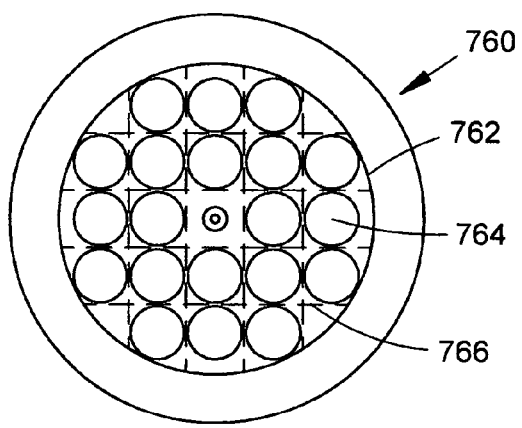
Figure 11F:
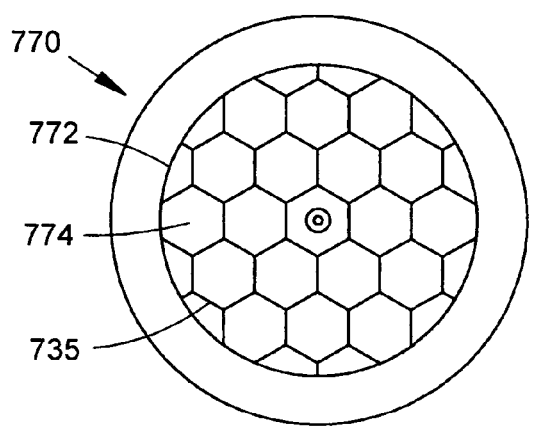
Figure 11G:
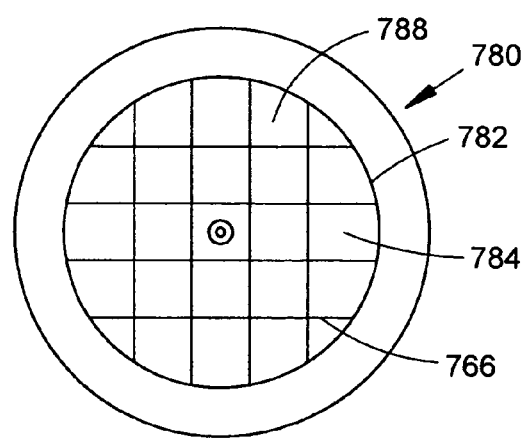
Figure 11H:
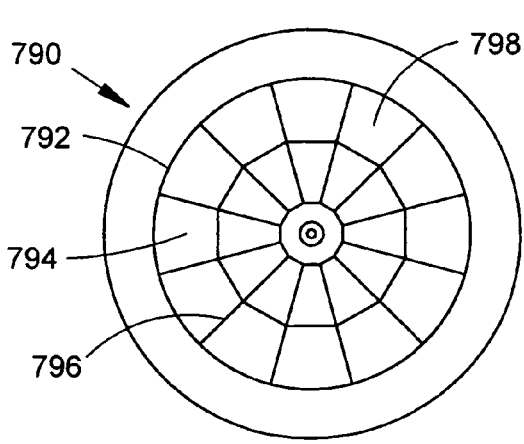

FIGS. 11C-11H depict various other dimpling patterns for dimpled detuned reflectors. Specifically, FIG. 11C depicts a device 740 having a detuned reflective membrane 742 (third species, third sub-species) incorporating a plurality (e.g., eighteen) of pre-formed substantially circular and/or elliptical dimples, which are generally arranged in a staggered concentric circular pattern or array, wherein a plurality of medium-sized dimples 746 (e.g., six) are surrounded by a plurality (e.g., twelve) of alternating smaller dimples 744 and larger dimples 748 to maximize packing density for a given number of substantially circular and/or elliptical dimples. FIG. 11D depicts a device 750 having a detuned reflective membrane 752 (third species, fourth sub-species) incorporating a generally staggered array of large and optionally small (not shown) pre-formed substantially circular dimples 754, which are arranged in such a manner so as to allow the reflective membrane to be reinforced in three directions by a plurality of linear cords, wires, cables, or the like 756 (shown dashed). FIG. 11E depicts a device 760 having a detuned reflective membrane 762 (third species, fifth sub-species) incorporating a simple, substantially rectangular array of large and optionally small (not shown) pre-formed circular dimples 764, which are arranged in such a manner so as to allow the reflective membrane to be reinforced in two directions by a plurality of linear cords, wires, cables, or the like 766 (shown dashed). FIG. 11F depicts a device 770 having a detuned reflective membrane 772 (third species, sixth sub-species) incorporating a generally hexagonal array of pre-formed dimples 774 supported by a hexagonal support grid 735, wherein each dimple substantially comprises the entire area of its associated cell within the hexagonal support grid 735. FIG. 11G depicts a device 780 having a detuned reflective membrane 782 (third species, seventh sub-species) incorporating a generally rectangular array of pre-formed dimples 784 supported by a rectangular support grid 766, wherein each dimple substantially comprises the entire area of its associated cell 788 within the rectangular support grid 766. Similarly, FIG. 11H depicts a device 790 having a detuned reflective membrane 792 (third species, eighth sub-species) incorporating a concentric annular array of tapered quadrilateral dimples 794 supported by a tapered quadrilateral support grid 796, wherein each dimple substantially comprises the entire area of its associated cell 798 within the support grid 796. It should be noted that dimples of any pre-determined size, quantity, shape, and/or combinations thereof may be employed to tailor the light concentration pattern to a predetermined intensity and distribution, i.e., the invention is not limited to the specific examples shown.

Figure 12A:
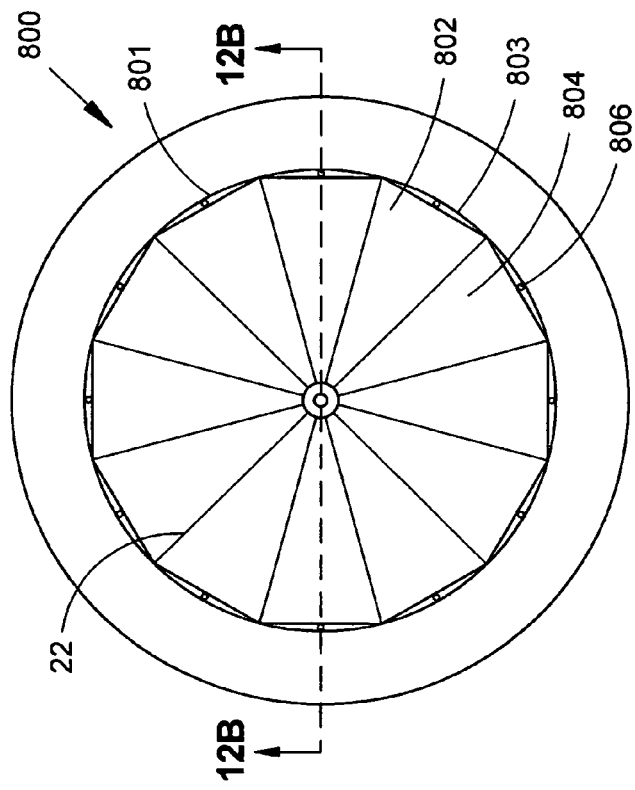
FIGS. 12A-D are schematic top plan views (FIGS. 12A and 12C) and schematic diametrical cross-sectional views (FIGS. 12B and 12D) of alternate basic first embodiment reflector apparatuses having a detuned reflective membrane comprising a plurality of generally wedge-shaped facets.
Figure 12B:
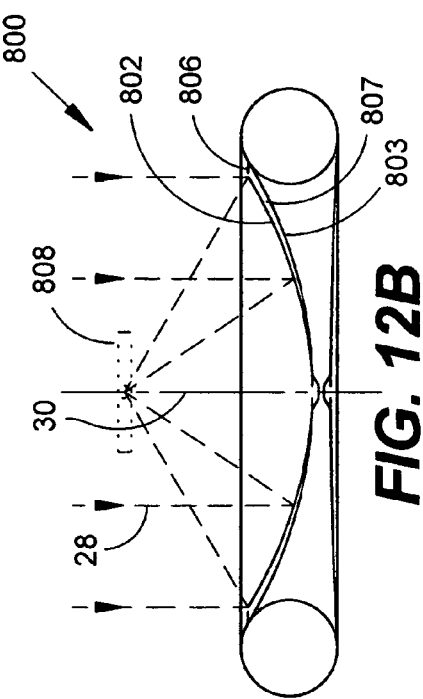

FIGS. 12A-B depict an alternate basic first embodiment reflector apparatus 800 having a composite detuned reflective membrane 801 (fourth species, first sub-species), wherein the composite reflective membrane 801 comprises a mechanically deformable reflective membrane 802 selectively bonded to a pressure-deformable membranous substrate 803 along a plurality (e.g., twelve) of radial lines or seams 22 to provide an equal number of wedge-shaped facets 804, each of which is curved in the radial direction and substantially flat in the circumferential direction. One or more orifices 806 need to be provided to allow gas (e.g., air) to freely enter or exit the chambers or cavities 807 between the reflective and substrate membranes 802, 803. Such orifices 806 can be included in and/or around the periphery of the reflective membrane 802. FIG. 12B shows that the electromagnetic rays 28 reflected by each facet form a diffuse, substantially linear focal locus 808 (shown dotted) in proximity to the primary focal axis 30 of the reflector 801.

Figure 12C:
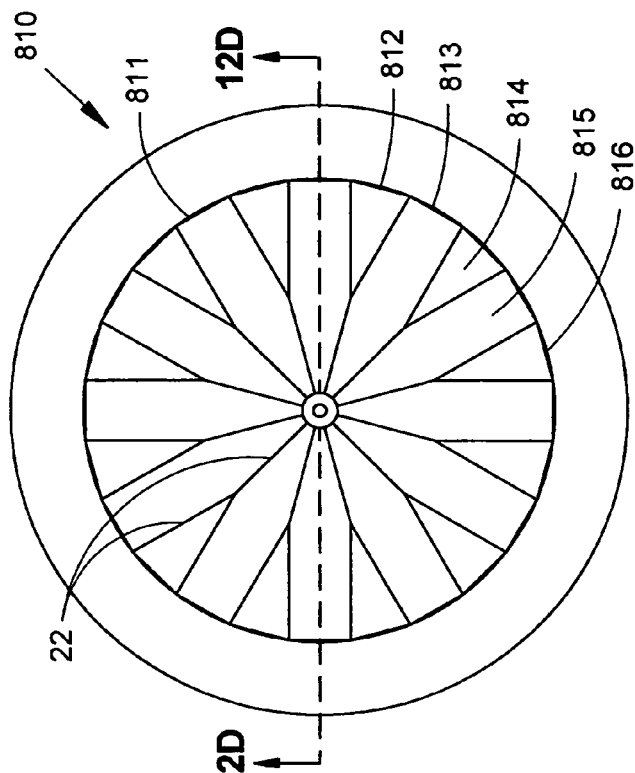
Figure 12D:
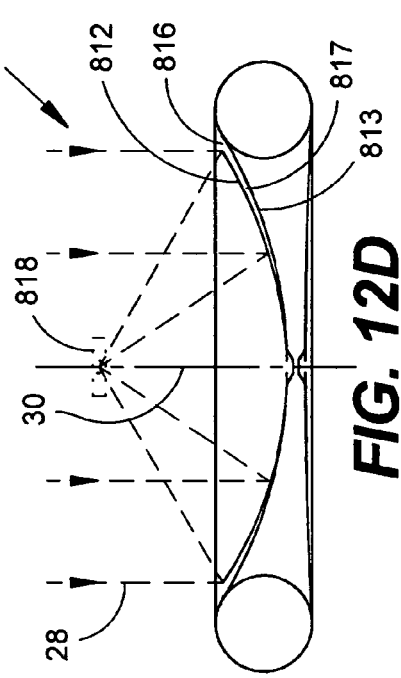

Similarly, FIGS. 12C-D depict an alternate basic first embodiment reflector apparatus 810 having a composite detuned reflective membrane 811 (fourth species, second sub-species), wherein the composite reflective membrane 811 comprises a mechanically deformable reflective membrane 812 bonded to a pressure-deformable membranous substrate 813 along a combination of radial seams 22 and parallel-to-radial seams 22 to provide a plurality (e.g., twenty-four) of alternating wedge-shaped facets 814 and circumferentially truncated wedge-shaped facets 815, each of which is curved in the radial direction and substantially flat in the circumferential direction. FIG. 12D shows that the electromagnetic rays 28 reflected by each facet form a diffuse, substantially linear focal locus 818 (shown dotted) in proximity to the primary focal axis of the reflector 811; however, this pattern produces a more uniform but more highly concentrated pattern of energy than is provided by the faceted reflector 801 of FIG. 12B.

FIGS. 13A-B depict an alternate basic first embodiment reflector apparatus 820 having a composite detuned reflective membrane 821 (fifth species, first sub-species), wherein the composite reflective membrane 821 comprises a mechanically deformable reflective membrane 822 selectively bonded to a pressure-deformable membranous substrate 823 along a plurality (e.g., five) of equally spaced circumferential lines or seams 22 to provide a plurality (e.g., four) of conical facets 824 of equal radial width, each of which is curved in the circumferential direction and substantially flat in the radial direction. One or more orifices 826 need to be provided to allow gas (e.g., air) to freely enter or exit the chambers or cavities 827 between the reflective and substrate membranes 822, 823. FIG. 13B shows that the electromagnetic rays 28 reflected by each facet converge in proximity to the primary focal axis 30 of the reflector to provide a substantially spherical pattern 828 of concentrated light.

Similarly, FIGS. 13C-D depict an alternate basic first embodiment reflector apparatus 830 having a composite detuned reflective membrane 831 (fifth species, second sub-species), wherein the composite reflective membrane 831 comprises a mechanically deformable reflective membrane 832 bonded to a pressure-deformable membranous substrate 833 along a plurality (e.g., five) of circumferential lines or seams 22 having progressively reduced radial spacing to provide a plurality (e.g., four) of conical facets 834 of decreasing radial width, each of which is curved in the circumferential direction and substantially flat in the radial direction. Again, one or more orifices 836 need to be provided to allow gas (e.g., air) to freely enter or exit the chambers or cavities 837 between the reflective and substrate membranes 832, 833. FIG. 13D shows that the electromagnetic rays 28 reflected by each facet 834 converge in proximity to the primary focal axis 30 of the reflector to provide a substantially planar pattern 838 of concentrated light.

FIGS. 14A-B depict an alternate basic first embodiment reflector apparatus 840 having a composite detuned reflective membrane 841 (sixth species, first sub-species), wherein the composite reflective membrane 841 comprises a mechanically deformable reflective membrane 842 selectively bonded to a pressure-deformable membranous substrate 843 at a plurality of discrete points 23 in an annular pattern or array (i.e., aligned concentric circular arrays) to form a plurality (e.g., ninety-six) of substantially planar quadrilateral facets 844 having constant width in the radial direction. FIG. 14B shows that the electromagnetic rays 28 reflected by each facet 844 form an associated non-concentrated column of light, all of which converge in proximity to the primary focal axis 30 of the reflector to provide a substantially spherical pattern 848 of concentrated light. It should be noted that this planar faceted configuration forms a substantially spherical pattern 848 of concentrated energy that is more uniform than that provided by the conically faceted reflector of FIGS. 13A-B.

Figure 14C:
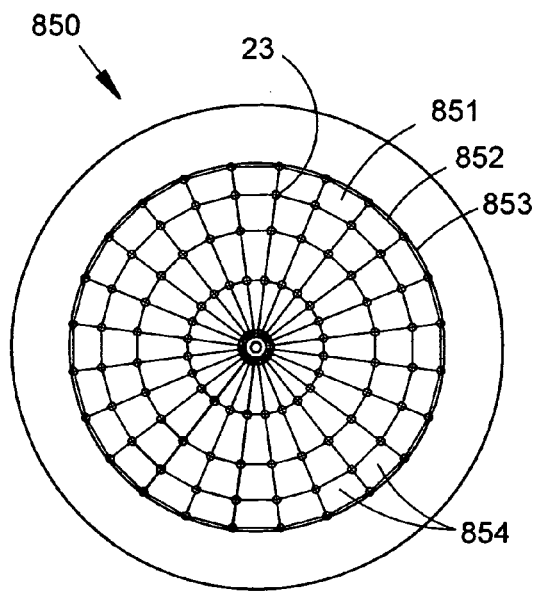
Figure 14D:
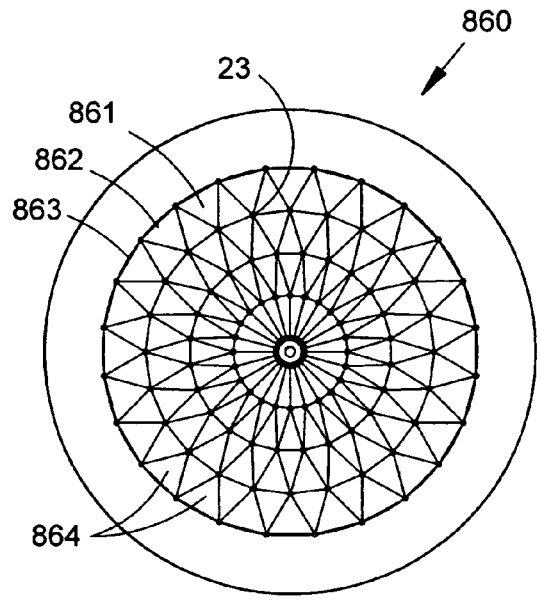
Figure 14E:
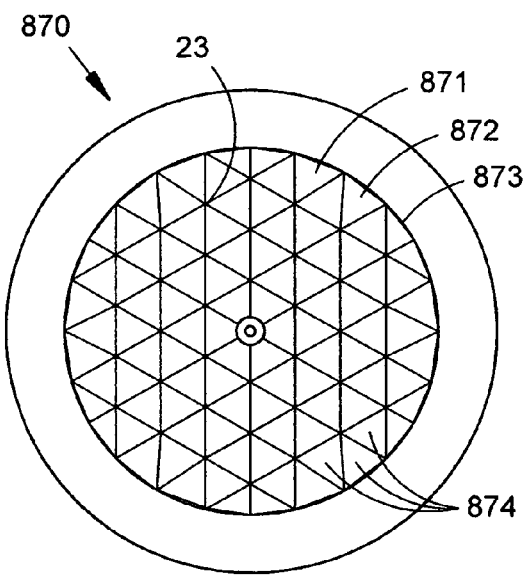
Figure 14F:
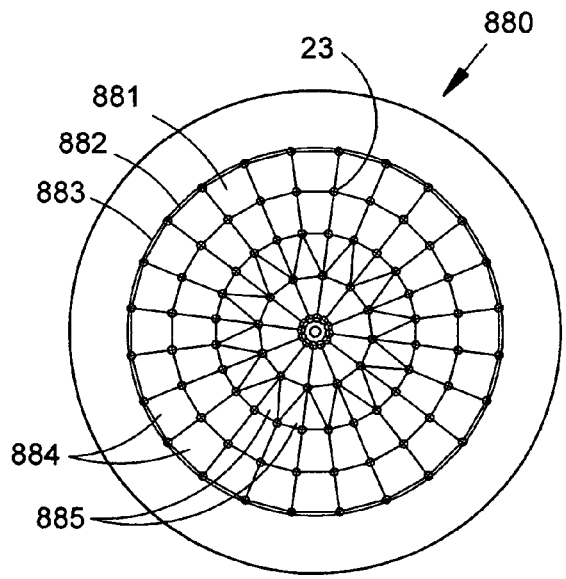

FIGS. 14C-F depict various other faceting patterns for faceted detuned composite reflectors. Specifically, FIG. 14C depicts a device 850 having a faceted composite detuned reflective membrane 851 (sixth species, second sub-species), wherein the composite reflective membrane 851 comprises a mechanically deformable reflective membrane 852 bonded to a pressure-deformable membranous substrate 853 at a plurality of discrete points 23 in an annular pattern or array to form a plurality (e.g., ninety-six) of planar quadrilateral facets 854 having decreasing width in the radial direction. Note that this planar faceted configuration forms a substantially planar pattern of concentrated energy similar to that provided by the conically faceted reflector of FIGS. 13C-D, but which is significantly more uniform. Similarly, FIG. 14D depicts a device 860 having a faceted composite detuned reflective membrane 861 (sixth species, third sub-species) comprising a mechanically deformable reflective membrane 862 bonded to a pressure-deformable membranous substrate 863 at a plurality of discrete points 23 in a staggered pattern of concentric circular arrays to form a plurality (e.g., 168) of planar triangular facets 864 having optionally constant width in the radial direction. FIG. 14E depicts a device 870 having a faceted composite detuned reflective membrane 871 (sixth species, fourth sub-species) comprising a mechanically deformable reflective membrane 872 bonded to a pressure-deformable membranous substrate 873 at a plurality of discrete points 23 in a generally triangular pattern or array to form a plurality (e.g., ninety-six) of planar, substantially equilateral, triangular facets 874. FIG. 14F depicts a device 880 having a faceted composite detuned reflective membrane 881 (sixth species, fifth sub-species) comprising a mechanically deformable reflective membrane 882 bonded to a pressure-deformable membranous substrate 883 at a plurality of discrete points 23 in a generally annular pattern or array to form a plurality (e.g., ninety-six) of intermixed planar quadrilateral 884 and triangular 885 facets having substantially constant width in the radial direction.

It should be noted that the use of substantially planar facets provides excellent control of the maximum degree to which the light can be concentrated. More specifically, the light concentration factor cannot exceed the number of planar facets, unless special provisions are provided as described herein below. Further, facets of any pre-determined size, quantity, shape, and/or combinations thereof may be employed to tailor the light concentration pattern to a predetermined intensity and distribution, i.e., the invention is not limited to the specific examples shown.

Figure 14G:
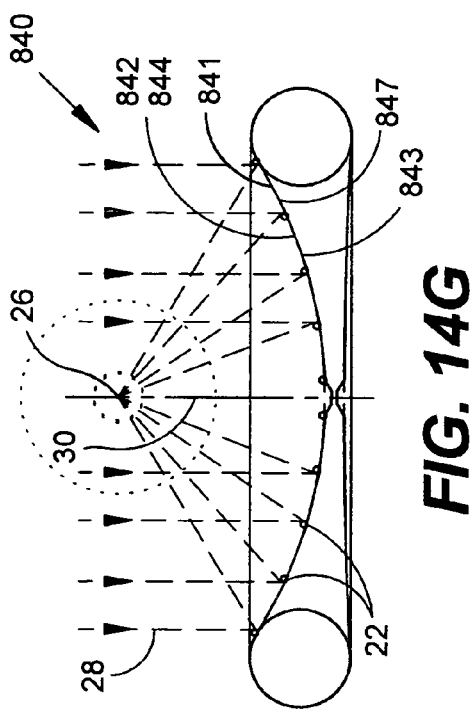
FIGS. 14G-H are schematic diametrical cross-sectional views of an alternate basic first embodiment reflector apparatus having a faceted detuned composite reflective membrane, for which the degree of electromagnetic energy concentration is adjustable by adjusting the pressure between the reflective membrane and the substrate membrane comprising the composite membrane.
Figure 14H:
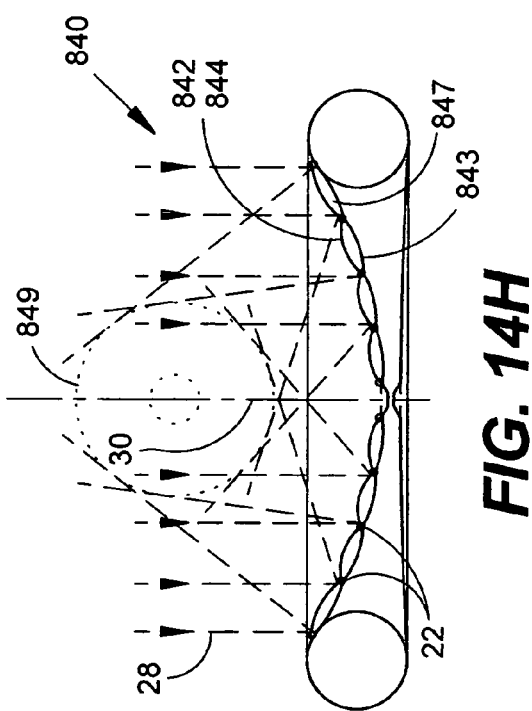

FIGS. 14G-H illustrate the various alternate modes of operation of an alternate basic first embodiment reflector apparatus having a faceted detuned composite reflective membrane 841 (similar to that shown in FIGS. 14A-B), for which the degree of electromagnetic energy concentration is adjustable by adjusting the pressure between the reflective membrane 842 and the substrate membrane 843 comprising the composite membrane 841. Note that FIG. 14B described above shows the nominal position of the deployed faceted reflective membrane, for which the pressure between the reflective membrane and the substrate membrane is substantially equal to the surrounding ambient pressure. In contrast, FIG. 14G illustrates the faceted composite reflective membrane deployed to further increase the degree of concentration (e.g., to a focal point 26) of radiant electromagnetic radiation above the nominal case shown in FIG. 14B by decreasing the pressure between the reflective membrane 842 and the substrate membrane 843 to a pressure below that of the surrounding ambient pressure. Alternatively, FIG. 14H illustrates the faceted composite reflective membrane deployed to reduce the degree of concentration (i.e., to produce a more diffuse focal zone 849) below the nominal case shown in FIG. 14B by increasing the pressure between the reflective membrane 842 and the substrate membrane 843 to a pressure above that of the surrounding ambient pressure. Note that a valve, pump, or other pressurizing or pressure-adjusting device (not shown) is provided to adjust the pressure between the reflective membrane 842 and the substrate membrane 843.

FIGS. 15A and 15B depict an alternate basic first embodiment reflector apparatus 890 having a detuned reflective membrane 892 (seventh species) comprising a mechanically deformable reflective membrane 892 bonded to an opposing membrane 893 via a plurality of internal linear radial ribs 895 and linear (i.e., chorded) circumferential ribs 899 or sheets to form, in an annular pattern, a plurality (e.g., ninety-six) of substantially planar quadrilateral facets 894 having constant width in the radial direction, whereby the reflector 892 can be deployed without imposing a differential pressure across the reflective membrane. However, one or more orifices (not shown) need to be provided to allow gas (e.g., air) to freely enter or exit the chamber(s) 897 between the reflective and opposing membranes 892, 893. Such orifices can be included in (and/or around the periphery of) the reflective and/or opposing membranes 892, 893 and may also be included in the internal ribs 899 to allow interconnection of the compartments 897 within the central chamber 20. Note that other faceting patterns may be produced, such as any of the preceding faceted patterns described herein, by the judicious use of radial, circumferential, and/or otherwise oriented internal ribs. Further, note that cords, lines, cables and/or other flexible elements alternatively or supplementally may be used to mechanically deploy the membranes (instead of the membranous ribs or sheets as noted above). Additionally, the central reflector chamber 20 of this configuration may be pressurized to adjust the degree of energy concentration.

Figure 15C:
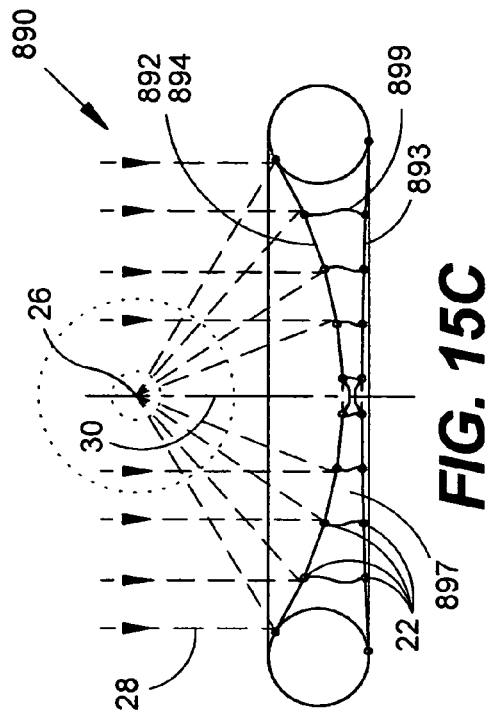
FIGS. 15C-D are schematic diametrical cross-sectional views of an alternate basic first embodiment reflector apparatus having a detuned faceted reflective membrane, for which the degree of electromagnetic energy concentration is adjustable by adjusting the pressure within the reflector chamber.
Figure 15D:
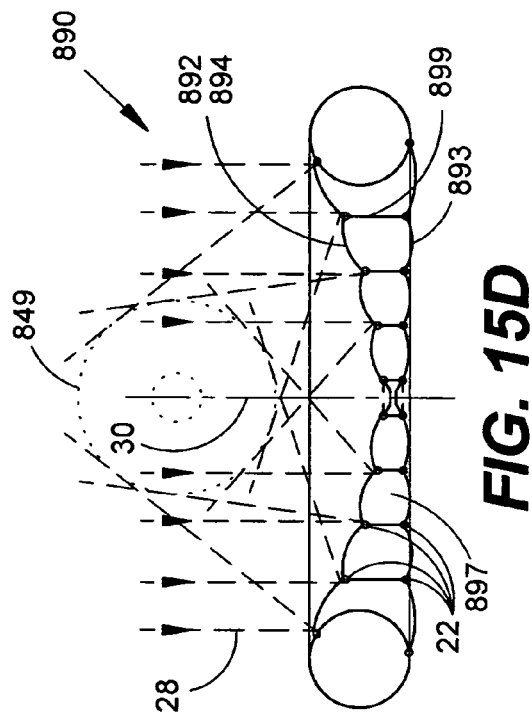

FIGS. 15C-D illustrate the various modes of operation of an alternate basic first embodiment reflector apparatus having a mechanically deployed, faceted detuned reflective membrane 892 (similar to that shown in FIGS. 15A-B), for which the degree of electromagnetic energy concentration is adjustable by adjusting the pressure within the central chamber(s) 897. Note that FIG. 15B shows the nominal position of the deployed faceted reflective membrane 892, for which the pressure in the central chamber(s) 897 is substantially equal to the surrounding ambient pressure. In contrast, FIG. 15C illustrates the faceted reflective membrane 892 deployed to further increase the degree of concentration of radiant electromagnetic radiation above the nominal case shown in FIG. 15B by decreasing the pressure in the central chamber(s) 897 to a pressure below that of the surrounding ambient pressure. Alternatively, FIG. 15D illustrates the faceted reflective membrane 892 deployed to reduce the degree of concentration of radiant electromagnetic radiation below the nominal case shown in FIG. 15B by increasing the pressure in the central chamber(s) 897 to a pressure above that of the surrounding ambient pressure. Note that a valve, pump, or other pressurizing or pressure-adjusting device is provided to adjust the pressure within the central chamber(s) 897.

FIGS. 15E-F are, respectively, a schematic top plan view and a schematic diametrical cross-sectional view of an alternate basic first embodiment reflector apparatus 1540 illustrating a flat pattern manufacturing method for an apparatus having a detuned faceted reflective membrane 892 which is alternately deployed via a plurality of internal ribs or sheets 1544 (which may optionally be continuous annular sheets) bonded to an opposing membrane 893 via generally circumferentially oriented bonds 22. Note that the two nested annular rings 1542 are shown positioned between the reflective and opposing membranes to form the support ring in a flat pattern.

FIGS. 15G-H are, respectively, a schematic top plan view and a schematic diametrical cross-sectional view of an alternate basic first embodiment reflector apparatus 1546 illustrating a flat pattern manufacturing method for an apparatus having a detuned faceted reflective membrane 892 which is alternately deployed via a plurality of internal ribs or sheets 1548 (similar to ribs 899) bonded to an opposing membrane 893 via generally radially oriented bonds 22.

Finally note that the present invention may optionally have detuned electromagnetic energy concentrators (e.g., sun-light concentrators) capable of variable light concentration wherein a central reflective membrane supported by an inflatable support ring is mechanically attached to an opposing central membrane, also supported by the inflatable support ring, by cords or lines, instead of internal membranous ribs or sheets, such that when the inflatable support ring is pressurized, the tension acting on the central mechanically deployable membranes by the ring and also from the cord ties or lines causes the central membranes to become distended into a concave configuration.

Figure 16A:
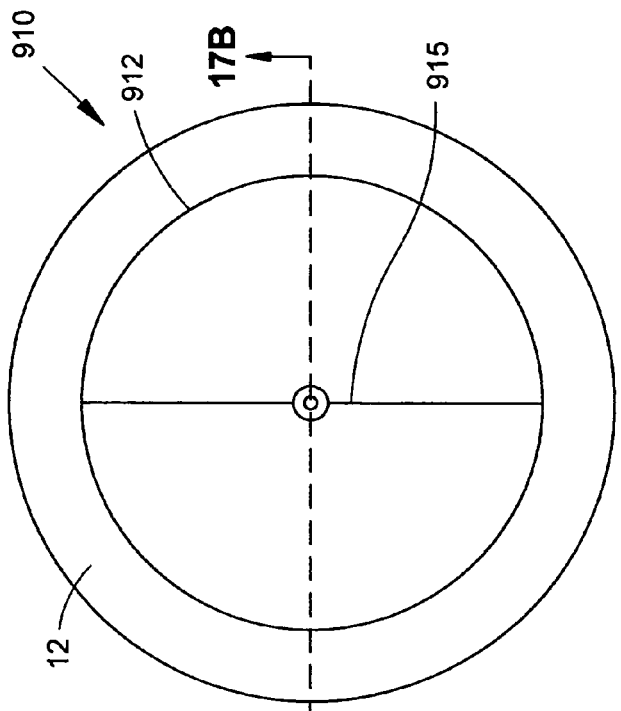
FIGS. 16A-B are, respectively, a schematic top plan view and a schematic diametrical cross-sectional view of an alternate basic first embodiment reflector apparatus having a detuned reflective membrane, wherein a central inflatable pressure envelope is disposed between the upper and lower pressure-deformable membranes to mildly distort the reflective membrane.
Figure 16B:
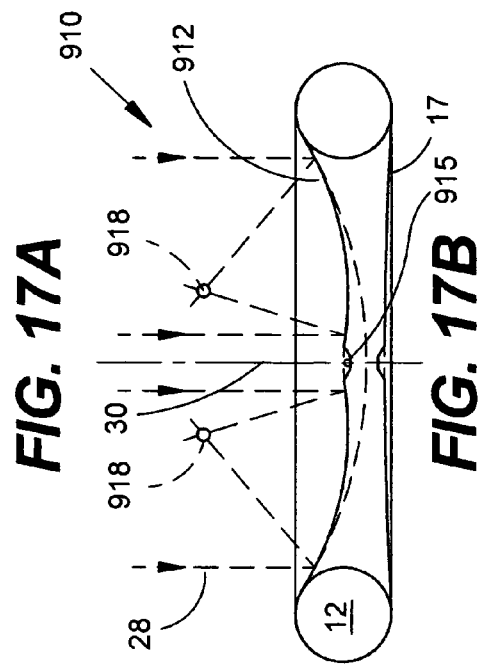

FIGS. 16A and 16B depict an alternate basic first embodiment reflector apparatus 900 having a detuned reflective membrane 902, (eighth species) wherein a secondary central inflatable pressure envelope 905 provides a secondary cavity 907 disposed between the upper and lower pressure-deformable membranes 902, 903 (i.e., centered within the reflector chamber 20) to mildly distort the reflective membrane 902 to provide an annular focal locus 908. This configuration enables the concentration and distribution of light to be adjusted by varying the pressure within the secondary central pressure envelope 905.

Figure 17A:
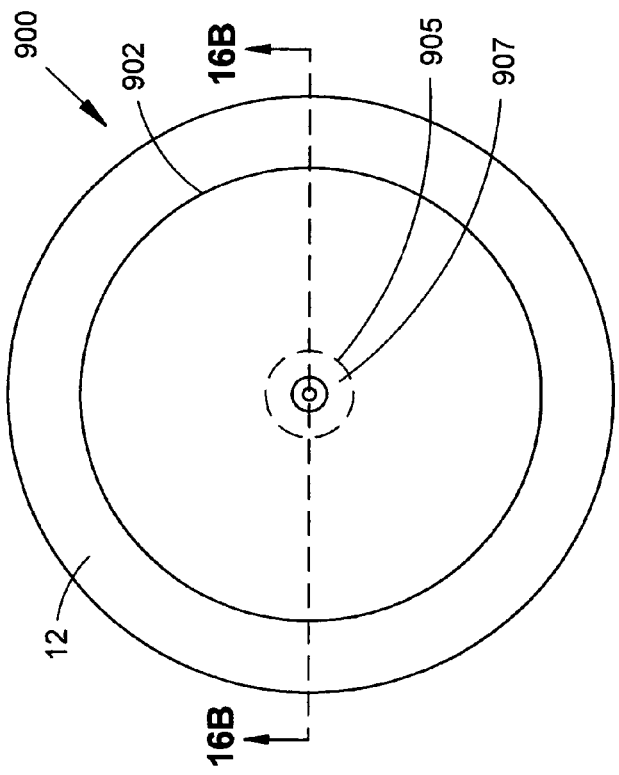
FIGS. 17A-B are, respectively, a schematic top plan view and a schematic diametrical cross-sectional view of an alternate basic first embodiment reflector apparatus having a dual-focal-point, detuned reflective membrane resulting in a device having two useable focal points.
Figure 17B:
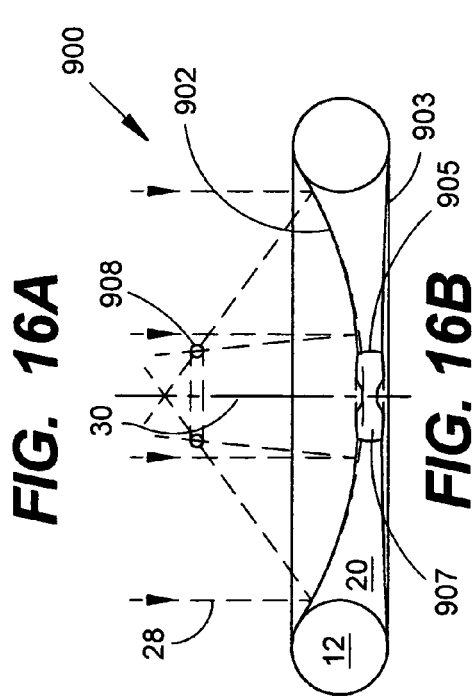

FIGS. 17A and 17B depict an alternate basic first embodiment reflector apparatus 910 having a dual-focal-point, detuned reflective membrane, 912 wherein an underlying tensioned cord, wire, or cable 915 diametrically spanning the toroid 12 distorts the reflective membrane 912 to provide two discrete detuned focal points 918, whereby the apparatus can simultaneously accommodate two distinct accessory elements (not shown), one at each focal point 918.

Finally, note that the present invention is not intended to be limited to only those types and configurations of detuned reflectors as described above and depicted in FIGS. 7A-17B.

Figure 18A:
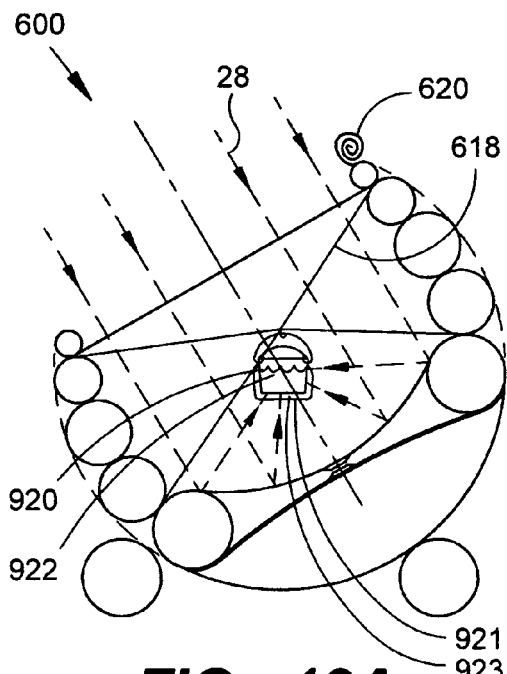

FIGS. 18A-F: Operation as a Broad-Spectrum Electromagnetic Energy Concentrator FIG. 18A depicts the modular multi-function apparatus 600 being used to concentrate solar energy 28 to heat or cook materials 922 contained in a vessel 920 supported in proximity to the focal point by the cable-stayed focal point support 618. Other non-limiting examples of heating or cooking accessories which may be used for heating or cooking food (or for other purposes) include: pots, pans, ovens, woks, pressure cookers, two-sided cooking accessories, flat griddle plates, waffle irons, pie irons, muffin tins, cake pans, toasters, coffee makers, kettles, steamers, and the like, each of which generally has a radiant-energyabsorbing (e.g., matte black) external surface that is suitable for absorbing solar radiation. Note that while such external surfaces absorb radiant energy, these heated surfaces also tend to loose a significant amount of heat energy through conduction, convection, and radiation, thus reducing overall heating efficiency of the heat-absorbing device. To improve heating efficiency, each of the various heating vessels or cooking accoutrements noted above (or other radiant-energy-absorbing heating devices) optionally may have a heat-absorbing surface which is conductively and/or convectively insulated by enclosing or encasing the energyabsorbing surface in a transparent or clear enclosure 921, wherein an insulating gap 923 is provided between the heat-absorbing surface and the transparent enclosure. The gap optionally can fluidically communicate via opening or ports with the surrounding atmosphere, whereby the gap is typically filled with air. Alternatively, the gap can be sealed, whereby it may be filled with a less-conductive gas, or be evacuated. Note that such an insulating enclosure also promotes safety by reducing heat transfer from the vessel to the enclosure, thus keeping the external surface cooler under one or more operating conditions, such as when resting the vessel on a table after removal from the source of energy. Note that the other surfaces of the vessel can be insulated by any suitable means.

Figure 18B:
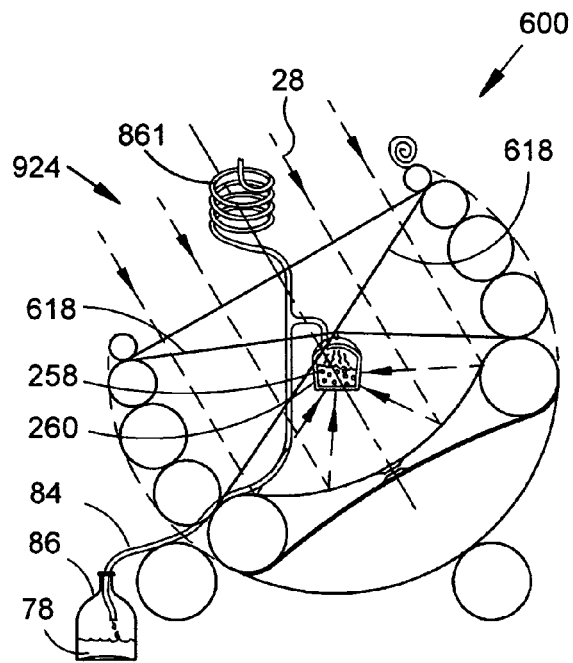

FIG. 18B depicts the modular multi-function apparatus 600 being used to concentrate solar energy 28 to distill liquids 258 contained in a vessel 260 of distillation apparatus 924 supported in proximity to the focal point by the cable-stayed focal point support 618. Conduit 84 deposits condensate 78 (i.e., condensed vapors, which typically condense in coil 861) into accessory vessel 86.

Figure 18C:
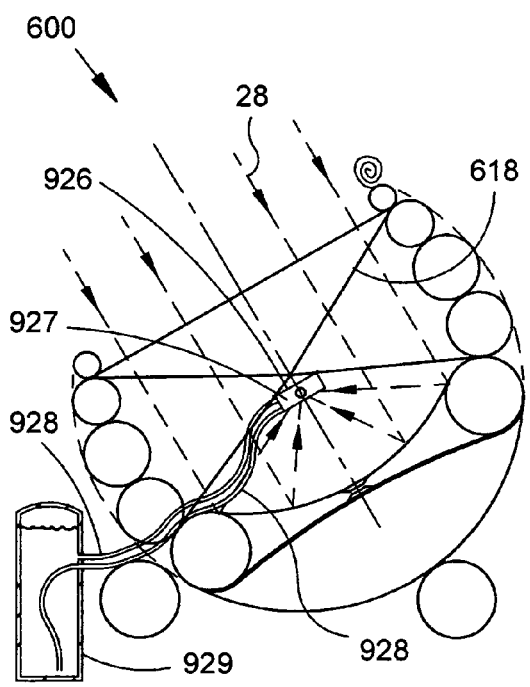

FIG. 18C depicts the modular multi-function apparatus 600 being used to provide thermal energy by concentrating sunlight 28 onto a heat exchanger 926 supported by the cable-stayed focal point support 618 in proximity to the focal point, wherein a liquid effluent 927 is cyclically heated and piped via conduits 928 to and from an insulated energy-storage vessel 929 or thermal reservoir. Note that the thermal energy storage vessel or thermal reservoir may optionally contain one or more phase-change materials (e.g., fluid to solid), whereby large amounts of energy can be stored or released as the phase-change material changes between a liquid phase and a solid phase. Also note that the thermal energy storage system can employ a high temperature working fluid, which can transfer its heat to a lower temperature storage medium. Note that these various thermal energy storage systems are valuable in that they can provide energy on demand, such as at night, during cloudy weather, or at other times when energy demand exceeds production.

Figure 18D:
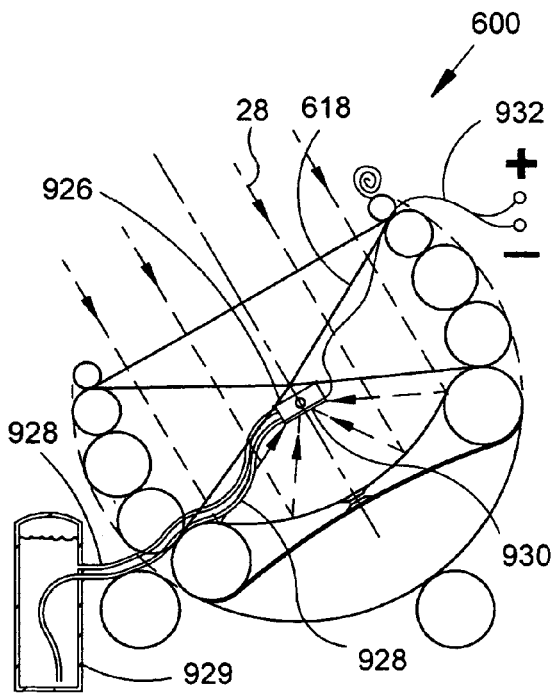

FIG. 18D depicts the modular multi-function apparatus 600 being used to generate electrical power by concentrating sunlight 28 onto a liquid-cooled photo-electric cell 930 supported by the cable-stayed focal point support 618 in proximity to the focal point. Electrical conduits 932 transmit electrical energy to a device (not shown) requiring electrical power. Note that thermoelectric cells can also be employed for this purpose. Further note that the optional heat exchanger 926 used to cool the photovoltaic cell device 930 can effectively be used to provide heat as in FIG. 18C.

Figure 18E:
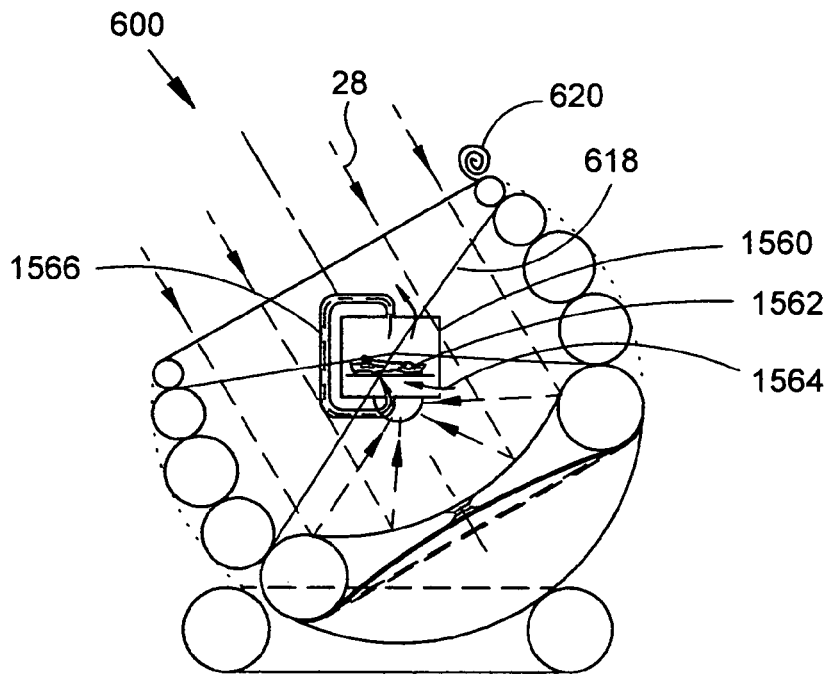

FIG. 18E depicts the modular multi-function apparatus 600 being used to process materials by concentrating sunlight 28 onto an openable, energy-absorbing, heating chamber 1560 supported by the cable-stayed focal point support 618 in proximity to the focal point, whereby a material to be processed 1562 (e.g., wood) may be placed within the heated chamber 1560 for processing or conversion to an alternate material form (e.g., charcoal). Note that the heated chamber 1560 can optionally incorporate one or more gas vents or ports 1564 to permit expanding gasses to escape from the heated chamber 1560 and/or to permit air (or other gases) to enter the chamber, and that such gas vents or ports optionally may have a valve (not shown) or other device operable to control the flow of gas through the ports. Further, the heated chamber 1560 can optionally further incorporate one or more gas re-circulating conduits 1566 to permit expanding gasses (such as carbonaceous gasses emitted from heated materials) to be cooled and re-circulated back into the heated chamber 1560 to improve material processing performance (such as when producing charcoal from wood or other carbonaceous biomass). Additionally, the heating chamber 1560 optionally may further include other elements (not shown), non-limiting examples of which include: a shelf or grating to support the material to be processed, a fan to enhance convection, a thermometer, a thermostatic control device, a viewing port, and/or other common elements. The apparatus 600 configured with a heating chamber optionally may be used for numerous other purposes, non-limiting examples of which include: firing ceramic materials, heat-treating metals, sterilizing medical equipment, baking of foodstuffs, and/or the like.

Figure 18F:
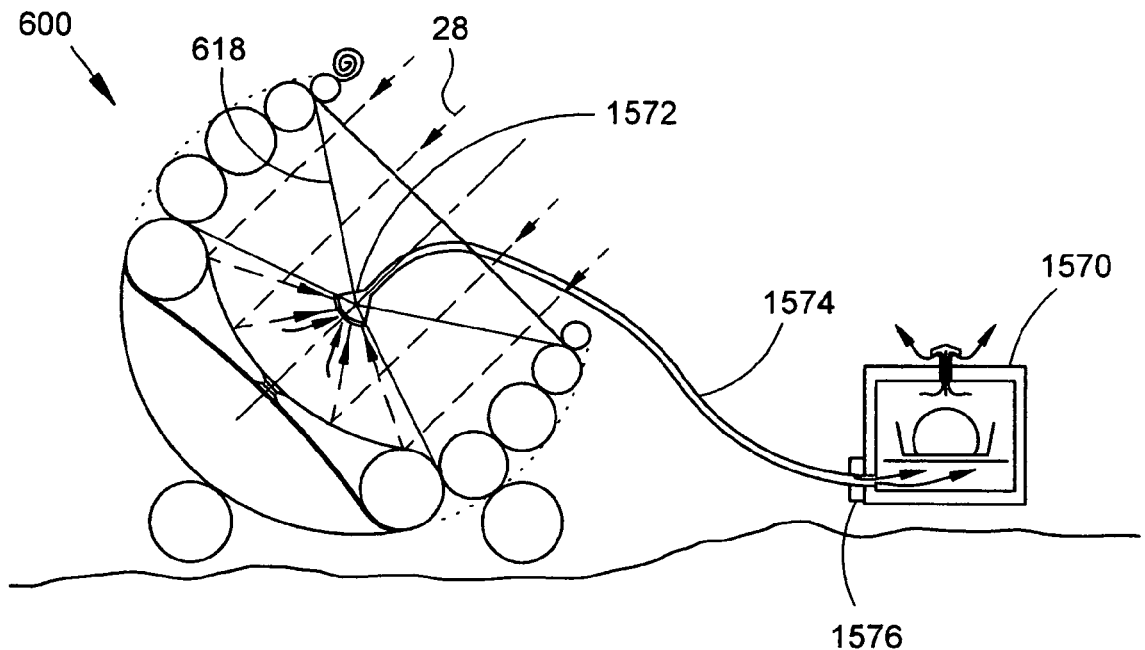

FIG. 18F depicts the modular multi-function apparatus 600 being used to provide heated air, such as to heat a proximate oven 1570 as shown, or for other heating purposes. For this application, the apparatus 600 operates in concert with an accessory, radiant energy-absorbing, air-heating device 1572 (e.g., a heat-absorbing air-permeable structure, mesh, fibrous material, and the like) shown optionally attached to an insulated thermal conduit 1574 to provide heated air to heat the proximate oven 1570, or to provide heated air for other purposes. Note the radiant-energy-absorbing, air permeable, air heating device operates simply by heating the energy absorbing air-permeable structure via exposure to preferably concentrated radiant energy (e.g., solar energy) and by drawing air through the heated structure to transfer heat from the structure to the air. Further, the porous nature of the air-permeable structure typically has superior energy-absorbing efficiency being that a portion of any energy initially reflected by the energy-absorbing surface of the structure will become trapped within the porous structure and eventually absorbed. Note that an optional accessory fan or air pump 1576 may be required to transmit the heated air through the conduit 1574. Alternatively, by positioning the oven (or the outlet of the conduit) above the inlet of the conduit, buoyant forces acting upon the lower-density of the heated air will cause the heated air to rise and, thus, be transmitted through the conduit. Further, the radiant energy-absorbing, air-heating device 1572 optionally may be incorporated directly into an oven apparatus 1570 (typically, but not necessarily, at or near the bottom of the oven apparatus), which can be directly supported in proximity to the focal point (similarly to that showm for chamber 1560 as shown in FIG. 18E), thereby eliminating the need for the insulated conduit 1574.

FIGS. 19A-D: Operation as a High-Gain Radio-Frequency Antenna

Figure 19A:
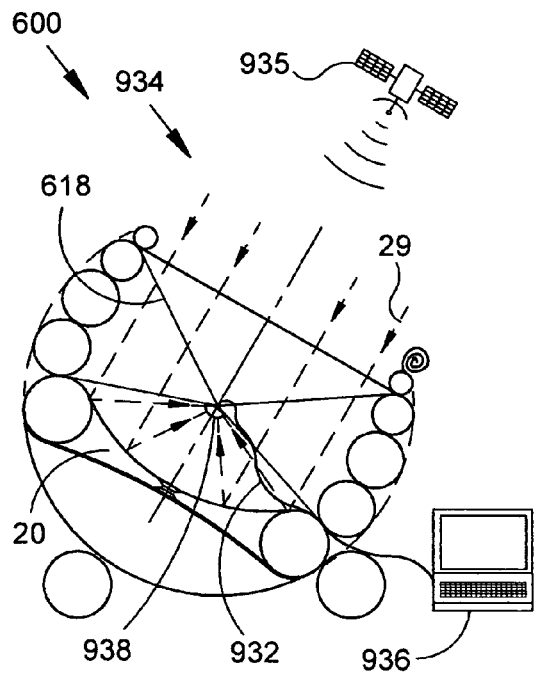
FIGS. 19A-D are schematic cross-sectional views of the modular multi-function apparatus being used as a high-gain antenna to facilitate or enable electronic communications.

FIG. 19A depicts the modular multi-function apparatus 600 being used as a high-gain antenna 934 to enable electronic communications between a geo-synchronous satellite 935 and a ground-based communications device 936, such as a portable computer, by supporting via the cable-stayed focal point support 618 a basic antenna 938 at the focal point of a sub-ambient pressurized reflector chamber 20. Electrical conduits 932 are shown connecting the basic antenna 938 to the ground-based communications device 936.

Figure 19B:
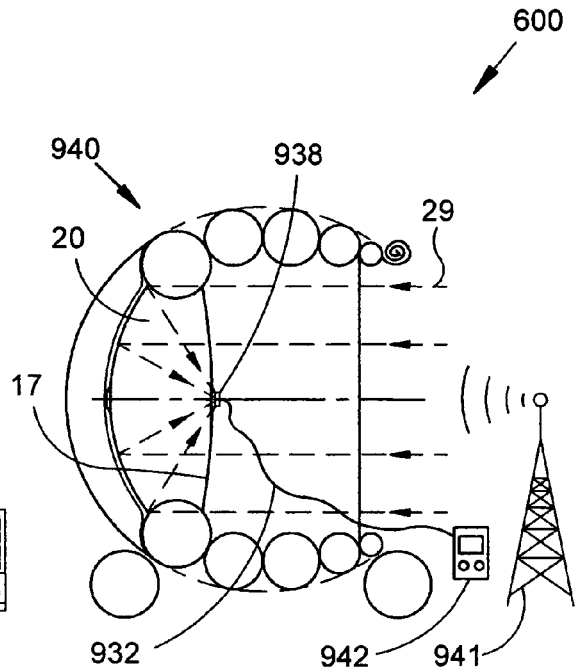

FIG. 19B depicts the modular multi-function apparatus 600 being used as a high-gain antenna 940 to enhance electronic communications between a distant radio transmission tower 941 and a portable transceiver device 942, wherein the transparent membrane 17 of a super-ambient pressurized reflector chamber 20 is alternatively used to support a basic antenna 938 in proximity to the focal point. Note that the basic antenna device 938 may be integrally incorporated into the transparent membrane 17 as an integral conductive wire, mesh, or other suitable conductive element (not shown). Also note that for this and other applications, the transparent membrane need only be transparent to the particular spectrum of electromagnetic radiation (e.g., RF) being manipulated by the apparatus. Accordingly, the invention provides that the transparent membrane 17 optionally can be opaque, translucent, or otherwise disruptive to higher energy spectra, (e.g., broad-spectrum solar energy, visible light, infrared, and the like) to prevent inadvertent damage to the transparent membrane and/or an accessory element (such as a portable transceiver device, cellular phone, and the like) supported thereon in the event the apparatus inadvertently becomes aligned with a high-energy electromagnetic source, such as the sun. In addition to transmitting and/or receiving electromagnetic radiation for communications purposes, note that the device optionally can also be configured and used for electromagnetic detection and/or ranging (e.g., RADAR, LIDAR, electromagnetic surveillance, and the like) by incorporating a suitable transmitter and/or receiver device.

Figure 19C:
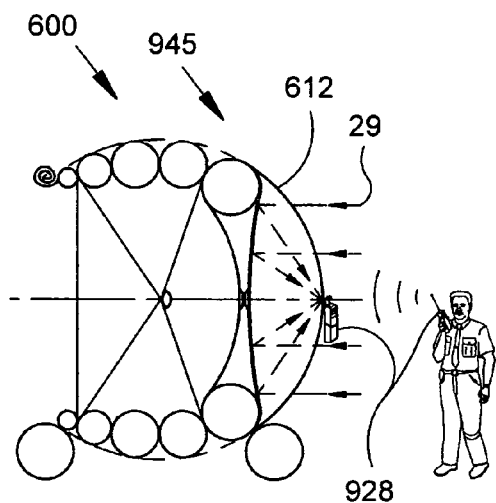

FIG. 19C depicts the modular multi-function apparatus 600 being used as an alternately configured high-gain antenna 945 to extend the range of electronic communications between two portable transceiver devices 928 by attaching one of the transceiver devices directly to the spherical support element 612. This configuration allows the apparatus to be quickly converted between various operational modes, such as between use as a high-gain antenna and use as, for example, a broad-spectrum concentrator.

Figure 19D:
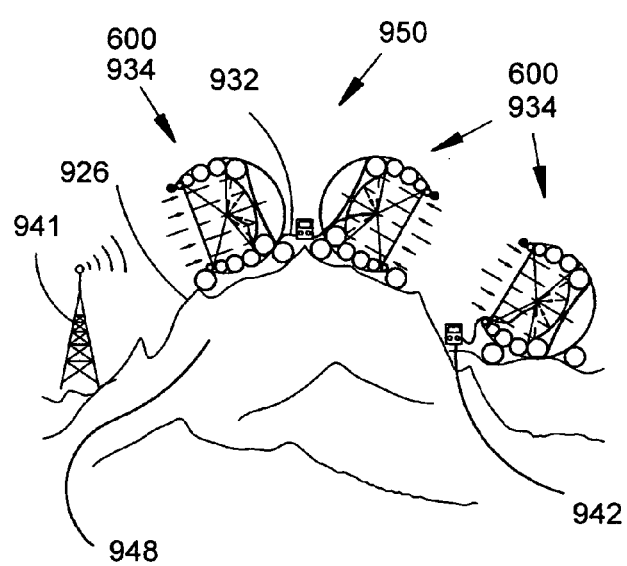

FIG. 19D depicts two electrically interconnected modular multi-function apparatuses 600 located on a mountain 948 and being used as high-gain antenna apparatuses 934 (each similar to those shown above in FIGS. 19A-C) to provide a communications relay apparatus 950 to relay electronic communications between a low-lying transmission tower 941 and a third modular apparatus 934 located on opposite sides of the mountain. It is noted that a single modular multi-function apparatus may be reconfigured by the user to provide two or more reflector modules (such as by attaching a removable reflector chamber to, for example, the separate toroidal support ring 614 or the rings of the safety shield 616), thus enabling a single apparatus to serve as a relay station between non-aligned remote stations. However, depending on the element selected to support the auxiliary removable reflector chamber, alternate means for supporting the apparatus may need to be implemented.

Figure 20A:
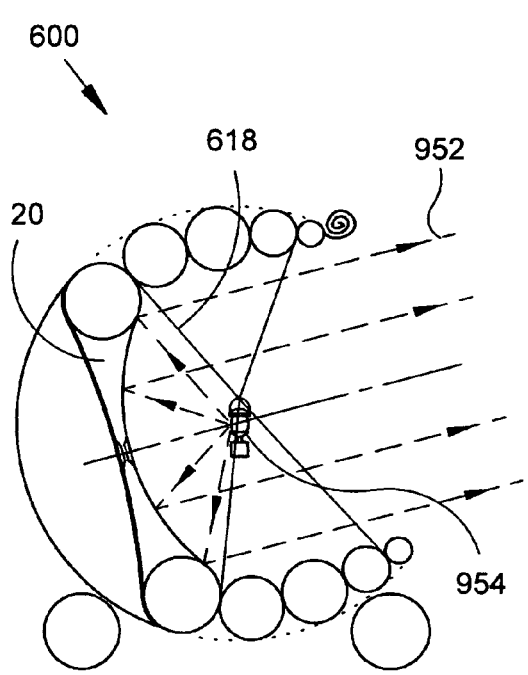
Figure 20B:
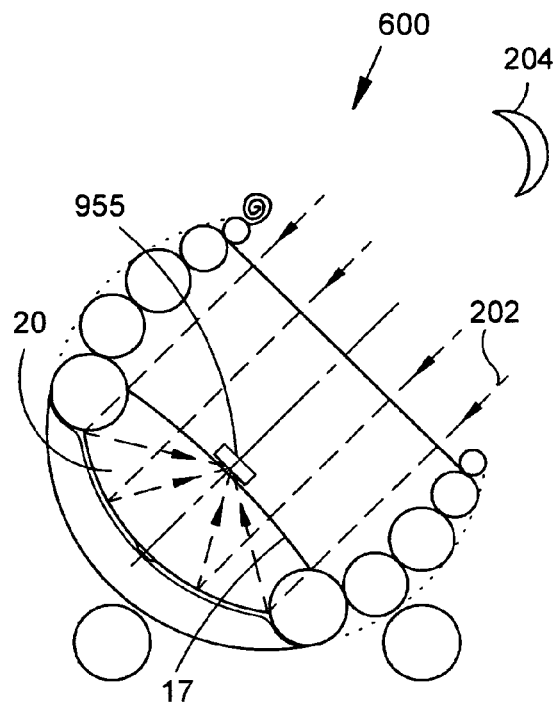
Figure 20C:
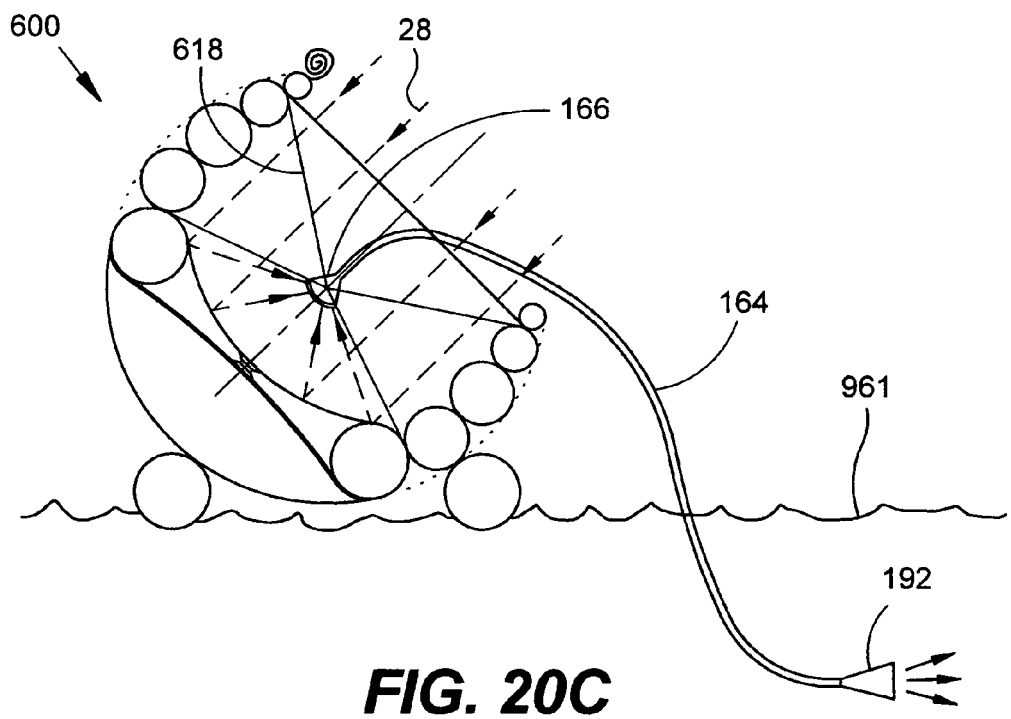

FIGS. 20A-C: Operation as a Visible Spectrum Concentrator and Projector

FIG. 20A depicts the modular multi-function apparatus 600 being used to project a collimated beam of light 952 for enhancing vision, signaling, and the like, by locating a non-collimated light source 954 at the focal point 26 of a sub-ambient pressurized reflector chamber 20. Various light sources can be used for this application including, for example, a gas or oil lantern, an electrical lamp, a candle, a torch, a phosphorescent glow stick, and the like. Note that the device can optionally include reflectors, transparent covers, and/or transparent membranes (if used in super-ambient mode) having various colors to enable the device to project a wider range of signals, or to project colored illumination, such as for artistic purposes.

FIG. 20B depicts the modular multi-function apparatus 600 being used to concentrate moonlight 202 from a crescent moon 204 onto an item 955 to be viewed at night, such as a map or compass, optionally held in proximity to the focal point by the transparent membrane 17 of a super-ambient pressurized reflector chamber 20. Note that other dim or distance sources of light may also be used for this application, such as a distant street lamp, or the glow emanating from a distant city skyline. Also note that the apparatus alternatively can be deployed in sub-ambient mode for this and other applications disclosed herein.

FIG. 20C depicts the modular multi-function apparatus 600 (shown optionally supported on the surface of a body of water 961) being used in conjunction with an accessory waveguide device 166 to concentrate solar radiation 28 (or lunar radiation) and transmit the concentrated radiation via waveguide 164 to an underwater lamp 192 to provide panchromatic illumination for use by a diver (not shown). Note that this configuration can also be used to provide illumination for interior, subterranean, and/or other darkened environments, or to energize optical equipment (such as, for example, an image projection device), a heated tool, or a surgical device.

Figure 20D:
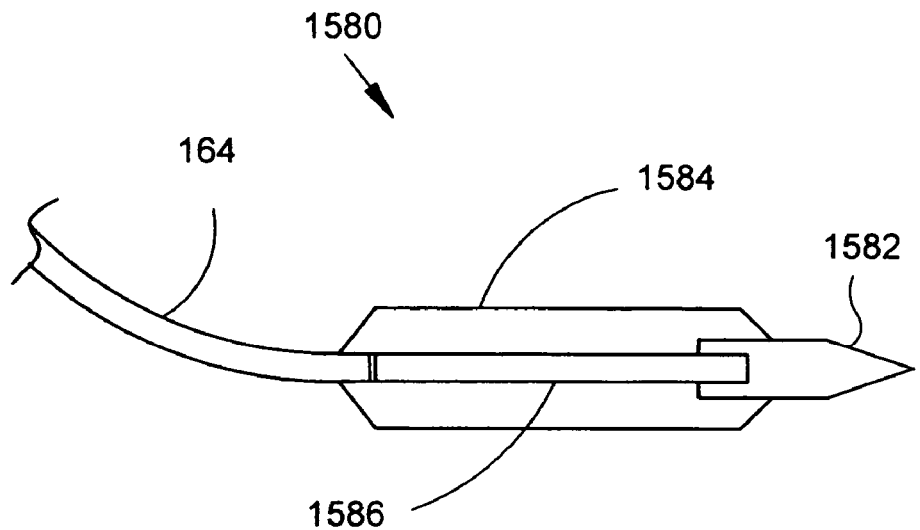
FIGS. 20D-E are schematic cross-sectional views of light-energized tools including, respectively, a light-heated tool and a light-emitting tool, for which the energizing light is transmitted to the tool by an optical conduit.

FIG. 20D depicts a light-energized tool 1580 comprising a light-absorbing element or tool tip 1582 secured to a handle 1584 within which is disposed a high-temperature-capable light conduit 1586, which is further connected to a flexible light or optical conduit 164 (e.g., a wave guide, fiber optic cable, and the like), through which light energy is transmitted to energize the tool 1580 to heat the light-absorbing element 1582. Note that the light absorbing element 1582 may be of any practical shape, and that such a heated tool may be used for numerous purposes, non-limiting examples of which include: soldering, thermal cutting, thermal bonding, cauterizing flesh wounds, and thermal ironing or pressing of fabrics or other materials.

Figure 20E:
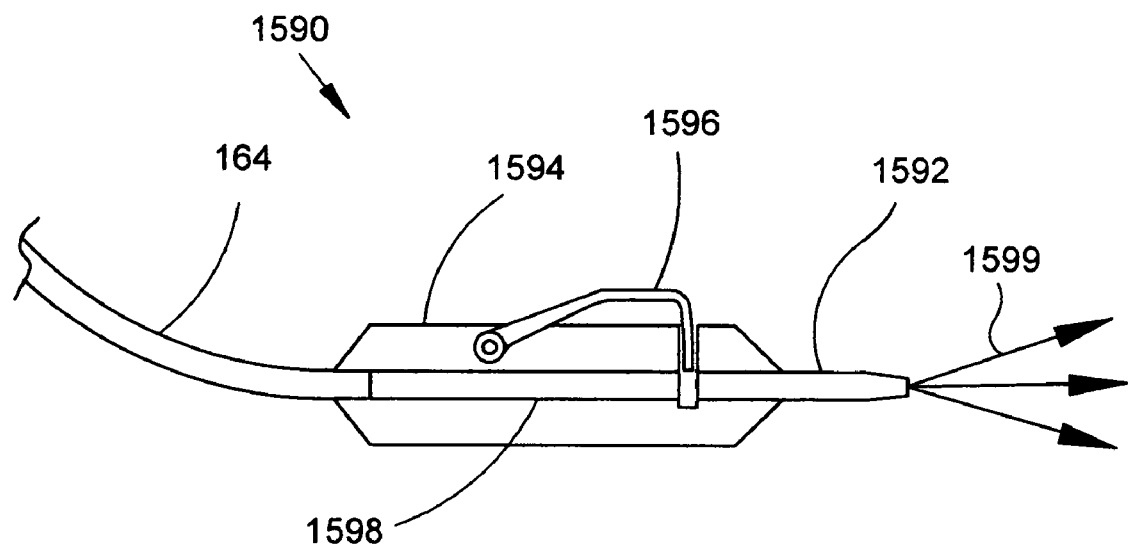

FIG. 20E depicts a light-energized tool 1590 comprising a light-emitting tip 1592 secured to a handle 1594 having an optional optical switch or optical valve assembly 1596 operable to control the flow of light energy transmitted by a light conduit 1598 disposed within the handle 1594 to the light-emitting tip 1592. Once again, the tool 1590 is shown energized by light energy transmitted through a flexible optical conduit 164 attached to the tool 1590. Note that such a light-emitting tool 1590 also may be used for many of the purposes noted above for the light-absorbing heated tool of FIG. 20D; however, the light-emitting tool may be preferable for surgical procedures or other purposes benefiting from the use of a non-contacting tool, (i.e., the tool need not touch the material upon which it is acting to transmit energy 1599.)

FIGS. 21A-D: Operation as a Support or Shelter

Figure 21A:
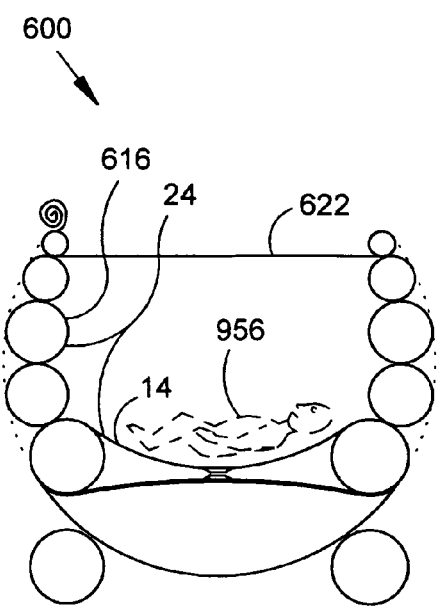

FIG. 21A depicts the modular multi-function apparatus 600 being used in an upright position as an insulated crib, cradle, or incubator, such as to hold an infant 956. In addition to the reflective membrane 14, the invention contemplates that many of the other elements of the apparatus, such as the interior and/or or exterior walls of the safety shield 616 can have a reflective surface 24 to enhance the thermal insulating characteristics of the apparatus. Note that the focal point support apparatus 618 has been removed to facilitate this application.

The apparatus as shown in FIG. 21A can also be used as an inflatable container for holding various other items (e.g., materials, produce, trash, or waste). Further, the compliant or soft nature of the inflatable apparatus also renders the apparatus useful for vibration isolation and/or load distribution.

Figure 21B:
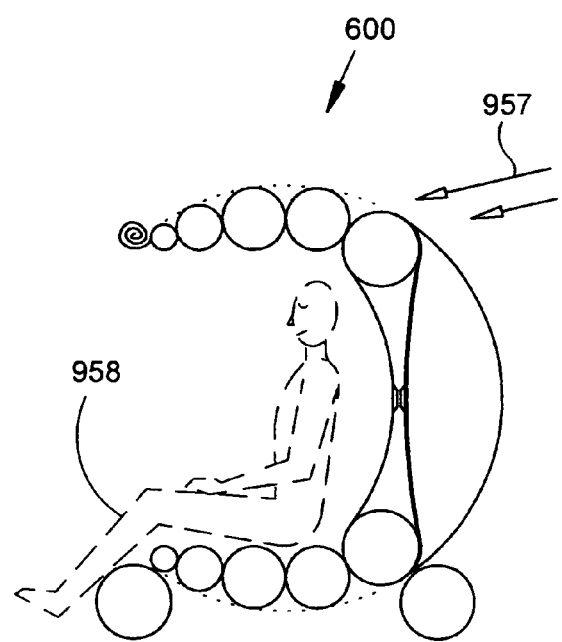

FIG. 21B depicts the modular multi-function apparatus 600 being used in a horizontal position by a person 958 as a seat or chair, and as a shield from the sun, wind, and/or inclement weather 957.

Figure 21C:
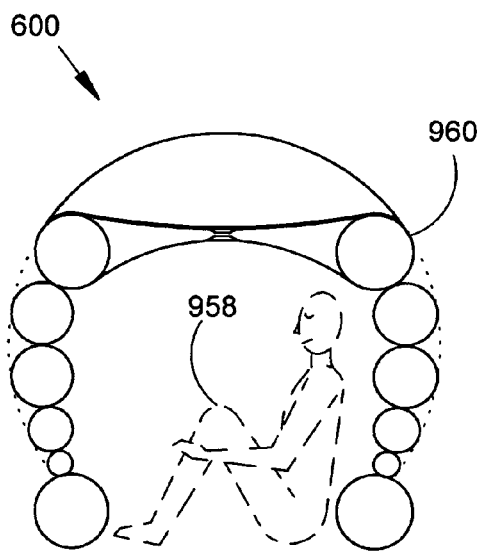

FIG. 21C depicts the modular multi-function apparatus 600 being used in an inverted position as a shelter to protect a person 958 from inclement weather or other environmental elements. By further incorporating an optional camouflaged external surface 960 (such as can be provided by disposing various colors and/or patterns on the external surface of the apparatus), the apparatus effectively serves as a wildlife blind or hunting blind. Note that an apparatus similar in construction to those depicted in FIGS. 21A-C also may be configured as a camouflaged or low-observability shelter (such as for military operations and the like), wherein the apparatus optionally may be coated with an infrared-light-reflecting material on its inner surfaces and/or optionally coated with a microwave or radio-frequency absorbing material on its outward facing surfaces. Additionally, infrared, microwave, and/or radio-frequency camouflaged patterns can be incorporated into the surfaces of the device to provide additional protection from electromagnetic surveillance technologies. Such patterns can be produced by varying the extent to which various portions of the device absorb and/or reflect these non-optical electromagnetic frequencies, such as by variably disposing one or more electromagnetically reflecting or absorbing materials on or in the apparatus. Such apparatus can be used to conceal equipment, personnel, and/or other items, such as for military operations, intelligence gathering operations, and/or other purposes.

Further, the device optionally can be made of a membranous, heat-resistant, polymeric material coated with a highly reflective surface material, whereby the apparatus can provide temporary protection from fire and/or the associated radiant thermal energy released from combustion. Alternatively, the apparatus can further incorporate an optional fluorescent or re-radiating external surface to aid nighttime location of the apparatus, which, upon illumination by a source of invisible ultraviolet radiation, will re-radiate light in the visible spectrum, thus allowing detection.

Further, the apparatus 600 configured as an inflatable shelter (or configured for other purposes) can optionally have one or more of its inflatable elements (e.g., safety shield, support rings, central chamber, and/or cover) filled with dense material (e.g., sand, dirt, gravel, and/or the like) to provide ballistic protection against small shrapnel and small arms fire, to provide thermal mass for heat stabilization, and/or for other purposes. Note that the dense material optionally may be removed or emptied from inflatable elements, such as to facilitate or permit portage and/or storage. Alternatively, one or more of the inflatable elements optionally may be filled with a hardenable material (e.g., concrete, mortar, plaster, expanding polymer foam, and the like) to provide a sturdy, substantially permanent shelter upon the chemical setting or curing of the hardenable material. Alternatively, one or more of the inflatable elements of the apparatus can be filled with water, such as to produce a sturdy, semi-permanent or seasonal (e.g., winter) shelter upon freezing of the water to form ice in an adequately cold environment, or to provide an underwater structure or shelter, such as artificial reef.

Further, the apparatus can optionally be configured as a super-ambient or sub-ambient pressure clean room or shelter to, respectively, prevent contaminants from entering the interior region of the apparatus when deployed as a shelter, or prevent contaminants from being released from the interior of the apparatus when it is being used as a containment vessel.

Figure 21D:
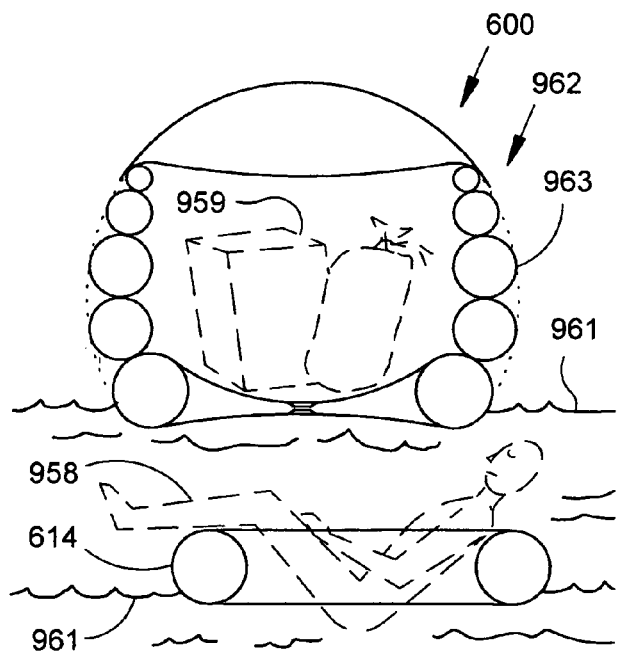

FIG. 21D depicts the modular multi-function apparatus 600 in a partially disassembled and reconfigured condition 962, wherein the toroidal base ring 614 is being used as an open flotation device to support a person 958 on water 961, and the remainder of the apparatus is being used as an enclosed flotation device 963 or weather-resistant gear closet to protect gear 959. Note that an apparatuses configured as a water floatation device or shelter may optionally include a radar reflector, such as may be provided by an assembly of the three orthogonally oriented, electromagnetically reflective membranes, which can be mounted within the apparatus to reflect incident radar back to its source, such as for search and rescue operations, providing a navigation marker, or for other purposes. The apparatus optionally may further comprise a brightly colored external surface to facilitate search and rescue operation, to provide a visible navigational aid, and/or other purposes.

The apparatus can also be used as a portable cage, terrarium, aquarium, greenhouse, frost shield, and the like. These applications can be facilitated by the inclusion of an integral or removably attached cover, such as a transparent cover (not shown) to enable use as a greenhouse, or a fine mesh cover (not shown) to enable use as a cage for small animals or insects. Note that such a fine mesh cover can also be used as an insect shield (e.g., mosquito net) when using the device as a shelter, incubator, and the like.

Also note that the apparatuses described above and depicted in FIGS. 22A-D can optionally have membranous cavities (such as rings, reflector chambers, hemispherical supports and the like), which may be filled with insulating material such as dried biomass, crumpled paper, cloth, and the like.

Figure 22A:
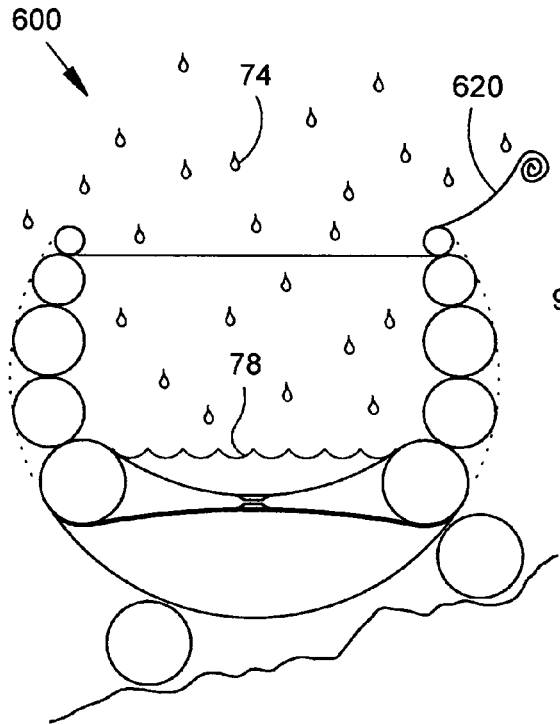
FIGS. 22A-C are schematic cross-sectional views of the modular multi-function apparatus being used as a water collection, storage, and processing apparatus.

FIGS. 22A-G: Operation as a Water Collection, Storage, and Processing Apparatus FIG. 22A depicts the modular multi-function apparatus 600 being used to provide potable water 78 by capturing, purifying, and/or storing precipitation 74 (or other sources of water), wherein additional collection area is optionally provided by an outwardly extended safety cover 620.

Figure 22B:
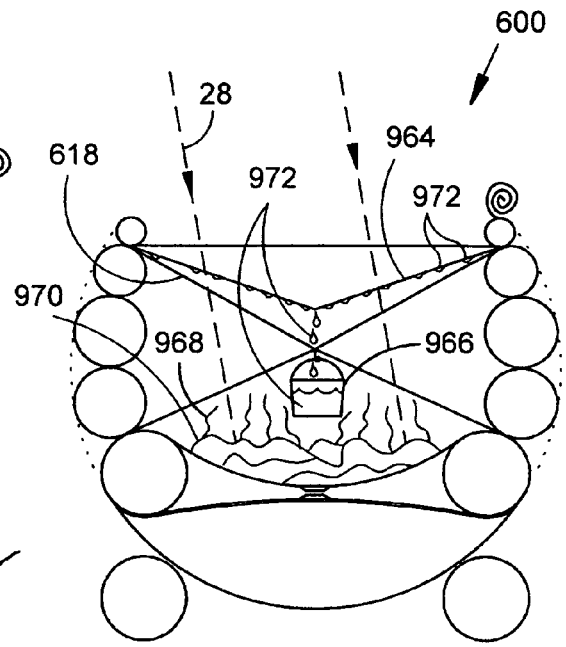

FIG. 22B depicts the modular multi-function apparatus 600 being used in conjunction with a transparent cover 964 and a liquid collection vessel 966 to produce potable water by first condensing onto the transparent membrane 964 the water vapor 968 emitted from moist materials 970 placed within the apparatus 600 and passively heated by solar radiation 28, and then collecting the resulting condensate 972 in the collection vessel 966. The collection vessel 966 is shown supported by the cable-stayed focal point support 618; however, it can be alternatively supported, such as by attaching it to the transparent cover 964, which is particularly useful when the moist materials are optionally heated by concentrated energy at the focal point. Note that an apparatus configured as a plant growth chamber also can be used as a to provide potable water, wherein the moisture transpired by the plants can be condensed and collected. Accordingly, the apparatus can be used to process non-potable water into potable water. Note that the apparatus shown in FIG. 22B also can be used as a dehydrator, dryer, or curing chamber by providing a means for exhausting vapor from the chamber, such as a partially open cover 964, or an open valve or loading port.

Figure 22C:
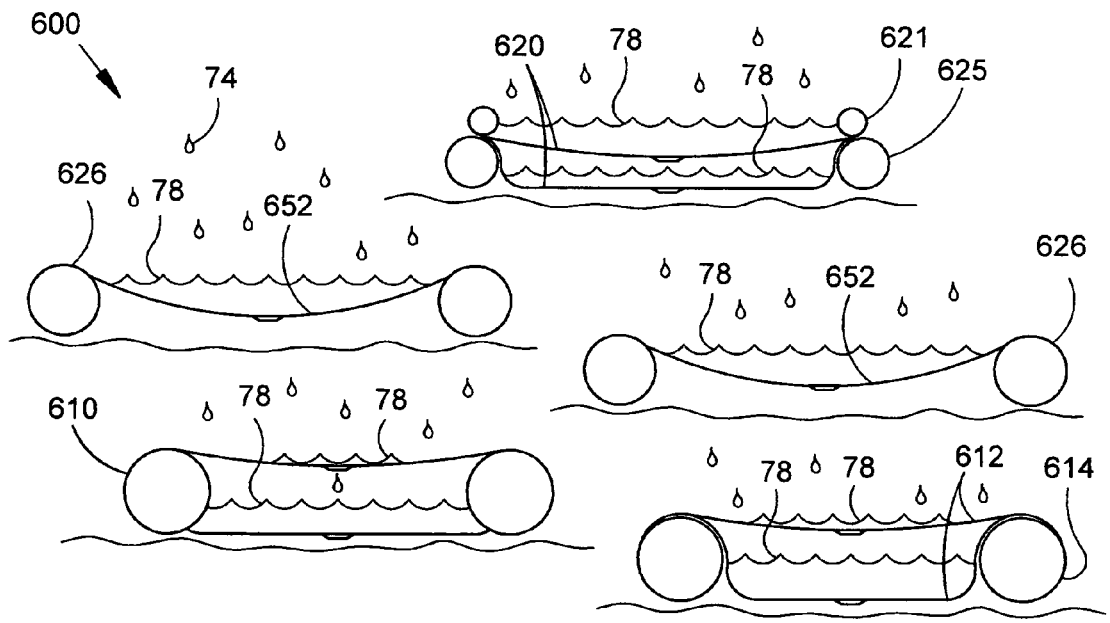

FIG. 22C depicts a disassembled and reconfigured modular multi-function apparatus 600 being used to provide potable water 78 by collecting precipitation 74 and/or dew, wherein the collection area of the apparatus is greatly increased as a result of separating its basic modular components. Note that accessory membranes, such as removable covers 620, removable spherical support 612, removable reflective membranes 652, and/or removable reflector chambers, are shown attached to the various toroidal rings 614, 625, 626 of the disassembled modular apparatus 600 to provide a water collection surface. Also note that water collection membranes attached to an upper portion of a water collecting apparatus optionally may have a substantially cone-like shape to facilitate efficient and rapid inflow of the collected precipitation into the liquid storage chamber below.

Note that the water collecting apparatuses disclosed herein alternatively can be used to collect and/or hold other materials, such as oils, granular materials, food crops, and the like.

FIGS. 22D-G depict the basic multi-function apparatus 610 being used as various types of water purification apparatuses.

Figure 22D:
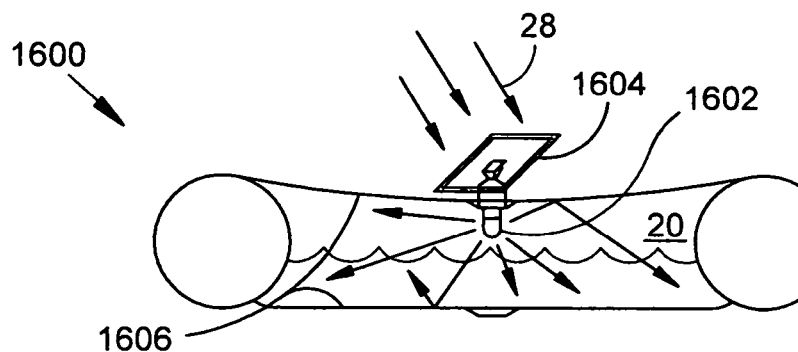
FIGS. 22D-G are schematic cross-sectional views of the modular multi-function apparatus being used as a water purification apparatus including, respectively, a UV light sterilizing apparatus, a thermal sterilizing apparatus, an electrostatic de-ionizing or desalinating apparatus, and a titanium-dioxide-catalyzed UV sterilizing apparatus.

In particular, FIG. 22D depicts the basic multi-function apparatus 610 being used as a ultraviolet (UV) light sterilizing apparatus 1600, wherein the apparatus 610 further includes a UV light-emitting device 1602 disposed within the central chamber 20. The UV-emitting device 1602 is shown optionally being powered by a photovoltaic device 1604, which is energized by radiant electromagnetic energy emitted from the sun 28; however, the UV-emitting device 1602 may alternatively be energized by other power sources (not shown), non-limiting examples of which include an electrical battery, an electrical generator, (such as may be driven by a wind or water turbine, a water wheel, a wave-energy extracting device, or a manually powered generator cranking device), or other common power sources. It should be noted that a relatively short exposure to UV light is effective for killing harmful biological pathogens, thus rendering the water potable. Accordingly, a low-powered photovoltaic device can be used, optionally in conjunction with a rechargeable battery (chemical or capacitive) and an optional timer or controller, to energize the UV-emitting device either continuously or intermittently. To enhance performance, an optional layer of UV reflective material 1606 such as magnesium fluoride may be applied to the interior of the chamber, whereby any UV radiation not absorbed during its initial pass through the water may be reflected back into the water to enhance sterilization.

Figure 22E:
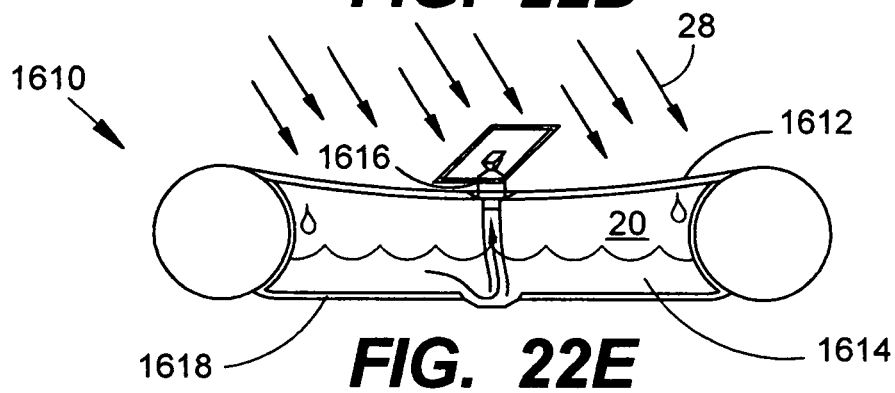

FIG. 22E depicts the basic multi-function apparatus 610 being used as a thermal sterilizing apparatus 1610, wherein the apparatus 610 includes a radiant energy-absorbing upper membrane device 1612, which may be exposed to radiant energy (such as solar energy 28, or energy emitted from a campfire) to heat the liquid, e.g., water 1614, contained within the central chamber 20. Note that the energy-absorbing membrane device 1612 can be a single high-emissivity (e.g., matte black) membrane. Alternatively, the energy-absorbing membrane device 1612 can be a multi-layered and/or insulated membrane device, non-limiting examples of which are presented herein below (see FIGS. 35F-O). To enhance heating performance, the water in the central chamber 20 can be circulated either by an optionally PV-energized pump apparatus 1616 as shown, or by natural convention. Note that an optional layer of insulation 1618 can be disposed to insulate the reflector chamber as shown.

Figure 22F:
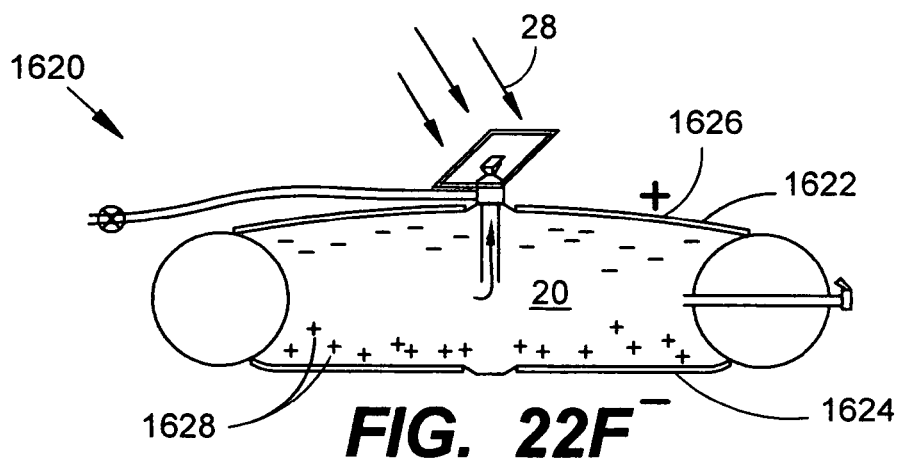

FIG. 22F depicts the basic multi-function apparatus 610 being used as an electrostatic de-ionizing or desalinating apparatus 1620, wherein the apparatus 610 includes one upper and one lower central membrane 1622, 1624 each having an electrically insulated, electrically conductive layer 1626, whereby water can be at least partially de-ionized and/or desalinated by electrostatically charging the two membranes (one generally being positively charged, and the other generally being negatively charged), which will then draw the ions suspended in the water solution toward the charged membranes, thereby reducing the concentration of ions 1628 in the water disposed approximately midway between the charged membranes.

Figure 22G:
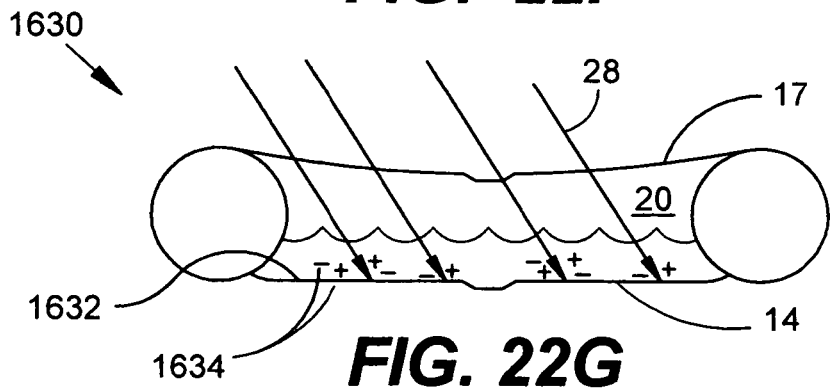

FIG. 22G depicts the basic multi-function apparatus 610 being used as a titanium-dioxide-catalyzed UV sterilizing apparatus 1630, wherein the apparatus 610 includes a transparent upper central membrane 17 and a lower central membrane 14 having a layer 1632 of titanium-dioxide disposed on its inner surface, whereby water in the central chamber 20 can be sterilized by exposing the apparatus 1630 to a source (not shown) of ultraviolet (UV) radiation (such as the sun), which interacts with the titanium dioxide layer 1632 to produce pathogen-killing ions or free radicals 1634. Note that the various water purification apparatuses disclosed herein optionally can incorporate one or more alternate or supplemental water-sterilizing accessory elements, non-limiting examples of which include: a dispenser device operable to dispense pathogen-killing chemicals (e.g., chlorine, ammonia, iodine, ozone, or other materials) into the water to be purified; an electrically powered ion generating device operable to produce pathogen-killing ions or free radicals within the water to be purified; a bacteriostatic medium disposed to contact the water to be purified and/or preserved (e.g., a silver or silver-containing layer disposed on an inner surface of the central water-fillable chamber); a fine filtration device (e.g., a ceramic filter, reverse osmosis device, and the like) operable to filter microscopic pathogens (e.g., giardia) from water; and/or a filtration media containing-device or container that contains (or is operable to contain) one or more filtration media (e.g., activated carbon, sand, diatomaceous earth, fibrous material, and the like).

Further, note that the various water purification devices and/or water purification accessory elements disclosed herein optionally can be incorporated into the present invention either integrally (i.e., permanently attached), or removably (i.e., separably attached).

Additionally, note that several of the water purification devices and/or water purification accessory elements disclosed herein may require electrical or mechanical power to operate, and that power may optionally be provided by one or more of the devices as noted above in relation to FIG. 22A, as described elsewhere herein, or as known to the user of the apparatus.

Figure 23E:
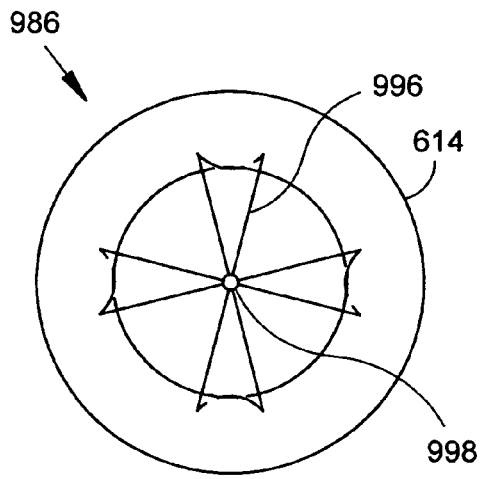
Figure 23F:
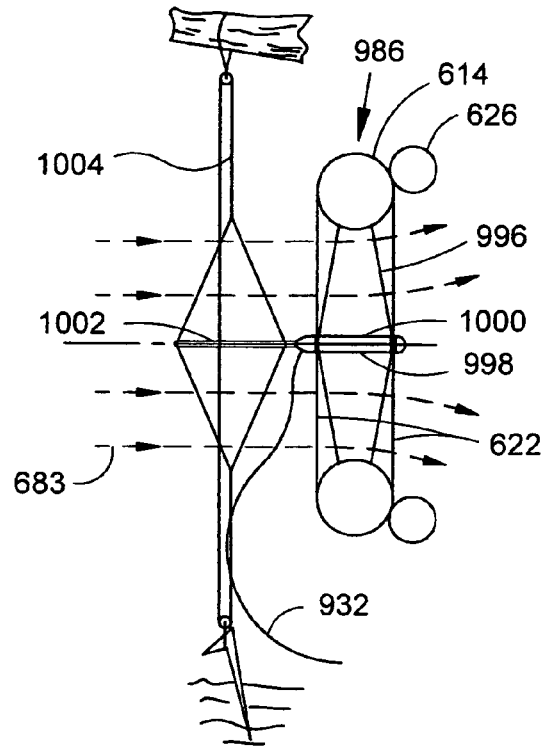
Figure 23G:
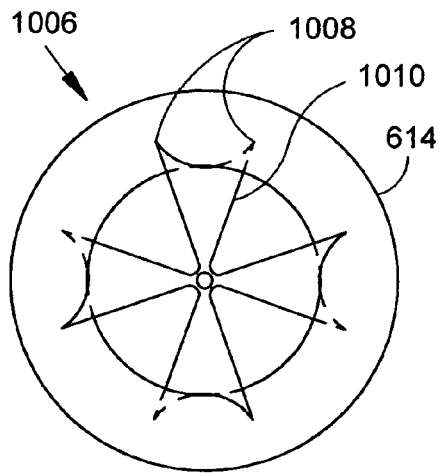
Figure 23H:
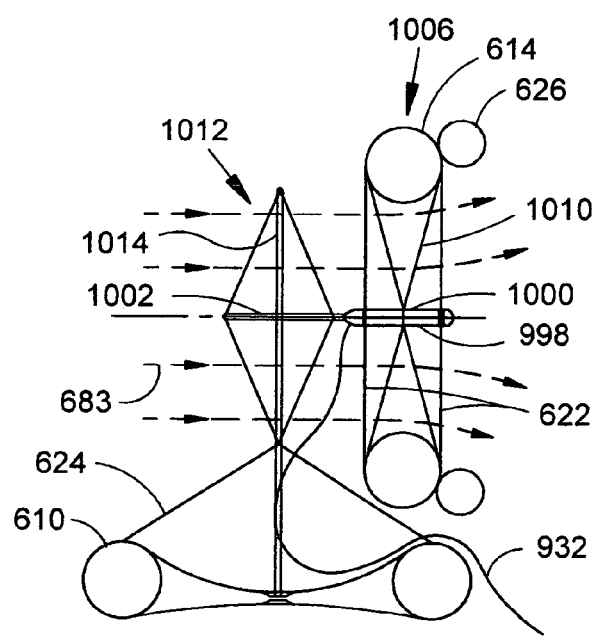
Figure 23N:
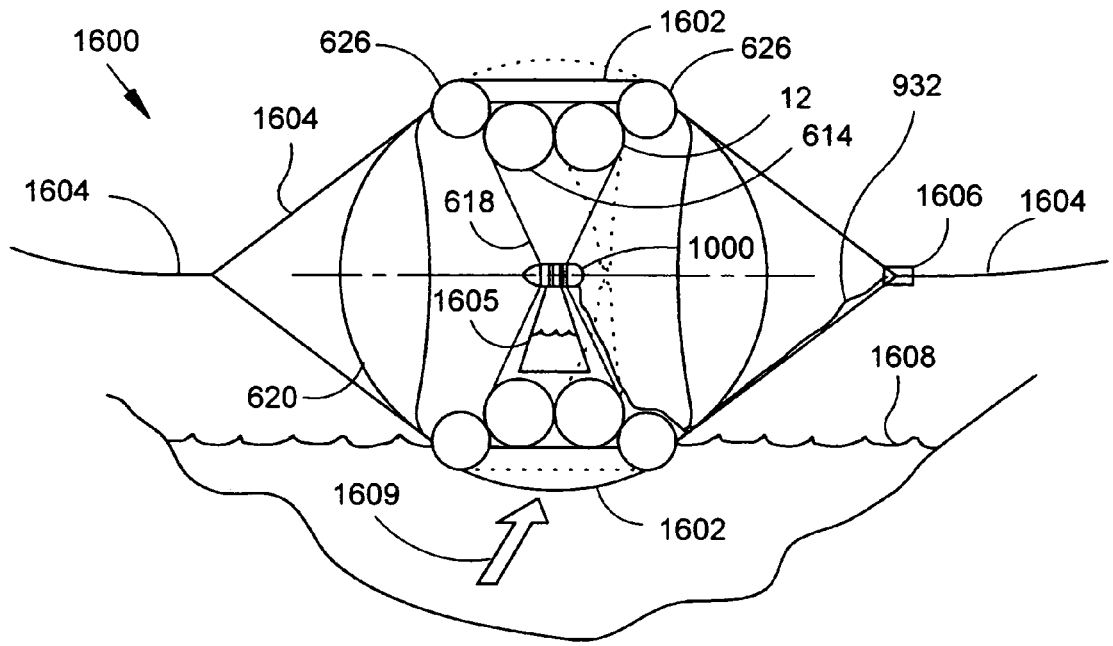
FIGS. 23N-P are, respectively, a schematic cross-sectional view, a schematic front elevational view, and a schematic side elevational view of the modular multi-function apparatus (or modules thereof) configured and being used as part of a water wheel or wind turbine apparatus for generating mechanical and/or electrical power.
Figures 23O, 23P:
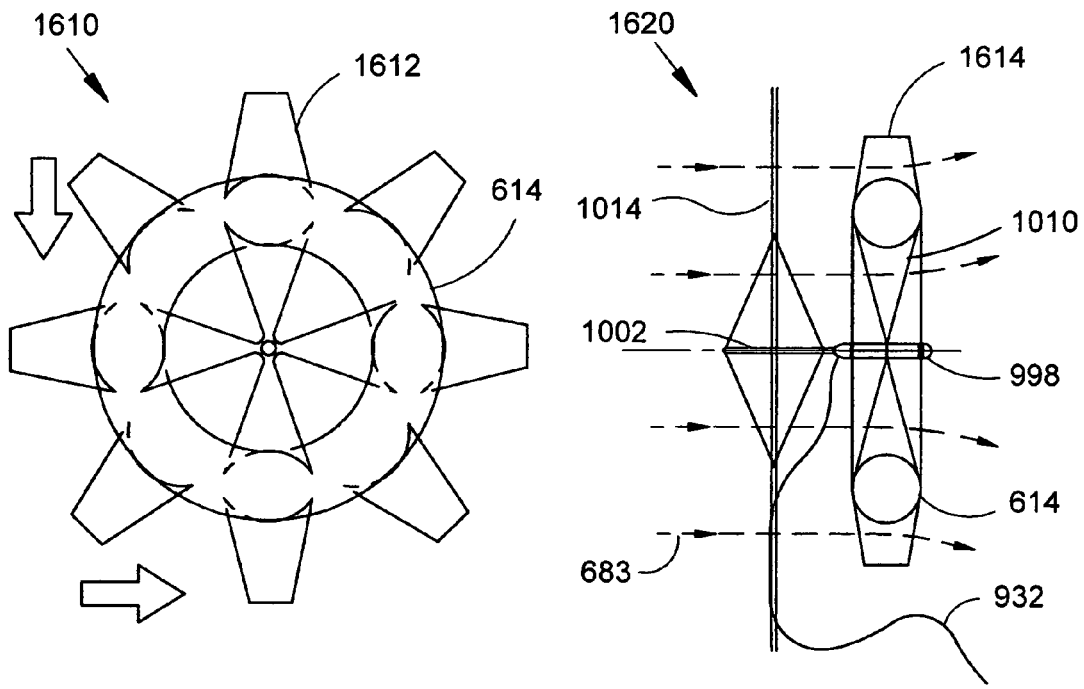

FIGS. 23A-P: Operation as a Wind Turbine or Water Wheel

FIG. 23A depicts a reconfigured modular multi-function apparatus 980 being used to harness wind energy, wherein a lightweight accessory wind turbine generator device 982 is mounted via the cable-stayed focal point support 618 within the inflatable safety cage 616 (shown with a safety net or mesh 622 covering one end of the safety cage 616), which is supported horizontally, facing the wind 683, by the remaining modules of the apparatus. Conduits 932 are provided for transmitting electrical and/or mechanical power to other accessory apparatus (not shown).

FIG. 23B depicts a reconfigured multi-function apparatus 984 being used to harness wind energy, wherein the lower inflatable toroidal support ring 614 is utilized as part of a lightweight inflatable wind turbine 986 to structurally stabilize very lightweight collapsible (membranous) accessory wind turbine blades 996, which are mounted aft of the inflatable safety cage 616 on a horizontal accessory rod 988 to facilitate wind-pointing.

FIG. 23C depicts a reconfigured multi-function apparatus 990 being used to harness wind energy, wherein an accessory wind turbine device 982 is supported (via structural safety net 622 having an optional central mounting hub 1020 and/or via cable-stayed support 618) within the inflatable toroidal support ring 614, which has its wind-facing side movably attached to a vertical line support 992 (shown attached to an upper support, such as a tree branch, and a lower support, such as a ground stake) to enable wind-pointing, and which further utilizes an inflatable ring 626 from the safety shield 616 attached to its aft side, both to augment airflow through the turbine and to further enhance wind-pointing.

FIG. 23D depicts a reconfigured multi-function apparatus 994 being used to harness wind energy in a manner similar to that depicted in FIG. 23C, but further including additional inflatable rings 625 optionally from the safety cage 616, located between the line support 992 and the wind-facing side of the toroidal support ring 614 to promote venturi-type flow augmentation through the wind turbine, and to further enhance wind-pointing.

FIG. 23E depicts a wind-facing view of a collapsible lightweight wind turbine 986 formed by attaching a plurality of flexible membranous blades 996 to one of the inflatable toroidal support rings 614 in such a manner so as to provide twist in each blade 996 (i.e., the blade angle decreases with increasing radius) both to enhance aerodynamic performance and to facilitate connection to a central axial hub 998.

FIG. 23F depicts the lightweight wind turbine 986 depicted in FIG. 23E being used to produce electrical power, wherein the wind turbine 986 is attached to a generator 1000 mounted on a horizontal shaft 1002, which is movably connected to a vertical cable support 1004 to enable wind-pointing, and to permit the apparatus to be elevated into higher velocity wind streams.

FIG. 23G depicts a wind-facing view of a collapsible lightweight wind turbine 1006 formed by attaching the tips 1008 of a plurality of simple, generally non-twisted, flexible membranous blades 1010 to one of the inflatable toroidal support rings 614, wherein the plurality of blades is economically fabricated primarily from a single flexible membrane.

FIG. 23H depicts the lightweight wind turbine 1006 depicted in FIG. 23G, wherein the wind turbine 1006 is attached to a generator 1000 mounted on a horizontal shaft 1002, which is movably connected to a stand 1012 formed in part by a vertically oriented accessory rod 1014 attached to the basic inflatable reflector apparatus 610 and stabilized by a plurality of cables 624.

FIG. 23I depicts a wind-facing view of a lightweight wind turbine 1016 formed by attaching a slotted, pre-formed membrane 1018 having a central mounting hub 1020 to the front side of the inflatable toroidal support ring 614, and by further attaching a structural safety net 1022 (e.g., a safety net 622 further having a central hub 1020) to the aft side of the inflatable toroidal support ring 614, wherein the two central hubs 1020 are used to stably mount the wind turbine to the shaft of a generator (not shown).

FIG. 23J depicts the slotted-membrane wind turbine 1016 depicted in FIG. 23I, wherein the turbine blades 1024 are formed by locally slitting and pre-deforming a substantially conical membrane 1026.

FIG. 23K depicts a slotted-membrane wind turbine 1028 similar to that depicted in FIG. 23I, wherein the turbine blades 1030 are formed by locally slitting and deforming a substantially planar membrane 1032.

FIG. 23L depicts a slotted-membrane wind turbine 1034 similar to that depicted in FIG. 23I, wherein the turbine blades 1036 are formed by locally slitting and deforming a shallow, concave, substantially spherical membrane 1038.

FIG. 23M depicts a slotted-membrane wind turbine 1040 similar to that depicted in FIG. 23I, wherein the turbine blades 1036 are formed by locally slitting and deforming a deeply concave, substantially spherical membrane 1038 that is alternatively attached to the aft end of the toroidal support ring 614 so as to not interfere with the stabilizing structural safety nets 1022 mounted to the front and aft sides of the toroidal support ring 614.

FIGS. 23N-P are a schematic cross-sectional view, a front elevational view, and a side elevational view of the modular multi-function apparatus (or modules thereof) configured and being used as part of a water wheel or wind turbine apparatus for generating mechanical and/or electrical power.

FIG. 23N depicts the modular apparatus reconfigured as a water wheel assembly 1600 mounted above a stream 1608 on a cable support 1604. The support rings 12, 614, 626, 626 support a membranous water catchment element 1602 employed to react against the current 1609. A generator 1000 employs a weight-fillable pouch 1605 to react the load (torque) induced by the water wheel assembly 1600 on the generator 1000. Electrical power is delivered through conduit 932 and electrically connected slip ring assembly 1606 to any device requiring power (not shown).

FIG. 23O depicts elements of the modular apparatus reconfigured as a water wheel assembly 1610, wherein blades 1612 are attached to the outer periphery of the support ring 614 to harness fluid stream energy from tangential flow (as indicated by the arrows) and/or axial flow, depending on the selected attachments points of the blades 1612 to the ring 614. Note that multiple water wheels may optionally be connected in parallel along a support (e.g., anchoring line, rope, cable, and the like) extending across a wide stream or river for generating greater amounts of electrical power.

FIG. 23P depicts elements of the modular apparatus reconfigured as an axial fluid turbine 1620, wherein blades 1614 are attached to the outer periphery of the support ring 614 to harness energy from an axial fluid stream 683.

The invention also provides that the inflatable support ring (or other elements) may be filled with water, air, and/or lighter-than-air gas to provide a negatively, neutrally, or positively buoyant apparatus, which may be used underwater, on a water or land surface, and/or in the air to facilitate, enhance, or enable capture of fluid stream energy. Wind turbines optionally may be elevated into the atmosphere by a ground-tethered kite, balloon, dirigible, and the like.

Figure 23Q:
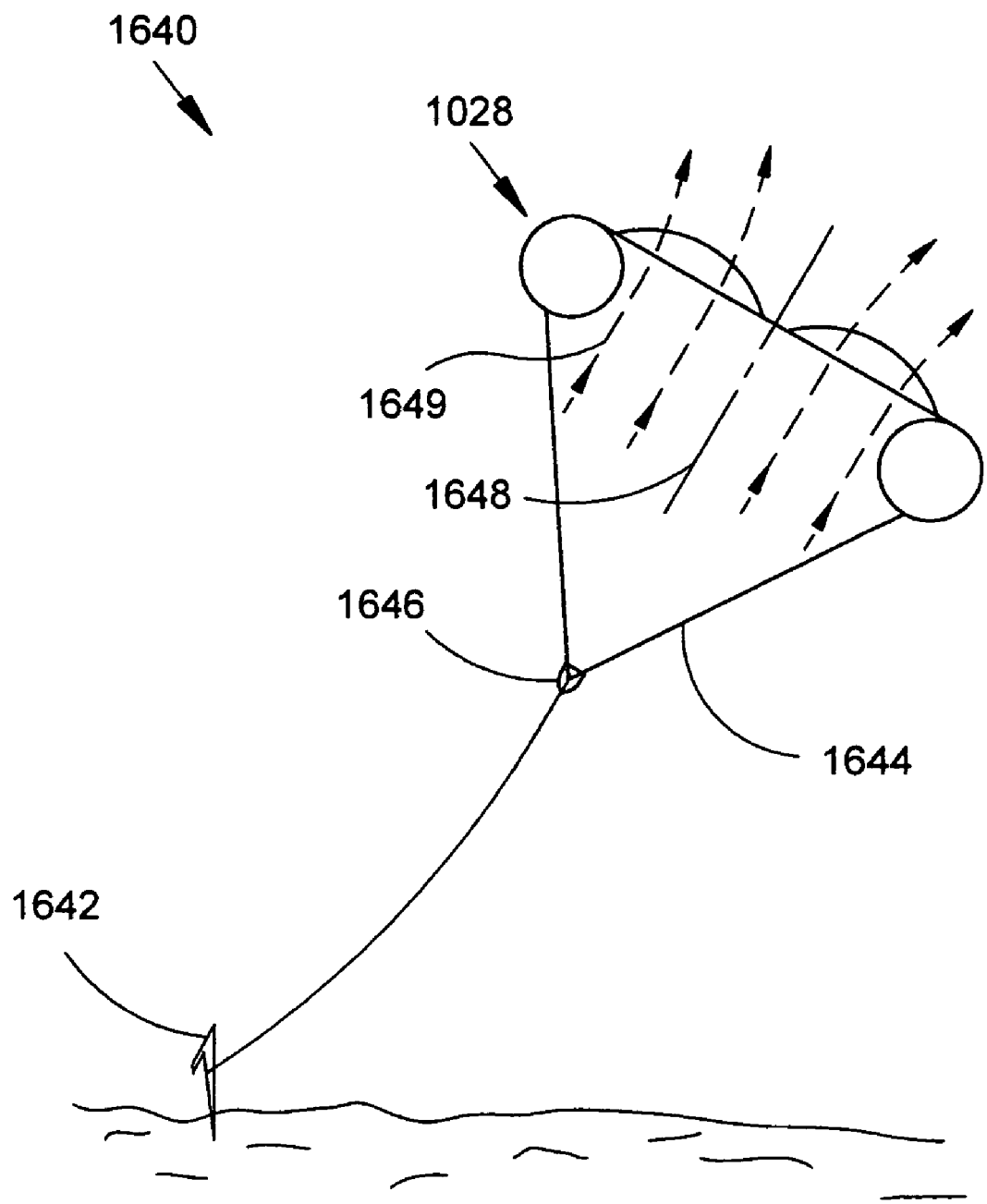
FIG. 23Q is a schematic side-elevational cross-sectional view of the modular multi-function apparatus (or modules thereof) being used as part of a lighter-than-air wind turbine apparatus tethered to a ground support.

FIG. 23Q is a non-limiting example, depicting the modular multi-function apparatus alternately configured and being used as a ground-tethered, lighter-than-air wind turbine apparatus 1640 tethered to a ground support 1642 using a cable assembly 1644 having a rotating swivel device 1646, whereby the apparatus will rotate about its axis 1648 in response to wind 1649. By optionally further providing alternating colors, patterns, and/or indicia on an external surface of the apparatus, the apparatus, when rotating in the wind, will provide a dynamic or changing appearance when viewed by a person or an imaging device. Note that a plurality of wind turbines optionally can be attached in series along a tether, and that such a plurality of turbines can be selected or configured to rotate in opposite directions (i.e., "counter-rotate"), whereby an electrical generator device (or other apparatus) optionally can be disposed between and attached to the counter-rotating turbines to generate electricity, which optionally can be used, as non-limiting examples, to power a lamp such as to illuminate the aerial turbine assembly, or to transmit electrical power by an optionally conductive tether assembly to any device requiring electrical power. Note that the plurality of turbines optionally can be of various different sizes, shapes, and/or colors for practical and/or aesthetic purposes.

FIGS. 24A-D: Operation for Miscellaneous Applications

FIG. 24A depicts the modular multi-function apparatus 600 being used as a high-gain directional sound-amplification device 1050, wherein an accessory microphone 140 is attached at the focal point 26 via the cable-stayed support 618 and connected via conduit 932 to an amplifying headset 1052 to listen, for example, to the auditory chirp of a bird 138. Note that the naked ear (not shown) can also be placed in proximity to the focal point to hear distant and/or faint sounds.

FIG. 24B depicts the modular multi-function apparatus 600 being used as a fermentation apparatus 1054 to harness chemical energy from chemical substances by attaching an anaerobic airlock or pressure-relief valve 87 to the upper central membrane 14 to ferment materials 1053 located in the chamber 20. Note that the portable fermentor apparatus optionally can be deployed (e.g., floated) on water to provide temperature stabilization. Also note that, depending on the filler materials used, the apparatus can be used to produce various alcohols, acetic acid solutions, or aerobically or anaerobically produced flammable hydrogenic gasses such as molecular hydrogen, methane, propane, ethane and the like. Additionally, the apparatus can be used as a waste digesting apparatus, whereby organic waste materials can be processed to yield a benign state and/or to provide useful products, such as organic fertilizers for agricultural and/or horticultural purposes.

FIG. 24C depicts the modular multi-function apparatus 600 being used as a filtering apparatus 1056 to sieve or filter liquid and/or solid materials by attaching suitable accessory meshes 1058 and/or other filter media to the apparatus 600.

Figure 24E:
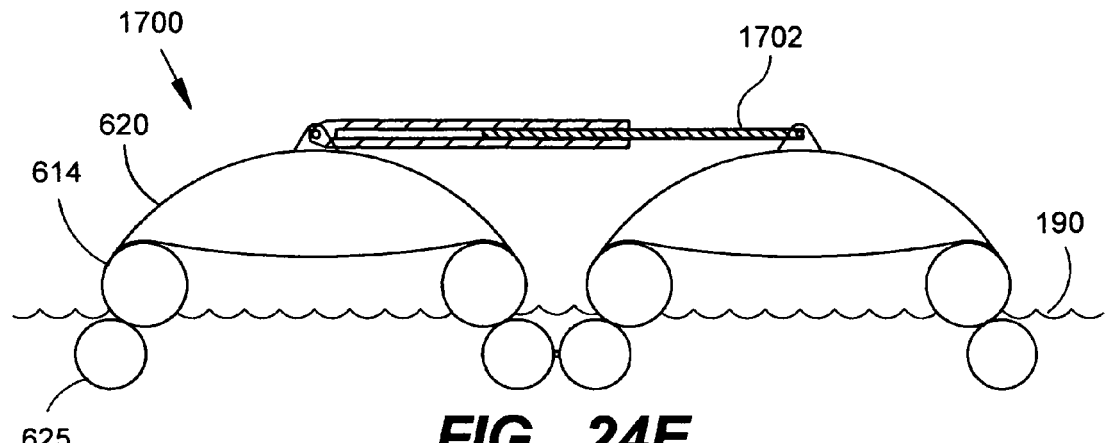
FIGS. 24E-G are schematic cross-sectional views of the modular multi-function apparatus configured and being used to harness mechanical energy or wave energy from an undulating fluid surface (e.g., ocean waves).
Figure 24F:
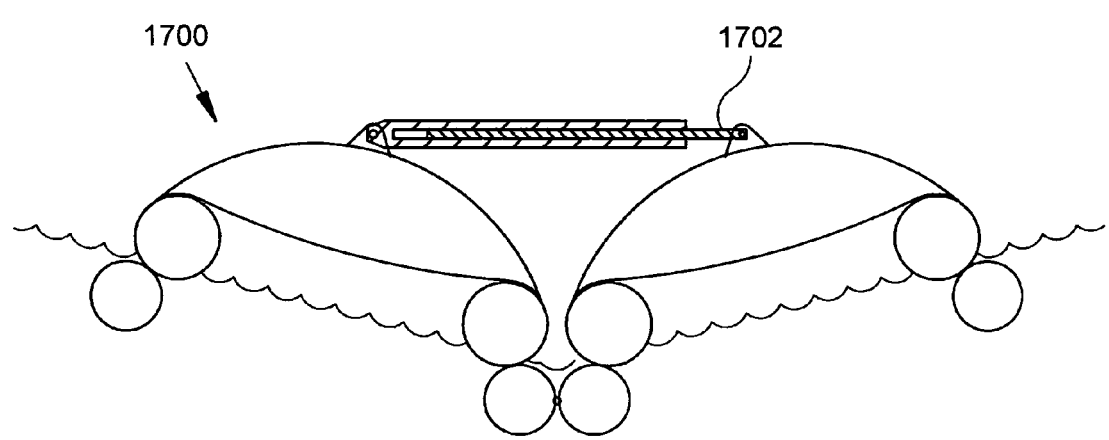
Figure 24G:
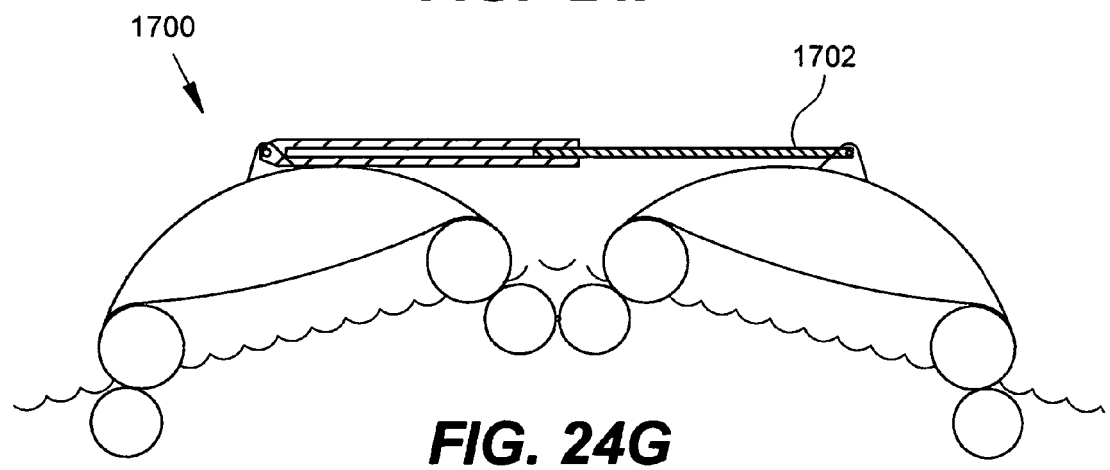

FIG. 24D depicts the modular multi-function apparatus 600 being used as a floating aquatic chamber 1060 to hold live fish 1062, such as for aquacultural or other purposes. Note that the rings of safety shield 616 are shown inflated with water. FIGS. 24E-G depict the modular multi-function apparatus reconfigured and being used to harness mechanical energy or wave energy from an undulating fluid surface (e.g., ocean waves).

FIG. 24E depicts the wave energy harnessing apparatus 1700 (located on the surface of a body of water, such as the sea 190), wherein two rotatably attached (via attachment means not shown) gas-inflated support rings 614 (and/or 12) support weight-fillable (e.g., water-fillable) rings 625 on the lower side, and inflatable covers 620 (and/or spherical supports 612) on the upper side. The covers 620, further support a mechanical energy harnessing assembly 1702 in a nominal position. The energy harnessing assembly optionally includes, as one non-limiting example, a linear piston assembly, which may be used in concert with one or more conduits (not shown) as a pump to convey water, or to force water through a filter and/or desalination apparatus, such as to provide potable water. As a second non-limiting example, the energy harnessing assembly can be a linear electrical generator, which in concert with an electrical conduit (not shown), can provide electrical power such as to charge a battery.

FIG. 24F depicts the wave energy harnessing apparatus 1700 (located in the trough of a wave) with the mechanical energy harnessing assembly 1702 in a compressed position.

FIG. 24G depicts the wave energy harnessing apparatus 1700 (located on the crest of a wave) with the mechanical energy harnessing assembly 1702 in an extended position. Note that the mechanical energy-harnessing device 1702 may comprise piston and cylinder arrangement a generator, a pump, a filter, a desalination unit (e.g., reverse osmosis unit), and/or any other suitable mechanical energy activated device. Other accessory elements may be incorporated into apparatus 1700, such as suitable conduits (not shown) for transferring electrical energy, pumped fluids, desalinated water, or other products of the apparatus to a selected location within or external to the apparatus 1700 for storage or use.

Figure 24H:
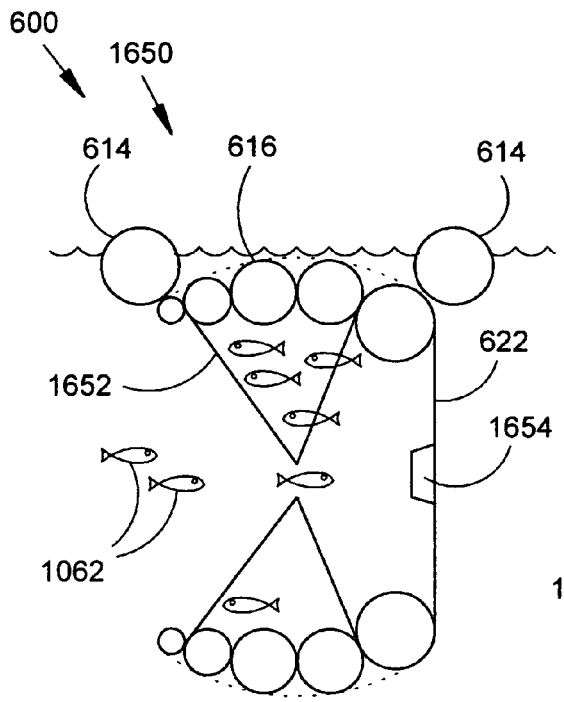
FIGS. 24H-K are schematic side-elevational cross-sectional views of the modular multi-function apparatus (or modules thereof) configured and being used as, respectively, a fish trap, a self-provisioning fish trap or aquatic chamber, a marine material collector employing a selectively-permeable membrane, and material collector and/or separator employing a selectively transmissive valve.

FIG. 24H depicts the modular multi-function apparatus 600 (or modules thereof) alternately configured and being used as a fish trapping apparatus 1650, wherein an accessory tapered "lead-in" net 1652 is attached to one end of a water-filled safety shield 616, which further has a mesh or net 622 attached to its opposing end, and which is further shown optionally supported by a gas-inflated, floating support ring 614 (or 610). The trapping apparatus 1650 can optionally further include one or more securing apparatus not shown (e.g., a cable, line, chain, anchor, and the like) operable to substantially fix the position of the apparatus, to resist water currents, and/or to tow the apparatus through water. Note that by attaching the securing apparatus to the end of the safety shield 616 to which the lead in net 1652 is attached, the apparatus will tend to orient itself in a water current whereby fish 1062 (or other marine life, or other waterborne items or materials) will be drawn into the tapered lead-in net and, thus, the trap by the current. The trapping apparatus 1650 optionally also can include one or more attracting devices 1654 operable to attract fish (or other marine life). Note that such attracting devices 1654 may include, as non-limiting examples: a device for holding bate, a lure, a decoy, a luminous or light-emitting device, a sound-emitting device, an electric-field-emitting device, and the like. Note that a similarly configured apparatus may also be used to trap land animals and/or flying animals (e.g., birds, insects, and the like).

Figure 24I:
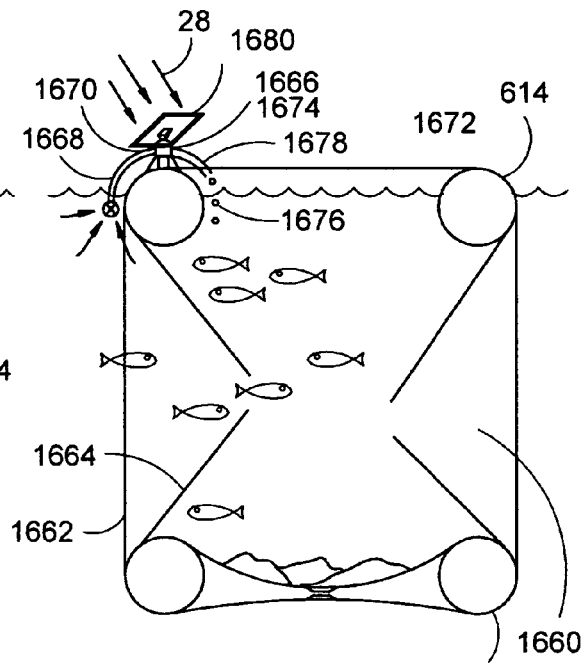

FIG. 24I depicts the modular multi-function apparatus (or modules thereof) alternately configured and being used as a self-provisioning fish trap or aquatic chamber 1660, wherein an accessory net or mesh 1662 having a tapered "lead-in" section 1664 is disposed between and upper gas-inflated, floating support ring 614 (or 12, 625, or 626) and a lower support ring 12 (or 614, 625, or 626) that is alternatively filled with water and/or other dense material so as to deploy the lower ring without creating buoyant forces. The self-provisioning apparatus 1660 further includes an optional accessory feeding apparatus 1666 operable to extract via a conduit 1668 and filter 1670 various biological materials (e.g., algae, plankton, protozoa, krill, seaweed, or other marine life) from the surrounding water 1672, and subsequently pelletize or otherwise aggregate the extracted materials using a compaction unit 1674, wherein the aggregated materials 1676 may then be dispensed using a dispenser unit 1678 to provide food for the marine animals contained within the aquatic chamber. The feeding apparatus is shown being powered by a photovoltaic device 1680, which is energized by radiant electromagnetic energy emitted from the sun; however, the feeding apparatus 1666 may alternatively be energized by other power sources (not shown), non-limiting examples of which include a wind or water turbine, a water wheel, a wave-energy extracting device, and the like.

Figure 24J:
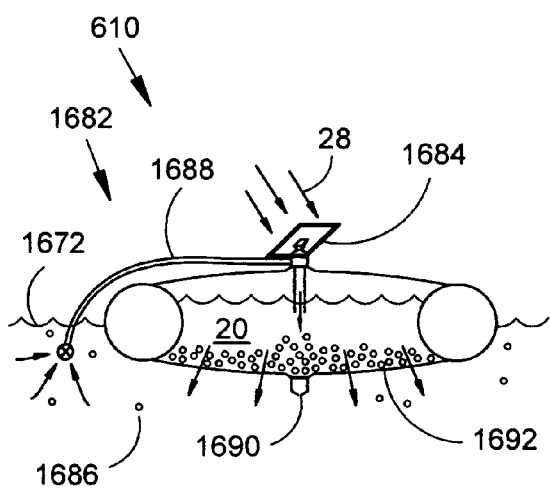

FIG. 24J depicts the modular multi-function apparatus (or modules thereof) alternately configured and being used as a floating marine material collection apparatus 1682, wherein apparatus 610 further comprises an accessory pump assembly 1684 operable to draw water 1672 and waterborne materials 1686 via conduit 1688 into the central chamber 20, wherein the waterborne materials collected from the marine environments are stored. Note that excess water contained within the central chamber can be drained through a lower valve 1690 having a selectively permeable mesh or filter, which prevents the collected waterborne materials from exiting the chamber, thereby effectively collecting and concentrating only the waterborne materials within the central chamber. Alternatively, the lower membrane 1692 can be a selectively-permeable membrane, through which the collected water may be returned to the surrounding environment while retaining the collected waterborne materials within the central chamber.

Figure 24K:
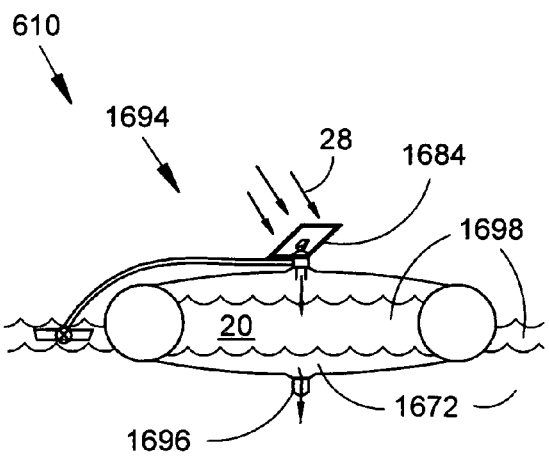

FIG. 24K depicts the modular multi-function apparatus (or modules thereof) alternately configured and being used as a floating marine material collection apparatus 1694 similar to that shown in FIG. 24J, but wherein the lower valve 1696 is a selectively transmissive valve controlled by the density, viscosity, chemistry, or other physical properties of the material entering the valve from the central chamber 20. Consequently, the apparatus 1694 can be used to separate different, generally immiscible, materials having different physical properties, such as oil 1698 and water 1672. Thus, the collection apparatus 1694 can be used to effectively collect, separate, and hold oil 1698 that has been spilled into water 1672, such as by accident.

FIG. 24L depicts the modular multi-function apparatus 600 (or modules thereof) configured and being used as an evaporative cooler and/or an evaporative material collecting apparatus 1720, wherein one or more e.g., four) permeable wicking membranes 1722 are disposed within the central portion of the safety shield 616, which is shown optionally supported in a horizontal orientation facing the warm dry wind 1724 by the support ring 614. The apparatus 1720 functions as an evaporative cooler by wetting the membranes with water, which, as it evaporates, cools the air flowing through the wetted membranes 1722 to provide cool moist air 1726. The apparatus 1720 can also function as an evaporative material collecting apparatus by wetting the membranes with, for example, sea water, which, as it evaporates, concentrates sea salt in the membranes for subsequent collection and use (e.g., as a food additive or preservative).

Although the apparatus is shown positioned such that the wind induces flow through the membranes to accelerate evaporation, note that an optional accessory fan or pump (not shown) also can be used to force air through the membranes to increase cooling capacity and/or material collection.

Figures 24, 24M:
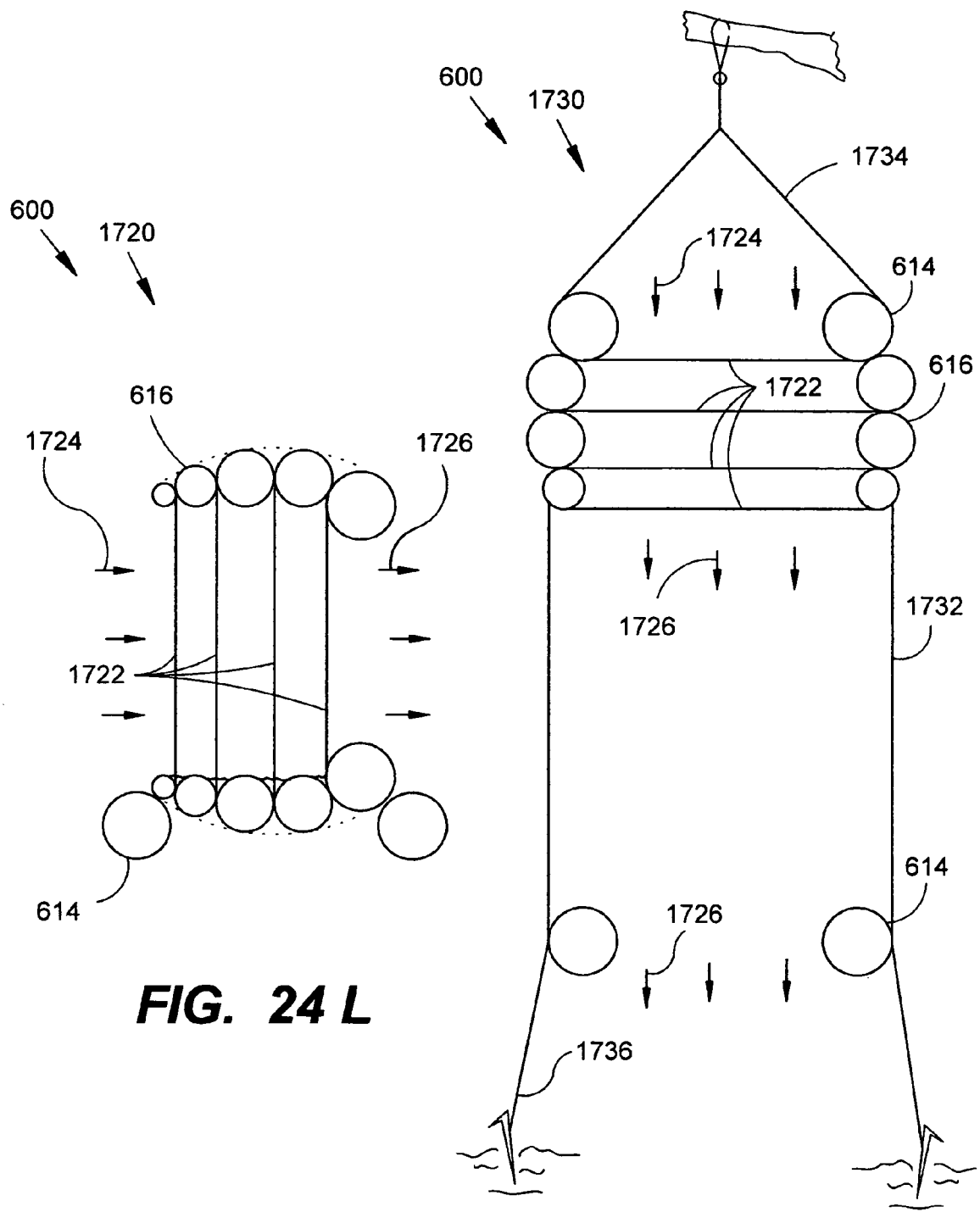
Figure 25A:
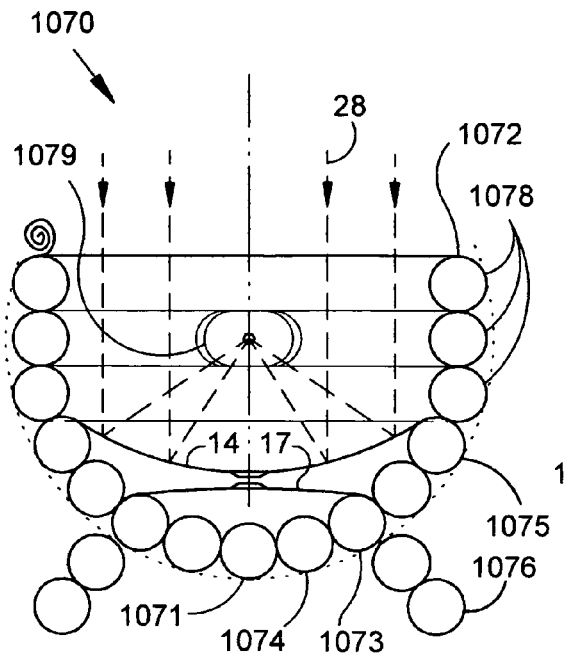
FIGS. 25A-D are schematic cross-sectional views of the modular multi-function apparatus illustrating alternate methods of constructing the inflatable spherical support, the inflatable safety shield, and the inflatable support rings.

FIG. 24M depicts the modular multi-function apparatus (or modules thereof) configured and being used as an alternate evaporative cooler and/or evaporative material collection apparatus 1730, wherein an optionally membranous accessory tube 1732 is connected between an elevated support 614 and safety shield 616 and a lower support ring 614 (or 12, 625, or 626), and wherein one or more (e.g., four) permeable wicking membranes 1722 are disposed across the vacant central portion of the upper support ring. Once again, the apparatus 1730 functions as an evaporative cooler by wetting the membranes with water, which, as it evaporates, cools the hot dry air 1724 flowing through the wetted membranes. However, instead of using the wind, fans, or pumps to induce flow through the membranes, this configuration of the apparatus utilizes the increased density of the cooled air to naturally convect or induce flow downward through the apparatus, which delivers cold air 1726 at the lower ring. The device comprises an upper supporting cable assembly 1734 and a lower cable 1736 support FIGS. 25A-D: Alternate Methods for Constructing the Spherical Support, Safety Shield, and Support Rings FIG. 25A depicts an alternate modular inflatable multi-function apparatus 1070 having a low-inflation-volume alternate spherical support 1071 and an simplified alternate inflatable safety shield or cage 1072, wherein the low-inflation-volume spherical support 1071 is formed by connecting a plurality of inflatable toroidal rings 1073, 1074 of decreasing major diameter, and the simplified inflatable safety cage 1072 is formed by connecting a plurality of inflatable toroidal rings 1078 of substantially equal minor and major diameter. Also shown is an aperture or window 1079 within the wall of the safety shield 1072 to provide an alternate means for accessing elements (not shown) positioned within the safety shield 1072. FIG. 25A further depicts low-inflation-volume alternate inflatable support rings 1075, 1076 for respectively supporting the central membranes 14, 17 and the spherical support 1071, wherein the alternate support rings 1075, 1076 each comprise a plurality of stacked inflatable toroidal rings of optionally decreasing major diameter. In addition to providing a reduced inflation volume to facilitate deployment, note that the alternate support ring 1075 accommodates a larger reflector 14 for a given outer diameter of the ring, and the alternate safety shield provides a larger primary aperture (i.e., inner diameter) for a given outer diameter of the safety shield.

Figure 25B:
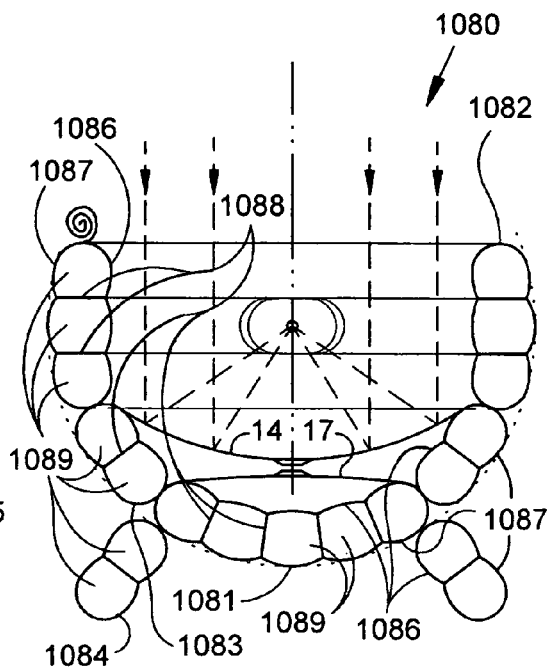

FIG. 25B depicts an alternate modular inflatable multi-function apparatus 1080 having an alternate inflatable spherical support 1081, an alternate inflatable safety cage 1082, and alternate inflatable support rings 1083, 1084 for respectively supporting the central membranes 14, 17 and the spherical support 1081, wherein each of these alternate structures comprises an inner membrane 1086 and an outer membrane 1087 joined by one or more spaced, continuous circumferential, membranous ribs 1088 (e.g., cylindrical, conical, or annular membranes) to form a plurality of optionally interconnected inflatable compartments 1089 within each structure. Consequently, note that the support rings for supporting the central membranes 14 and 17, in general, may optionally be composed of a plurality of discreet inflatable compartments.

Figure 25C:
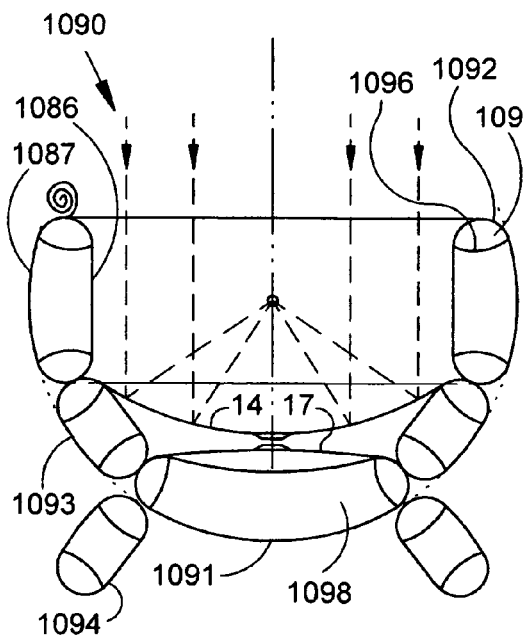

FIG. 25C depicts an alternate modular inflatable multi-function apparatus 1090 having an alternate inflatable spherical support 1091, an alternate inflatable safety cage 1092, and alternate inflatable support rings 1093, 1094 for respectively supporting the central membranes 14, 17 and the spherical support 1091, wherein each of these alternate structures typically comprises an inner membrane 1086 and an outer membrane 1087, which are joined to each other at their peripheral edges to form an inflatable pressure envelop 1095, and which are further joined by a plurality of internal, finite, circumferentially spaced, membranous ribs 1096 (e.g., substantially planar radial membranes at discrete circumferential positions) to hold the inner and outer membranes 1086, 1087 in a predetermined shape, and to form a plurality of typically (but optionally) interconnected compartments 1098 within each structure. Note that the ribs 1096 will typically cause local circumferential distortions in each of these structures; however, in the case of the support ring 1093 for supporting the central membranes 14, 17, the local circumferential distortions can be employed to induce a circumferential waviness or scalloped pattern in the peripheral edge of the reflector 14, thereby effectively detuning the reflective membrane as a safety means as noted above in FIGS. 9A-D. In general, note that the support ring for supporting the central membranes may optionally have a non-circular cross section. In addition, the membranous webs or ribs (similar to those described in FIGS. 25A-C) holding the inner and outer portions of the support ring need not be radially or circumferentially oriented, but, instead, may have other orientations such as oblique orientations or spiraling orientation. Also, cords or lines alternatively may be used to hold the inner and outer portions of the support rings in their deployed positions. Further, the support ring may optionally have a non-constant cross-sectional shape.

Figure 25D:
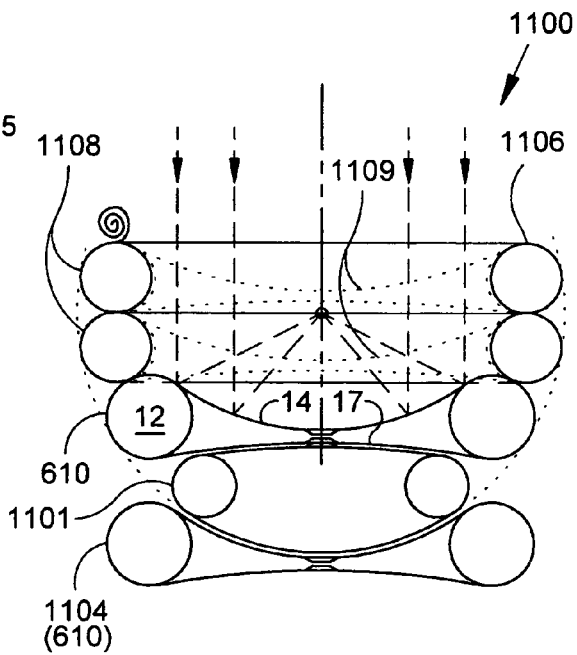

FIG. 25D depicts an alternate modular inflatable multi-function apparatus 1100, wherein the spherical support 1101 comprises a smaller version of the basic reflector apparatus 610 deployed in super-ambient mode (similar to that shown above in FIG. 3C), the support ring 1104 for supporting the spherical support 1101 comprises a second basic reflector apparatus 610 deployed in sub-ambient mode, and the safety shield 1106 comprises a plurality of (e.g., two) stacked alternate basic reflector apparatuses 1108 (similar to the apparatuses 650, 670 shown above in FIGS. 5A-B and/or 6B) having removable reflective membranes and/or removable reflector chambers 1109 (shown dotted), which are removed and stowed to allow light to strike the primary reflector 14. The primary benefit of alternate apparatus 1100 is that the device can be selectably configured as shown in FIG. 25D to facilitate use, or it can be disassembled and reconfigured to provide a plurality of basic devices to maximize energy harnessing, water collecting, and/or other functions of the apparatus.

FIGS. 26A-E: Integrated Alternate Structures

Figure 26A:
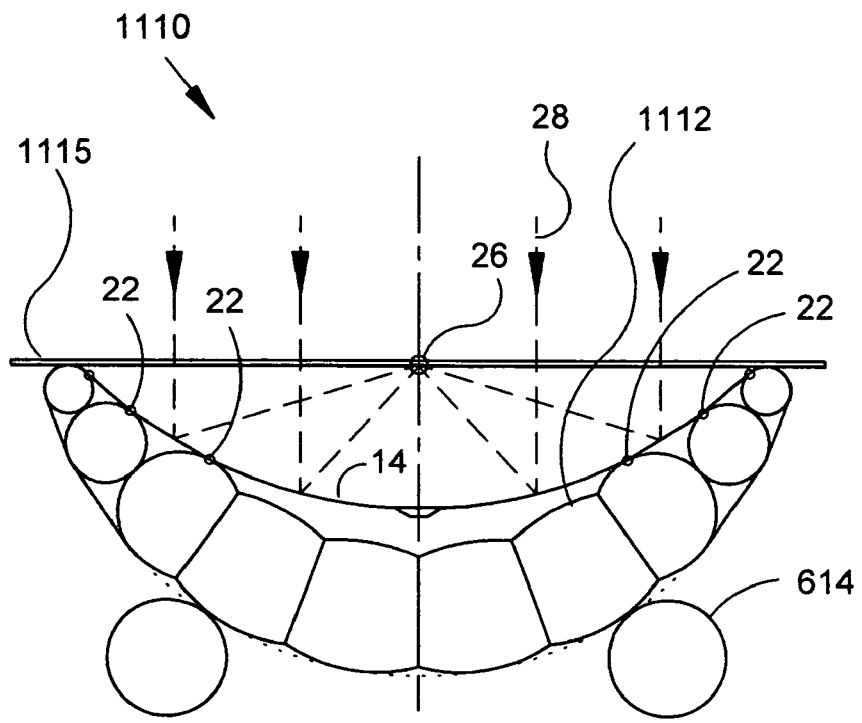
FIGS. 26A-F are schematic cross-sectional views of alternate modular inflatable multi-function apparatuses comprising a reflective membrane integrated with a low-inflation-volume combination spherical support and/or focal point support.

FIG. 26A depicts an alternate modular inflatable multi-function apparatus 1110 comprising a reflective membrane 14 integrated with a low-inflation-volume combination spherical support and focal point support 1112, wherein the inner portion of the reflective membrane 14 is supported above the spherical support 1112 in a pressure-deployable arrangement, and the outer portion of the reflective membrane 14 is intermittently attached to the spherical support 1112 in a mechanically deployable arrangement by a plurality of substantially circumferentially oriented bonds 22. Also depicted is a rod 1115 spanning the apparatus 1110 as one example of a means for supporting an accessory element in proximity to the focal point 26. Note that the outer portion of the support element comprises a plurality of attached tubular (e.g., toroidal) rings, and that the inner portion comprises an inner or upper membrane and an outer or lower membrane joined by a plurality of internal elements (e.g., membranous ribs, cords, or other flexible elements). However, the entire support 1112 optionally can be substantially produced from a plurality of toroidal rings of varying size disposed to provide an approximately parabolic inner surface and an approximately spherical outer surface. Alternatively, the entire support 1112 optionally can be substantially produced by inner and outer membranes, which are connected by a plurality of flexible circumferentially (and/or otherwise) oriented elements or ribs. Note that the necessary inflation devices have been omitted from this and other figures.

Figure 26B:
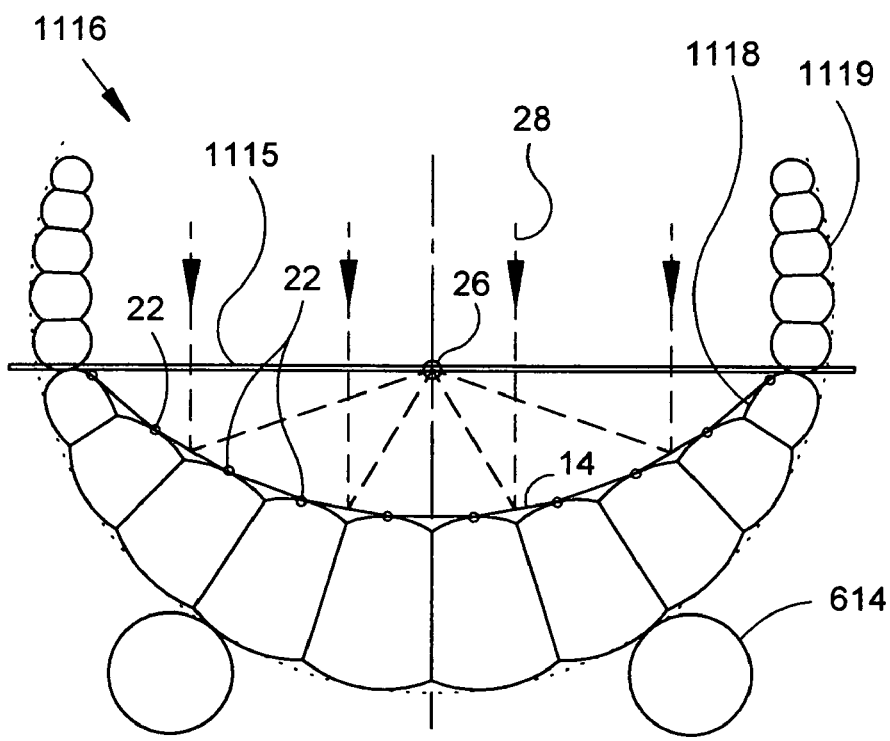

FIG. 26B depicts an alternate modular inflatable multi-function apparatus 1116 comprising a reflective membrane 14 integrated with low-inflation-volume combination spherical support and focal point support 1118, wherein the entire reflective membrane 14 is supported by the spherical support and intermittently attached to the spherical support in a mechanically deployable arrangement by a plurality of substantially circumferentially oriented bonds 22. Also depicted is a rod 1115 spanning the apparatus 1116 as one example of a means for supporting an accessory element in proximity to the focal point 26. A low inflation volume safety shield 1119 is shown attached to and above the spherical support. Note that this apparatus (or other similar apparatuses) may optionally incorporate other focal point supports, such as the cable-stayed focal point support 618, and the like.

Figure 26C:
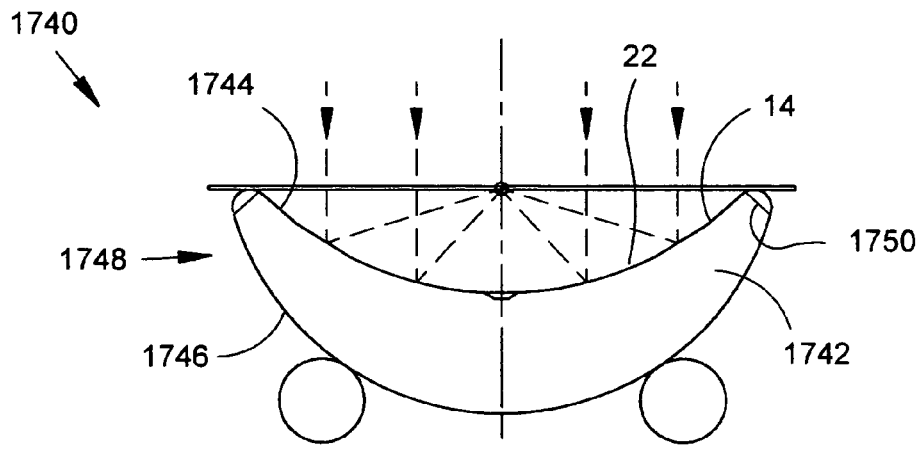

FIG. 26C depicts an alternate inflatable multi-function apparatus 1740 comprising a reflective membrane 14 integrated with a low-inflation-volume spherical support 1742 comprising an inner membrane 1744 and an outer membrane 1746, which are joined to each other at their peripheral edges to form an inflatable structure 1748, and which are further joined by a plurality of internal, finite, circumferentially (e.g., angularly) spaced, membranous elements or ribs 1750 (e.g., substantially planar radial membranes at discrete circumferential positions) to hold the inner and outer membranes 1744, 1746 in a predetermined shape (e.g., an approximately parabolic inner or upper surface and an approximately spherical outer or lower surface), and to form a plurality of typically (but optionally) interconnected compartments 1752. The reflective membrane is supported by the spherical support in a mechanically deployable arrangement by a plurality of substantially radially oriented bonds 22, which intermittently attach the reflective membrane 14 to the spherical support 1742.

Figure 26D:
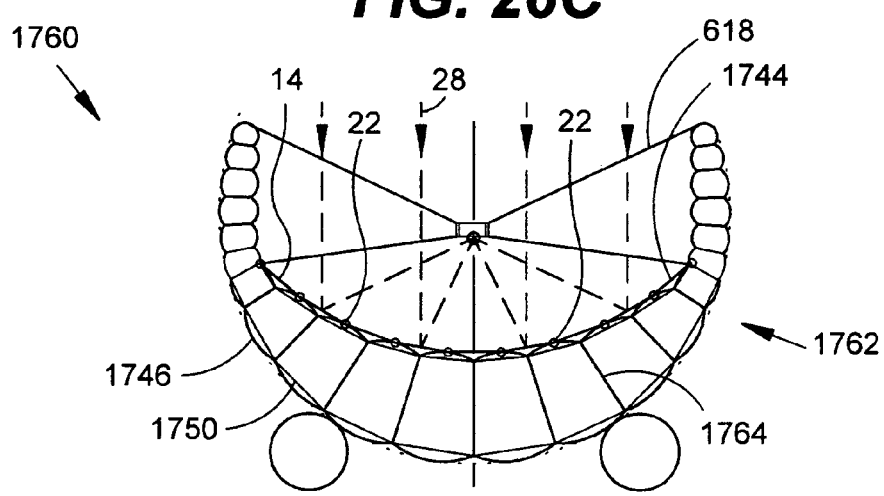

FIG. 26D depicts another alternate inflatable multi-function apparatus 1760 comprising a reflective membrane 14 integrated with a low-inflation-volume spherical support 1762 comprising an inner membrane 1744 and an outer membrane 1746 similar to the apparatus of FIG. 26C, but wherein the membranes are further joined by a plurality of internal membranous elements or ribs having both radial 1750 and circumferential 1764 orientation (and/or a plurality of cords or ties). Further, the reflective membrane is alternatively supported by the spherical support in a mechanically deployable arrangement by a plurality of discrete point bonds 22 to form a faceted reflector.

Figure 26E:
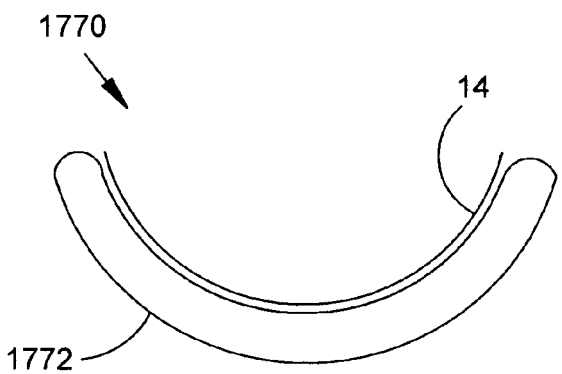
Figure 26F:
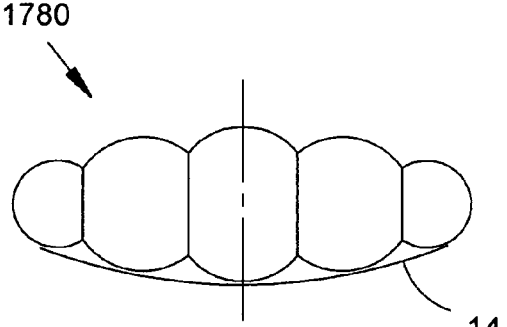

FIG. 26E depicts an alternate inflatable multi-function apparatus 1770 comprising a reflective membrane 14 integrated with a low-inflation-volume spherical support 1772 produced by connecting a plurality of inflatable tubular elements 1774 preferably configured to provide an effectively parabolic inner or upper surface to which the membrane is attached (e.g., by bonds 22), and an effectively spherical outer or lower surface for supporting and orienting the apparatus.

Note that supports similar to those depicted in FIGS. 26A-E may optionally have a non-circular planform, non-limiting examples of which include: a regular polygonal shape (e.g., square, pentagon, hexagon, octagon, etc.), an irregular polygonal shape (e.g., trapezoidal, rectangular, etc.), or a curvilinear shape (e.g., ellipse, oval, etc.). Also, these supports may comprise a concentric series of rings, wherein each ring optionally has the same shape as the overall support of which the ring form a portion. Also note that apparatuses similar to those depicted in FIGS. 26A-E may optionally have obliquely oriented, spiral shaped, or orthogonally oriented membranous ribs or walls attaching the upper and the lower portions of the support apparatuses.

Other low-inflation-volume support devices may comprise an inflatable spoke-like assemblage of curved tubes optionally further including one or more circumferential tubes in a broken or interrupted cup-like arrangement. Alternatively, a mechanically deployable membrane (or a pressure-deployable membrane) may be attached to an alternate support similar to those depicted in FIGS. 26A-E, but wherein the support element has two substantially convex (or, alternatively, flat) surfaces, such as apparatus 1780 depicted in FIG. 26F.

FIGS. 27A-D: Alternate Safety Cages

Figure 27A:
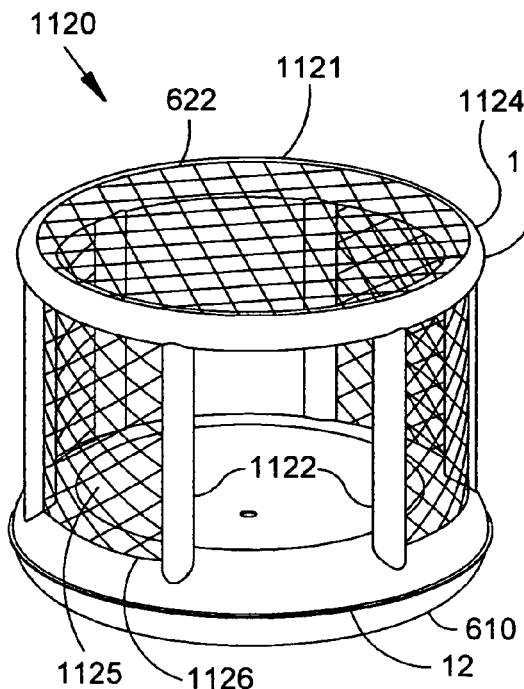
FIGS. 27A-D are schematic perspective views illustrating various alternate inflatable safety cages (e.g., truss-like safety shields with optional safety nets).

FIG. 27A depicts an alternate modular multi-function apparatus 1120 having an integral alternate inflatable safety cage 1121, wherein a plurality (e.g., six) of substantially linear inflatable tubes 1122 are integrally connected to the toroidal support ring 12 of the basic reflector apparatus 610 and to an upper inflatable toroidal ring 1123 to form a lightweight tubular structure 1124, and wherein several of the openings 1125 within the lightweight tubular structure 1124, are covered with a flexible mesh or net 1126, both to provide a physical barrier around the focal point, and to enhance the structural stability of the integral safety cage. Note that by making the safety cage 1121 integral with the toroid 12, both structures can be inflated simultaneously by providing one or more interconnecting gas ports between the structures. This configuration significantly enhances safety by preventing the use of the apparatus 1120 without a substantially fully deployed safety cage 1121.

Figure 27B:
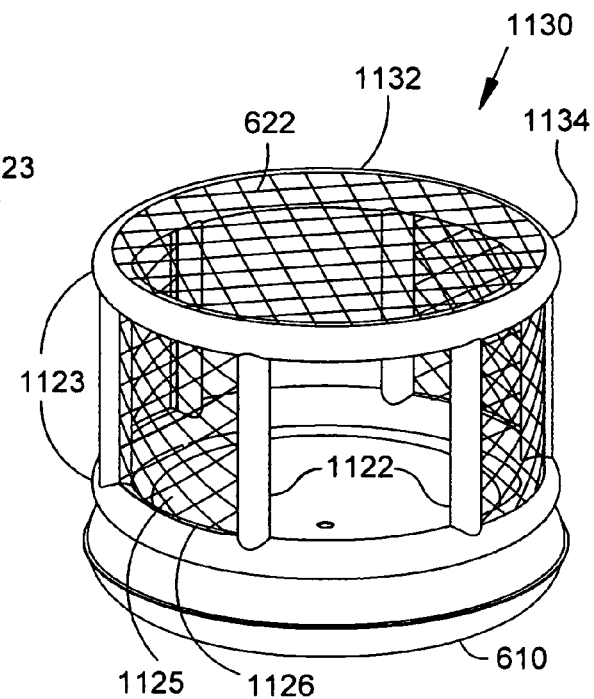

FIG. 27B depicts an alternate modular multi-function apparatus 1130 having a removably attached alternate inflatable safety cage 1132, wherein a plurality of linear (but optionally curved) inflatable tubes 1122 are integrally connected to both an upper and a lower inflatable toroidal ring 1123 to form a removable lightweight tubular structure 1134, and wherein several of the openings 1125 within the lightweight tubular structure 1134 are covered with a flexible mesh or net 1126, both to provide a physical barrier around the focal point, and to enhance the structural stability of the removable safety cage 1132.

Figure 27C:
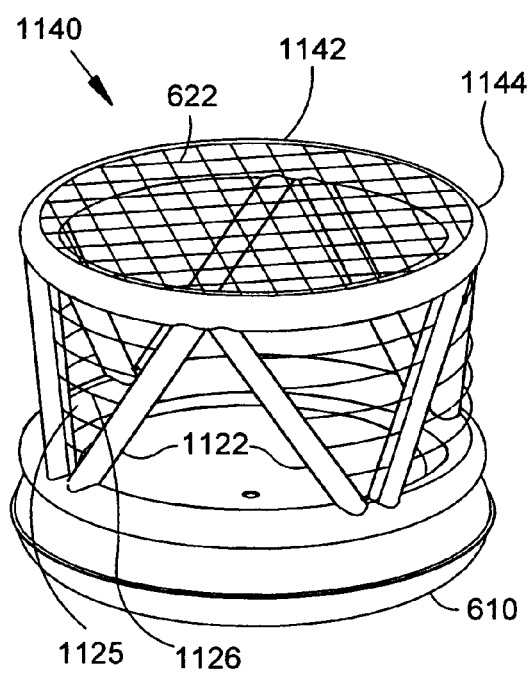

FIG. 27C depicts an alternate modular multi-function apparatus 1140 having a removably attached alternate inflatable safety cage 1142, wherein a plurality of linear inflatable tubes 1122 connected to an upper and a lower ring form a lightweight truss structure 1144, and wherein several of the openings 1125 within the lightweight truss structure 1144 are covered with a flexible mesh or net 1126, both to provide a physical barrier around the focal point, and to enhance the structural stability of the removable safety cage 1142.

Figure 27D:
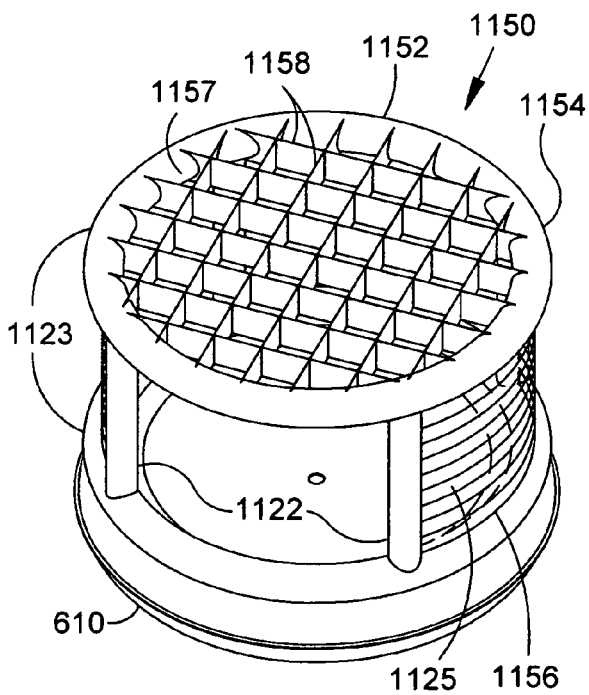

FIG. 27D depicts an alternate modular multi-function apparatus 1150 having a removably attached alternate inflatable safety cage 1152 comprising a plurality of linear inflatable tubes 1122 integrally connected to both an upper and a lower inflatable toroidal ring 1123 to form a removable lightweight tubular structure 1154, wherein several of the openings 1125 within the side of the tubular structure 1154 are covered with a light-attenuating flexible transparent membrane 1156, and the upper opening 1157 of the tubular structure is covered with a membranous grid or grating 1158 to provide off-axis light attenuation.

FIGS. 28A-D: Tapered Support and Leveling Rings

Figure 28A:
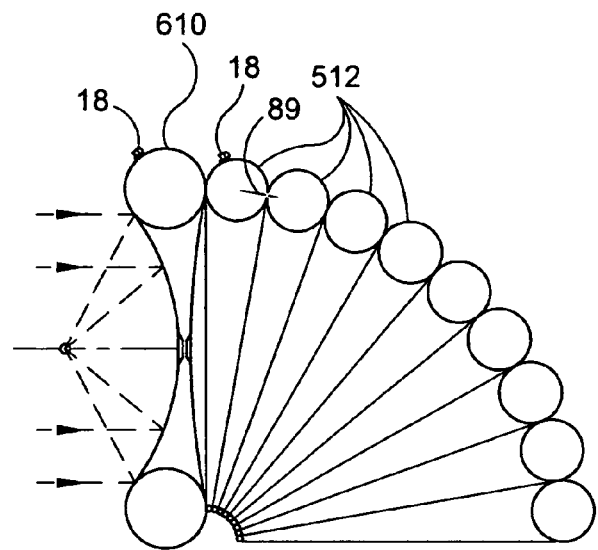
FIGS. 28A-D are schematic cross-sectional views of a basic inflatable reflector apparatus being supported by a plurality of inflatable tapered support and leveling rings.
Figure 28B:
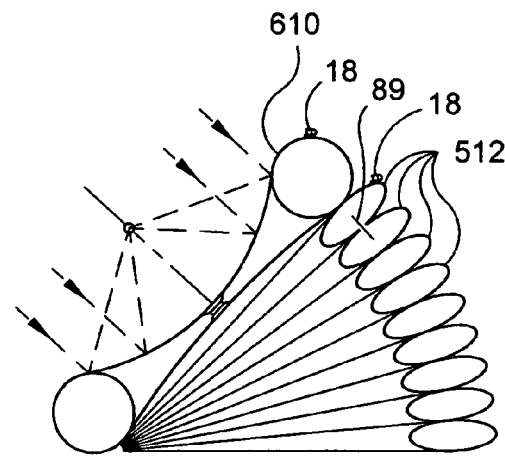

FIG. 28A depicts a basic inflatable reflector apparatus 610 being supported by a plurality of inflatable tapered support and leveling rings 512, wherein the thinnest portions of the stacked tapered rings 512 are located at one circumferential position, whereby the apparatus can be progressively inclined to a nearly vertical orientation by progressively inflating the tapered rings. Alternatively, the device can be oriented in a nearly horizontal position by substantially deflating the rings 512 as shown in FIG. 28B. Note that the tapered rings 512 can be inflated simultaneously using one valve 18 by providing interconnecting gas ports 89 between the rings as shown, or inflated separately via individual gas valves 18 for each tapered ring 512.

Figure 28C:
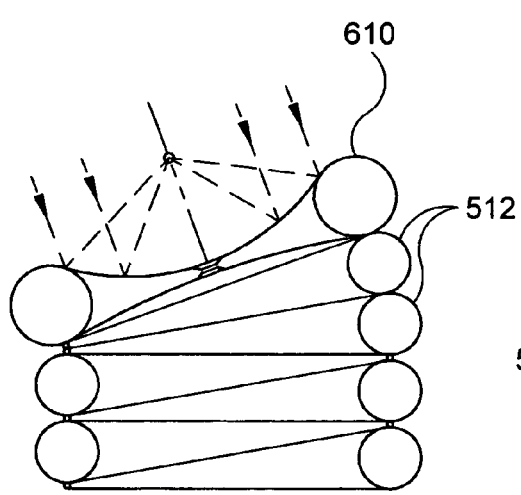
Figure 28D:
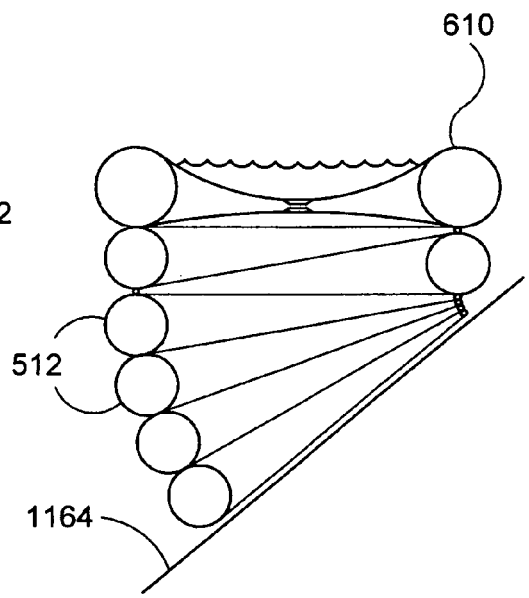

FIG. 28C depicts a basic inflatable reflector apparatus 610 being supported by a plurality of inflatable tapered support and leveling rings 512, wherein the inclination of the basic reflector apparatus is substantially minimized by alternately positioning the thinnest portions of adjacent stacked rings 512 at opposite circumferential locations as shown, but wherein the inclination of the basic reflector apparatus optionally can be maximized by positioning the thinnest portions of the stacked rings 512 at one circumferential location. Note that the rings 512 can also be used to level the apparatus when placed on an inclined surface 1164, such as a hill or roof, as shown in FIG. 28D.

FIG. 29A-D: Alternate Combination/Dual-Use Safety Cages and Device Supports

Figure 29A:
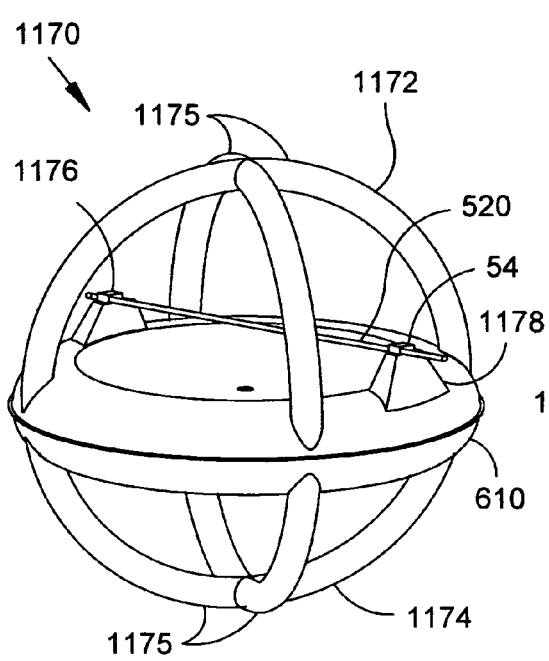
FIGS. 29A-D are schematic perspective views illustrating various alternate combination/dual-use safety cages and device supports.

FIG. 29A depicts an alternate modular multi-function apparatus 1170 having an alternate integral inflatable safety cage 1172 and a substantially identical alternate integral inflatable spherical support 1174, both of which comprise two orthogonally connected semicircular tubes 1175 optionally integrally attached to the basic reflector apparatus 610. Also shown is an alternate inflatable focal point support 1176 comprising two localized or discrete inflatable pressure vessels 1178 removably attached to the basic reflector apparatus 610 for supporting via brackets 54 a rod 520 diametrically spanning the basic reflector apparatus 610.

Figure 29B:
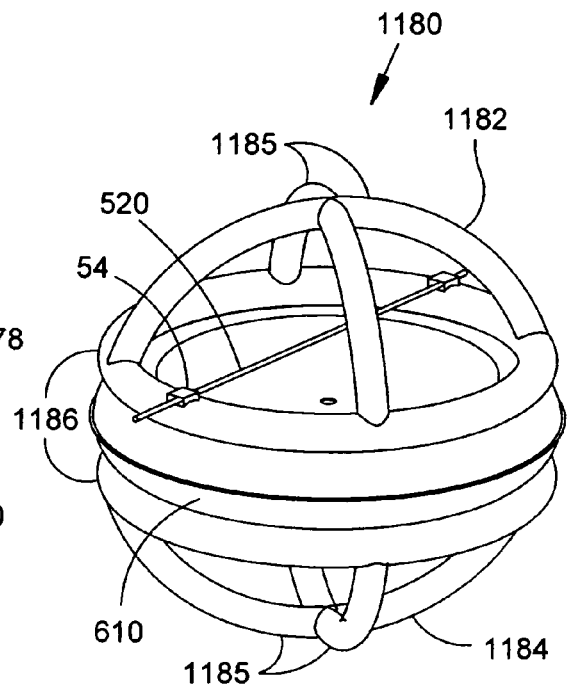

FIG. 29B depicts an alternate modular multi-function apparatus 1180 having an alternate removably attached inflatable safety cage 1182 and a substantially identical alternate removably attached inflatable spherical support 1184, both of which comprise two orthogonally connected inflatable semicircular tubes 1185 integrally attached to an inflatable toroidal ring 1186. Also shown is an alternate means for supporting a rod 520 diametrically spanning the basic reflector apparatus 610, wherein the rod 520 is removably attached via a bracket 54 or other fastening means to the inflatable toroidal ring 1186 of the safety cage 1182.

Figure 29C:
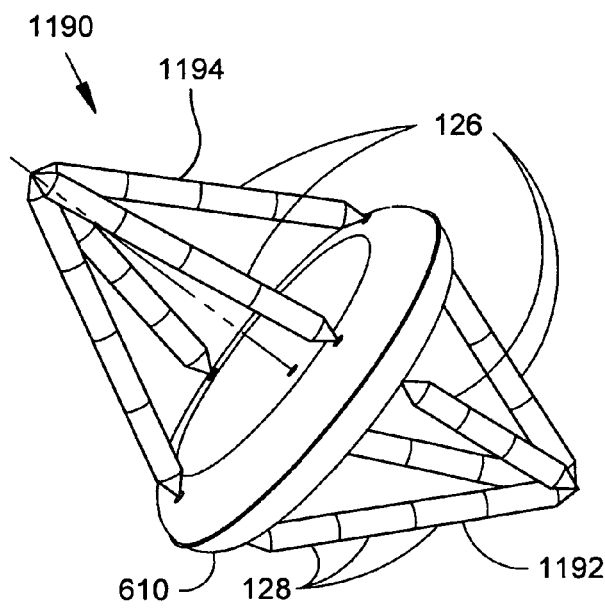

FIG. 29C depicts an alternate modular multi-function apparatus 1190 having an alternate inflatable support means 1192 for supporting the apparatus 1190 and a substantially identical alternate inflatable focal point support 1194, both of which comprise a removably attached adjustable truss comprising a plurality (e.g., four) of linear inflatable tubes 126, wherein each inflatable tube 126 has a plurality of individually inflatable compartments 128 with separate inflation valves (not shown) as a means for adjusting its length.

Figure 29D:
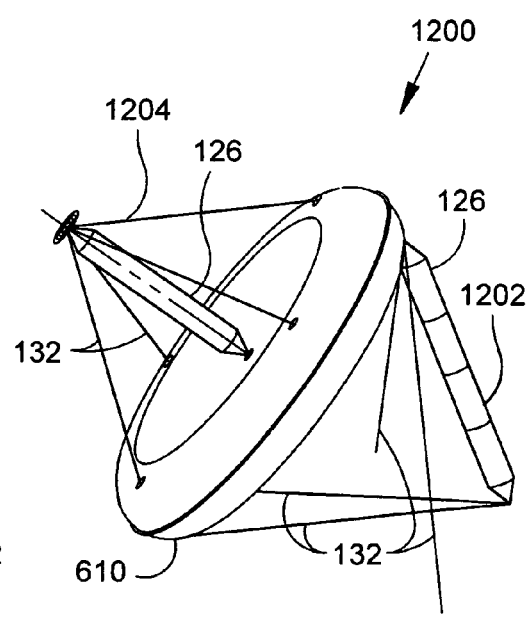

FIG. 29D depicts an alternate modular multi-function apparatus 1200 having an alternate inflatable support means 1202 for supporting the apparatus 1200 and a similar alternate inflatable focal point support 1204, each of which comprises a removably attached inflatable tube 126 stabilized by a plurality of tensioned lines or cable stays 132. Note that two or more inflatable tubes may be used to enhance stability or provide structural redundancy.

Figure 30A:
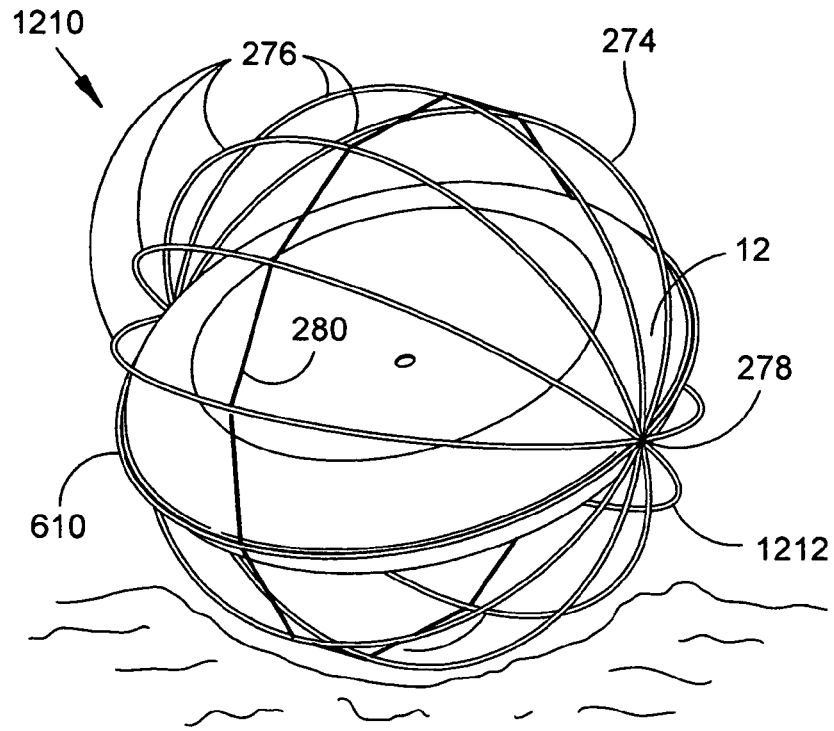
FIGS. 30A-B are schematic perspective views illustrating various alternate combination/dual-use safety cages and device supports.
Figure 30B:
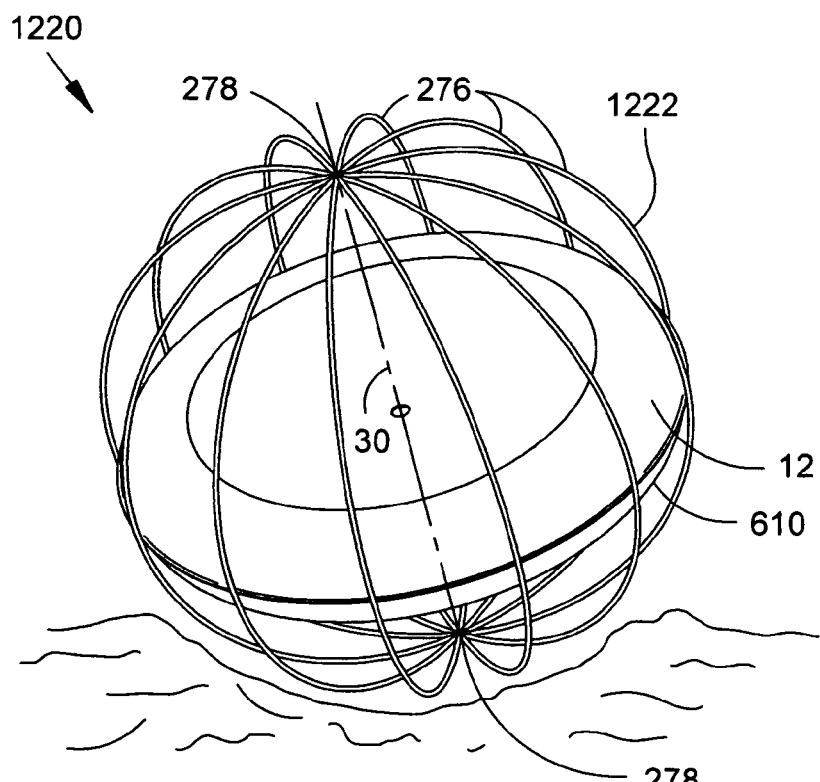

FIGS. 30A-B: Alternate Non-Inflatable Collapsible Combination Safety Cages and Device Supports FIG. 30A depicts an alternate modular multi-function apparatus 1210 having an alternate collapsible rigid safety cage 274 and a substantially identical alternate collapsible rigid spherical support 1212, each of which comprise a plurality (e.g., five) of semicircular rigid elements 276 rotatably attached (e.g., pinned) to one side of the inflatable toroidal support ring 12 of the basic reflector apparatus 610 at diametrically opposed pin joints 278, and which further comprise a single cord or cable stay 280, as shown, (or a plurality of cords or cable stays 280) connected to the semicircular rigid elements 276 and to the basic reflector apparatus 610 to stabilize the collapsible structure 274.

FIG. 30B depicts an alternate modular multi-function apparatus 1220 having an alternate globe-shaped combination collapsible rigid safety cage and spherical support 1222 comprising a plurality (e.g., twelve) of semicircular rigid elements 276, which are rotatably attached (e.g., pinned) to each other via pin joints 278 located above and below the basic reflector apparatus 610 along the focal axis 30 of the device, and which are further attached to the inflatable toroidal support ring 12 of the basic reflector apparatus 610 both to support the reflector apparatus 610 and to stabilize the collapsible structure 1222. Note that the semicircular elements forming the combination safety cage and device support may optionally comprise attachable rod-like or tube-like sub-elements, which are held together by tensioned shock cords to form each of the semicircular elements of the combination safety cage and device support.

Figure 31A:
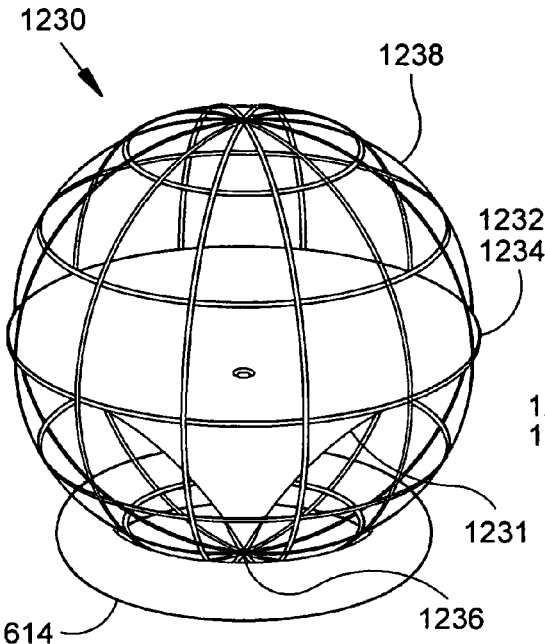
FIGS. 31A-D are, respectively, a schematic perspective view and three schematic cross-sectional views illustrating various alternate collapsible combination safety cage and device supports shown supporting removable reflector chambers.
Figure 31B:
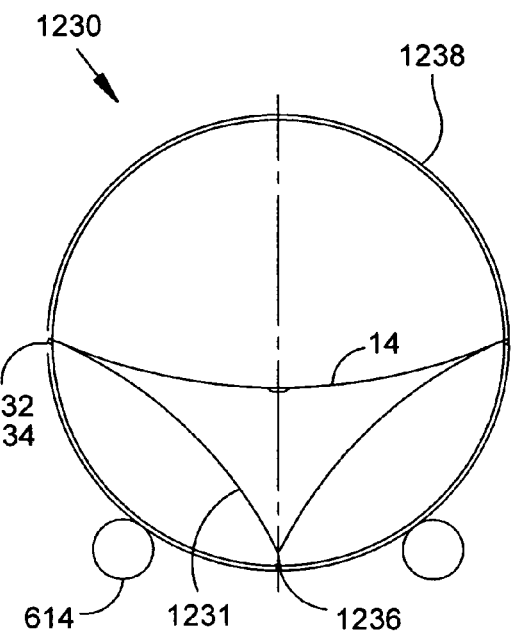

FIGS. 31A-D: Alternate "Globe-Type" Collapsible Rigid Element Combination Safety Cage and Device Supports FIGS. 31A and 31B depict an alternate configuration of the modular multi-function apparatus 1230 comprising a sub-ambient pressurized removable reflector chamber 1231 (third species) removably attached via hooks 1232, clips, or the like, to the equatorial rim 1234 and the bottom pole 1236 of an optionally collapsible, globe-shaped, truss-like, support structure 1238 couched within an inflatable toroidal support ring 614.

Figure 31C:
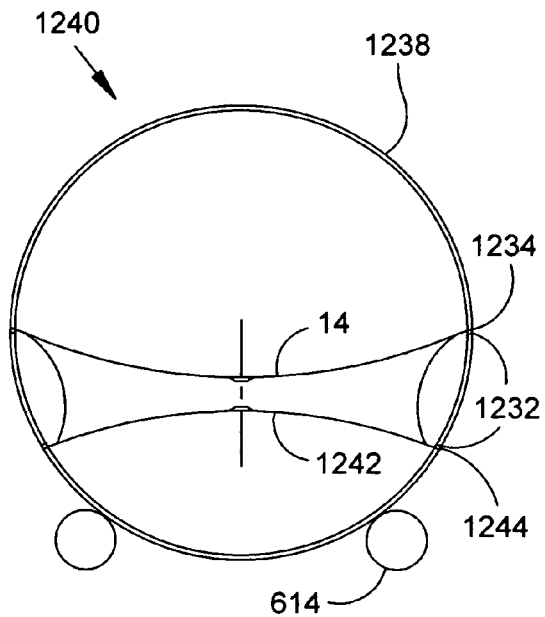

FIG. 31C depicts an alternate configuration of the modular multi-function apparatus 1240 comprising a sub-ambient pressurized removable reflector chamber 1242 (first species) having its upper side removably attached via hooks 1232, clips, or the like, to the equatorial rim 1234 and its lower side similarly removably attached to a lower parallel rim 1244 of an optionally collapsible, globe-shaped, truss-like, support structure 1238 couched within an inflatable toroidal support ring 614.

Figure 31D:
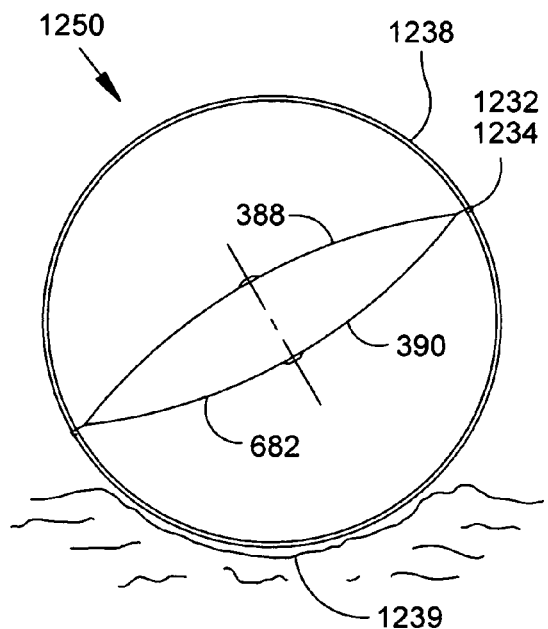

FIG. 31D depicts an alternate configuration of the modular multi-function apparatus 1250 comprising a super-ambient-pressurized, removable reflector chamber 682 (second species) removably attached via hooks 1232, clips, or the like, to the equatorial rim 1234 of the globe-shaped, truss-like, support structure 1238 couched alternatively in a ground depression 1239, such as may be dug in sand.

FIGS. 31E-M: Alternate Collapsible and Rigid Support Elements

Figure 31E:
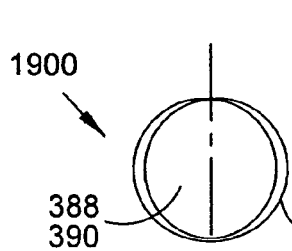
FIGS. 31E-M are schematic cross-sectional views illustrating various alternate support rings including a flexible ring, a plurality of flexible or rigid rings in an optionally collapsible arrangement, and various rigid rings.
Figure 31F:
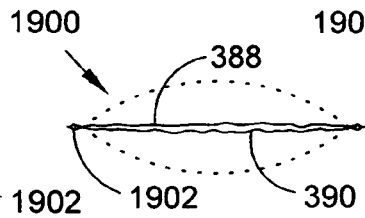
Figure 31G:
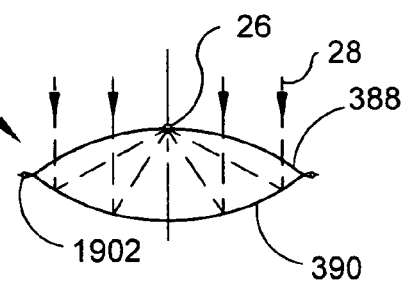

FIGS. 31E-M depict various alternate non-inflatable support elements (or rings), which are generally applicable to the vast majority of the embodiments of the present invention. In particular, FIGS. 31E-G depict an alternate reflector apparatus 1900 comprising a super-ambient inflated reflector chamber supported by a flexile support ring 1902, wherein the apparatus is shown, respectively, in a collapsed, a semi-deployed, and a fully deployed configuration.

Figure 31H:
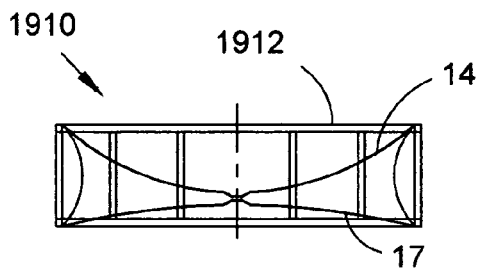
Figure 31I:
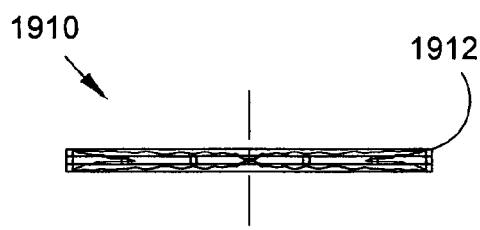

Further, FIGS. 31H-I depict an alternate reflector apparatus 1910 comprising a sub-ambient inflated reflector chamber supported by a collapsible support frame 1912 (or ring) shown, respectively, in a deployed and a collapsed position.

Figure 31J:
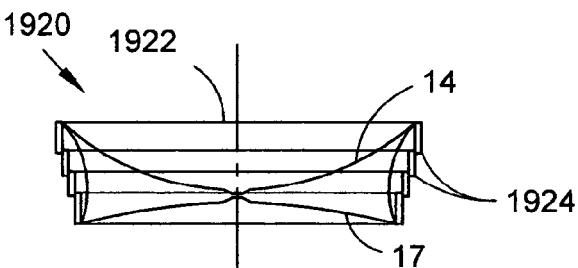
Figure 31K:
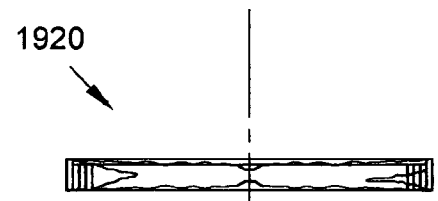

FIGS. 31J-K depict, respectively, an alternate reflector apparatus 1920 comprising a sub-ambient inflated reflector chamber supported by a collapsible support frame 1922 comprising a plurality of telescoping elements 1924 (or rings).

Figure 31L:
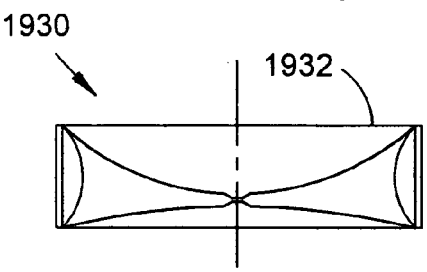
Figure 31M:
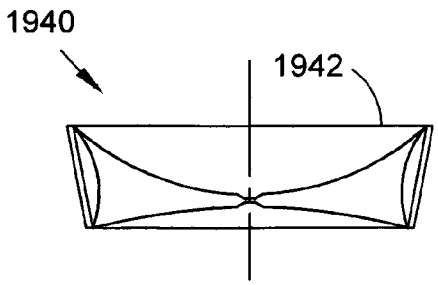

Additionally, FIGS. 31L-M respectively depict alternate reflector apparatuses 1930, 1940 comprising a sub-ambient inflated reflector chamber supported by a rigid support element. In particular, as non-limiting examples, FIGS. 31L-M respectively depict apparatuses having a substantially cylindrical rigid support element 1932 and a tapered rigid support element 1942 or ring. Although shown solid, note that any of these (or other) rigid support elements optionally may be hollow, or may comprise a truss or frame. Further, any suitable material may be used, non-limiting examples of which include: plastic, rigid foams, structural foam, fiber reinforced composites, metal, wood or other natural material, and/or the like. Note that inflation valves (or other inflation devices) operable to deploy one or more pressure-deployable central membranes optionally may be incorporated into the rigid support element or ring to extend into the central chamber. Additionally, although alternate support elements (such as those depicted in FIGS. 31H-M or elsewhere herein) may support an optionally removable pressure-deployable reflector chamber and/or central membranes (such as shown), note that similar non-inflatable support elements (e.g., collapsible or rigid rings or frames) optionally may be provided for other purposes, non-limiting examples of which include: (a) to support one or more mechanically-deployed or faceted membranes, (b) to support a spherical support and orienting apparatus (e.g., inflatable spherical support, collapsible spherical support, rigid spherical support, or globe-shaped truss or frame), and/or (c) to provide a safety member (e.g., safety shield, safety cage, and the like).

FIGS. 32A-H: Alternate Cable-Stayed Focal Point Supports

Figure 32A:
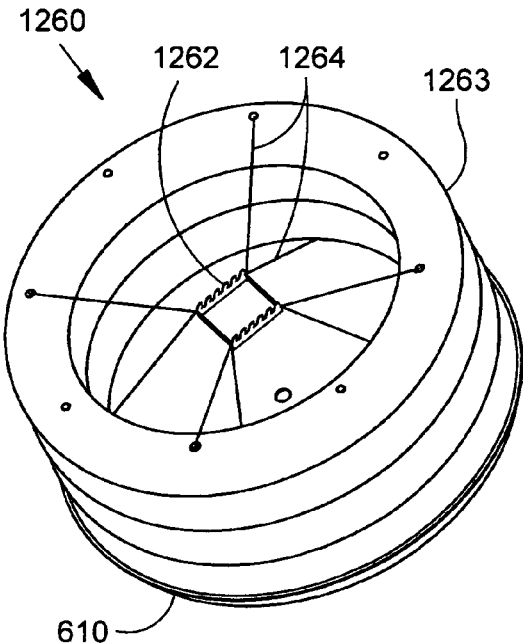
FIGS. 32A-H are schematic perspective views illustrating various alternate cable-stayed focal point supports.

FIG. 32A depicts an alternate collapsible, cable-stayed focal point support 1260 (second species) comprising a square, rigid frame 1262 removably attached to the upper and lower surfaces of an inflatable safety cage 1263 using four pairs of cords, wires, or cable stays 1264, whereby various accessory elements can be supported in proximity to the focal point.

Figure 32B:
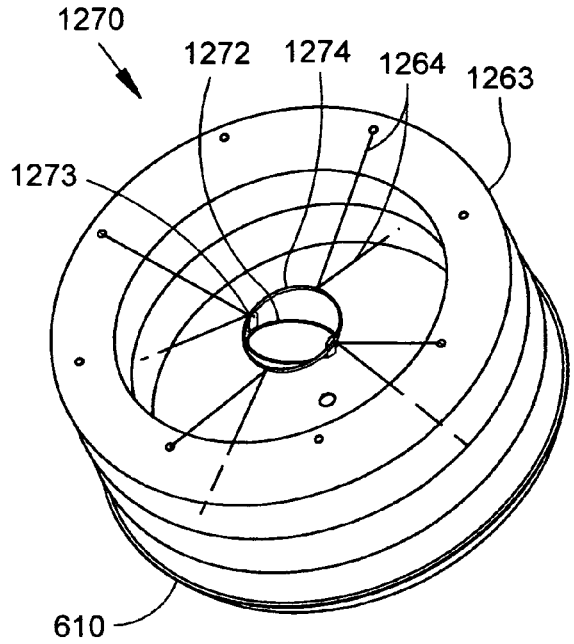

FIG. 32B depicts an alternate collapsible focal point support 1270 (third species) comprising a circular gimbal 1272 (i.e., a self-leveling pivoting frame) movably attached via pin joints 1273 to a circular rigid frame 1274, which is removably attached to the upper and lower surfaces of an inflatable safety cage 1263 using four pairs of cords, wires, or cable stays 1264, wherein an accessory element supported by the gimbal 1272 in proximity to the focal point can be self-leveling as shown, or optionally adjusted and held in a predetermined orientation using an optional adjustment and securing means (not shown), such as a friction clamp at one of the pivot joints 1273.

Figure 32C:
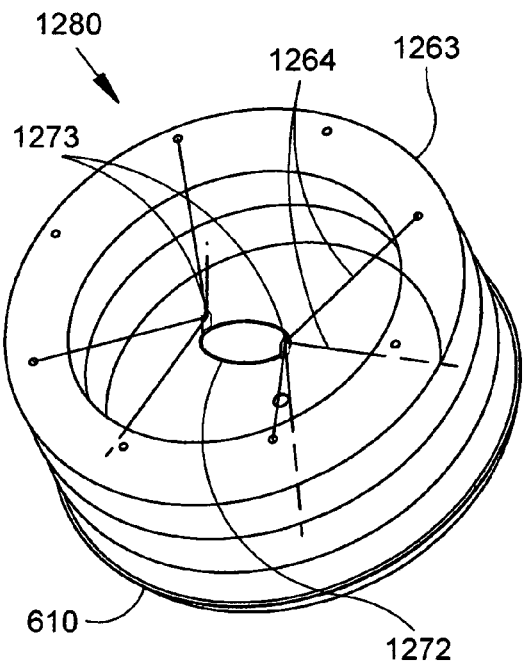

FIG. 32C depicts an alternate collapsible focal point support 1280 (fourth species) comprising a circular gimbal 1272 (i.e., a self-leveling pivoting frame) movably attached via two pin joints 1273 to four pairs of cords, wires, or cable stays 1264, which are removably attached to the upper and lower surfaces of an inflatable safety cage 1263, wherein an accessory element supported by the gimbal in proximity to the focal point can be self-leveling.

Figure 32D:
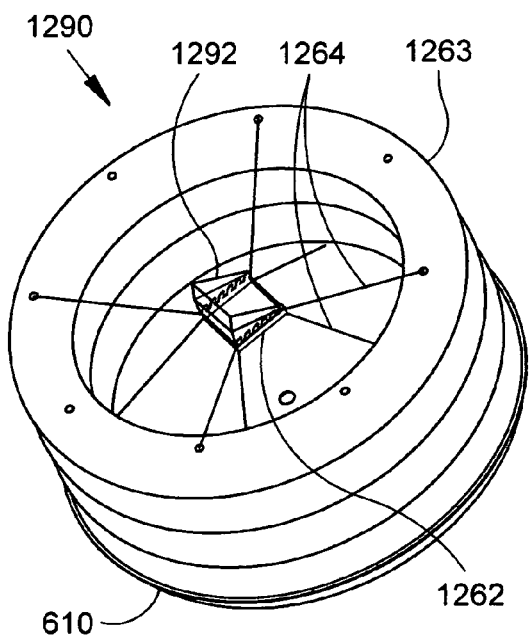

FIG. 32D depicts an alternate collapsible focal point support 1290 (fifth species) comprising a rigid square frame 1262 removably attached to the upper and lower surfaces of an inflatable safety cage 1263 using four pairs of cords, wires, or cable stays 1264, and further comprising an internally reflective, articulated structure 1292 attached to the upper side of the rigid frame 1262, whereby accessory elements can be supported in a horizontal (i.e., level) or other predetermined orientation, and the radiant energy entering the lower end of the reflective articulated structure 1292 can be redirected to the bottom of an accessory element (not shown), such as a pan, to improve performance.

Figure 32E:
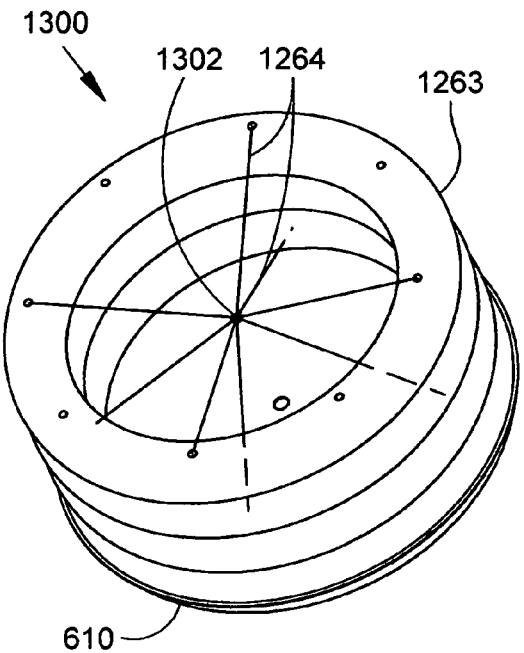

FIG. 32E depicts an alternate collapsible focal point support 1300 (sixth species) comprising a small bracket or ring 1302 attached via four pairs of cords, wires, or cable stays 1264 to the upper and lower surfaces of an inflatable safety cage 1263, whereby various accessory elements (not shown) can be supported in proximity to the focal point.

Figure 32F:
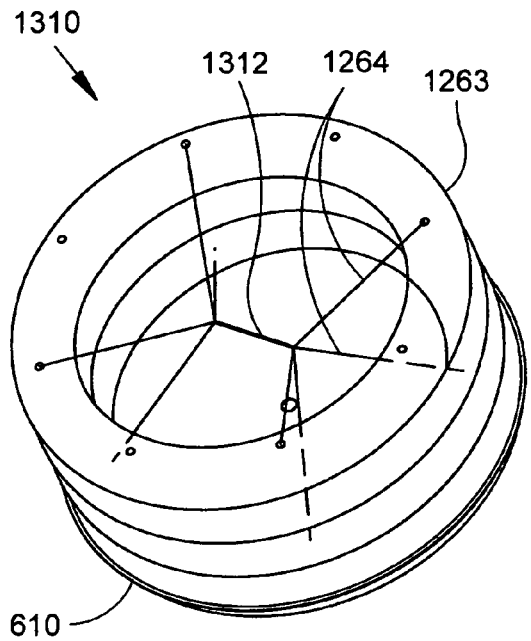

FIG. 32F depicts an alternate collapsible focal point support 1310 (seventh species) comprising a short rod, tube, or length of cable 1312 attached via four pairs of cords, wires, or cable stays 1264 to the upper and lower surfaces of an inflatable safety cage 1263, whereby various accessory elements (not shown), such as a kettle, can be suspended or otherwise supported in proximity to the focal point.

Figure 32G:
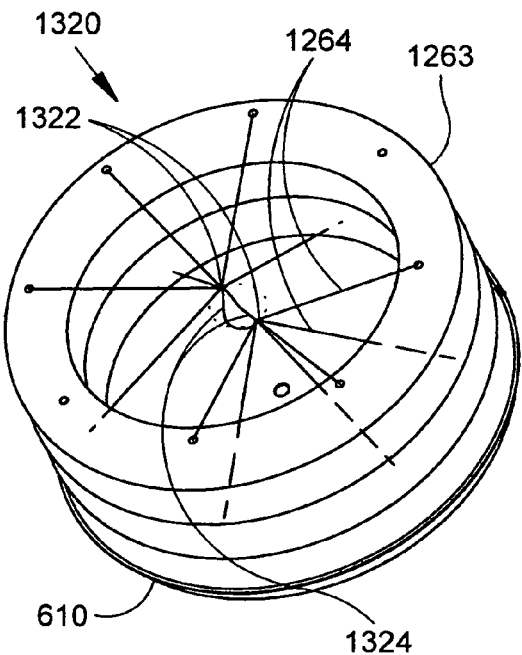

FIG. 32G depicts an alternate collapsible focal point support 1320 (eighth species) comprising two substantially fixed small brackets or rings 1322, each of which is attached via three (or other number) pairs of cords, wires, or cable stays 1264 to the upper and lower surfaces of an inflatable safety cage 1263, and further comprising an adjustable wire loop 1324 attached between the two brackets or rings 1322, whereby various accessory elements, such as a cooking or heating vessel, can be supported in a self-leveling manner in proximity to the focal point. Note that the wire loop can optionally have a cinching means (not shown) for securing the cables around an undersized accessory element.

Figure 32H:
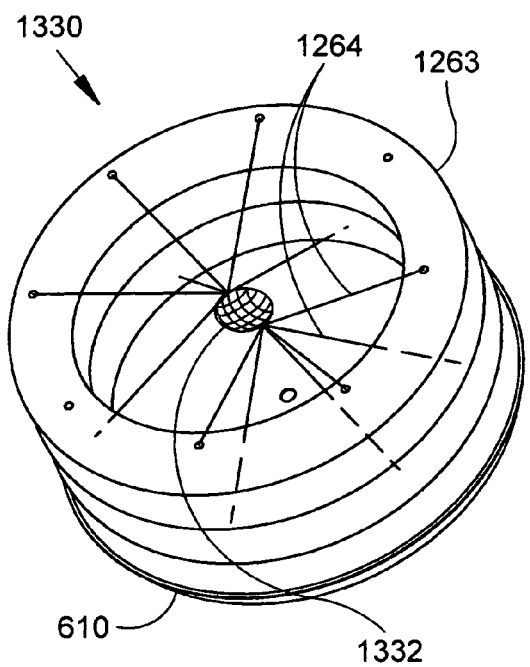

FIG. 32H depicts an alternate collapsible focal point support 1330 (ninth species) comprising a flexible wire or cable basket 1332 removably attached via six pairs of cords, wires, or cable stays 1264 to the upper and lower surfaces of an inflatable safety cage 1263, whereby various accessory elements and/or materials (not shown) to be heated, such as a cooking vessel, pre-packaged food items, and/or certain solid foodstuffs, can be securely supported in proximity to the focal point in either a random or predetermined orientation.

Figure 33A:
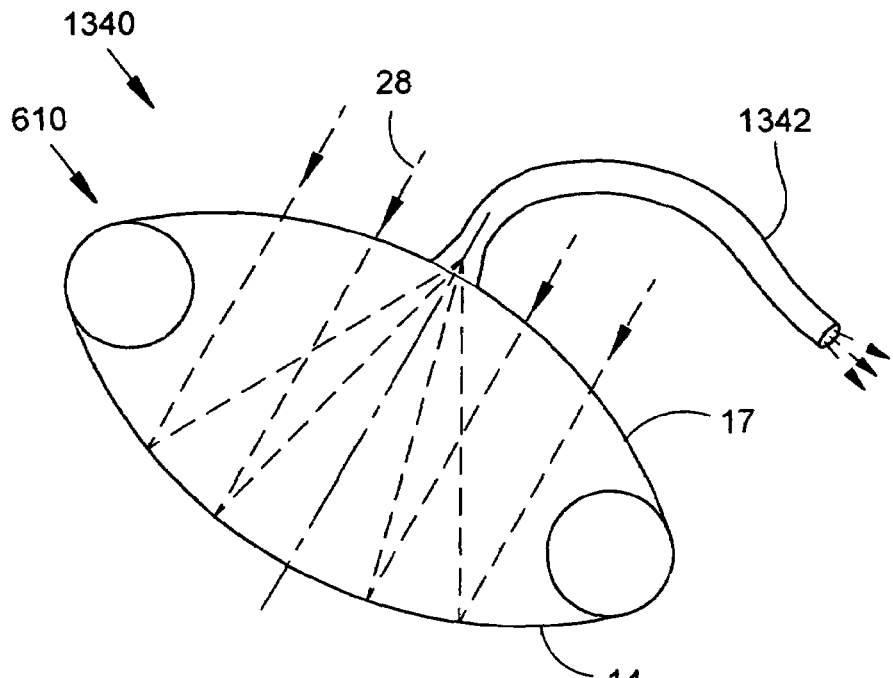
FIGS. 33A-B are schematic cross-sectional views illustrating the use of a waveguide with a super-ambient-pressurized first embodiment basic reflector apparatus.
Figure 33B:
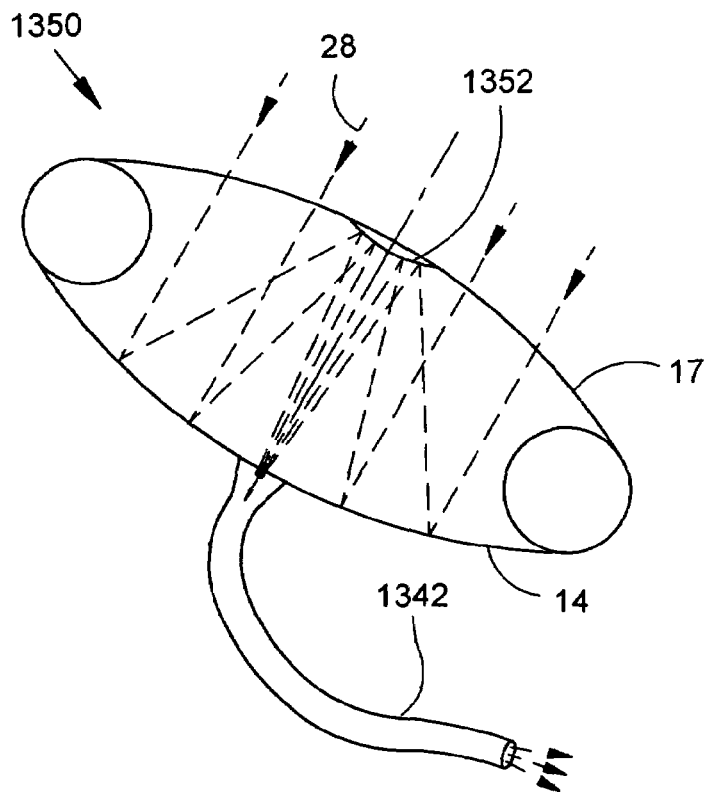

FIGS. 33A-B: Waveguide and Secondary Reflectors

FIG. 33A depicts a basic first embodiment reflector apparatus 610 operating in super-ambient pressure mode to focus light rays 28 into an accessory waveguide device 1342 connected to the upper transparent membrane 17 in proximity to the focal point of the apparatus 610.

FIG. 33B depicts an alternate basic first embodiment reflector apparatus 1350 having a pressure-deployable convex secondary reflective membrane 1352 centered within the transparent membrane 17 of a super-ambient pressurized reflector chamber 20, wherein light rays 28 entering the apparatus 1350 are progressively concentrated by the primary and secondary reflectors 14, 1352 into an accessory waveguide device 1342 connected to the center of the primary reflector 14 in proximity to the focal point of the modified (compound) reflector apparatus 1350. Note that the waveguide depicted herein can optionally be a lightweight fluid-filled tube, instead of the conventional coated glass or polymer fiber(s).

Figure 33C:
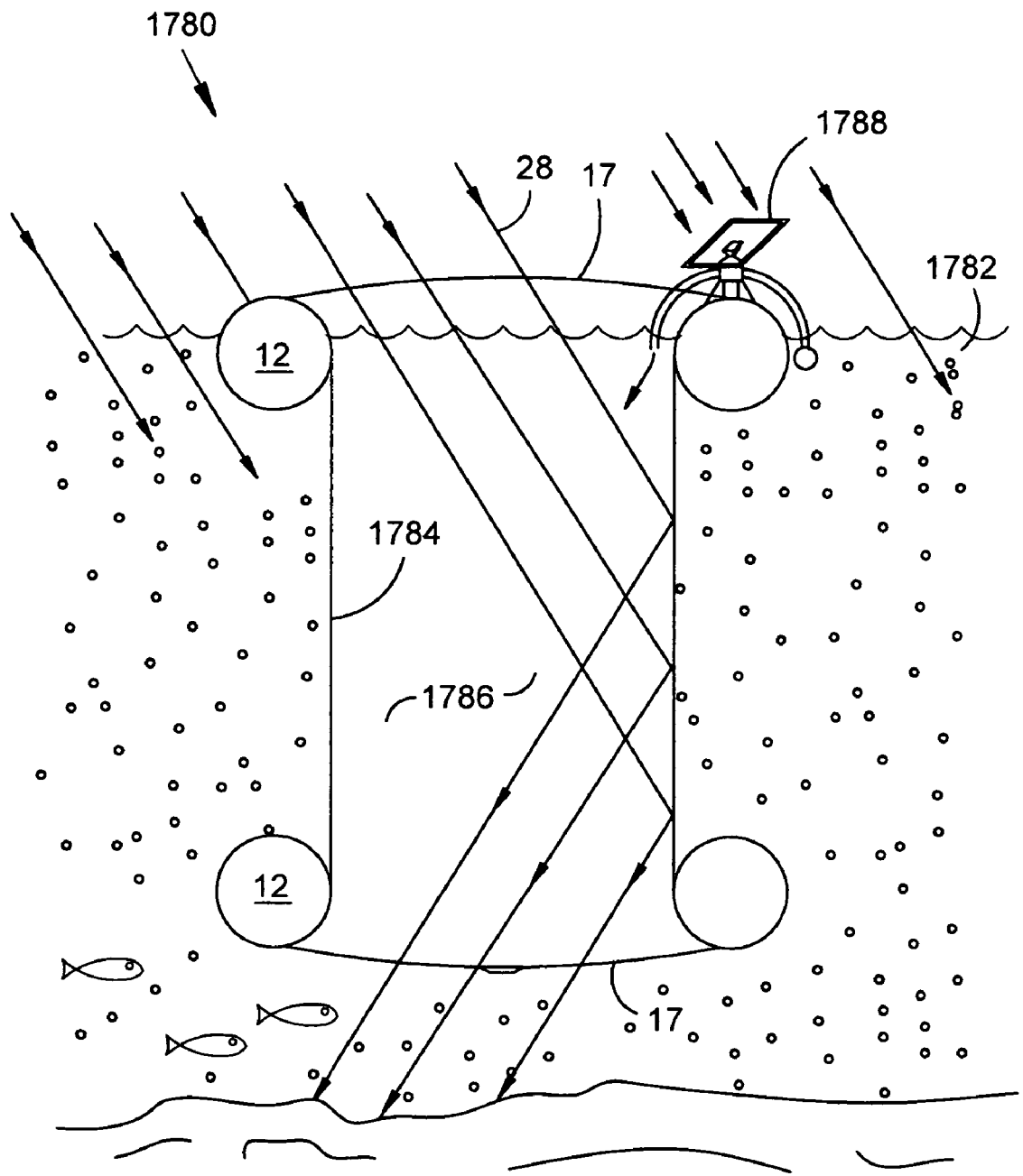
FIG. 33C is a schematic cross-sectional view of the modular multi-function apparatus (or modules thereof) configured as a water-fillable floating waveguide or lightpipe operable to transmit light through turbid water to provide enhanced underwater illumination.

FIG. 33C depicts the modular multi-function apparatus (or modules thereof) configured as a water-fillable floating waveguide or lightpipe apparatus 1780 operable to transmit light 28 through turbid water 1782 to provide enhanced underwater illumination. The floating lightpipe apparatus 1780 comprises an upper floating (e.g., air-inflated) support ring 12 (or 614, 625, or the like), which supports a first transparent central membrane 17 and an optionally internally reflective, water-filled, membranous accessory tube 1784, which further supports a lower water-filled support ring having a second transparent central membrane 17. Upon filling the tube 1784 with non-turbid or clear water 1786 (wherein the tube is closed at its upper and lower ends by the two transparent central membranes 17), the light 28 (e.g., sunlight, moonlight, and/or artificially produced light) entering the tube through the upper transparent membrane can be transmitted through the tube to exit the lower transparent membrane to provide enhanced underwater illumination. Note that an optional filtering apparatus 1788 can be incorporated, whereby the turbid water within which lightpipe apparatus is disposed can be filtered to provide non-turbid or clear water for filling the tube.

FIGS. 34A-D: Operation as a Fluid Pump

Figure 34A:
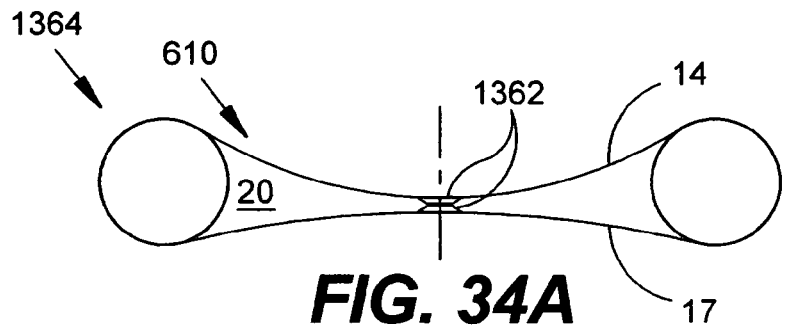
FIGS. 34A-D are schematic cross-sectional views illustrating the use of a basic first embodiment reflector apparatus as a fluid pump.

FIG. 34A depicts a basic first embodiment reflector apparatus 610 modified with one-way fluid valves 1362 (i.e., check valves) to facilitate inflation, to prevent accidental deflation, and to facilitate use of the apparatus as a manual fluid pump 1364.

Figure 34B:
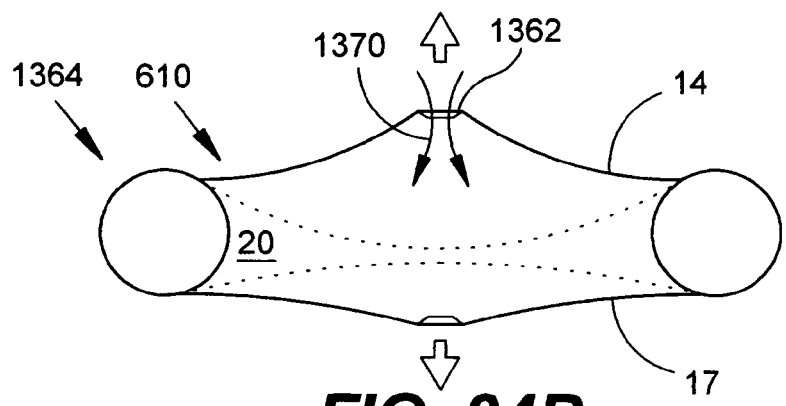

FIG. 34B depicts a modified basic first embodiment reflector apparatus 610 configured as a manual fluid pump 1364 illustrating the fluid intake stroke, wherein the central membranes 14, 17 are manually separated (i.e., extended outward) to draw fluid 1370 (typically air) into the central reflector chamber 20 through the upper valve 1362.

Figure 34C:
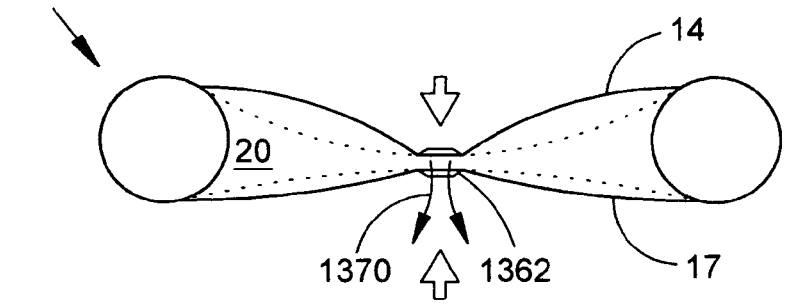

FIG. 34C depicts a modified basic first embodiment reflector apparatus 610 configured as a manual fluid pump 1364 illustrating the fluid exhaust stroke, wherein the central membranes 14, 17 are manually forced together (i.e., forced inward) to expel or exhaust fluid 1370 (typically air) from the central reflector chamber 20 through the lower valve 1362.

Figure 34D:
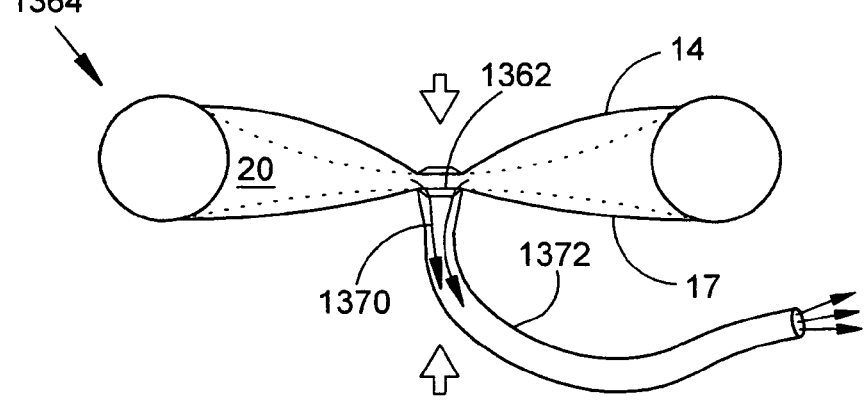

FIG. 34D depicts a modified basic first embodiment reflector apparatus 610 configured as a manual fluid pump 1364 illustrating the fluid exhaust stroke, wherein the central membranes 14, 17 are manually forced together (i.e., forced inward) to expel or exhaust fluid 1370 (typically air) from the central reflector chamber 20 through the lower valve 1362 into an attached accessory tube 1372, which may be connected to any suitable accessory device (not shown) requiring inflation.

FIGS. 35A-E: Accessory Membranes for Enhanced Water Collection and/or Shelter

Figure 35A:
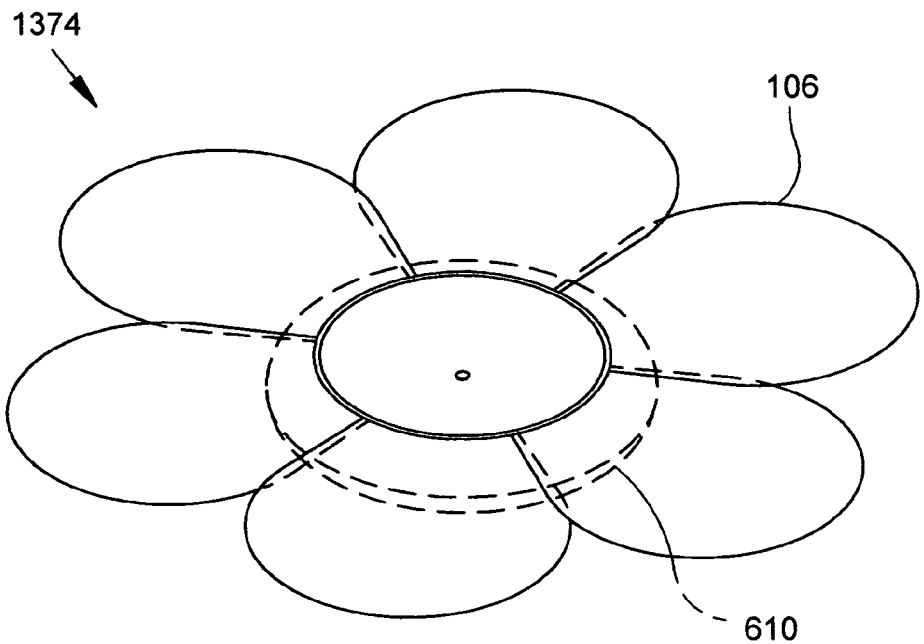
FIGS. 35A-E are schematic perspective views and schematic cross-section views illustrating the use of additional accessory membranes for both enhanced water collection and use as a shelter.

FIG. 35A depicts apparatus 1374 wherein a basic first embodiment reflector apparatus 610 further includes a plurality (e.g., six) of attached membranes or covers 106, which are shown extended in a petal-like arrangement to enhance liquid collection by augmenting the capture area of the apparatus 610, but which can also have various optical properties (such as color, transparency, opacity, emissivity, reflectivity, selective reflectivity, and the like) and, thus, can be used to enhance or enable numerous optical functions of the apparatus.

Figure 35B:
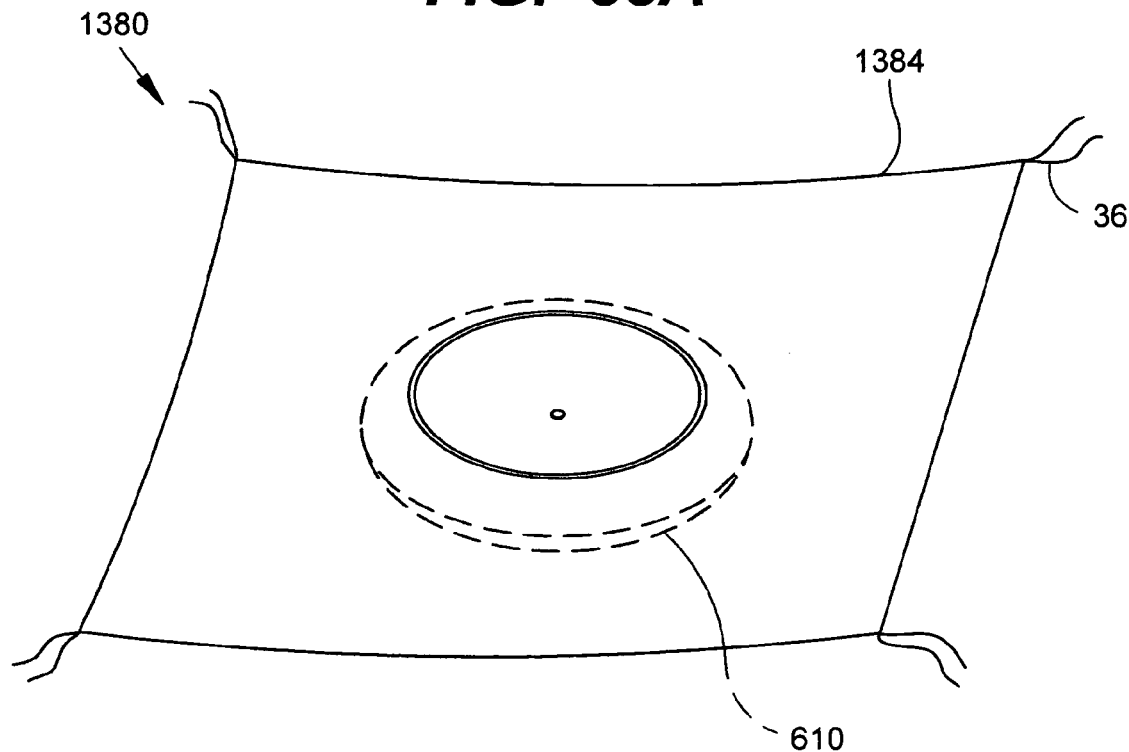

FIG. 35B depicts apparatus 1380 wherein a basic first embodiment reflector apparatus 610 further includes a large extended rectangular (or other shaped) multi-layer insulated membrane or sheet 1384 attached to the upper surface of the multi-function reflector apparatus 610 to greatly enhance liquid collection in the form of precipitation, dew, or frost. Ties 36 are shown for supporting or elevating the periphery of the membrane 1384; however, one or more inflatable tubes may be used to support the membrane in a cupped configuration, as will be shown below. Note that the upper surface of the membrane 1384 (and/or many other surfaces of the modules of the present invention) can have a high emissivity surface to enhance the collection of dew or frost at night by radiative condensation processes. Further, note that the multi-layer insulated membrane can also serve as an emergency thermal blanket, insulating ground cloth, protective tarp or cover, and the like. Additional membranes 1384 and/or membranes of any other practical shape may also be used.

Figure 35C:
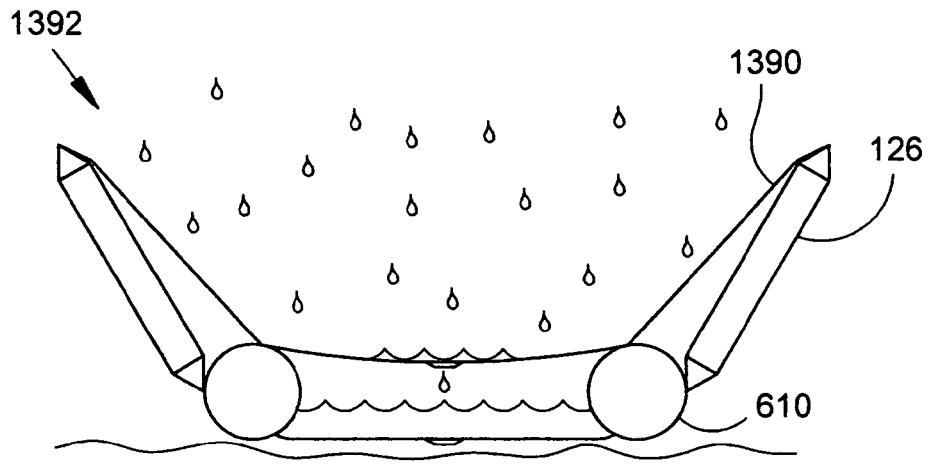
Figure 35D:
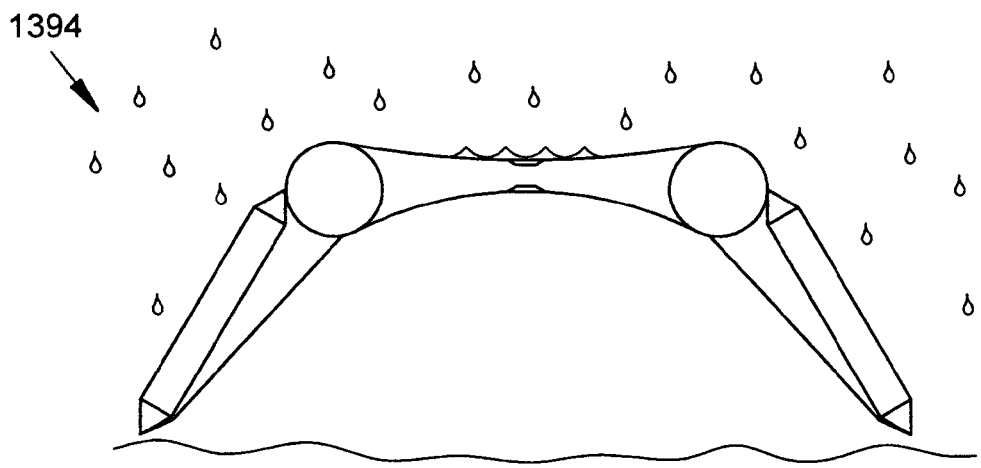
Figure 35E:
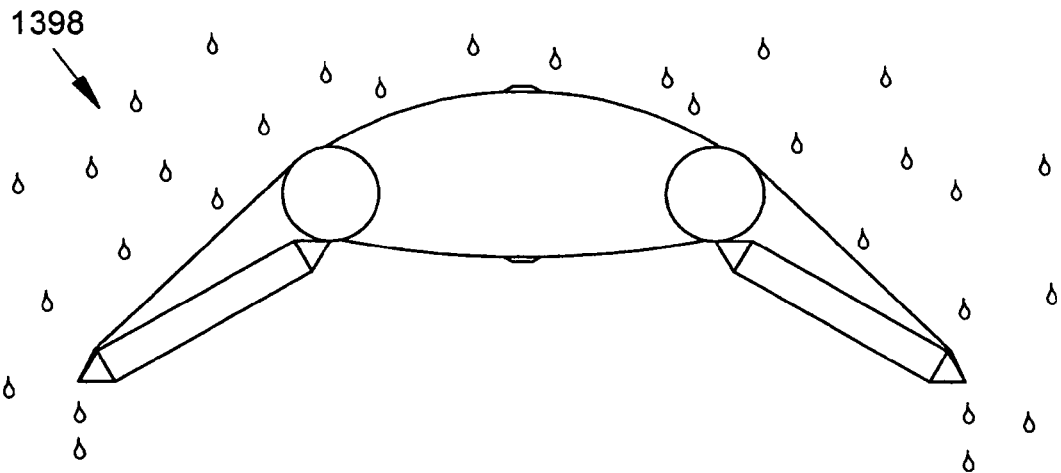

FIG. 35C depicts a basic first embodiment reflector apparatus 610 further including a large extended, optionally multi-layer insulated, membrane or sheet 1390 supported at its edge by a plurality of inflatable tubes 126, such as those described above in FIG. 29C, to provide a modified apparatus 1392 having a cupped configuration to facilitate water collection. Similarly configured apparatus 1394 can also be used as a self-supporting shelter, such as shown in FIG. 35D, or suspended to form an umbrella 1398, such as shown in FIG. 35E.

Figure 35F:
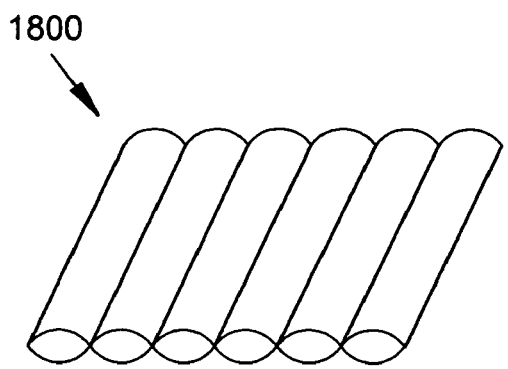
FIGS. 35F-K are partial schematic perspective views illustrating the construction of additional multi-layer optionally insulated accessory membranes for providing enhanced water collection, use as a shelter or insulator, and/or use as a fluid heater or sterilizer.
Figure 35G:
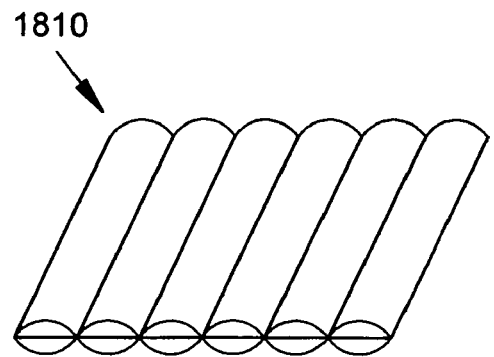

FIGS. 35F-K are partial schematic perspective views illustrating the construction of additional multi-layer insulated accessory membranes for providing enhanced water collection, use as a shelter or insulator, and as a fluid heater. FIG. 35F is a multi-layered insulated sheet 1800 comprising a high-emissivity upper membrane and a low-emissivity lower membrane to enhance the collection of atmospheric moisture at night or to heat fluids contained between the two membranes. FIG. 35G depicts a three-layered composite sheet 1810 having an upper high-emissivity membrane, a low-emissivity middle membrane, and a low-emissivity bottom membrane for enhanced radiative condensation of atmospheric moisture at night and efficient heating of fluids contained within the upper half of the composite sheet when radiant broad-spectrum electromagnetic energy impinges upon the upper membrane.

Figure 35H:
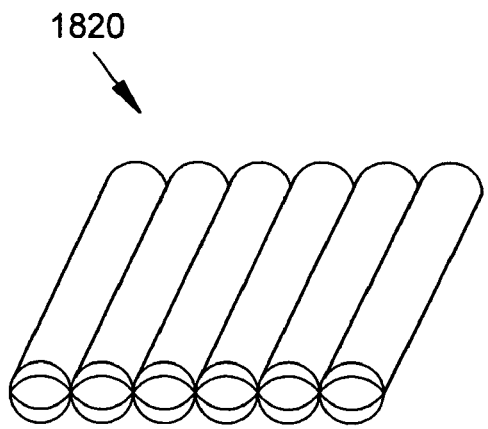
Figure 35:
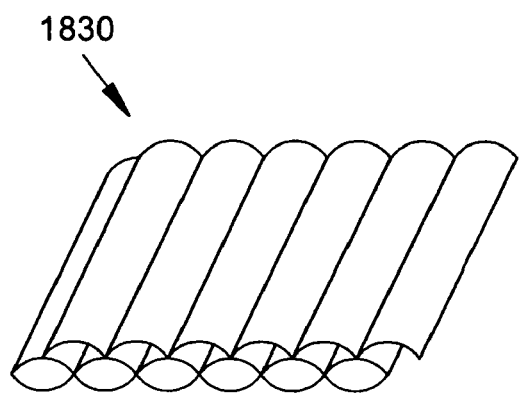
FIGS. 35L-O are schematic perspective views illustrating multi-layer insulated accessory membranes being used as a fluid heater or sterilizer, providing enhanced water collection, being use as a shelter or insulator, and being used as an electrostatic de-ionizing or desalinating device.

FIG. 35H depicts a four-layered composite sheet 1820, wherein the upper layer is a transparent membrane, the next lower membrane is a high-emissivity membrane, and the bottom two membranes are low-emissivity membranes, wherein fluid contained within the middle portion of the composite sheet is efficiently heated as a result of the radiant heat absorptivity of the high-emissivity sheet, while simultaneously being convectively and conductivity insulated from the adjacent environment by the air-gap between the upper two sheets and the air-gap between the lower two sheets. The reflective low-emissivity bottom sheets reduce the radiative heat loss from the fluid contained within the middle portion of the device. Note that all four sheets are linearly bonded at the same locations. FIG. 35I depicts a three-layered composite sheet 1830, wherein the lower portion of the multi-layered sheet comprises a bottom low-emissivity membrane and an upper high-emissivity membrane, and the top portion of the composite sheet 1830 comprises a transparent membrane, wherein fluid contained between the uppermost membrane and the middle high-emissivity membrane is efficiently heated when broad-spectrum electromagnetic radiation impinges upon the upper surface or topmost membrane of the device. Note that the bonds between the uppermost sheet and the lower portion of the device are located midway between the bonds of the two lower sheets.

Figure 35J:
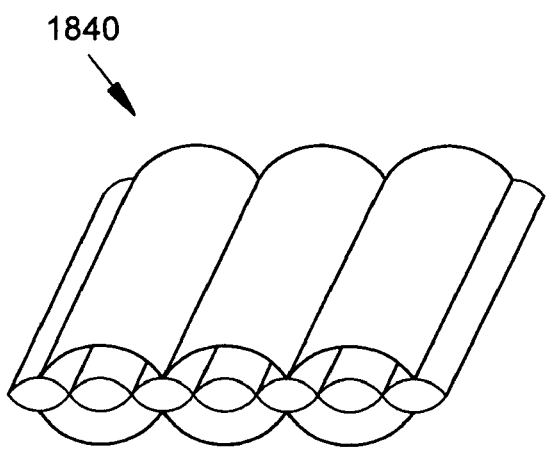

FIG. 35J depicts a four-layered composite sheet 1840, wherein the upper layer is a transparent membrane, the next lower layer is a high-emissivity membrane, and the bottom two membranes are low-emissivity membranes, wherein fluid contained within the middle portion of the composite sheet is efficiently heated as a result of the radiant heat absorptivity of the high-emissivity membrane while simultaneously being convectively and conductivity insulated from the surrounding atmosphere by the air-gap between the upper two membranes and the air-gap between the lower two membranes. The reflective low-emissivity bottom membranes reduce the downward radiative heat loss from the fluid contained within the middle portion of the device. Note that the bonds between the uppermost membrane and the upper middle membrane are located midway between every second bond between the two middle membranes, as are the bonds between the bottommost membrane and the lower middle membrane.

Figure 35K:
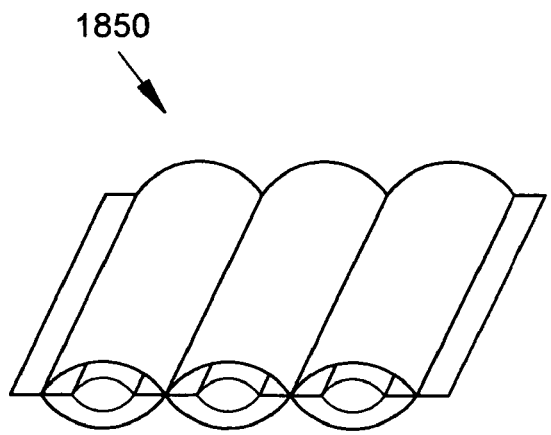

FIG. 35K depicts a four-layered composite sheet 1850, wherein the upper layer is a transparent membrane, the next lower layer is a high-emissivity membrane, and the bottom two sheets are low-emissivity membranes, wherein fluid contained within the middle portion of the composite sheet is efficiently heated as a result of the radiant heat absorptivity of the high-emissivity membrane while simultaneously being convectively and conductivity insulated from the surrounding atmosphere by the air-gap between the upper two membranes and the air-gap between the lower two membranes. The reflective low-emissivity lower membranes reduce the downward radiative heat loss from the fluid contained within the middle portion of the device. Note that the middle two membranes are alternately bonded along finite planar intervals wherein fluid-containing gaps are located between the middle two membranes at locations between the finite planar bonds. The uppermost and lowermost membranes of the composite sheet are linearly bonded at locations midway between the gaps between the middle two membranes.

Note that multi-layered sheets (similar to those described above) having a transparent upper sheet may optionally incorporate a titanium dioxide coating, which, when energized by ultra-violet solar radiation, catalyzes the production of free radicals within the water contained within the multi-layered sheets under the upper transparent membrane. The free radicals thus produced are sufficient to kill virtually all of the pathogenic organisms contained within the enclosed water.

Figure 35L:
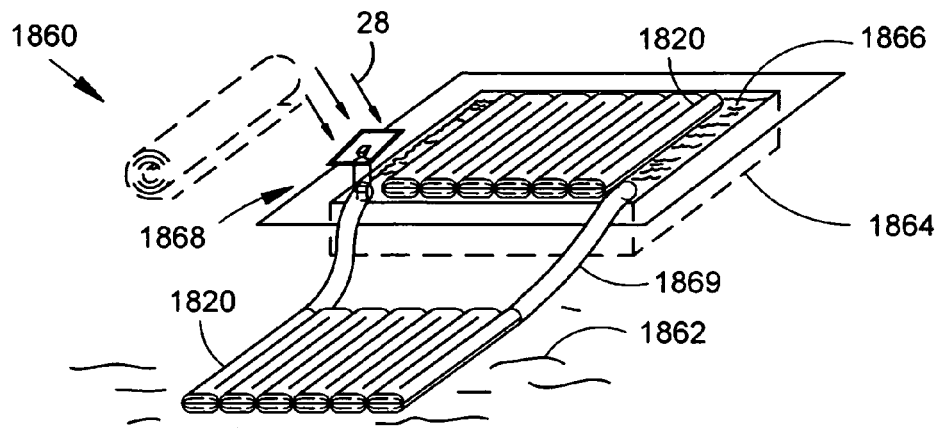

FIGS. 35L-O illustrate non-limiting additional uses of multi-layer, optionally insulated, accessory membranes, such as those depicted in FIGS. 35F-K. In particular, FIG. 35L depicts a pool heating apparatus 1860 comprising a first multi-layer insulated accessory membrane 1820 (such as that depicted in FIG. 35H) placed upon the ground 1862 beside a swimming pool 1864 and being used to heat the pool water 1866, which is circulated via pump 1868 and conduits 1869 between the pool 1864 and the multi-layer membrane 1820. A second multi-layer membrane 1820 is shown floating on the surface of the pool water 1866 to provide heat while also functioning as an insulated pool cover. The water heating device 1820 optionally can be retracted, such as by rolling (or folding) to achieve a stowed position (shown dashed). Note that an apparatus 600 or 610 configured to hold water may optionally be used in concert with the water heating device 1820 to provide hot water, such as for bathing, or for use as a hot tub.

Figure 35M:
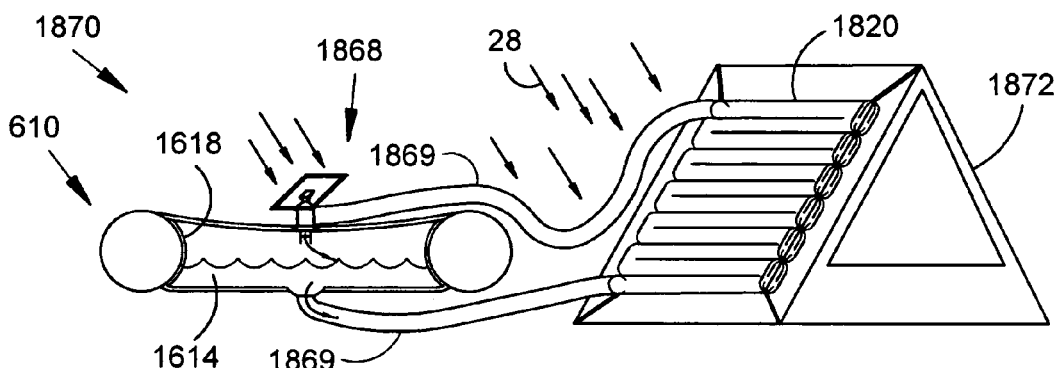

FIG. 35M depicts a water heating apparatus 1870 illustrating a multi-layer, optionally insulated, accessory membrane 1820 secured to a shelter 1872 (e.g., tent) or other structure facing the sun (not shown) to absorb solar radiation 28 to heat water 1614 contained in a proximate storage vessel (e.g., apparatus 610), for which the water 1614 is circulated via pump 1868 and conduits 1869 between the multi-layered heat-absorbing membrane 1820 and the storage vessel 610. Note that the storage apparatus is shown having an optional layer of insulating material 1618 disposed to insulate the central chamber 20. Further, note that the multi-layer membrane optionally may be employed to heat air to warm the interior of the shelter 1872 or for other purposes. Additionally, note that the energy-absorbing multi-layered membranes (such as shown in FIGS. 35L-N) alternatively may be employed to cool fluids (e.g., water, air and the like), by radiating heat at night.

Figure 35N:
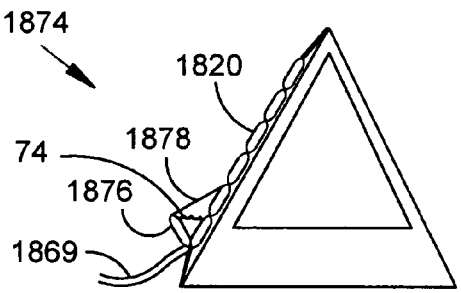

FIG. 35N illustrates an alternate multi-layer, optionally insulated, accessory membrane 1874 similar to that shown in FIG. 35M, but which further includes an optionally inflatable water-collecting gutter 1876 along its lower edge to capture precipitation 74, which then may be transferred to a proximate vessel (not shown) for storage via conduit 1869. Also shown is an optional mesh or net which serves as a debris shield 1878 or screen to prevent debris from entering and/or clogging the water collection gutter.

Figure 35O:
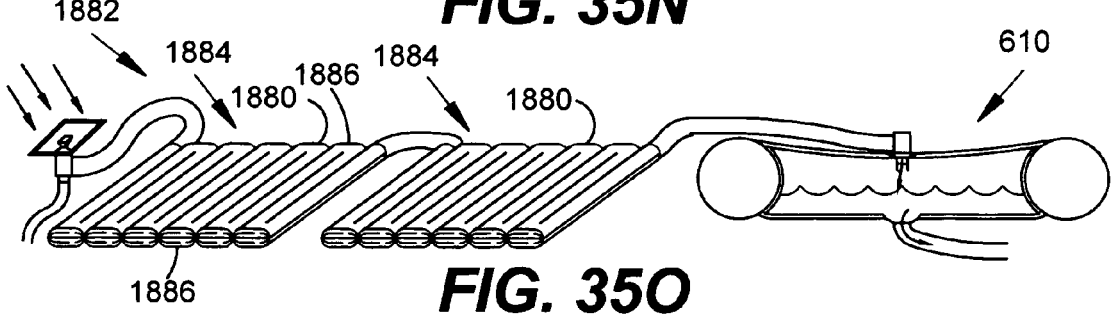

FIG. 35O illustrates a plurality (e.g., two) of multi-layer accessory membranes 1880 being used as a multi-staged electrostatic de-ionizing or desalinating apparatus 1882, wherein each multi-layer membrane 1880 comprises an electrostatic desalination device 1884 comprised of two membranes 1886, 1886 wherein one of these two membranes is positively charge while the opposing membrane is negatively charged.

The resulting electric field between these two membranes acts to attract ions having opposite charges with respect to the membranes attracting them. As a result, the water located substantially midway between the charged membranes becomes relatively depleted of the ions compared to the water located closer to the charged membranes thus resulting in desalination of the water passing through the apparatus.

The multi-layered insulated sheets described above may optionally be configured as a counter flow heat exchanger or regenerative heat exchanger, such as by flowing water (or other liquid) through adjacent conduits within the multi-layer membranes in opposite directions. Such regenerative heat exchangers may by employed for various purposes, a non-limiting example of which includes the pasteurization of water and/or other consumable liquids, whereby the process can thus be performed more efficiently.

Further, any of the membranes or other elements described herein may optionally include an insulative layer, (e.g., a flexible foam layer, a flexible fiber mat, and the like).

High-emissivity membranes having formed or textured surfaces may optionally be included in any apparatuses of the present invention to provide additional surface area to permit more efficient radiative cooling. High-emissivity membranes used for cooling processes may have a turbulence-inducing surface, non-limiting examples of which include: surface roughness, trip strips, eddy flow vortex inducers, dimples, and the like.

Membranes which are liquid impermeable yet gas permeable can be incorporated into any of the apparatuses disclosed herein, such as those used as a shelter. A good non-limiting example of such a membrane is one composed of fabric sold under the trade name GORTEX®.

Figure 36:
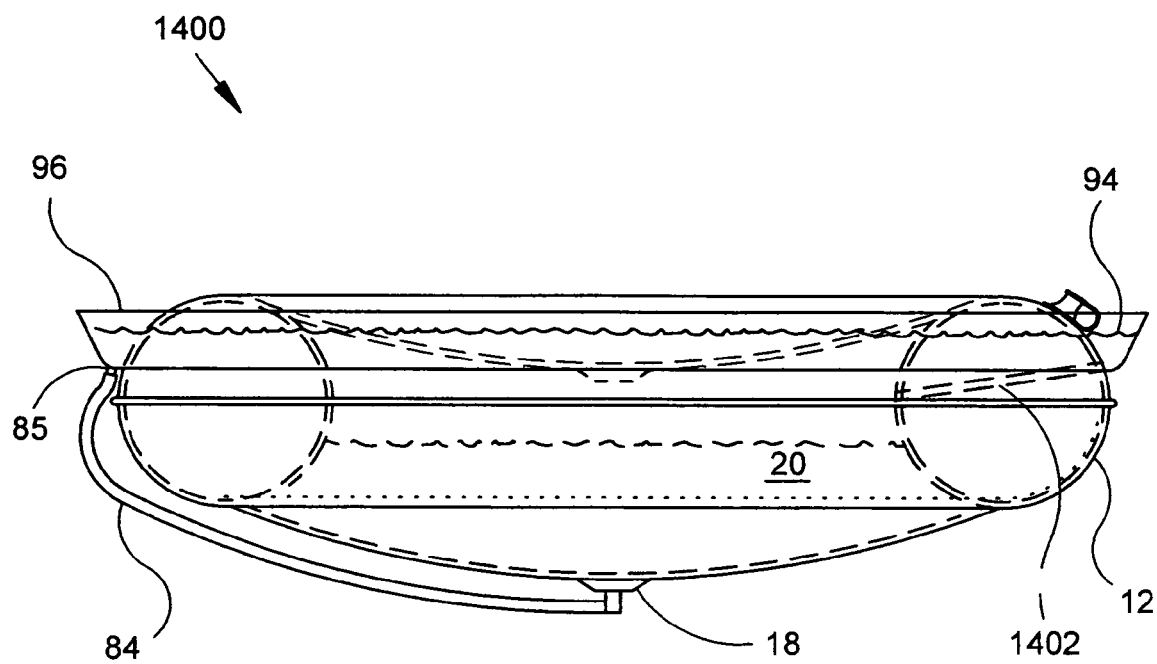
FIG. 36 is a schematic side elevational view of a modified first embodiment reflector apparatus further including optional accessory elements, such as a peripheral gutter, for facilitating the collection and storage of water.
Figure 37:
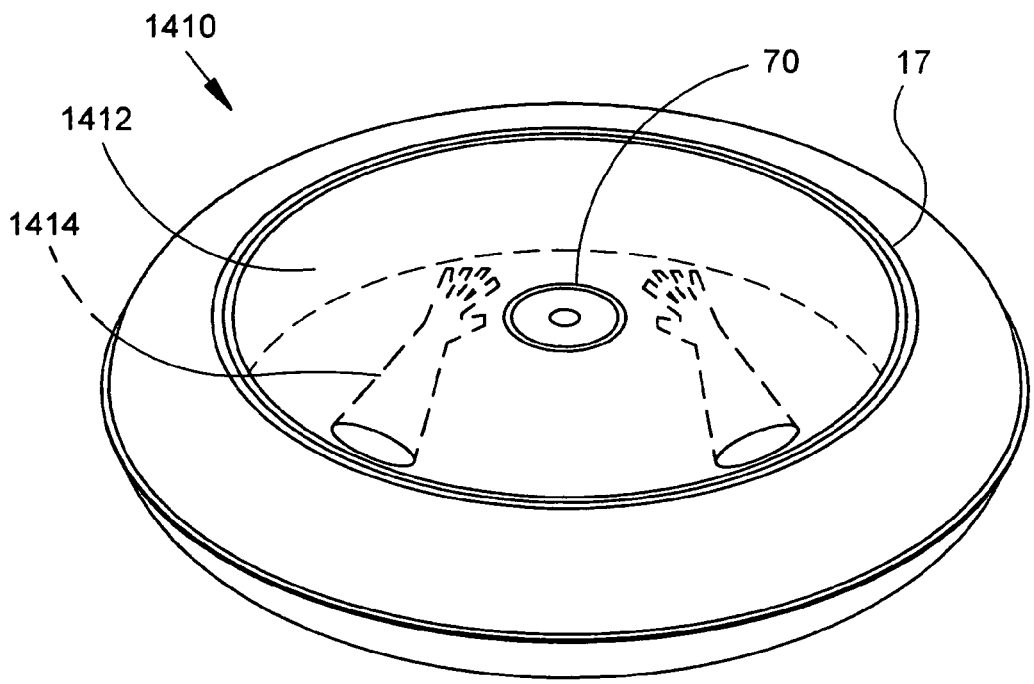
FIG. 37 is a schematic perspective view of a modified first embodiment reflector apparatus configured as a portable sealed work chamber.

FIGS. 36-37: Miscellaneous Apparatus

FIG. 36 depicts a modified first embodiment reflector apparatus 1400 further including optional accessory elements for facilitating the collection and storage of water, including a peripheral gutter 96 having a drain port 85 for connection to a conduit 84, which is shown further connected to the lower valve 18 to permit water effluent 94 collected in the gutter 96 to be transferred to the reflector chamber 20 for storage. An optionally valved conduit 1402 extending through the toroid 12 can also be use to transfer water effluent 94 to the reflector chamber 20 for storage.

FIG. 37 depicts a modified first embodiment reflector apparatus 1410 configured as a portable sealed work chamber 1412 having a pair of attached gloves 1414 and a covered access port 70 incorporated into an optionally removably attached upper transparent membrane 17.

Figure 38A:
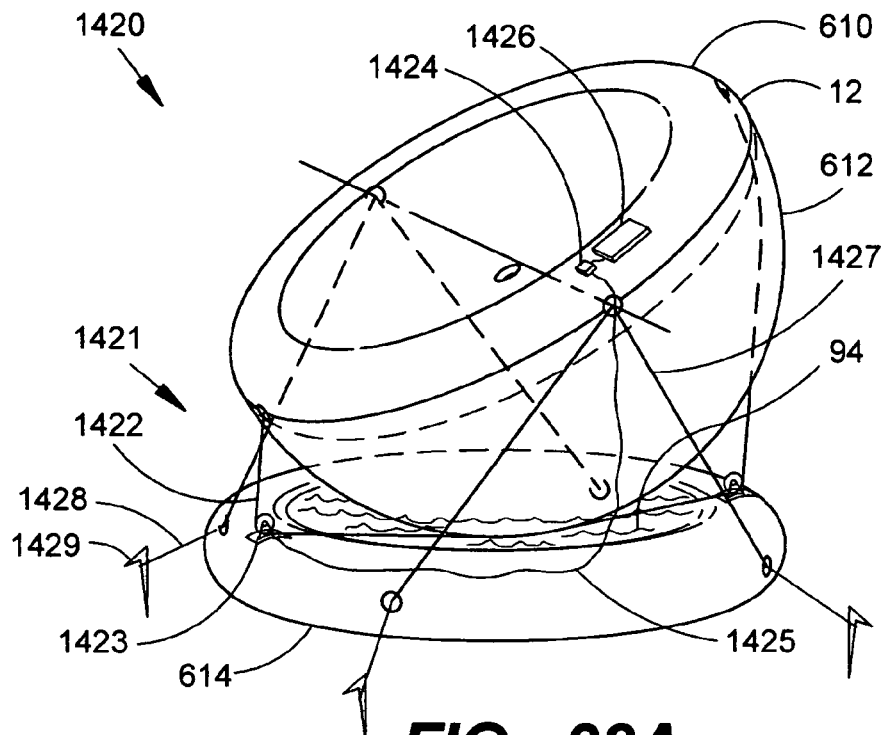
FIGS. 38A-B are schematic perspective views of a modified first embodiment reflector apparatus further including self-supporting single-axis and dual-axis means for tracking the sun.
Figure 38B:
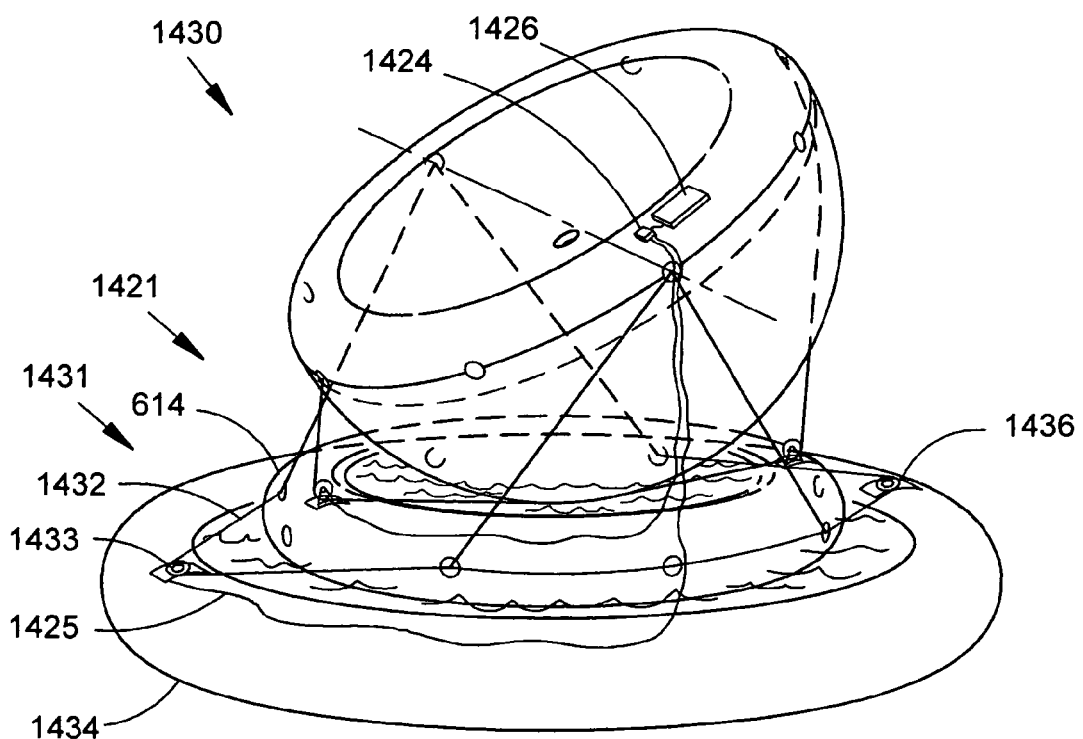

FIGS. 38A-B: Self-Supporting Automated Sun-Tracking Devices

FIG. 38A depicts a modular multi-function apparatus 1420 (with the inflatable safety cage and the cable-stayed focal point support omitted from the figure for clarity) having an optional automated means 1421 for tracking the vertical motion or elevation of the sun (i.e., a single-axis sun-tracking apparatus), wherein the modular multi-function apparatus 1420 further includes a motor-driven cable 1422 connected between the upper portion of the apparatus 1420 and its supporting toroidal base ring 614, at least one motorized drive pulley 1423 typically attached to the toroidal base ring 614, and a sun-sensing controller assembly 1424 electrically connected via electrical conduits 1425 both to the motorized drive pulley 1423 and to an electrical power supply 1426, such as a rechargeable battery and/or photovoltaic panel. Note that the toroidal base ring 614 is configured to hold water 94 such that, when filled, it provides a substantially frictionless support for the inflatable spherical support module 612, which floats on the water-filled base ring 614. Note that opposite sides of the toroidal support ring 12 of the basic reflector apparatus 610 are connected to the toroidal base ring 614 via flexible cords or cables 1427 to stabilize the upper portion of the apparatus 1420 relative to the lower toroidal support ring 614, which can be secured to the ground, for example, by cables 1428 and stakes 1429, as shown, or by other securing means. Note that the flexible cords or cables 1427 used to stabilize the apparatus 610 can optionally be replaced by rods (not shown) to form a rigid truss-like structure attached to the support ring (or ground) to support the reflector apparatus 610, thereby eliminating the need to fill the base ring 614 with water. Alternatively, cables 1427 may be replaced by inflatable supports attached to the support ring 614 to form an inflatable yoke structure for supporting the reflector apparatus 610.

FIG. 38B depicts a modular multi-function apparatus 1430 (with the inflatable safety cage and the cable-stayed focal point support omitted from the figure for clarity) having an optional automated means 1431 for tracking both the vertical and horizontal motion of the sun (i.e., a dual-axis sun-tracking apparatus), wherein the modular multi-function apparatus 1420 of FIG. 38A having a single-axis tracking apparatus 1421 further includes an additional larger water-filled base ring 1434 on which the first base ring 614 floats, an additional motor-driven cable 1432 connected between the primary base ring 614 and the larger secondary base ring 1434, and one non-driven and one driven pulley 1436, 1433, the latter of which is electrically connected via electrical conduit 1425 to the sun-sensing controller assembly 1424 and electrical power supply 1426.

Note that the larger water-filled base ring 1434 and the associated positioning devices which enable rotation about the vertical axis may be replaced with an alternate inflatable ring (similar to support ring 614) rotatably attached to the lower side of a modified support ring 614, wherein the upper ring is rotated relative to the lower ring by any suitable drive mechanism (e.g., a track and roller positioning assembly, a cable positioning assembly, and the like.)

FIGS. 39A-C: Suspended Automated Sun-Tracking Apparatus

FIG. 39A depicts an apparatus 1440 comprising a modular multi-function apparatus 600 (with the inflatable safety cage and the cable-stayed focal point support omitted from the figure for clarity) having an alternate automated means 1441 for tracking both the vertical and horizontal motion of the sun (i.e., a dual-axis sun-tracking apparatus), wherein the modular multi-function apparatus 1420 of FIG. 38A having a single-axis tracking mechanism 1421 is rotatably suspended via a cable system 1442 between an overhead support 1443, such as a tree branch, and a staked ground support 1429 to enable substantially frictionless motion about the vertical axis 1445, and further includes an additional motor-driven cable 1432 connected between the toroidal base ring 614 and one non-driven pulley and one motor-driven pulley 1438, 1433, both pullies being supported by ground stakes 1429, and the latter of which is electrically connected via electrical conduit 1425 to a sun-sensing controller 1424 and an electrical power supply 1426.

FIG. 39B depicts an apparatus 1450 comprising a basic first embodiment reflector apparatus 610 further having a dual-axis (i.e., vertical and horizontal) sun-tracking mechanism 1451, wherein the basic reflector apparatus 610 is suspended via a cable system 1452 between an overhead support 1443, such as a tree branch, and a staked ground support 1429 to enable substantially frictionless motion about the vertical and horizontal axes 1445, 1454, and further comprises two motor-driven cables 1422, 1422 (one for each axis of rotation), and two motorized drive pulleys 1423, 1433 (one for each axis of rotation, i.e., vertical and horizontal), both of which are supported by ground stakes 1429 and are electrically connected via electrical conduit 1425 to a sun-sensing controller 1424 and an electrical power supply 1426.

FIG. 39C depicts an apparatus 1460 comprising a basic first embodiment reflector apparatus 610 having a polar-aligned, single-axis, sun-tracking mechanism 1461 (i.e., the axis 1463 of the tracking mechanism 1461 is optionally aligned with the poles or rotational axis of the Earth), wherein the basic reflector apparatus 610 is suspended via a cable system 1462 between an overhead support 1443, such as a tree branch, and a staked ground support 1429 to enable substantially frictionless motion about an axis 1463 parallel to the Earth's axis of rotation, and further comprises one motor-driven cable 1422 and one motorized drive pulley 1423, the latter of which is supported by a ground stake 1429 and is electrically connected via electrical conduit 1425 to a sun-sensing controller 1424 and an electrical power supply 1426.

FIGS. 40A-D: Materials of Construction

FIG. 40A depicts a typical, substantially polymeric, multi-layer composite material 1470 from which the apparatus 600 can be constructed, comprising from bottom to top: a heat-sealable layer of material 1472 (such as polyethylene, and the like), a load-bearing structural membrane 1474 (such as Nylon, Mylar®, and the like), a smooth reflective layer 1476 (such as provided by vapor-deposited aluminum, and the like), and a protective upper coating 1478 (such as lacquer, polyethylene, and the like), which optionally may also be heat-sealable.

FIG. 40B depicts an alternate, substantially polymeric, multi-layer composite material 1480 from which the apparatus 600 can be constructed, comprising from bottom to top: a heat-sealable polymer material 1472, a longitudinally oriented load-bearing structural polymer membrane 1482, an intermediate polymeric bonding or interface material 1484, a transverse-oriented load-bearing structural polymer membrane 1486, a reflective metallic layer 1476, and a protective polymer coating 1478 which also serves as a heat-sealable layer, whereby the two cross-stacked, directionally-oriented membranes 1482, 1486 increase strength and tear resistance of the composite membrane.

FIG. 40C depicts a fiber-reinforced multi-layer composite material 1490 from which the apparatus 600 can be constructed, comprising from bottom to top: a heat-sealable polymer material 1472, a bi-axially oriented load-bearing structural polymer membrane 1492, an intermediate polymeric bonding or interface material 1484, a layer of reinforcing fibers shown, for example, in a bi-axial weave 1494, a second intermediate polymeric bonding or interface material 1484, a second bi-axially oriented load-bearing structural polymer membrane 1492, a reflective metallic layer 1476, and a protective polymer coating 1478 which also serves as a heat-sealable layer, whereby the fiber reinforcement greatly improves the strength and tear resistance of the multi-layer composite membrane.

FIG. 40D depicts a fiber-reinforced composite material 1500 from which the non-reflective portions of the apparatus can be constructed, comprising a layer of reinforcing fibers 1494 in, for example, a bi-axial weave integrally imbedded in a heat-sealable polymer matrix material 1472, whereby an economical, high-strength, tear-resistant composite membrane is provided for the non-reflective portions of the apparatus. Note that this material can also optionally incorporate a reflective surface.

Various other materials may also be used to construct the membranous portions of the various apparatus disclosed herein. Non-limiting examples include: three-dimensional knit fabrics offering greater elasticity, randomly oriented fiber-reinforced membranes offering improved strength; ultraviolet light-resistant materials to protect against UV degradation of the polymer membranes, heat resistant and/or combustion resistant materials (e.g., Kapton, Nomex, etc.); and/or chemically resistant materials such as Teflon or Teflon coated membranes.

FIGS. 41A-46 illustrate various alternate apparatus having rigid resource harnessing elements (e.g., rigid reflector element).

FIGS. 41A-E: Rigid Concentrating Reflector with Safety Device

Figure 41A:
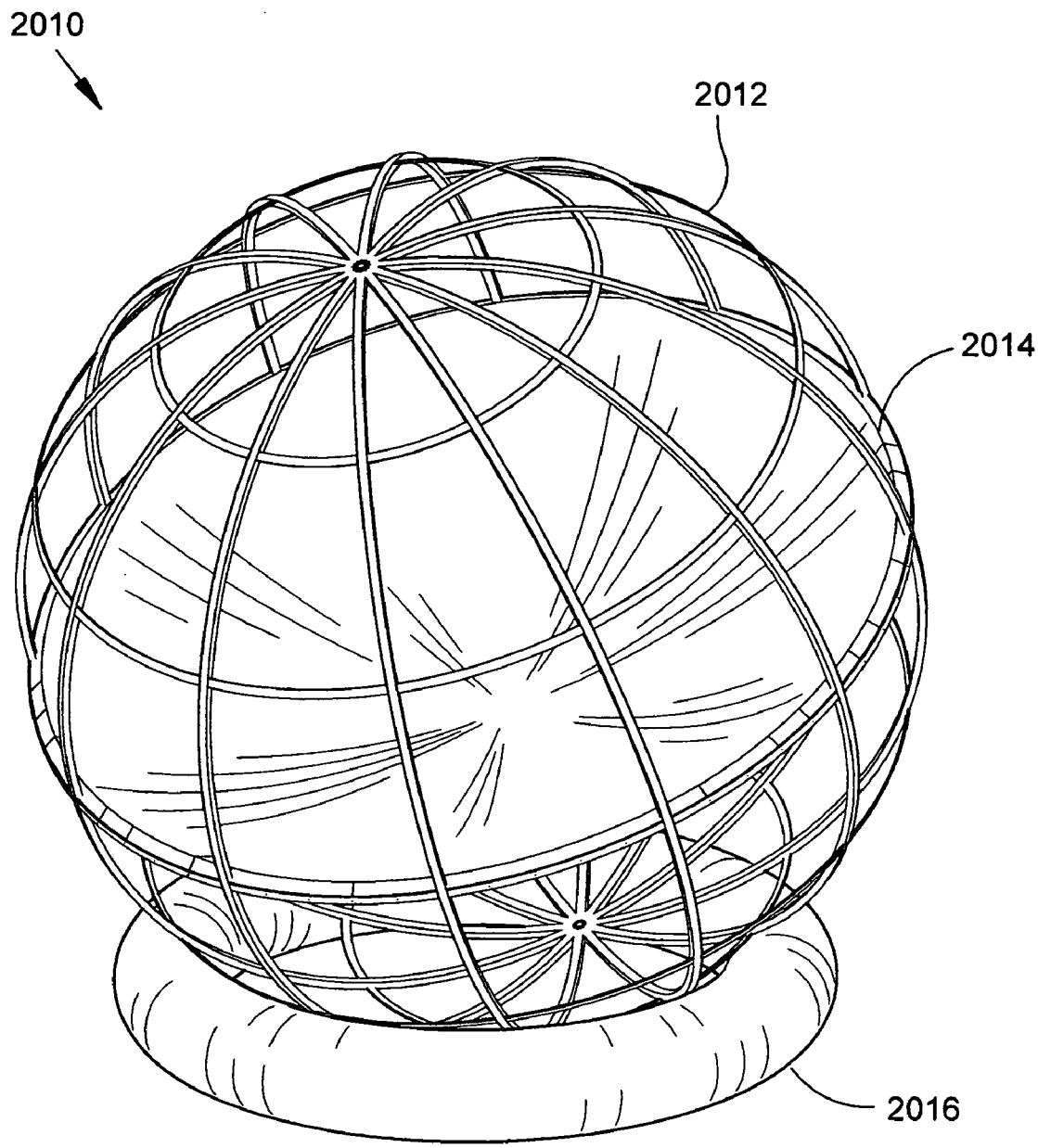
FIG. 41A-C are, respectively, two schematic perspective views and a schematic side-elevational cross-sectional view of a concentrating reflector apparatus comprising a central rigid concentrating reflector element supported by a multi-axis rotatable globe-shaped truss structure or frame, which is further supported by an optional support element (e.g., ring or frame). These figures show the upper potion of the apparatus rotationally oriented such as for harnessing solar energy.

FIG. 41A is a schematic perspective view of a concentrating reflector apparatus 2010 comprising a central rigid concentrating reflector element 2014 supported by a multi-axis rotatable globe-shaped truss structure 2012, which is further supported by an optional support element 2016 (e.g., ring), wherein the globe-shaped truss structure 2012 functions both as a safety device forming a barrier at least partially surrounding a focal point defined by the apparatus 2010, and as a universally pivoting support and orienting device operable to support and orient the apparatus for a selected function.

The concentrating reflectors for the apparatuses depicted herein may optionally have a parabolic cross section (i.e., paraboloidal in shape) for maximum degree of energy concentration. However, parabolic reflectors may optionally have a very short focal length to mitigate the risk of unintentional contact by the operator of the device from highly concentrated sunlight when the device is being used to concentrate solar energy. Alternatively, non-parabolic concentrating reflectors (e.g., reflectors having surfaces which are spherical, undulating, dimpled, faceted, or which comprise a series of conic sections, and the like) is contemplated to limit the maximum degree of concentration to further enhance safety and/or to provide more uniform heating.

Although the truss-like support structure 2012 is rigid, it may optionally be composed of a collapsible framework made from rigid elements.

The support rings 2016 for supporting the apparatuses depicted herein are shown having a toroidal shape, although they may optionally be non-toriodal in shape (e.g., cylindrical, conical and the like).

Figure 41B:
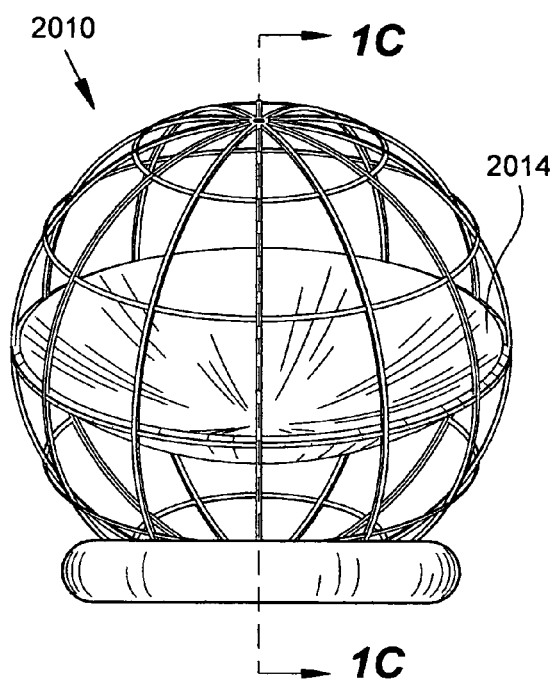

FIG. 41B is a schematic side-elevational view of the apparatus 2010 having its upper reflector portion 2014 rotated such that the axis 2028 of the concentrating reflector element 2014 is inclined relative to a vertical axis, such as may be required to orient the axis 2028 of the reflector element 2014 toward an electromagnetic source (not shown), such as the sun.

Figure 41C:
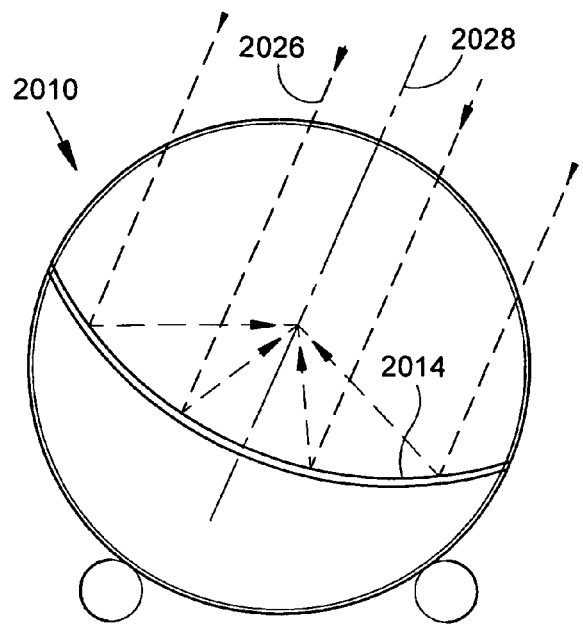

FIG. 41C is a schematic side-elevational cross-sectional view of the apparatus 2010 being used to concentrate radiant electromagnetic energy 2026 (e.g. solar radiation or sunlight), wherein the axis 2028 of the concentrating reflector element 2014 is inclined towards the electromagnetic source (not shown) (e.g., the sun).

Various non-limiting examples of solar energy harnessing accessory elements that may be integrally or removably incorporated into the present invention include: a solar oven or autoclave having a high-emissivity (generally blackened) energy-absorbing external surface; various two-sided cooking accessories integrally or removably attached to the apparatus such as flat griddle plates, waffle irons, pie irons; thermally (e.g., convectively and conductively) insulated cooking vessels; and turboelectric, thermoelectric, and/or photoelectric devices.

Non-limiting examples of various elements that may optionally be integrally or removably incorporated into the instant invention for holding items or materials at the focal point of the reflector include cable stayed focal points supports (i.e., assemblages of cables attached to the safety cage and/or the reflector operable to hold accessories in proximity to the focal point of the apparatus), rotisseries substantially diametrically spanning the concentrating reflector, and focal point supports otherwise comprising one or more rigid elements.

Non-limiting examples of energy conditioning apparatus that may optionally be integrally or removably incorporated into the instant invention include; rectifiers, inverters, transformers, phase synchronizers, voltage matchers, switches, fuses, breakers, frequency controllers, charge controllers, power controllers and the like.

Non-limiting examples of energy distributing accessories that may optionally be integrally or removably incorporated into the instant invention include; electrical conduits, waveguides and light-pipes, conduits for carrying heated fluids and the like.

Non-limiting examples of energy controllers that may be integrally or removably incorporated into the instant invention include; thermostats, voltage and electrical current controls, fluid pumps, electric motors, drivers, mechanical energy transmissions, gear sets, pulleys sets, and the like.

Figure 41D:
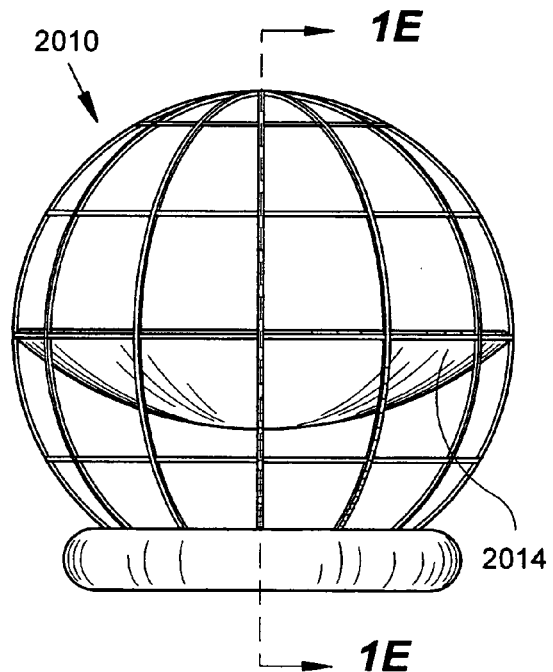
FIG. 41D is a schematic side-elevational view of the apparatus having its upper reflector portion rotationally oriented such that the axis of the concentrating reflector element is substantially aligned with a vertical axis to orient the reflector element toward the sky to collect precipitation (not shown).

Automatic sun tracking devices operable to provide single-axis and dual-axis tracking of electromagnetic sources may optionally be incorporated into the apparatus FIG. 41D is a schematic side-elevational view of the apparatus 2010 having its upper reflector portion 2014 alternatively rotated such that the axis 2028 of the concentrating reflector element 2014 is substantially aligned with a vertical axis to orient the reflector element 2014 toward the sky to collect precipitation (not shown)

Figure 41E:
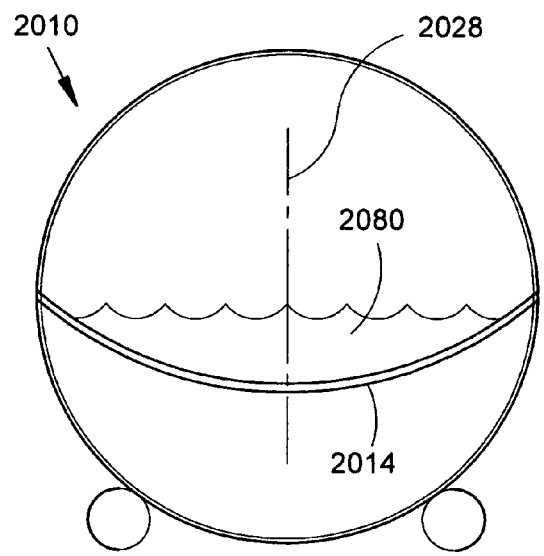
FIG. 41E is a schematic side-elevational cross-sectional view of the FIG. 41D apparatus being used to capture precipitation (not shown), (e.g., rain, snow, or sleet) to provide water for drinking or for other purposes.

FIG. 41E is a schematic side-elevational cross-sectional view of the apparatus 2010 being used to capture precipitation (not shown), (e.g., rain, snow, or sleet) to provide water 2080 for drinking or for other purposes. The apparatus 2010 may optionally have a port (not shown) having an optional valve through which the collected precipitation 2080 can be drained from the reflector element 2014 to an optional storage vessel (not shown) by an optional conduit (not shown).

The apparatus optionally can further incorporate one or more accessories for facilitating or enabling the collection, storage, processing, and/or distribution of collected precipitation. In particular, to further enhance the collection, storage, processing, and distribution of water or other liquids, it should be noted that various common liquid handling and processing devices can also optionally be integrally or removably incorporated into any apparatus of the instant invention in any useful quantity, location, and combination including, but not limited to, liquid pumps, pipes, tubes, funnels, valves, pressure gauges, flow meters, flow controllers, filters, and other useful elements. Non-limiting examples of optional water purifiers include but are not limited to reverse osmosis units, ultraviolet lamps for water sterilization, electro-static water filtration systems, ultra-violet light activated, titanium dioxide coatings for water bearing or water containment surfaces for catalyzing the production of free radicals to kill water borne pathogens, and antiseptic chemical applicators such as ozonators, chlorinators, and iodizers.

Figure 42:
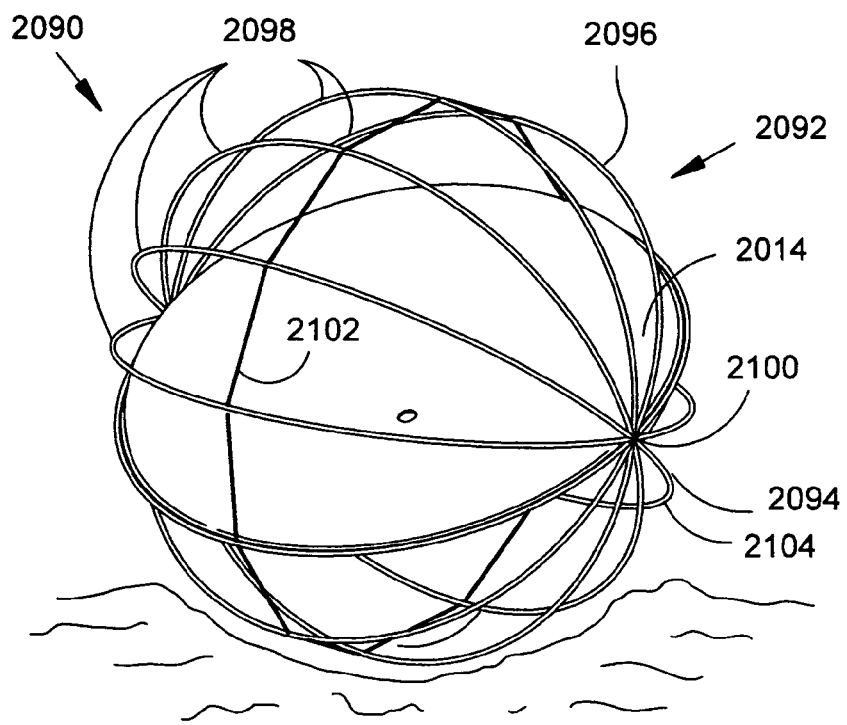
FIG. 42 is a schematic perspective view of a modified apparatus illustrating an alternate configuration for the safety cage and support element, wherein the safety cage and the support element each comprise a portion of a collapsible globe-shaped structure.
Figure 43:
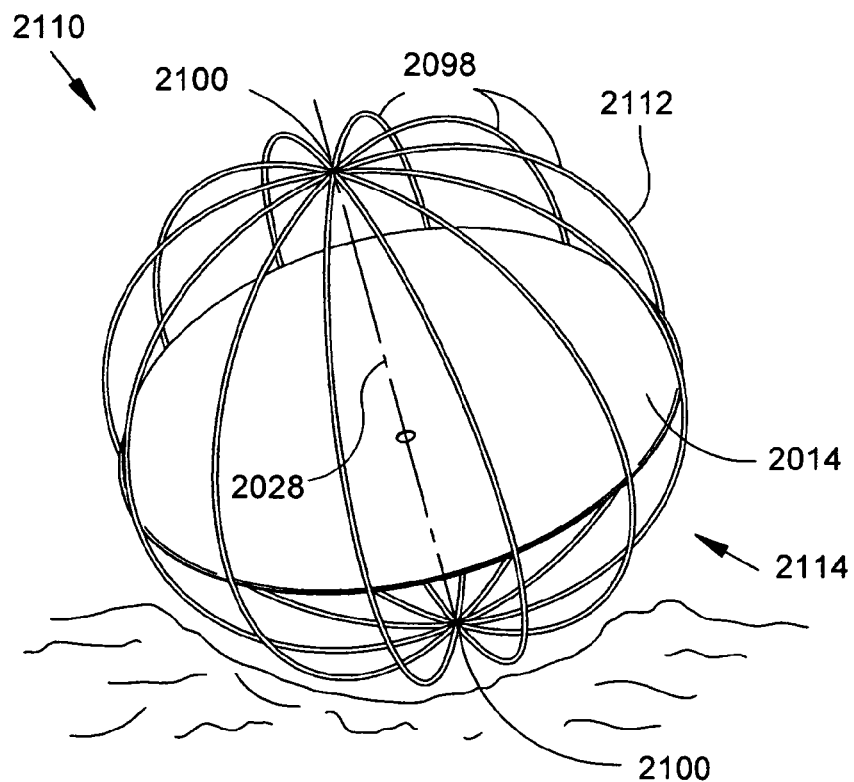
FIG. 43 is a schematic perspective view of a modified apparatus illustrating another alternate configuration for the safety cage and support element, wherein a combination safety cage and support element comprise a collapsible globe-shaped structure.

FIGS. 42 and 43: Alternate Safety Device Configurations

FIG. 42 is a schematic perspective view of a modified apparatus 2090 illustrating an alternate configuration for the safety cage and support element, wherein the safety cage 2092 and the support element 2094 each comprise a portion of a collapsible globe-shaped structure 2096 wherein each side of the collapsible globe-shaped structure comprise a plurality (e.g., five) of semicircular rigid elements 2098 rotatably attached (e.g., pinned) to one side of the rigid concentrating reflector 2014 of the reflector apparatus 2090 at diametrically opposed pin joints 2100, and which further comprise a single cord or cable stay 2102 as shown, (or a plurality of cords or cable stays) connected to the semicircular rigid elements 2104 and to the concentrating reflector 2014 to stabilize the collapsible structure.

FIG. 43 is a schematic perspective view of a modified apparatus 2110 illustrating an alternate configuration for the safety cage and support element, wherein the safety cage 2112 and the support element 2114 comprise a collapsible globe-shaped structure comprising a plurality (e.g., twelve) of semicircular rigid elements 2098, which are rotatably attached (e.g., pinned) to each other via pin joints 2100 located above and below the concentrating reflector 2014 along the focal axis 2028 of the device, and which are further attached to the concentrating reflector both to support the concentrating reflector and to stabilize the collapsible structure 2112.

Figure 44A:
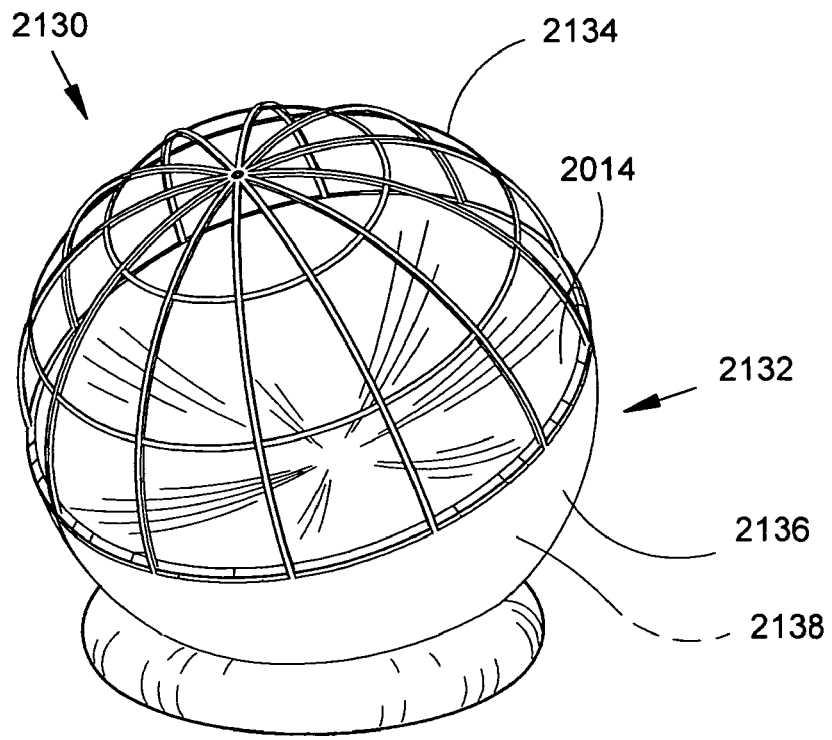
FIG. 44A is a schematic perspective view of an alternate concentrating reflector apparatus having an alternate multi-axis rotatable support structure wherein the upper portion is a globe-shaped truss structure and the lower portion is a spherically-shaped, optionally impermeable structure.
Figure 44B:
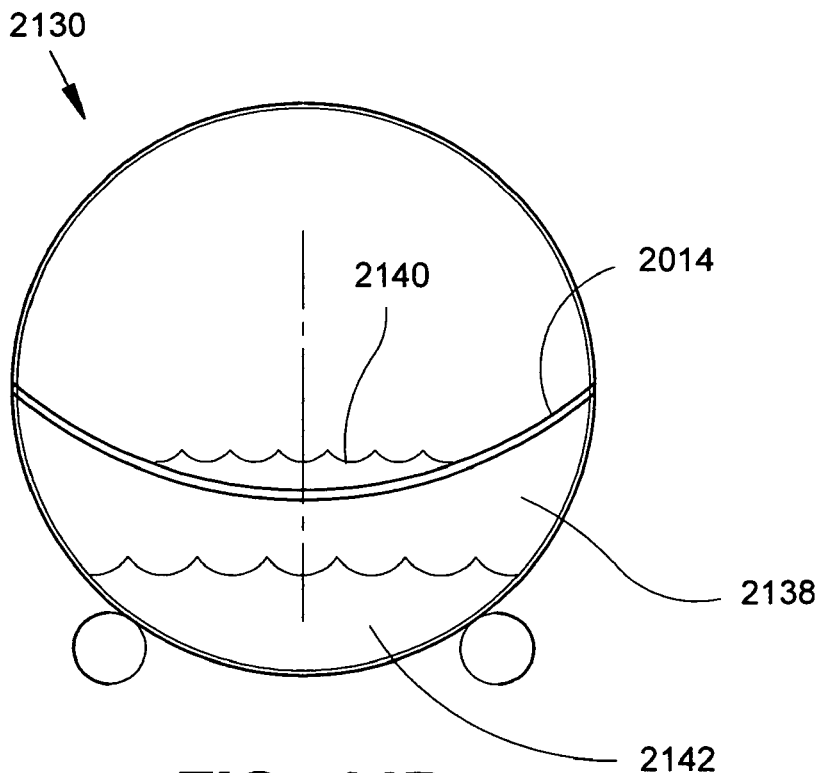
FIG. 44B is a schematic side-elevational cross-sectional view of an apparatus similar to that depicted in FIG. 44A having an alternate multi-axis rotatable support structure, wherein the upper portion is a globe-shaped truss structure and the lower portion is a spherically-shaped impermeable structure operable to contain and/or process material (e.g, fluid).

FIGS. 44A-B: Alternate Spherical Support Configuration

FIG. 44A is a schematic perspective view of an alternate concentrating reflector apparatus 2130 having an alternate multi-axis rotatable support structure 2132, wherein the upper portion (e.g., half) is a globe-shaped truss structure 2134 similar to that shown above in FIGS. 1A-E, but the lower portion (e.g., half) is a spherically-shaped, optionally impermeable structure 2136 which optionally provides a fluid storage chamber 2138 between the reflector element 2014 and the spherical support element 2136, such as can be seen in the cross-sectional view of FIG. 44B.

The storage chamber 2138 can be used to store collected precipitation 2140, or simply filled with water 2142 or other material to stabilize the apparatus 2130, such as to prevent tipping or upsetting of the apparatus 2130 if subjected to a strong or gusty wind.

The spherical support structure also facilitates use when supported in a ground depression, such as can be dug in sand or other soft material.

Note that ports, valves, and conduits can be incorporated into the fluid storage chamber to facilitate or enable the collection, storage, processing, and/or distribution of collected water or precipitation. In general, note that the same non-limiting set of water collection, storage, processing, and/or distribution accessories available to the apparatus depicted in FIGS. 1D and C can be removably or integrally incorporated into the apparatus depicted in FIGS. 4A and B in any useful quantity, location, and combination thereof.

Figure 45:
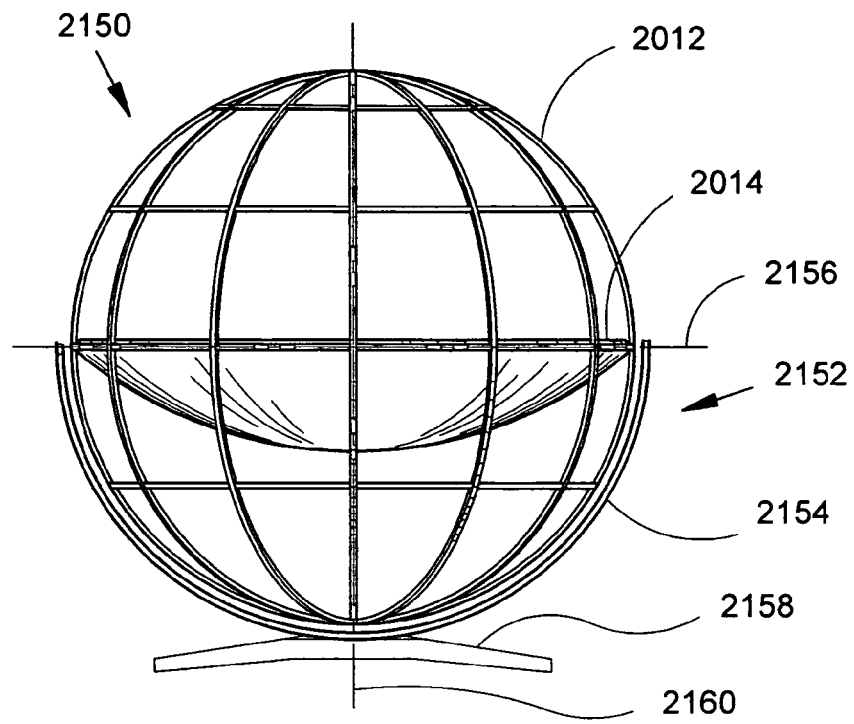
FIG. 45 is a schematic side-elevational view of an alternate reflector apparatus having an alternate support and orienting apparatus comprising a yoke assembly.
Figure 46:
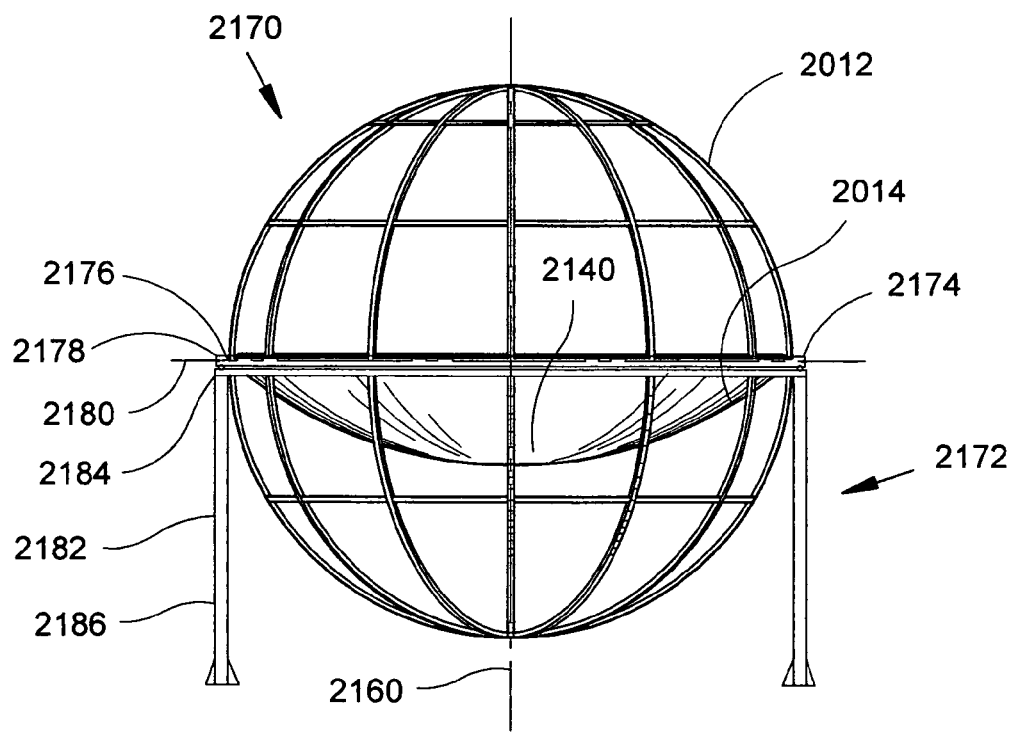
FIG. 46 is a schematic side-elevational view of an alternate reflector apparatus having an alternate support and orienting apparatus comprising a rotating gimbal assembly.

FIGS. 45 and 46: Alternate Yoke-Type Support Configuration

FIG. 45 is a schematic side-elevational view of an alternate apparatus 2150 having an alternate support and orienting apparatus 2152 comprising a yoke assembly 2154, which has its upper end rotatably attached to the reflector element 2014 and/or the safety cage 2012 to enable rotation about a horizontal axis 2156 to permit elevational adjustments in orientation, and which has its lower portion rotatably attached to a support base 2158 to enable rotation about a vertical axis 2160 to permit azimuthal adjustment in orientation.

FIG. 46 is a schematic side-elevational view of an alternate apparatus 2170 having an alternate support and orienting apparatus 2172 comprising a rotating gimbal assembly 2174, wherein the reflector element 2014 and/or the safety cage 2012 are rotatably attached via pivoting (e.g., pin) joints 2176 to a collar 2178 to enable rotation about a horizontal axis 2180 to permit elevational adjustments in orientation, and the collar 2178 is further rotatably attached to a frame 2182 to enable rotation about a vertical axis 2160 to permit azimuthal adjustment in orientation. FIG. 46 depicts the frame 2182 as comprising a substantially horizontally oriented circular rim 2184 or ring being supported by a plurality of generally vertical supports 2186 or legs; however, the invention contemplates that any suitable frame may be employed, including a rigid or collapsible frame.

Miscellaneous Broadly Applicable Optional Elements:

First, in addition to various valves noted herein above, still other valves may be alternatively or supplementally incorporated in to the various embodiments of the present invention. Non-limiting examples of such valves include: a valve with a removable plug; a valve with a removable cap; a valve with a snap-open and snap-close integrated valve and nozzle; a valve with a spring activated closure means; a twist-to-open valve; a valve with a variable control rate or flow resistance; a valve with an attached closure means to prevent loss of the closure means; a membranous conduit with a closure device (e.g., tongue and groove closure means, self sealing membrane, a clamp, a tie, or other closure means); an oral inflation valve; a flush-depressible and flushstowable valve such as for oral inflation; a pressure relief valve; a vacuum-relief valve; a one-way or check-valve; a safety valve providing easy inflation yet resists deflation; an adjustable pressure-relief valve; a reversible pressure-relief valve; a funnel-shaped valve; a threaded valve; a valve with an integrated accessory mounting feature (e.g., bayonet, spring loaded quick release attachment or tab, an interference fit, snap fit, integral bracket, boss, socket, hook and loop patch, latch, clamp, etc.); integral valve; and a modular replaceable valve.

In order to pressurize and/or depressurize the various pressure vessels of the present invention, the following non-limiting set of pumps optionally may be integrally or removably incorporable within the apparatus: manual pumps (e.g., hand pump, foot pump, etc.), motorized pumps, pressure regulated and pressure controlled pumps, integral pumps, modular pumps, and reversible pumps, and the like.

Pressurized gas canisters may optionally be used to inflate the various pressure vessels of the inflatable apparatus including; single shot devices, gas reservoirs with a manual valve, gas canisters with an automatic pressure and/or mass regulator.

Gas generators may also be used to pressurize the apparatus including chemical reactants and phase-change materials (e.g., liquid-to-gas or solid-to-gas).

Metallic reflective layers that may optionally be disposed on or within the various optionally electromagnetic energy reflecting portions of the apparatus include the following non-limiting set of substances; gold, aluminum, nickel, silver, molybdenum, and the like. The reflective layers may be deposited on or disposed within the reflective portions of the device by the following non-limiting set of processes; vapor deposition, electroplating, plasma or ionized matter gun deposition, chemical deposition, and installation of a leafed or laminated layer. Reflective chemical compounds such as magnesium fluoride may optionally be included on or within the reflective membranes of the device in order to reflect ultra-violet light. Reflective membranes may optionally contain a carbon and/or molybdenum coated carbon wire, mesh, or grid; a conductive ink; or a conductive paint for reflecting radio-frequency or microwave energy. An additional benefit to having a device with at least one membrane containing metallic or otherwise electrically conducting outer surface is that such membranes can serve as electrostatic energy shields or dissipaters to shield equipment in electrically charged environments such as can exist in dust storms, electrical storms, and in the presence of volcanic ash fallout. Other optional membranes include those having a light-refracting surface such as a membrane having the form of a Fresnel lens. Compound reflector/refractor membranes may optionally also be included in the configurations of the present invention wherein such membranes comprise a light refracting upper layer attached to a reflective substrate thus yielding a light concentrating membrane capable of having a shorter focal length with respect to a given extent of concavity.

Membranes can optionally have a selectively emissive surface (e.g., white colored surface) to provide high infrared emission and yet reduce solar black body absorption.

Photovoltaic membranous materials may optionally be included in the construction of the device.

Finally, to facilitate many of the applications of the multi-function field-deployable resource harnessing apparatus of the present invention as described herein, it should be noted that various common electronic and/or mechanical accessory devices or apparatus can be integrally or removably incorporated into any apparatus of the instant invention in any useful quantity, location, and combination thereof. Such optional electrical and/or mechanical accessory devices include, but are not limited to: electrically powered pumps, water powered pumps, fans, drive motors, timers, thermostats, flow controllers, photovoltaic cells, movable louvers or iris apparatus (for controlling flow or radiation), and other useful elements. To further enhance the collection, storage, processing, and distribution of water or other liquids, it should be noted that various common liquid handling and processing devices can also be integrally or removably incorporated into any apparatus of the instant invention in any useful quantity, location, and combination including, but not limited to, liquid pumps, pipes, tubes, funnels, valves, pressure gauges, flow meters, flow controllers, filters, and other useful elements. In addition, non-limiting examples of useful control mechanisms and status indicator devices which may optionally be incorporated into the apparatus include items such as a thermometer, thermocouple, photometer, GPS receiver, electrical current and voltage measuring and control devices, chemical analysis indicator devices including PH meters, chromatographs, salinity indicators and the like.

Further, other electrical energy manipulating devices which may optionally be included in any configurations of the present invention include one or more elements selected from the non-limiting set comprising: rectifiers, inverters, transformers, phase synchronizers, voltage matchers, switches, fuses, breakers, frequency controllers, charge controllers, power meters and/or controllers, temporal power integrators, electrical current grounding devices. Each of these additional electrical devices may be integrally or removably incorporated into any configurations of the instant invention in any useful quantity, location, and combination thereof. Further, one or more mechanical energy harnessing, manipulation, and/or storage devices may be incorporated into any configuration of the instant invention in any useful quantity, location and combination thereof, including but not limited to: brakes, speed controllers, position controllers, gear sets, pulley sets, elevated mass-based potential mechanical energy storage mechanisms, springs, elastomer elements, flywheels, compressed gas containing vessels, and acceleration/shock absorbers.

Additionally, audible and/or visual alarms may be integrally or removably incorporated into any configurations of the instant invention in any useful quantity, location, and combination thereof. Such alarms include fire and/or overheating alarms, electrical malfunction alarms, mechanical failure alarms and the like. Further still, non-limiting examples of fire suppression equipment which may optionally be removably incorporated into the present invention, or optionally located in proximity to the invention, but not connected to it include water sprinkling systems, pressurized carbon dioxide based fire extinguishers, and pressurized HALON fire extinguishers. To facilitate use of the modular multi-function apparatus of the present invention, identical modules or sub-modules may optionally be identically colored, or they may have optional symbols, images, or text embossed on their visible surfaces to permit easy and quick identification.

Finally, note that the accessories disclosed in each of the applications included herein by reference are also generally applicable to each of the various embodiments shown herein.

Thus, the extensive applicability of the fundamental multifunction field-deployable resource harnessing apparatus has been disclosed.

What is claimed is:

1. An apparatus, comprising:
   (a) a reflector reflective to radiant electromagnetic energy and operable to produce a concentration of electromagnetic energy; and
   (b) a safety member disposed to provide a physical barrier at least partially surrounding the concentration of electromagnetic energy at a focal point defined by the reflector.

2. An apparatus as recited in claim 1, wherein the reflector comprises i. a ring support element including at least one ring, and the ring support element includes a vacant center; and ii. at least two pressure-deformable membranes extending across the vacant center of the support element, wherein the membranes, and optionally the ring support element, define at least one reflector chamber, and at least one of the membranes is reflective to electromagnetic radiation.

3. An apparatus as recited in claim 2, wherein the ring support element and the reflector chamber are inflatable, the ring support element is tubular, and the reflector further comprises iii. at least one inflation device disposed to inflate the ring support element; and iv. at least one pressure adjusting or inflating device disposed to adjust the pressure within, or to inflate, the reflector chamber.

4. An apparatus as recited in claim 1, wherein the safety member is a safety shield or a safety cage.

5. An apparatus as recited in claim 1, wherein one or more of the reflector and the safety member are collapsible structures.

6. An apparatus as recited in claim 1, wherein one or more of the reflector and the safety member are rigid structures.

7. An apparatus as recited in claim 1, further comprising:
   (c) a support assembly attached to the reflector.

8. An apparatus as recited in claim 7, wherein the support assembly comprises i. a spherical support.

9. An apparatus as recited in claim 8, wherein the support assembly further comprises ii. a ring, wherein the spherical support is disposed to moveably couch within the ring.

10. An apparatus as recited in claim 1, wherein the safety member supports a cable-stayed support for holding a material, an accessory element, or a material and an accessory element, in proximity to a focal point of the reflector.

11. An apparatus as recited in claim 10, wherein a safety net or mesh is attached to an upper portion of the safety member.

12. An apparatus as recited in claim 10, wherein a safety cover is attached to an upper portion of the safety member and is deployable to attenuate electromagnetic energy striking the reflector.

13. An apparatus as recited in claim 1, wherein the reflector comprises a central rigid concentrating reflector element.

14. An apparatus as recited in claim 13, wherein the reflector element is supported by a truss structure.

15. An apparatus as recited in claim 14, wherein the truss structure is globe-shaped.

16. An apparatus as recited in claim 15, wherein the truss structure is supported by a support element.

17. An apparatus as recited in claim 16, wherein the support element is a ring.

18. An apparatus as recited in claim 1, wherein a vessel is supported in proximity to the concentration of electromagnetic energy.

19. An apparatus as recited in claim 1, wherein a vessel of a distillation apparatus is supported in proximity to the concentration of electromagnetic energy.

20. An apparatus as recited in claim 1, wherein heat exchanger is supported in proximity to the concentration of electromagnetic energy.

21. An apparatus as recited in claim 1, wherein a photovoltaic cell is supported in proximity to the concentration of electromagnetic energy.

22. An apparatus as recited in claim 1, wherein a heating chamber is supported in proximity to the concentration of electromagnetic energy.

23. An apparatus as recited in claim 1, wherein an air-heating device is supported in proximity to the concentration of electromagnetic energy.

24. An apparatus as recited in claim 1, wherein an antenna is supported in proximity to the concentration of electromagnetic energy.

25. An apparatus as recited in claim 24, wherein the antenna is a basic antenna or a high-gain antenna.

26. An apparatus as recited in claim 1, further comprising a support element attached to the reflector and a transceiver device attached to the support element.

27. An apparatus as recited in claim 1, wherein the apparatus is disposed to relay electromagnetic energy to a second apparatus, wherein the second apparatus comprises i. a second reflector reflective to radiant electromagnetic energy and operable to produce a second concentration of electromagnetic energy; and ii. a second safety member disposed to provide a physical barrier at least partially surrounding the second concentration of electromagnetic energy.

28. An apparatus as recited in claim 1, wherein a non-collimated light source is supported in proximity to the focal point.

29. An apparatus as recited in claim 1, wherein the safety member supports a support of supporting an item in proximity to the concentration of electromagnetic energy, wherein the support is selected from the group consisting of a rigid support, a collapsible support, and inflatable support, and a cable-stayed support.

30. An apparatus as recited in claim 1, wherein a wave guide device is supported in proximity to the concentration of electromagnetic energy.

31. An apparatus as recited in claim 30, wherein the waveguide device comprises a waveguide, and the waveguide is connected to a lamp or a light-energized tool.

32. An apparatus as recited in claim 31, wherein the waveguide is connected to the light-energized tool, and the tool includes a light absorbing element that generates heat when the tool is energized.

33. An apparatus as recited in claim 31, wherein the waveguide is connected to the light-energized tool, and the tool includes a light-emitting tip that generates light or heat when the tool is energized.

34. A field-deployable reflector apparatus comprising:
(a) a ring support element comprising at least one ring, and the ring support element includes a vacant center;
(b) at least two mechanically-deployable membranes extending across the vacant center of the support element, and at least one of the membranes is reflective to electromagnetic radiation; and
(c) a safety member disposed to provide a physical barrier at least partially surrounding the concentration of electromagnetic energy at a focal point defined by the reflector.

35. A field-deployable reflector apparatus as recited in claim 34, wherein the membranes and the ring support element define at lease one reflector chamber when in a mechanically deployed state.

36. A field-deployable reflector apparatus as recited in claim 34, wherein the ring support element is inflatable and tubular, and the reflector apparatus further comprises at least one inflation device disposed to inflate the ring support element.

37. A field-deployable reflector apparatus as recited in claim 34, wherein the reflector apparatus is collapsible.

38. A field-deployable reflector apparatus as recited in claim 34, wherein the ring support element is a rigid structure.

39. A field-deployable reflector apparatus as recited in claim 34, wherein a plurality of internal ribs or cords, or both, connect the two mechanically-deployable membranes to form a faceting pattern.

40. A field-deployable reflector apparatus as recited in claim 39, wherein the membranes and the ring support element define at least one reflector chamber when in a mechanically deployed state, and wherein the apparatus further includes a pressure adjusting device operable to adjust pressure within the reflector chamber.

41. A field-deployable apparatus as recited in claim 34, further comprising: (c) a support assembly disposed to support and orient the apparatus.

42. A field-deployable apparatus as recited in claim 41, wherein the support assembly is attached to a lower surface of the ring support element, the support assembly comprising i. a spherical support.

43. A field-deployable apparatus as recited in claim 42, wherein the support assembly further comprises ii. a toroidal ring, wherein the spherical support is disposed to moveably couch within the toroidal ring.

44. A field-deployable apparatus as recited in claim 43, further comprising: (d) a safety shield attached to an upper surface of the ring support element.

45. A field-deployable apparatus for collecting, storing, or processing one or more materials, the apparatus comprising:
(a) a ring support element including at least one substantially tubular ring, and the ring support element includes a vacant center;
(b) one or more membranes extending across the vacant center of the support element, wherein a first membrane is disposed at an upper surface of the ring support element so as to form a floor of a collection basin for a material; and
(c) a collecting, storing, or processing device disposed to perform one or more functions selected from the group consisting of collecting, storing and processing a material, wherein the collecting, storing, or processing device is connected to one or more of the ring support element and the first membrane.

46. A field-deployable apparatus as recited in claim 45, wherein the collecting, storing, or processing device comprises one or more toroidal rings attached to the upper surface of the ring support element so as to form a portion of the collection basin.

47. A field-deployable apparatus as recited in claim 46, wherein the collecting, storing, or processing device further comprises a transparent membrane attached at an upper portion of the one or more toroidal rings; and a collection vessel disposed to receive material dripping from the transparent membrane.

48. A field-deployable apparatus as recited in claim 45, wherein the collecting, storing, or processing device includes at least one valve or port disposed in the first membrane and the valve or port is operable to drain material from the collection basin.

49. A field-deployable apparatus as recited in claim 48, further comprising a second membrane disposed to form a floor of a processing chamber, wherein the processing chamber is defined by the first membrane, the second membrane, and optionally the ring support element, and the valve or port disposed in the first membrane is operable to drain material from the collection basin to the processing chamber.

50. A field-deployable apparatus as recited in claim 45, further comprising a second membrane disposed to form a floor of a processing chamber, wherein the processing chamber is defined by the first membrane, the second membrane, and optionally the ring support element, and an ultraviolet-light-emitting device is disposed in the processing chamber.

51. A field-deployable apparatus as recited in claim 45, further comprising a second membrane disposed to form a floor of a processing chamber, wherein the processing chamber is defined by the first membrane, the second membrane, and optionally the ring support element, and a radiant-energy-absorbing upper membrane device is disposed on the first membrane.

52. A field-deployable apparatus as recited in claim 45, further comprising a second membrane disposed to form a floor of a processing chamber, wherein the processing chamber is defined by the first membrane, the second membrane, and optionally the ring support element, and the first membrane and the second membrane each have an electrically insulated, electrically conductive layer that electrostatically charge.

53. A field-deployable apparatus as recited in claim 45, further comprising a second membrane disposed to form a floor of a processing chamber, wherein the processing chamber is defined by the first membrane, the second membrane, and optionally the ring support element, and the first membrane is transparent and the second membrane includes a pathogen-killing layer disposed on an inner side within the processing chamber.

54. A field-deployable apparatus as recited in claim 53, wherein the pathogen-killing layer includes silver or titanium-dioxide.

55. A field-deployable apparatus as recited in claim 45, further comprising a second membrane disposed to form a floor of a processing chamber, wherein the processing chamber is defined by the first membrane, the second membrane, and optionally the ring support element, and a pathogen killing material is disposed within the processing chamber.

56. A field-deployable inflatable apparatus for harnessing energy from waves, the apparatus comprising: (a) a first ring support element comprising at least one substantially tubular inflatable ring, and the first ring support element includes a vacant center, wherein a first membrane extends across the vacant center of the first ring support element and a first inflatable cover is attached to the first ring support element; (b) a mechanical energy harnessing assembly attached to the first ring support element; and (c) a second ring support element comprising at least one substantially tubular inflatable ring, the second ring support element includes a vacant center, and a second membrane extends across the vacant center of the second ring support element and a second cover is attached to the second ring support element, and the energy harnessing assembly is also attached to the second ring support element so the energy harnessing assembly is disposed between the covers of the first ring support element and the second ring support element.

57. A field-deployable inflatable apparatus as recited in claim 56, wherein the energy harnessing assembly includes a linear piston.

58. A field-deployable inflatable apparatus as recited in claim 56, wherein the energy harnessing assembly includes a linear generator.

59. A field-deployable inflatable apparatus for harnessing energy from fluid streams, the apparatus comprising: (a) a first ring support element comprising at least one substantially tubular inflatable ring, and the first ring support element includes a vacant center; and (b) an energy harnessing assembly attached to the first ring support element, wherein the energy harnessing assembly includes a turbine device.

60. A field-deployable inflatable apparatus as recited in claim 59, wherein the turbine device is a turbine generator device disposed in the vacant center of the first ring support element.

61. A field-deployable inflatable apparatus as recited in claim 60, further comprising: (c) a safety member attached to the first ring support element, wherein the turbine generator device is mounted within the safety member.

62. A field-deployable inflatable apparatus as recited in claim 59, wherein the energy harnessing assembly includes a plurality of flexible membranous blades attached to the first ring support element so the first ring support element and the plurality of blades form a wind turbine.

63. A field-deployable inflatable apparatus as recited in claim 62, further comprising: (c) a support assembly comprising a shaft and a generator mounted on the shaft, wherein the wind turbine is attached to the generator so the generator generates electrical energy when wind rotates the turbine on the shaft of the support assembly.

64. An apparatus comprising: (a) a reflector reflective to radiant electromagnetic energy and operable to produce a concentration of electromagnetic energy; (b) a safety member disposed to provide a physical barrier at least partially surrounding the concentration of electromagnetic energy; and (c) a support element, wherein the safety member, the support element, and optionally the reflector, each comprise a portion of a globe-shaped structure of the apparatus.

65. An apparatus as recited in claim 64, wherein the safety member comprises a first plurality of semicircular rigid elements and the support element comprises a second plurality of semicircular rigid elements.

66. An apparatus as recited in claim 65, wherein the first plurality of semicircular rigid elements are rotatably attached to one side of the reflector and the second plurality of semicircular rigid elements is rotatably attached to the reflector to diametrically oppose the first plurality of semicircular rigid elements.

67. An apparatus as recited in claim 66, further comprising one or more cable-stays connected to stabilize the first plurality of semicircular rigid elements, the second plurality of rigid elements and the reflector as a globe-shaped structure.

68. An apparatus as recited in claim 65, wherein the safety member and the support element are rotatably attached to each other.

69. An apparatus as recited in claim 68, wherein the reflector is disposed to stabilize the first plurality of semicircular rigid elements and the second plurality of semicircular rigid elements.

70. An apparatus comprising:
  (a) a low-inflation-volume spherical support having an approximately parabolic inner surface; and
  (b) a reflective membrane attached to the approximately parabolic inner surface of the low-inflation-volume spherical support.

71. An apparatus as recited in claim 70, wherein at least a portion of the reflective membrane is attached to the low-inflation-volume spherical support by a plurality of substantially circumferential oriented bonds.

72. An apparatus as recited in claim 71, wherein the entire reflective membrane is supported by the low-inflation-volume spherical support.

73. An apparatus as recited in claim 70, further comprising: (c) a focal point support selected from a rod or cable-stayed support disposed to span the apparatus.

74. An apparatus as recited in claim 70, wherein the low-inflation-volume spherical support also includes an approximately spherical outer surface, and the apparatus further comprises: (d) a toroidal support ring, wherein the outer surface of the low-inflation-volume spherical support is couched within the toroidal ring support.

75. An apparatus as recited in claim 70, wherein the low-inflation-volume spherical support comprises an inner membrane and an outer membrane joined to the inner membrane, and a plurality of internal elements also join the inner membrane to the outer membrane.

76. A multifunction apparatus, comprising:
  (a) a reflector reflective to radiant electromagnetic energy and operable to produce a concentration of electromagnetic energy; and
  (b) a safety member disposed to provide a physical barrier at least partially surrounding the concentration of electromagnetic energy, wherein the reflector comprises i. a support element including at least one ring or frame, and the support element includes a vacant center; and ii. at least two pressure-deformable membranes extending at least partially across the vacant center of the support element, wherein the membranes and the support element define at least one reflector chamber, and at least one of the membranes is reflective to electromagnetic radiation.

* * * * *